(12) United States Patent
Raffaele et al.

(10) Patent No.: US 8,371,210 B2
(45) Date of Patent: Feb. 12, 2013

(54) RECIPROCATING FLUID MACHINES

(76) Inventors: Peter Robert Raffaele, Killarney Heights (AU); Michael John Raffaele, Killarney Heighs (AU)

( * ) Notice: Subject to any disclaimer, the term of this patent is extended or adjusted under 35 U.S.C. 154(b) by 0 days.

(21) Appl. No.: 13/289,421

(22) Filed: Nov. 4, 2011

(65) Prior Publication Data

US 2012/0247320 A1    Oct. 4, 2012

Related U.S. Application Data

(63) Continuation of application No. 12/032,343, filed on Feb. 15, 2008, now abandoned, which is a continuation-in-part of application No. 11/400,027, filed on Apr. 7, 2006, now abandoned, which is a continuation of application No. 09/037,740, filed as application No. PCT/AU00/00281 on Apr. 3, 2000, now abandoned.

(30) Foreign Application Priority Data

| Apr. 1, 1999 | (AU) | PP9573 |
|---|---|---|
| May 11, 1999 | (AU) | PQ0287 |
| Jun. 4, 1999 | (AU) | PQ0795 |
| Jun. 10, 1999 | (AU) | PQ0895 |
| Jul. 15, 1999 | (AU) | PQ1653 |
| Jul. 15, 1999 | (AU) | PQ1654 |
| Jul. 30, 1999 | (AU) | PQ1956 |
| Aug. 11, 1999 | (AU) | PQ2150 |
| Aug. 13, 1999 | (AU) | PQ2205 |
| Aug. 13, 1999 | (AU) | PQ2206 |
| Aug. 19, 1999 | (AU) | PQ2341 |
| Aug. 23, 1999 | (AU) | PQ2388 |
| Aug. 24, 1999 | (AU) | PQ2408 |
| Sep. 14, 1999 | (AU) | PQ2808 |
| Sep. 14, 1999 | (AU) | PQ2809 |

(51) Int. Cl.
  *F01B 7/04* (2006.01)
(52) U.S. Cl. .......... 92/72; 92/129; 92/140; 92/148
(58) Field of Classification Search .......... 92/72, 129, 92/140, 148
  See application file for complete search history.

(56) References Cited

U.S. PATENT DOCUMENTS
(Continued)

FOREIGN PATENT DOCUMENTS
DE    2361228    6/1975
DE    3624753    10/1987
(Continued)

OTHER PUBLICATIONS

Article: CKE's Radial Engine, based on Kmicikiewicz U.S. Patent 4,727,794, printed from internet web page at http:\\www.cke.tech.com.RE.htm and DWG SK-076, Kinematics and Dynamics of CKE's Radial Engine compared to conventional mechanisms con Scotch Yoke, based on Kmicikiewicz U.S. Patent 4,727,794.

(Continued)

*Primary Examiner* — Igor Kershteyn
(74) *Attorney, Agent, or Firm* — Volpe and Koenig, P.C.

(57) ABSTRACT

A scotch yoke type fluid device in which the pistons are decoupled from each other is provided. Each piston of the device has its own pair of sliding surfaces and its own slider. The sliding surface of each piston is disposed on the same side of a big end bearing of a crank. The main axis of the crank is movable along a path such that the pistons are neither substantially retarded nor advanced. The effective centre of mass of the crank, piston and slider remains stationary relative to the crank axis. Each piston includes a guide for constraining the piston to move along the piston axis. An intermediate member may interconnect the piston and the slides.

20 Claims, 81 Drawing Sheets

U.S. PATENT DOCUMENTS

| | | | |
|---|---|---|---|
| 1,349,660 A | | 8/1920 | Buhl |
| 1,987,661 A | | 1/1935 | Blauvelt |
| 2,366,237 A | * | 1/1945 | De Witt .............................. 74/50 |
| 3,205,723 A | * | 9/1965 | Erlenbach ......................... 74/50 |
| 3,258,992 A | | 7/1966 | Hittel |
| 4,013,048 A | | 3/1977 | Reitz |
| 4,124,002 A | | 11/1978 | Crise |
| 4,173,151 A | | 11/1979 | Grundy |
| 4,184,817 A | | 1/1980 | Pareja |
| 4,331,108 A | | 5/1982 | Collins |
| 4,339,960 A | * | 7/1982 | Senft .............................. 60/518 |
| 4,459,945 A | * | 7/1984 | Chatfield .................... 123/55.3 |
| 4,485,768 A | * | 12/1984 | Heniges ......................... 92/13.1 |
| 4,512,291 A | | 4/1985 | Kirk |
| 4,584,972 A | | 4/1986 | Jayne et al. |
| 4,598,672 A | | 7/1986 | Jayne et al. |
| 4,683,809 A | | 8/1987 | Taylor |
| 4,685,342 A | * | 8/1987 | Brackett ........................... 74/50 |
| 4,694,785 A | | 9/1987 | Timmerman et al. |
| 4,715,336 A | | 12/1987 | Schindler et al. |
| 4,727,794 A | | 3/1988 | Kmicikiewicz |
| 4,738,230 A | | 4/1988 | Johnson |
| 4,751,871 A | | 6/1988 | Burghardt et al. |
| 4,776,310 A | | 10/1988 | Gray |
| 4,791,898 A | | 12/1988 | Jayne |
| 4,803,890 A | * | 2/1989 | Giuliani et al. ................. 74/131 |
| 4,825,820 A | | 5/1989 | Morgan |
| 4,884,536 A | | 12/1989 | Neale et al. |
| 4,887,560 A | * | 12/1989 | Heniges ...................... 123/78 F |
| 4,909,133 A | | 3/1990 | Taylor et al. |
| 4,977,864 A | * | 12/1990 | Grant .......................... 123/50 B |
| 5,259,256 A | * | 11/1993 | Brackett ......................... 92/136 |
| 5,327,863 A | | 7/1994 | Downton et al. |
| 5,402,755 A | | 4/1995 | Waissi |
| 5,431,130 A | | 7/1995 | Brackett |
| 5,445,039 A | * | 8/1995 | Brackett ......................... 92/237 |
| 5,503,038 A | | 4/1996 | Aquino et al. |
| 5,575,173 A | | 11/1996 | Brackett |
| 5,755,192 A | | 5/1998 | Brevick |
| 5,791,302 A | | 8/1998 | Ma |
| 5,873,339 A | | 2/1999 | Isogai |
| 5,900,193 A | | 5/1999 | Rivers et al. |
| 6,029,346 A | | 2/2000 | Chellappa |
| 6,148,785 A | | 11/2000 | Rivers et al. |
| 6,524,707 B1 | | 2/2003 | Rasmussen |
| 6,539,835 B1 | | 4/2003 | Rasmussen |
| 7,210,397 B2 | | 5/2007 | Raffaele et al. |
| 2004/0045522 A1 | | 3/2004 | Raffaele |
| 2004/0206234 A1 | | 10/2004 | Raffaele |
| 2007/0079787 A1 | | 4/2007 | Raffaele |
| 2007/0151444 A1 | | 7/2007 | Raffaele |

FOREIGN PATENT DOCUMENTS

| | | |
|---|---|---|
| DE | 4408646 | 9/1994 |
| DE | 19500854 | 7/1995 |
| DE | 19725227 | 1/1998 |
| EP | 0187930 | 7/1986 |
| EP | 241243 | 10/1987 |
| FR | 2438746 | 5/1980 |
| GB | 200704 | 7/1923 |
| GB | 678677 | 9/1952 |
| JP | 1253335 | 3/1985 |
| JP | 03271530 | 12/1991 |
| JP | 8014061 | 1/1996 |
| JP | 08100621 A | 4/1996 |
| JP | 10008975 A | 1/1998 |
| JP | 10054255 | 2/1998 |
| JP | 10331940 | 12/1998 |
| RU | 2094627 C | 10/1997 |
| SU | 1281700 | 1/1987 |
| TW | 251333 A | 7/1994 |
| WO | 9006426 | 6/1990 |
| WO | 9415080 | 7/1994 |
| WO | 9726452 | 7/1997 |
| WO | 9732647 | 9/1997 |
| WO | 9736096 | 10/1997 |
| WO | 9848158 | 10/1998 |
| WO | 0060216 | 12/2000 |
| WO | 0150037 | 7/2001 |
| WO | 0227163 | 4/2002 |
| WO | 02088530 | 7/2008 |

OTHER PUBLICATIONS

Article: The Collins Scotch Yoke Engine as a Compac[t] Alternative—A Theoretical Comparison o[f] Features of Scotch Yoke and Conventional Engine [s], Hans G. Rosenkra[nz] CMC Research Pty. and Harry C. Wats[on] University of Melbourne; publication date of article unknown.

Some Unusual Engine, pp. 124-127, by L.J. K. Setright, published in 1975 by Mechanical Engineering Publications Limited (ISBN 0852982089).

Aerospace & Technology Innovation vol. 5 No. 4 Jul./Aug. 1997 titled "Composite Licensed for Pistons".

* cited by examiner

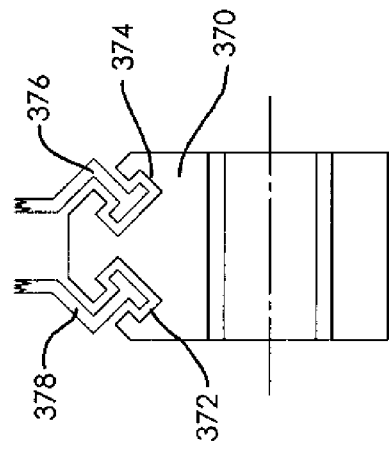
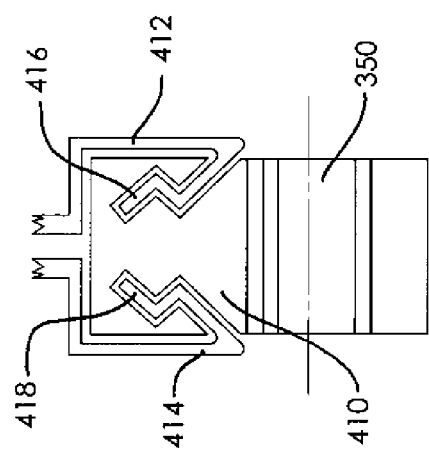
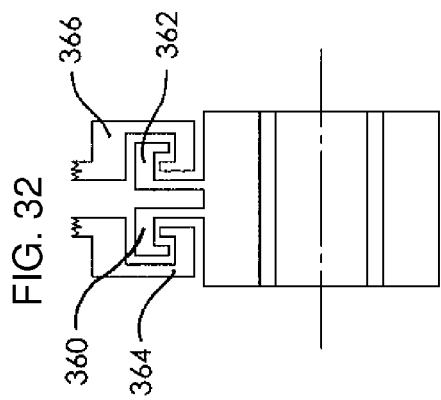
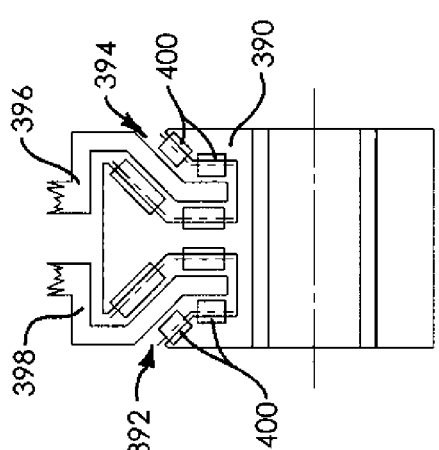
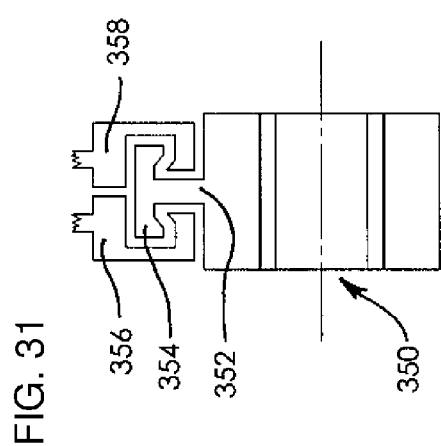
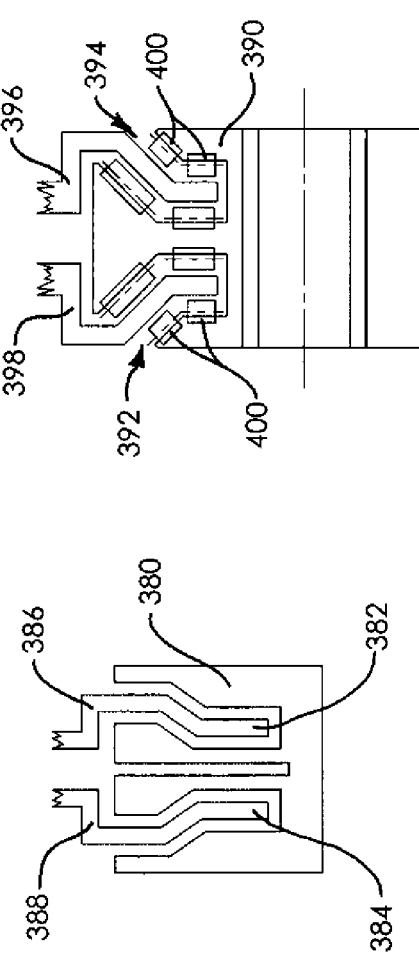

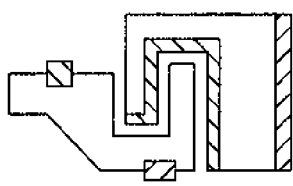
FIG. 42  FIG. 43  FIG. 44
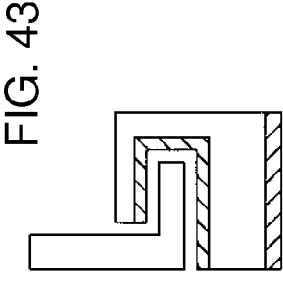
FIG. 45
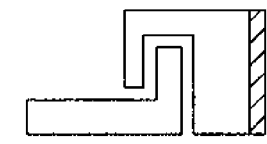
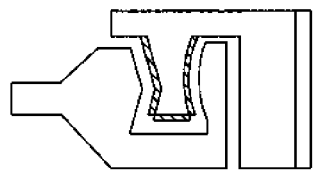
FIG. 46
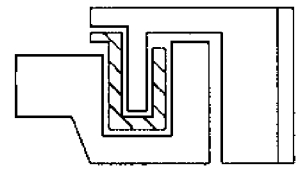
FIG. 47

FIG. 58
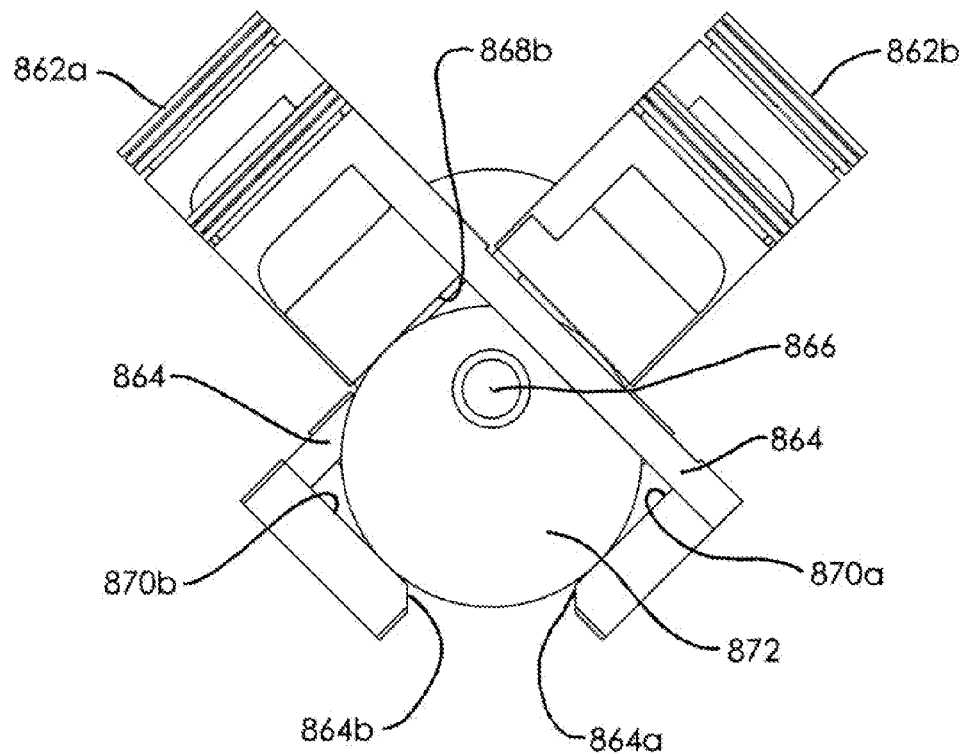
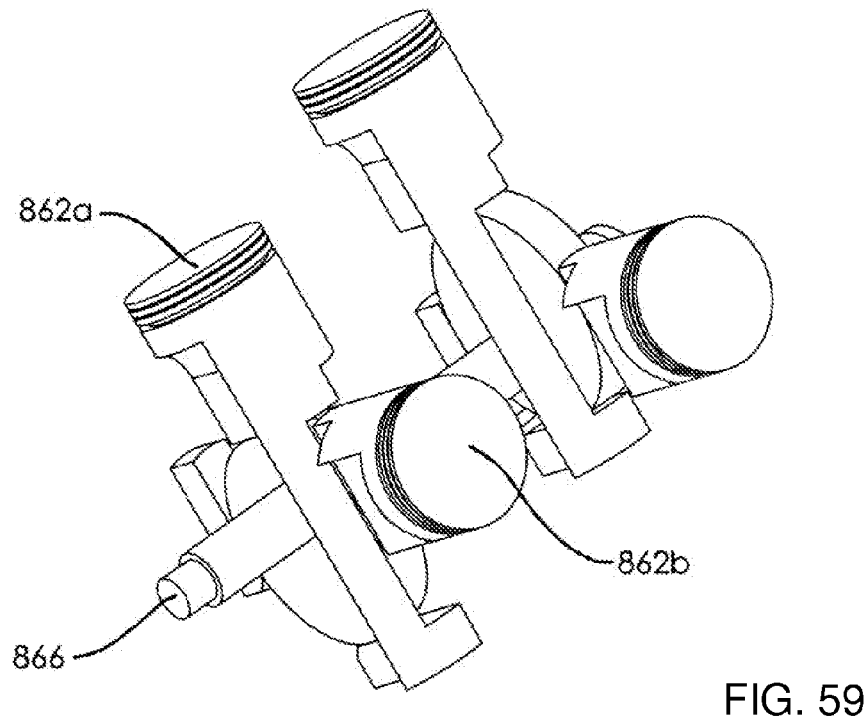
FIG. 59

FIG. 68A
FIG. 68
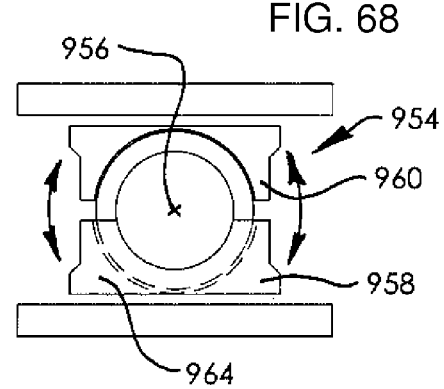
FIG. 68B
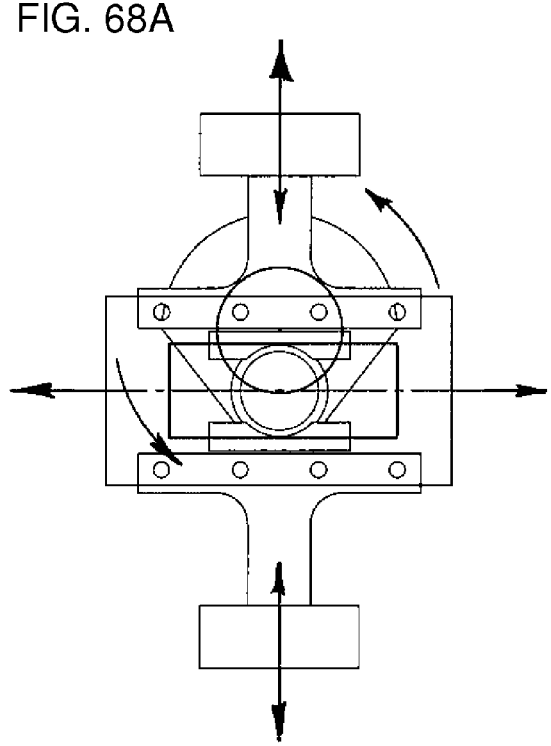
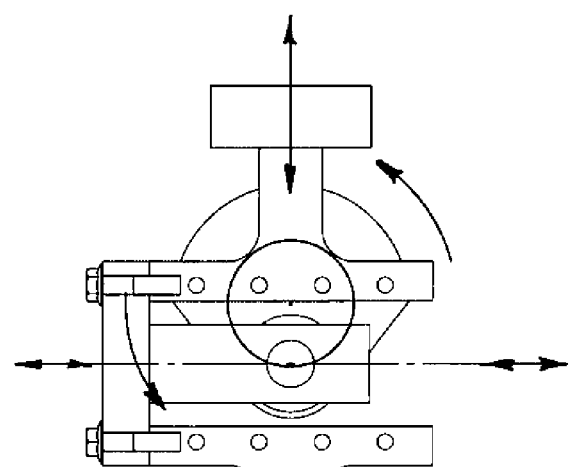
FIG. 68C
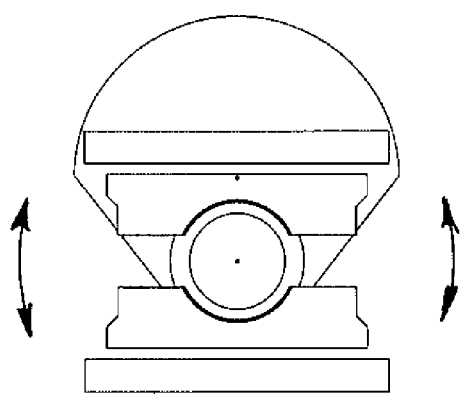

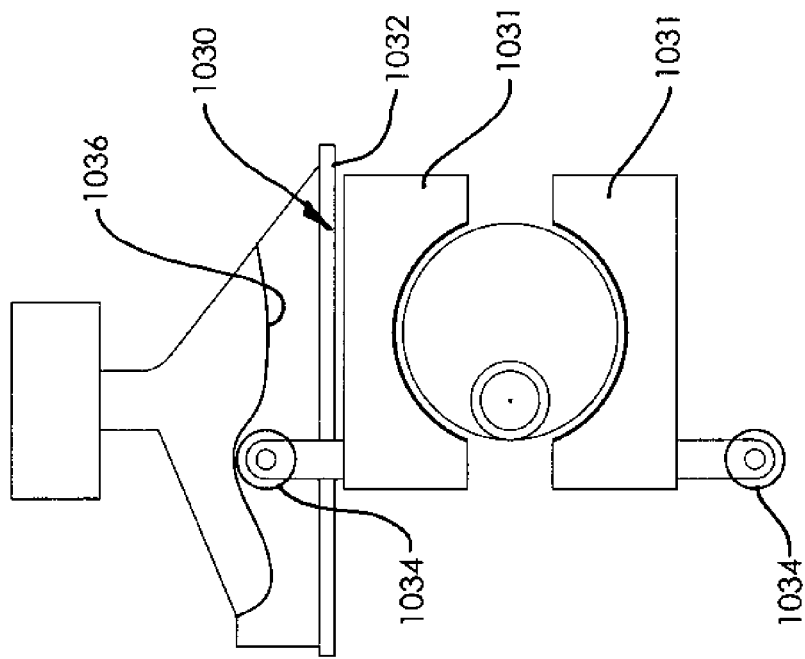
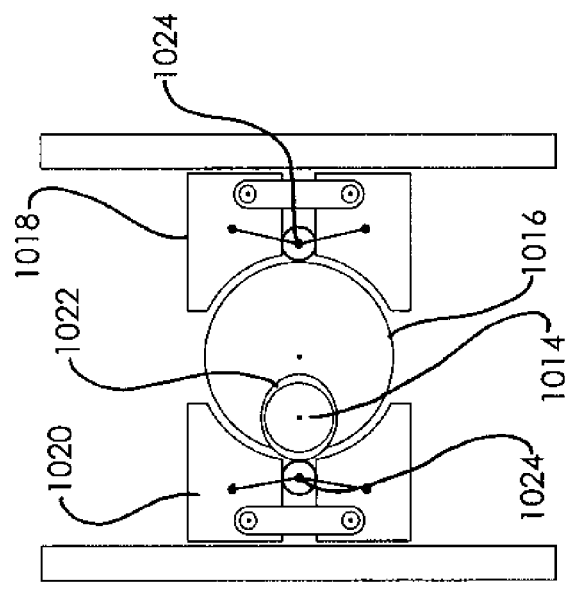
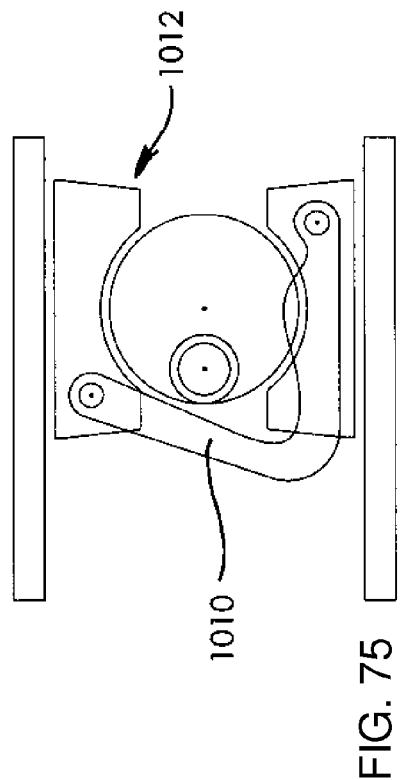
FIG. 77
FIG. 76
FIG. 75

FIG. 91
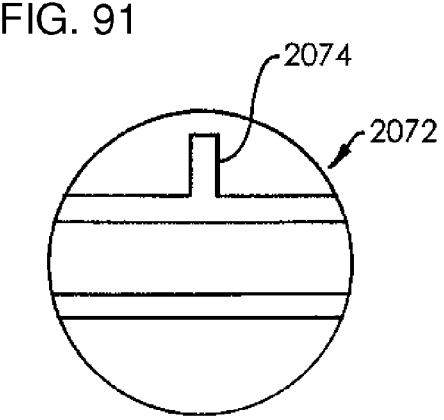
FIG. 94
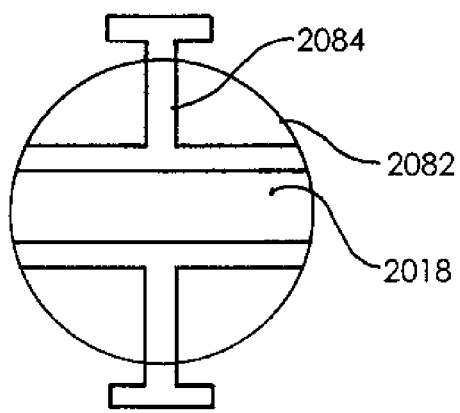
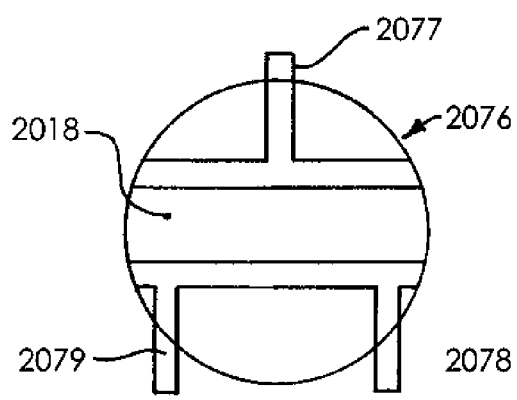
FIG. 92
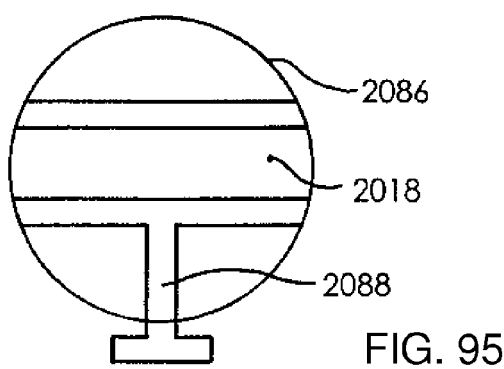
FIG. 95
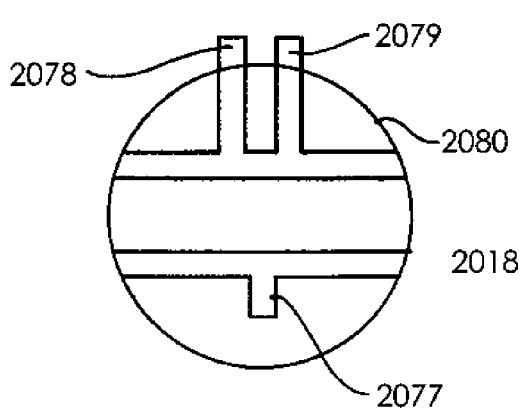
FIG. 93
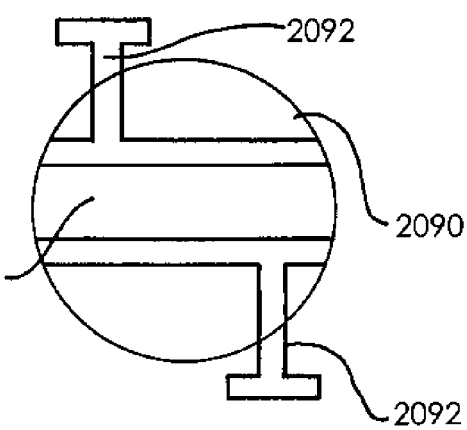
FIG. 96

FIG. 103
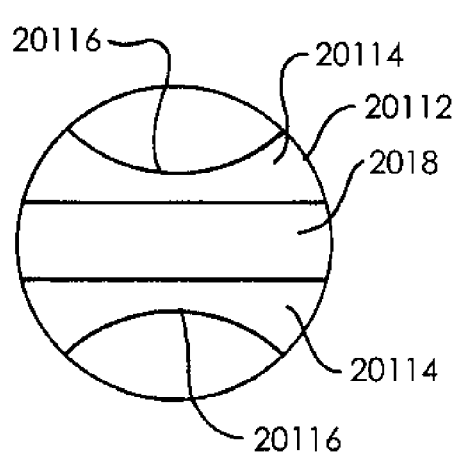
FIG. 104
FIG. 105
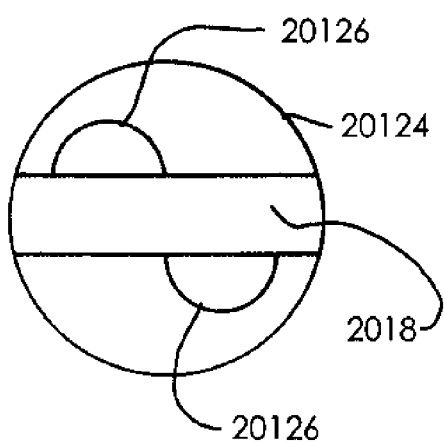
FIG. 106
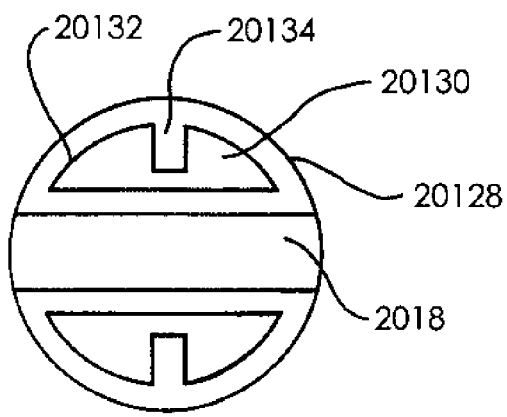
FIG. 107
FIG. 108
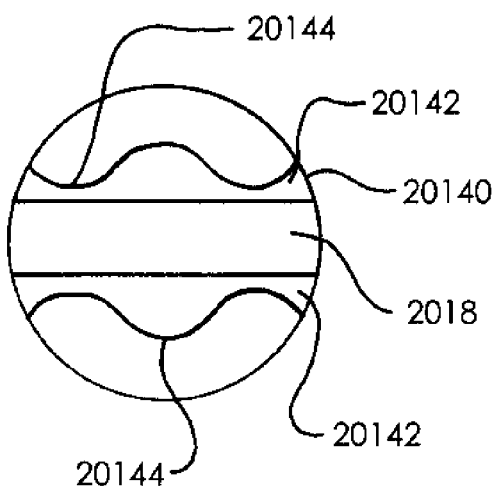

FIG. 109
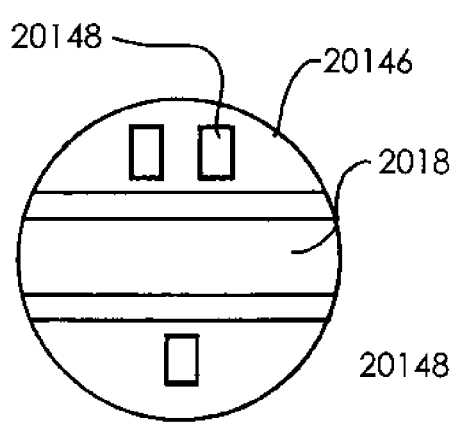
FIG. 112
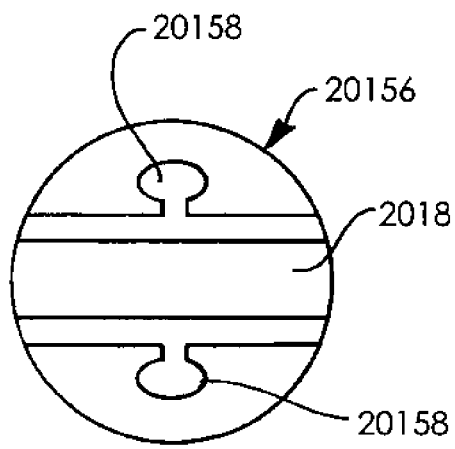
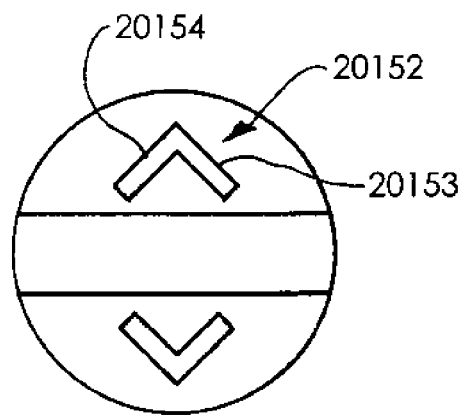
FIG. 110
FIG. 113
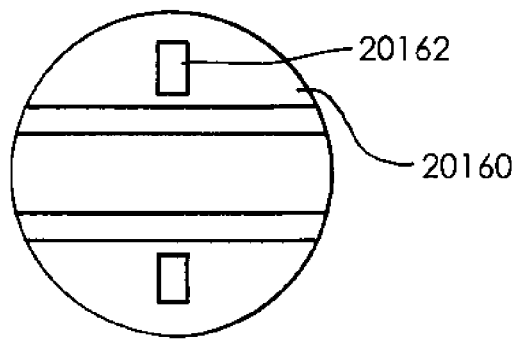
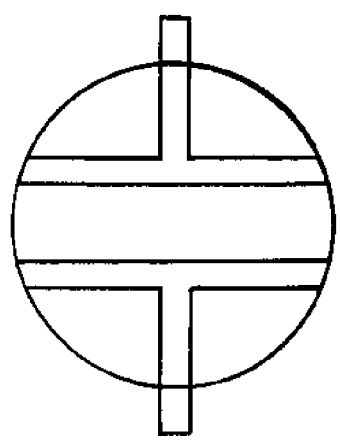
FIG. 111
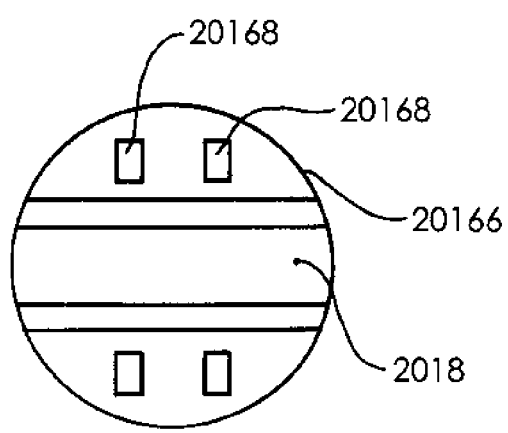
FIG. 114

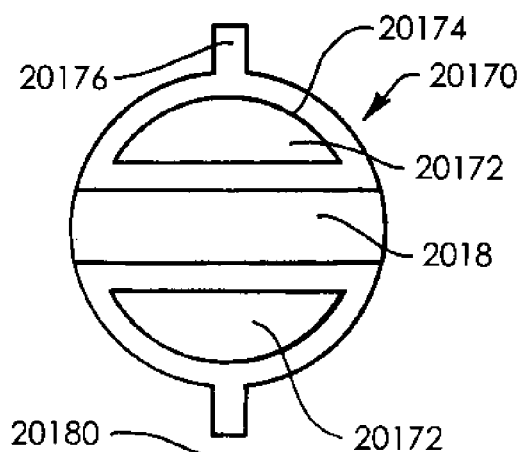
FIG. 115
FIG. 116
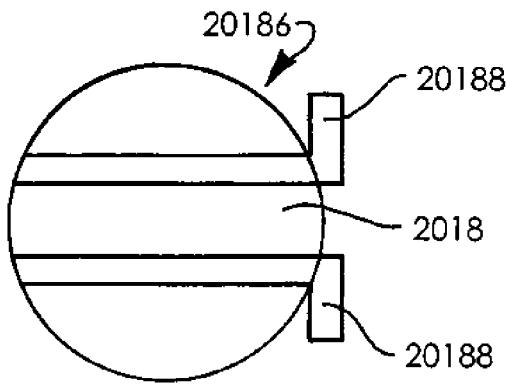
FIG. 118
FIG. 119
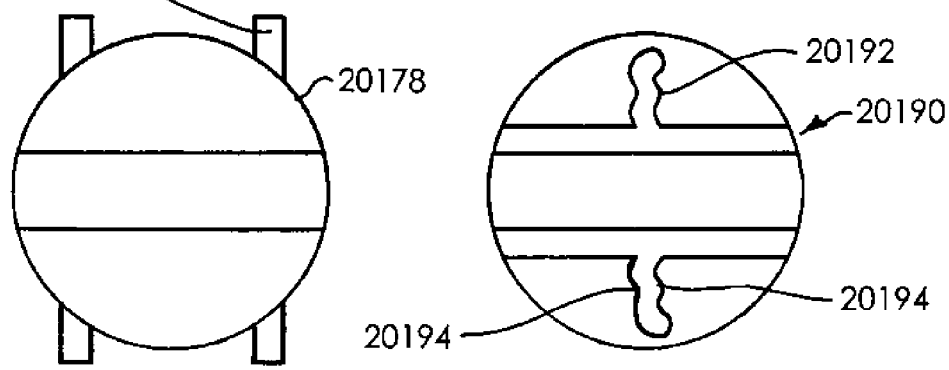
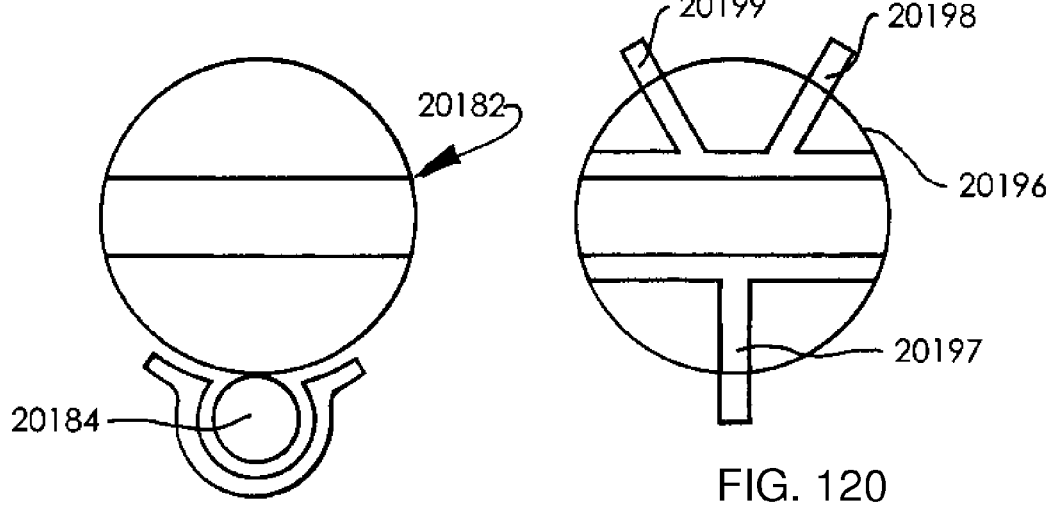
FIG. 117
FIG. 120

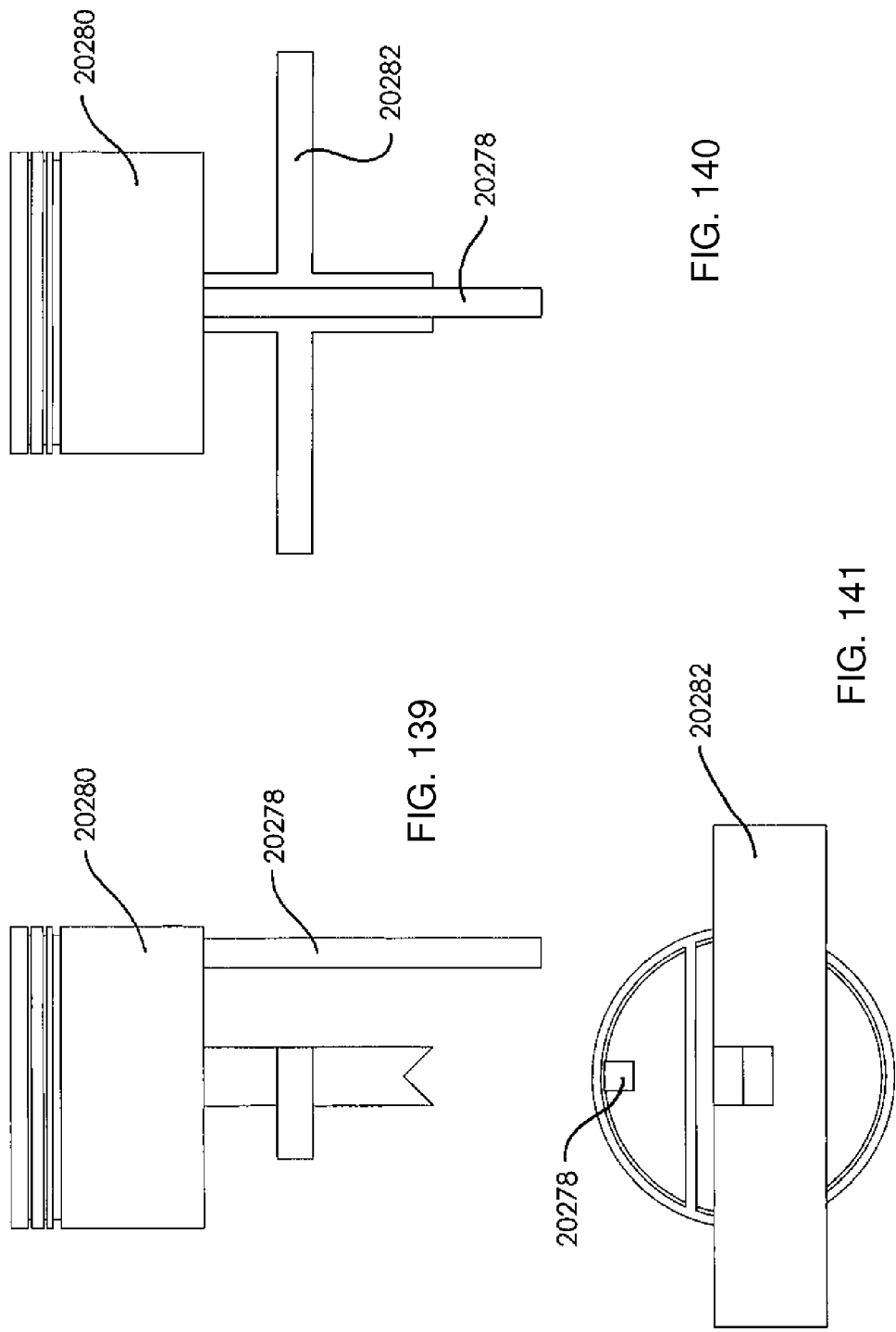

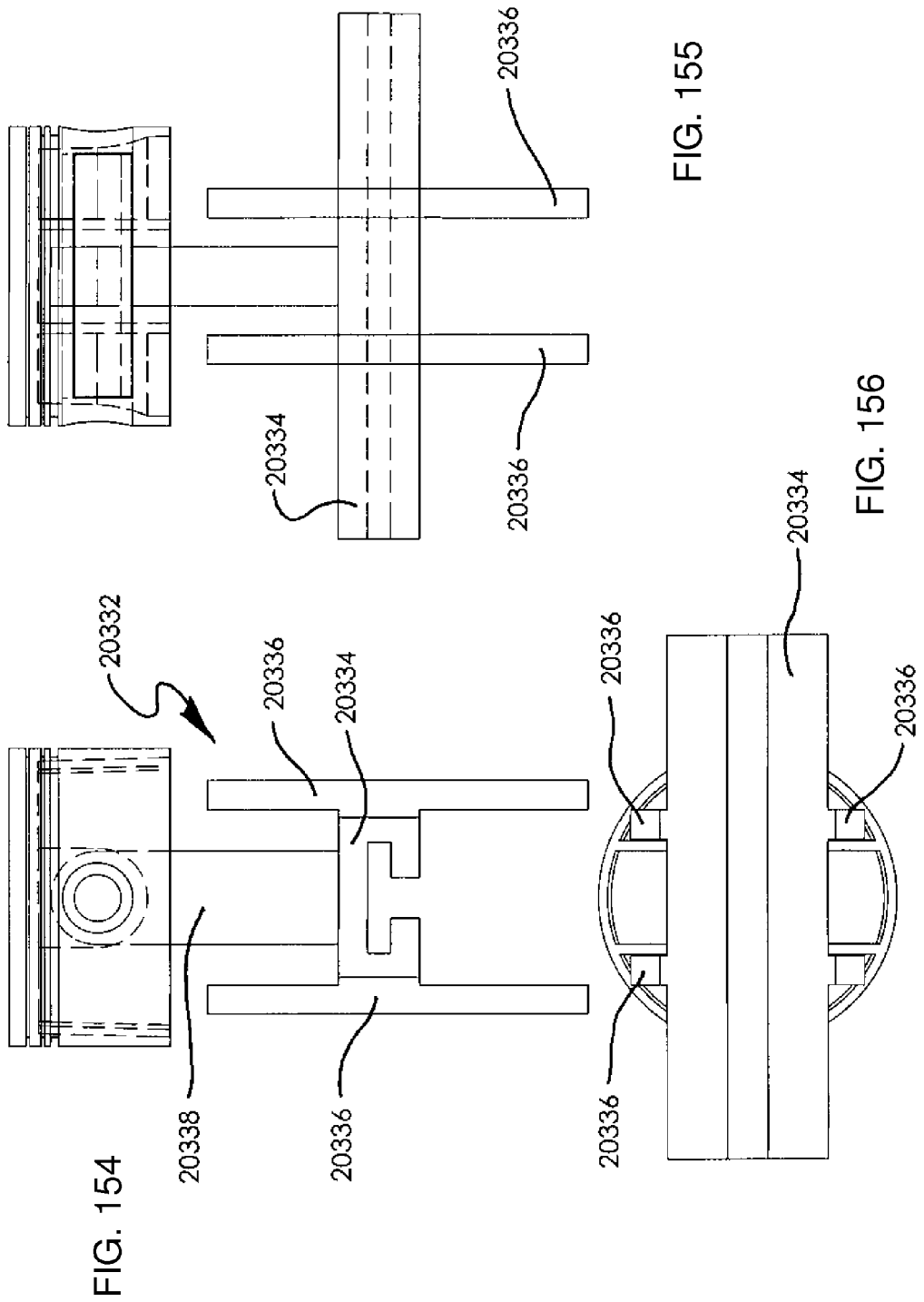

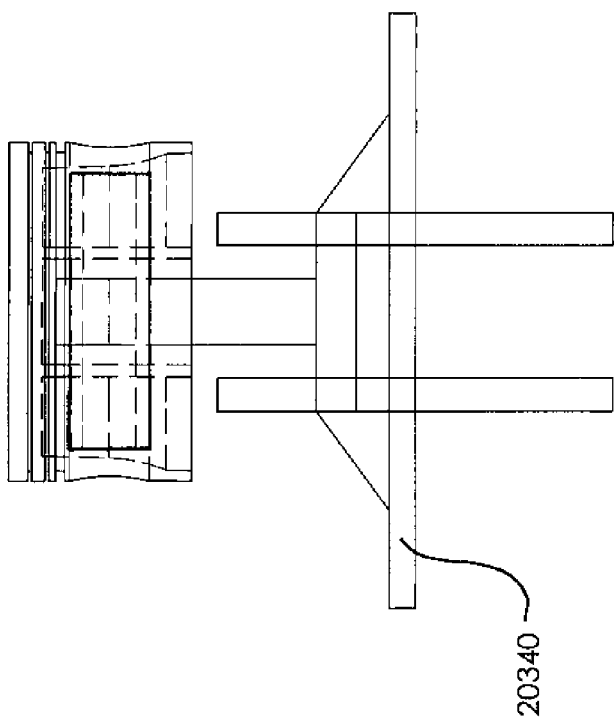
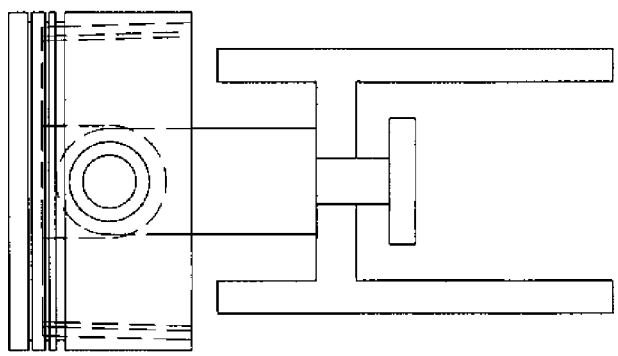
FIG. 157
FIG. 158
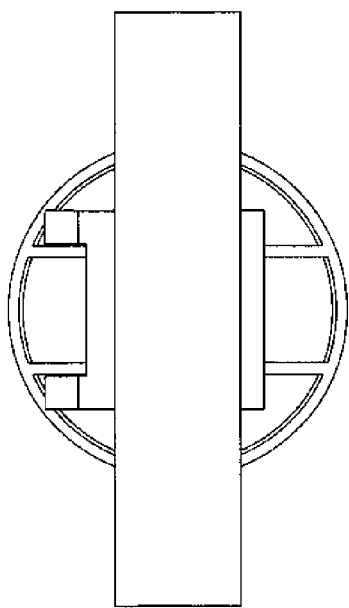
FIG. 159

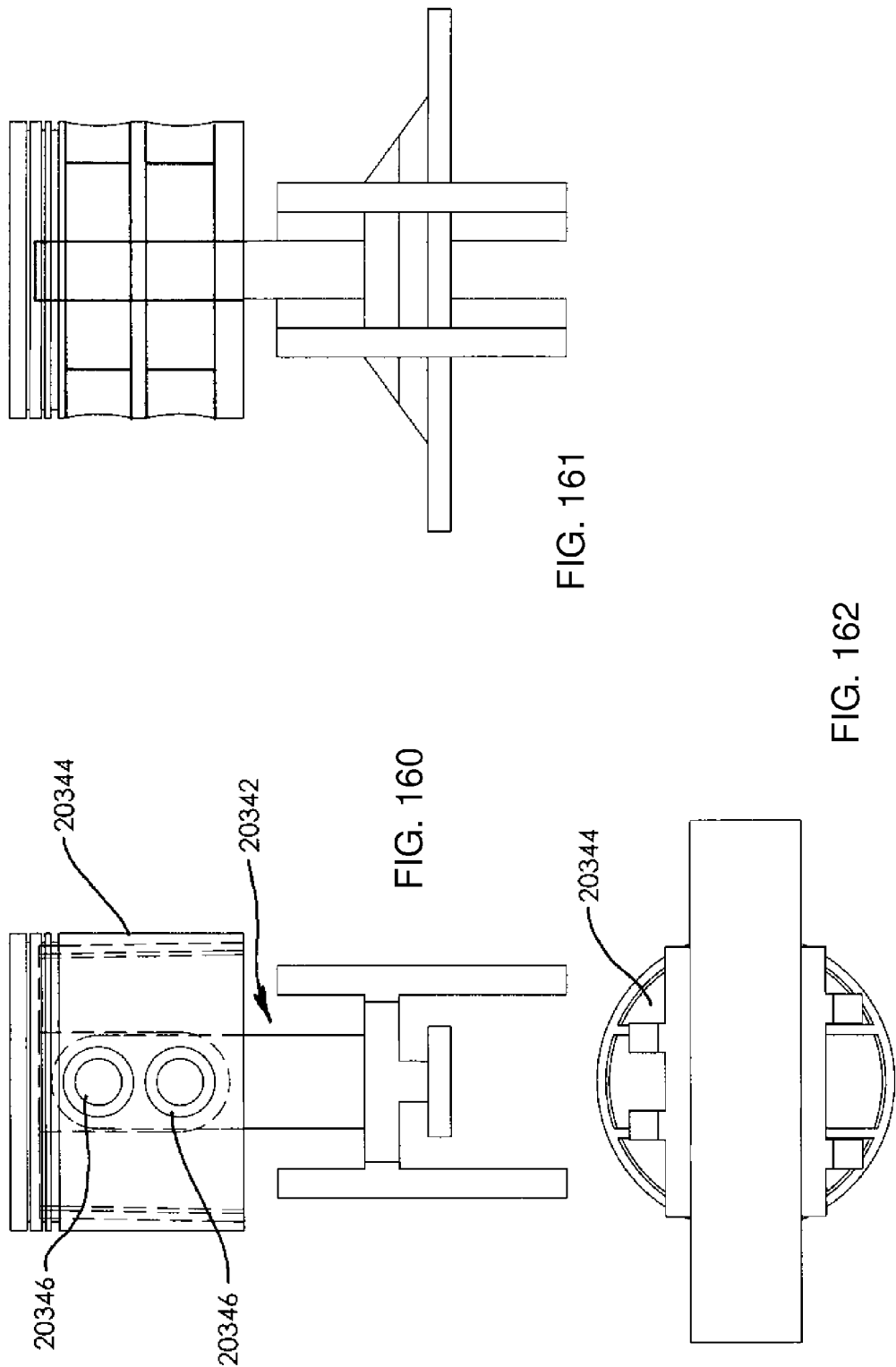

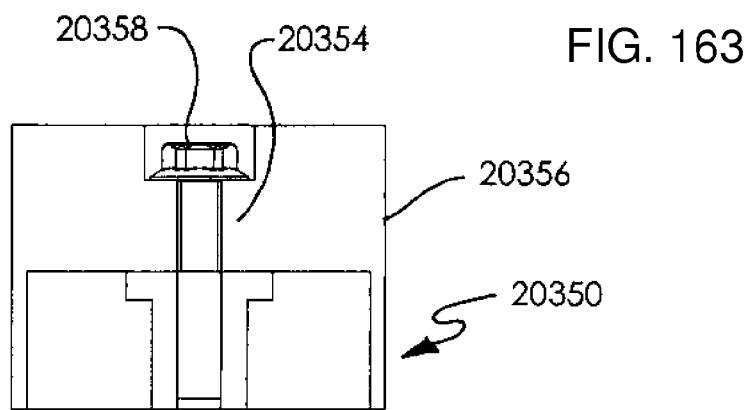
FIG. 163
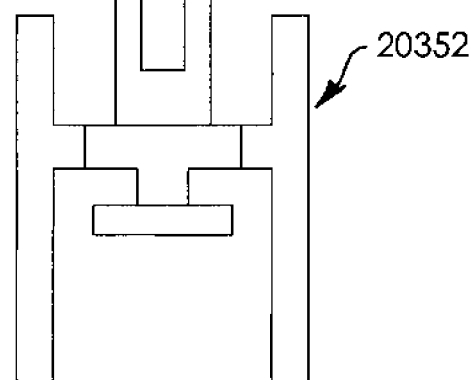
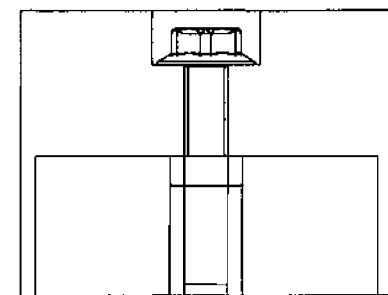
FIG. 164
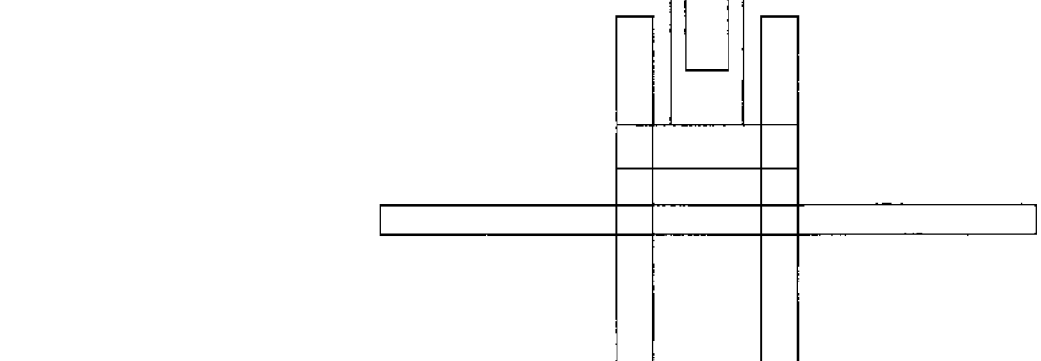
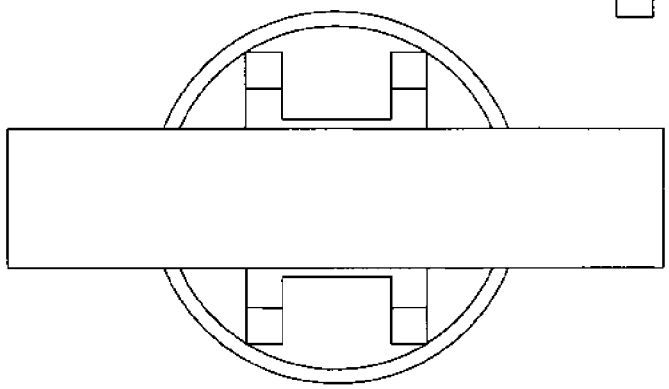
FIG. 165

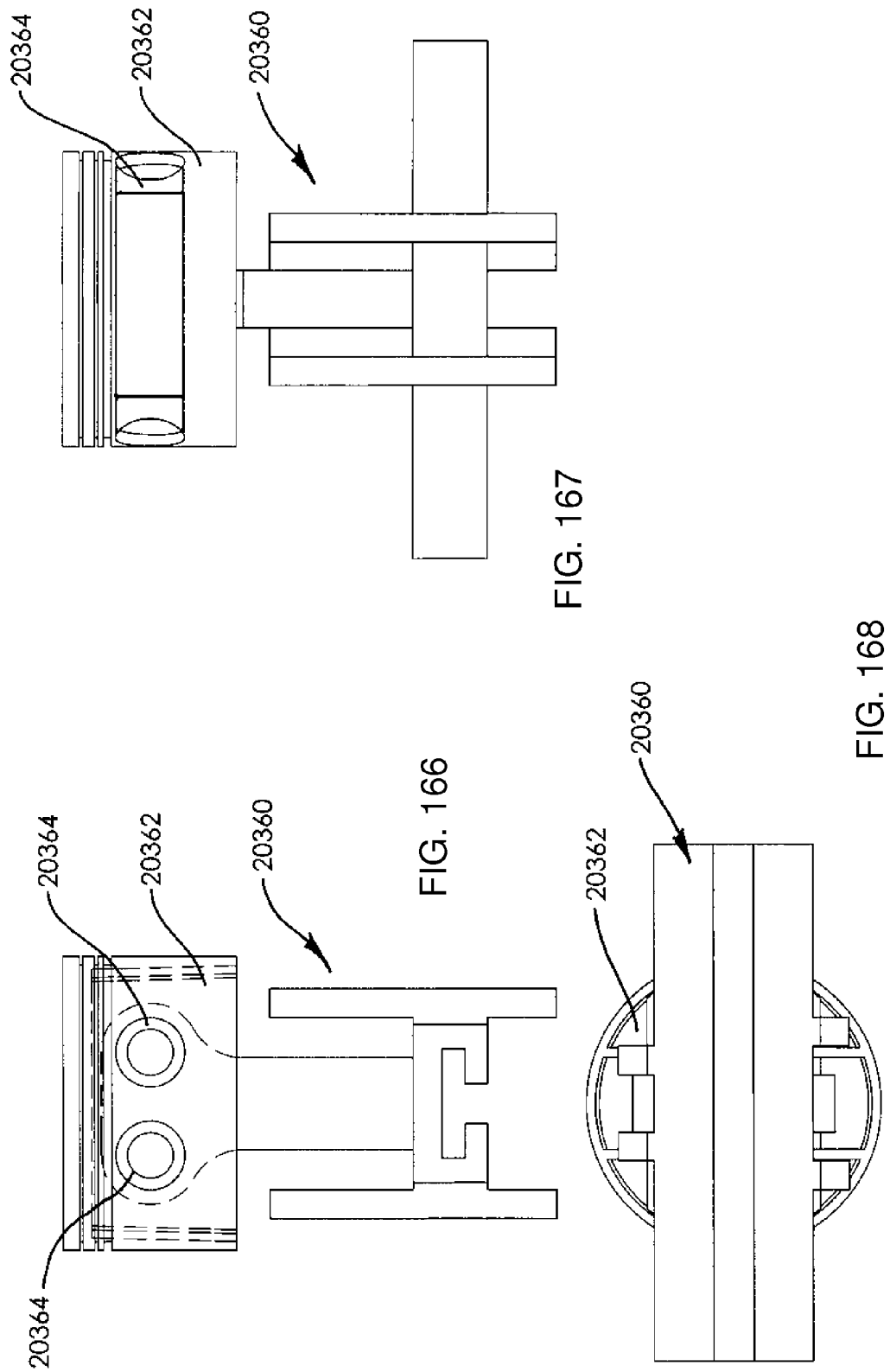

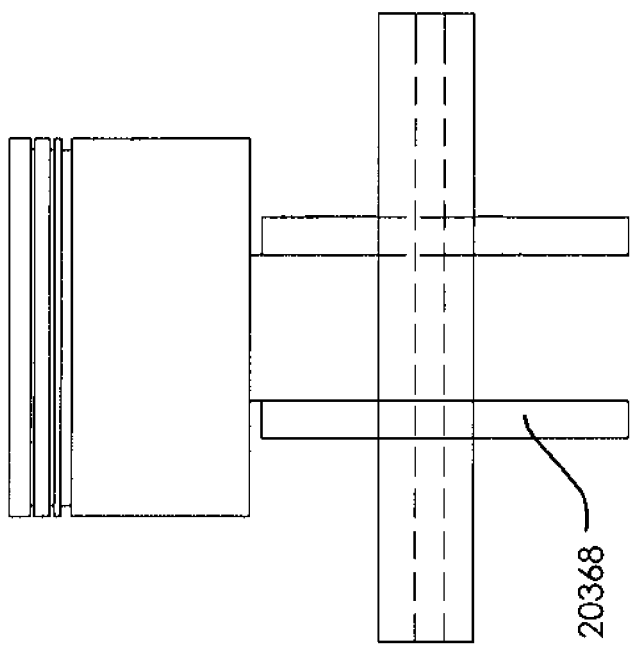
FIG. 170
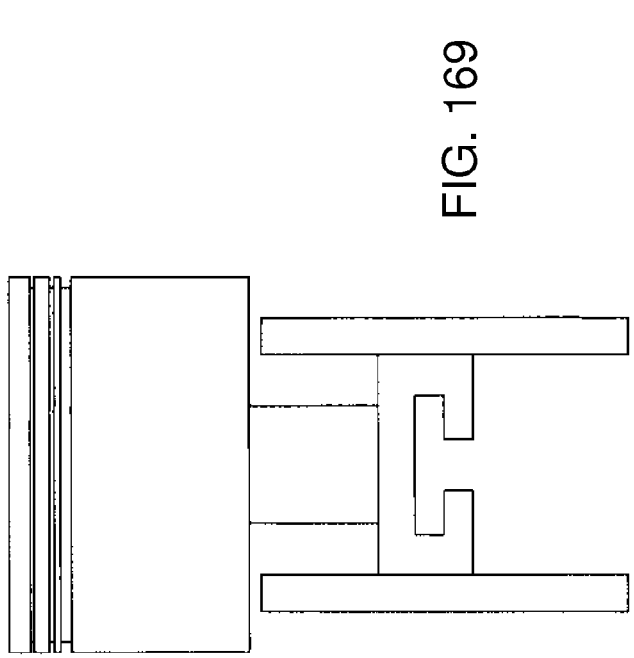
FIG. 169
FIG. 171
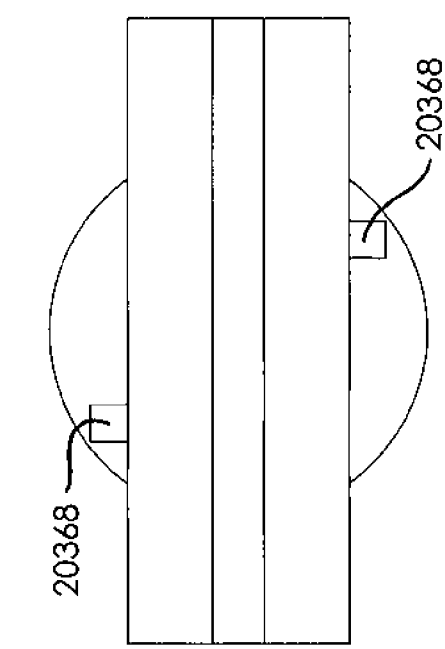

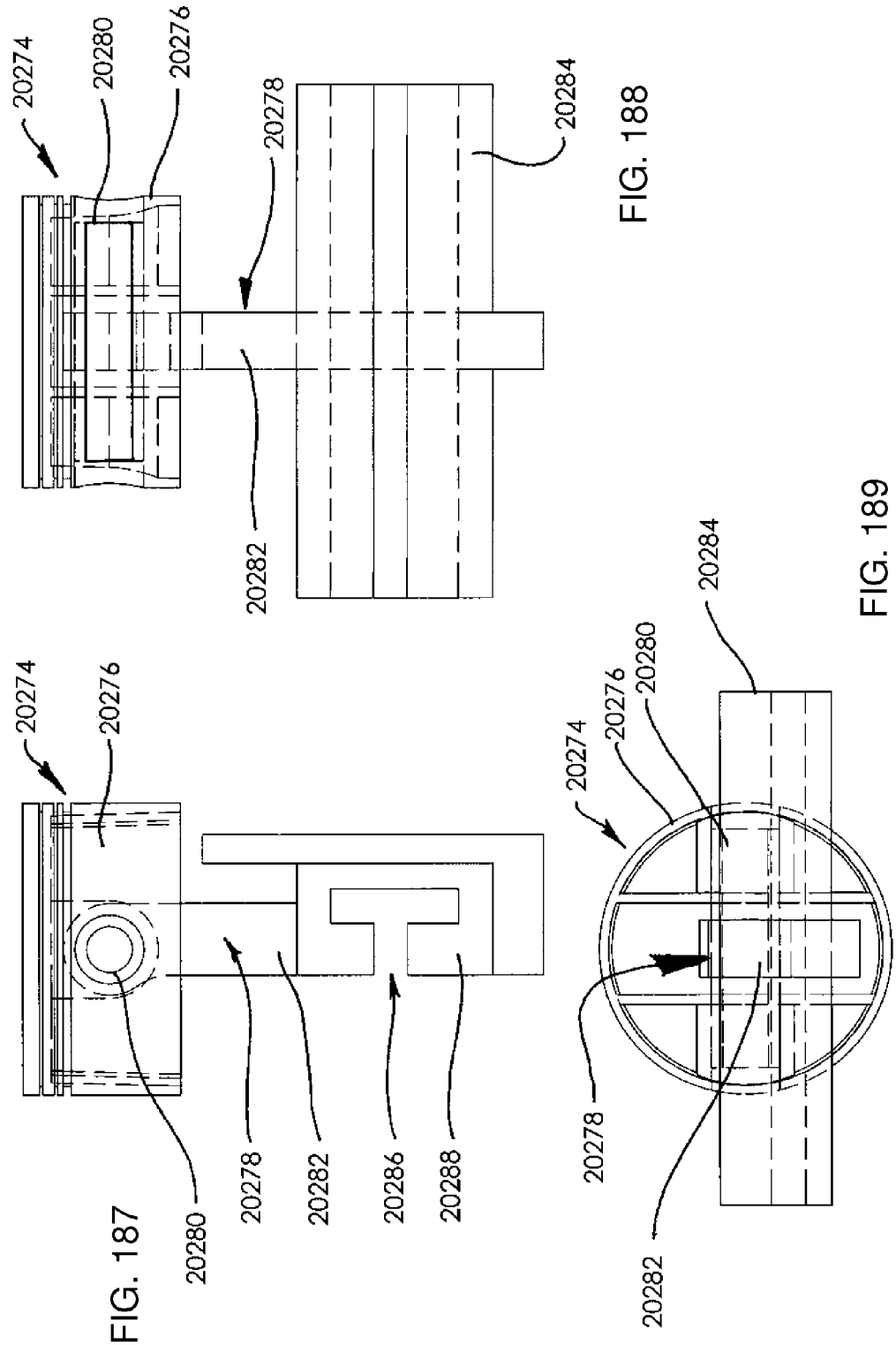

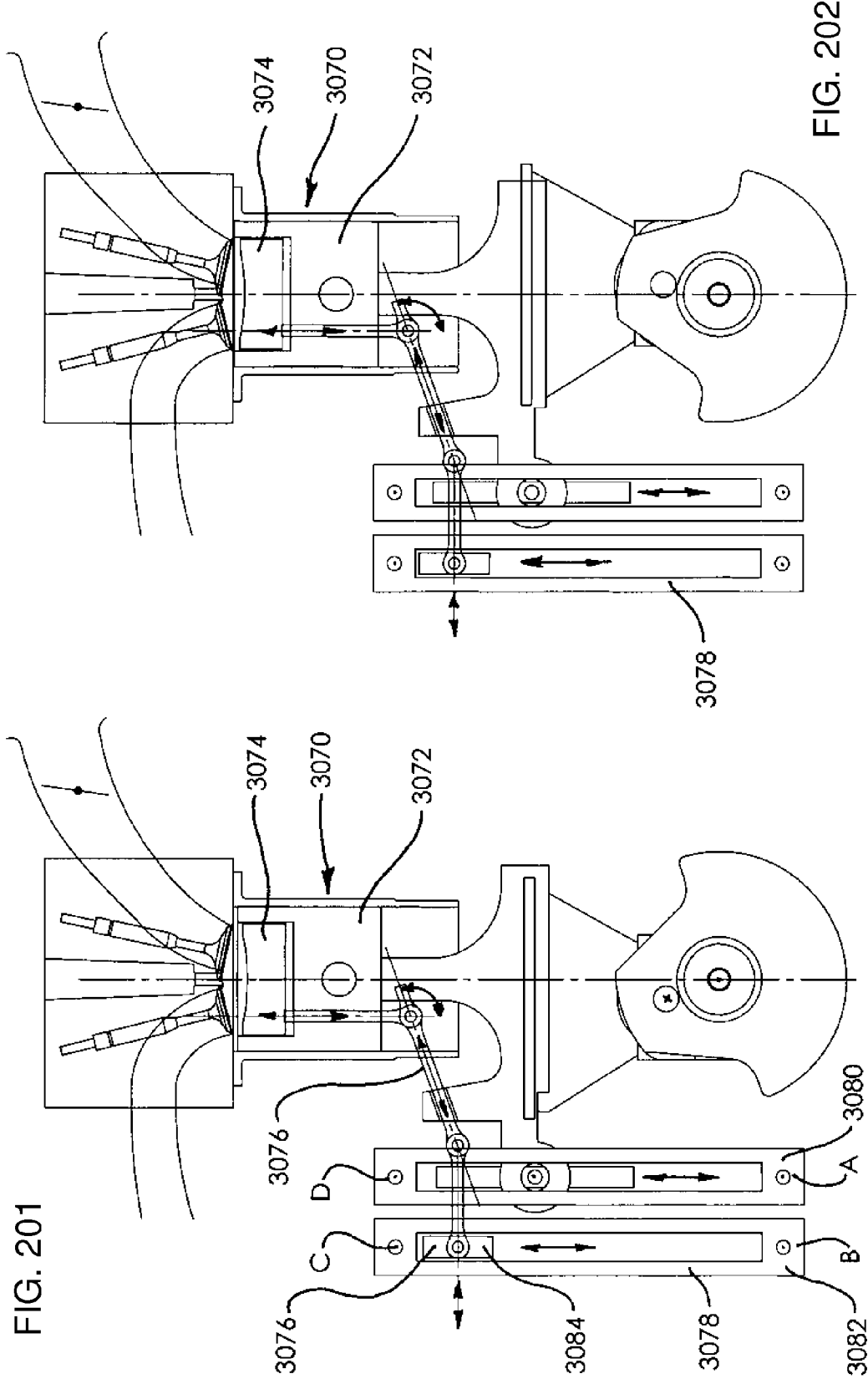

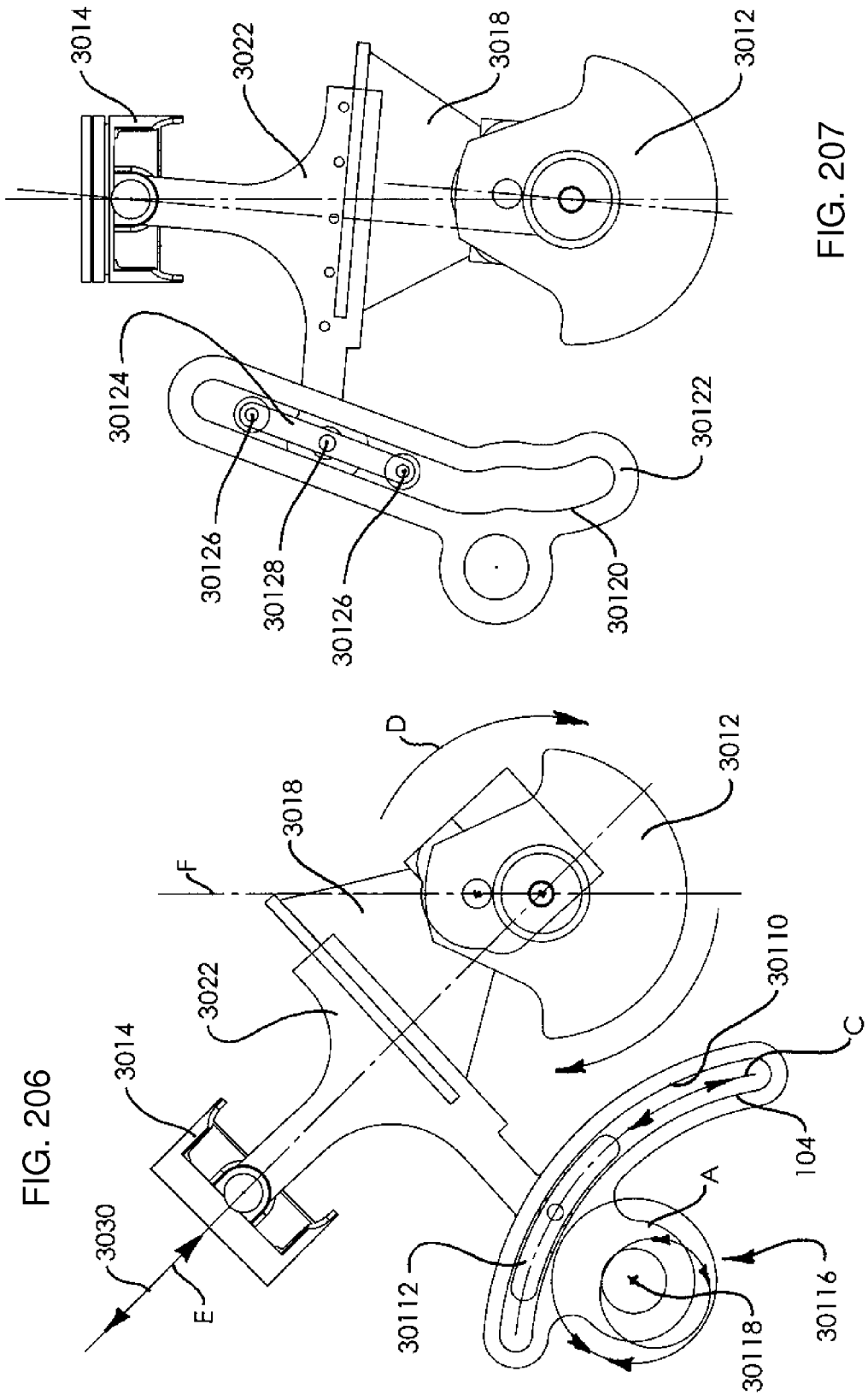

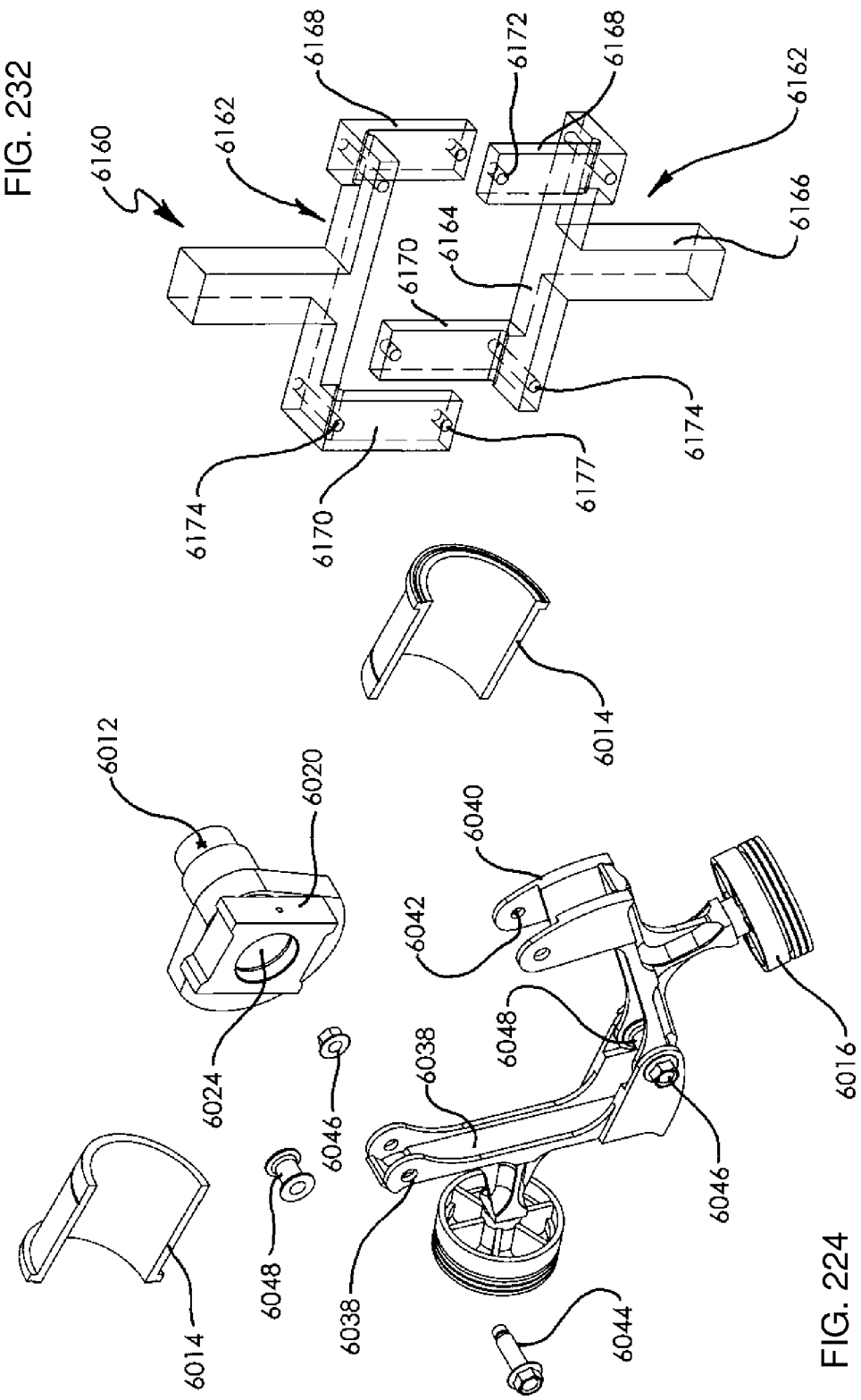

RECIPROCATING FLUID MACHINES

CROSS REFERENCE TO RELATED APPLICATIONS

This application is a continuation of U.S. patent application Ser. No. 12/032,343 filed Feb. 15, 2008 now abandoned, which is a continuation-in-part of U.S. patent application Ser. No. 11/400,027 filed Apr. 7, 2006 now abandoned, which was a continuation of U.S. patent application Ser. No. 09/037,740 filed Mar. 10, 1998, now abandoned, which was a 35 U.S.C. 371 national phase of PCT/AU00/00281 filed Apr. 3, 2000, all of which are incorporated herein by reference as if fully set forth.

This application claims priority to Australian Application Nos. AU PP9573, filed Apr. 1, 1999; AU PQ0287, filed May 11, 1999; AU PQ0795, filed Jun. 4, 1999; AU PQ0895, filed Jun. 10, 1999; AU PQ1653, filed Jul. 15, 1999; AU PQ1654, filed Jul. 15, 1999; AU PQ1956, filed Jul. 30, 1999; AU PQ2150, filed Aug. 11, 1999; AU PQ2205, filed Aug. 13, 1999; AU PQ2206, filed Aug. 13, 1999; AU PQ2341, filed Aug. 19, 1999; AU PQ2388, filed Aug. 23, 1999; AU PQ2408, filed Aug. 24, 1999; AU PQ2808, Sep. 14, 1999; and AU PQ2809, filed Sep. 14, 1999, all of which are incorporated herein by reference as if fully set forth.

The present application is related, in terms of subject matter, to pending U.S. patent application Ser. No. 11/526,344, which is a continuation of U.S. patent application Ser. No. 10/381,953, now abandoned, having a 35 U.S.C. 371(c) date of Sep. 28, 2001 based on PCT/AU01/01214. The present application is also related, in terms of subject matter, to pending U.S. patent application Ser. No. 11/712,819, which is a continuation of U.S. application Ser. No. 11/362,249, issued as U.S. Pat. No. 7,210,397 and a continuation of U.S. application Ser. No. 10/476,126, now abandoned, which has a 35 U.S.C. 371(c) date of Apr. 29, 2002 based on PCT/AU02/00535. The inventors of each of the above applications are the same as the inventors of the present application. U.S. patent application Ser. Nos. 11/526,344; 10/381,953; 11/712,819; 11/362,249; and 10/476,126; U.S. Pat. No. 7,210,397, PCT/AU01/01214; and PCT/AU02/00535 are incorporated herein by reference as if fully set forth.

FIELD OF THE INVENTION

This invention relates to a variation of reciprocating fluid machines colloquially called "scotch yoke" devices.

BACKGROUND

Known scotch yoke devices include one or more pairs of horizontally opposed pistons reciprocating in respective cylinders. Each piston of a pair is rigidly attached to the other so the pair of pistons move as a single unit. The pistons reciprocate along parallel axes which may be coaxial or which may be offset. A crank is provided centrally of the pair of pistons with an offset mounted in a slider. The slider in turn is mounted in the piston assembly between opposing sliding surfaces, which extend perpendicularly to the axes of the pistons. The slider is thus constrained to move perpendicularly to the piston axes and so, as the crank rotates, the pistons are caused to reciprocate along the piston axis, with a true sinusoidal motion. In certain circumstances the provision of a true sinusoidal motion is preferable to the quasi-sinusoidal motion provided by a crank and connecting rod arrangement found in most internal combustion engines or pumps. However such devices have certain drawbacks. Neither the slider, which reciprocates in a vertical plane, nor the pistons, can be dynamically balanced by a rotating mass. Whilst this can be partially compensated for in a multi-pair device, this still leaves rocking couples.

Further in the conventional arrangement the slider slides between a single pair of opposed surfaces which lie on either side of the big end bearing. The pistons must be arranged along parallel axes and the distance between the sliding surfaces of the slider and the guide surfaces of the pistons must be larger than the diameter of the big end on the crank.

The present invention aims to at least ameliorate some of the disadvantages of the prior art and, in preferred forms, provides devices in which paired pistons are not rigidly connected together, are not necessarily coaxial and in which better dynamic balancing is achieved. The invention also allows use of uneven numbers of pistons mounted on a single big end bearing pin.

In its broadest form the invention in effect decouples the pistons from each other and provides each piston with its own pair or group of sliding surfaces and its own slider. The sliding surfaces for each piston do not lie on either side of the big end but are positioned remote from the big end. The sliding surfaces may be compound surfaces. This decoupling means that each piston is not relying on the coupling with the other piston or pistons to move in both directions and allows each piston to move along a separate axis and at a different phase to all other pistons. Whilst pistons may be interconnected via a common linkage which carries the various sliding surfaces, the pistons are not rigidly connected together. Thus a V-configuration may be achieved with a pair of pistons or a 120° layout with three pistons, for instance.

SUMMARY

In one broad form the invention provides a fluid engine or pump, which includes: a crank mechanism including a big end bearing which orbits about a main axis; connecting means rotatably mounted on the big end bearing;
at least two pistons, each mounted for reciprocal motion in a respective cylinder along a respective piston axis, each piston including guide means which engages a respective engagement means on the connecting means, said guide means including a pair of guide surfaces both being disposed on the same side of the big end bearing.

Preferably, the guide means include surfaces which extend substantially perpendicularly to the respective piston axis. However, the guide surfaces may extend at other than 90° to the respective piston axis. Even when the guide surfaces are "perpendicular" to the piston axis, the guide surfaces may deviate from the perpendicular by up to 5° either way. The engagement means may be two or more parallel linear surfaces which correspond and slide relative to the guide surfaces. Alternatively, the engagement means may include two or more roller bearings or the like.

In this embodiment, the linear parallel opposed guide surfaces may be located on the connecting means and the engagement means may be mounted on the piston. In preferred forms there are two or three pistons mounted on slider means on each big end bearing. The pistons may be arranged at equal angles about the main axis if desired.

The guide means may be integral with the piston or may be located on a separate structure attached to the piston. Where a separate structure is provided, it may be pivotably mounted to the piston, preferably using a gudgeon pin arrangement. This allows one to use conventional pistons with connecting rods incorporating the guide means.

The crankshaft may be fixed relative to the cylinders or may be movable so as to alter the compression ratio and/or the timing of the pistons in the cylinders. In a V configuration, movement of the crankshaft along the bisector of the included angle between the cylinders results in a change in compression ratio without any change in phase. An alternate arrangement provides for the crankshaft axis to rotate about a distant axis, so raising or lowering the crankshaft. These arrangements may be used with a single piston engine. Movement of the crank may be in any direction.

When two pistons per big end bearing are utilised, the pistons may be arranged in a V-configuration. The V-configuration may be at any angle, such as 90°, 60°, 72° or any other desired angle. The number of pistons per big end bearing is only constrained by physical size limitations. Each big end bearing may have a single connecting means upon which multiple pistons are mounted or there may be a multiple connecting means mounted on each big end bearing with each connecting means having an associated piston mounted upon it.

When multiple pistons are mounted to one big end bearing, they may be located the same distance from the main axis or different pistons may be at different distances from the main axis.

Whilst the guide means and complementary engagement means are preferably simple planar surfaces in cross section, other configurations are possible, to provide additional locating surfaces perpendicular to the line of the guide means.

The invention, in another broad form, also provides a fluid engine or pump, which includes:
a crank mechanism including a big end bearing which orbits about a main axis; connecting means rotatably mounted on the big end bearing;
at least one piston mounted for reciprocal motion in a cylinder along a piston axis, the at least one piston engaging an engagement means on the connecting means
whereby the connecting means may have non-rotary movement relative to the at least one piston; and,
stabilising means engaging the connecting means to limit the connecting means to a single orientation as it orbits the main axis.

The stabilising means may include the engagement of the connecting means with the at least one piston. The stabilising means may include a separate linkage pivotably mounted to both the connecting means and the crankcase.

The crank mechanism may be a simple crank with an offset big end bearing or it may be a compound mechanism which provides for other than simple circular motion of the big end bearing at a constant angular velocity. Examples of compound crank mechanisms are disclosed in PCT International Patent Application Nos. PCT/AU97/00030 and PCT/AU98/00287, the disclosures of which are incorporated herein.

The invention, in another broad form, also provides a fluid device, which includes:
a crank mechanism including a big end bearing which orbits about a main axis;
connecting means rotatably mounted on the big end bearing;
at least one piston mounted for reciprocal motion in a respective cylinder along a piston axis, the at least one piston engaging engagement means on the connecting means;
wherein said main axis of the crank mechanism is movable along at least one path relative to said cylinder or cylinders and said engagement means is configured such that said at least one piston is neither substantially retarded or advanced.

Where the device includes pistons arranged in a V configuration the main axis of the crank mechanism preferably moves along a linear path which bisects the included angle of the V. Alternatively, the main axis of the crank mechanism may move along an arc.

The invention, in another broad form, also provides a fluid device, which includes:
a crank mechanism including a big end bearing which orbits about a main axis, the big end bearing having a big end axis;
connecting means rotatably mounted on the big end bearing for rotation about the big end axis;
at least one piston mounted for reciprocal motion in a respective cylinder along a piston axis, the at least one piston engaging engagement means on the connecting means;
wherein said connecting means has a centre of mass located on or adjacent to the big end axis.

Preferably the crank includes a counter weight which substantially and/or dynamically balances the mass of the connecting means relative to the crank axis.

The invention, in another broad form, also provides a fluid device, which includes:
a crank mechanism including a big end bearing which orbits about a main axis, the big end bearing having a big end axis;
connecting means rotatably mounted on the big end bearing for rotation about the big end axis;
at least one piston mounted for reciprocal motion in a respective cylinder along a piston axis, the at least one piston engaging engagement means on the connecting means;
wherein the effective centre of mass of the crank mechanism, the connecting means and the at least one piston remains stationary or substantially stationary relative to the crank axis as the crank rotates.

The invention, in another broad form, also provides a fluid device, which includes:
a crank mechanism including a big end bearing which orbits about a main axis, the big end bearing having a big end axis;
connecting means rotatably mounted on the big end bearing for rotation about the big end axis;
at least one pair of non opposed pistons, each piston being mounted for reciprocal motion in a respective cylinder along a respective piston axis, each piston engaging engagement means on the connecting means;
wherein the configuration of the connecting means and the engagement means is such that the motion of each piston is simple harmonic motion.

The invention, in another broad form, also provides a fluid device, which includes:
a crank mechanism including a big end bearing which orbits about a main axis, the big end bearing having a big end axis;
connecting means rotatably mounted on the big end bearing for rotation about the big end axis;
at least one pair of non opposed pistons, each piston being mounted for reciprocal motion in a respective cylinder along a respective piston axis, each piston engaging engagement means on the connecting means;
wherein each pair of pistons has a mass and motion equivalent to a single body orbiting in an orbit.

Preferably the orbit is a circle, but it may be elliptical.

Preferably the motion of each of the pistons is simple harmonic motion.

The invention, in another broad form, also provides a fluid device, which includes:
a crank mechanism including a big end bearing which orbits about a main axis, the big end bearing having a big end axis;

connecting means rotatably mounted on the big end bearing for rotation about the big end axis;

at least one pair of pistons, each piston being mounted for reciprocal motion in a respective cylinder along a respective piston axis, the piston axes of each pair being at 90° to each other, each piston engaging engagement means on the connecting means;

wherein each pair of pistons has a mass and motion equivalent to a single body orbiting in an orbit;

the centre of mass of the connecting means is located on or adjacent the big end axis; and the crank includes a counter weight located generally diametrically opposite the big end and having a centre of mass remote from the crank axis, the counter weight including the equivalent of:

a first mass to statically and/or dynamically balance all or part of the mass of the big end bearing relative to the crank axis;

a second mass to statically and/or dynamically balance all or part of the mass of the connecting means relative to the crank axis; and, a respective third mass to statically and/or dynamically balance all or part of the mass of each pair of pistons relative to the crank axis.

Preferably the angle is 90°.

Preferably the orbit is a circle and the third mass preferably statically and/or dynamically balances the mass of the pistons.

Where the orbit is not a circle, the third mass may balance the mass of the pistons in a first direction. The first direction is preferably parallel or perpendicular to a bisector of the axes of each pair of pistons. In all forms of the invention the connecting means may have non-rotary motion relative to the piston. Preferably there is no rotary motion whatsoever, except as allowed by clearances.

A reciprocating piston device having at least one piston assembly reciprocating along a piston axis; a crank rotating about a crank axis having a member offset from the crank axis; at least one intermediate member located between the member and the piston for transferring motion of the member to the piston assembly.

The device may have each piston assembly having two surfaces with the offset member bearing on one surface and an intermediate member bearing on the other surface.

The device may have a single intermediate member which bears on both surfaces or it may have a two intermediate members each of which bears on one of the respective surfaces.

Each piston assembly may have one piston or it may have two pistons. Where two pistons per assembly are provided, preferably the at least one intermediate member is located below the pistons.

The member is preferably a circular cam having its centre offset from the crank axis.

The device may have two or more piston assemblies for each member.

Where two or more pistons assemblies for each member are provided, they may reciprocate along piston axes extending at any angle to each other. Preferably there are two piston assemblies per offset member extending at 90° to each other.

Where two piston assemblies extending at 90° to each other are provided, preferably there are provided two intermediate members, each of which engages both piston assemblies.

The invention, in another broad form, also provides a reciprocating piston device having at least one piston assembly reciprocating along a piston axis;
a crank rotating about a crank axis having a member offset from the crank axis;
at least one intermediate member located between the member and the piston for transferring motion of the member to the piston assembly.

The device may have each piston assembly having two surfaces with the offset member bearing on one surface and an intermediate member bearing on the other surface.

The device may have a single intermediate member which bears on both surfaces or it may have a two intermediate members each of which bears on one of the respective surfaces.

Each piston assembly may have one piston or it may have two pistons. Where two pistons per assembly are provided, preferably the at least one intermediate member is located below the pistons.

The member is preferably a circular cam having its centre offset from the crank axis.

The device may have two or more piston assemblies for each member.

Where two or more pistons assemblies for each member are provided, they may reciprocate along piston axes extending at any angle to each other. Preferably there are two piston assemblies per offset member extending at 90° to each other.

Where two piston assemblies extending at 90° to each other are provided, preferably there are provided two intermediate members, each of which engages both piston assemblies.

The invention, in another broad form, also provides a fluid device which includes:

a crank mechanism including a big end bearing which orbits about a main axis, the big end bearing having a big end axis;

connecting means rotatably mounted on the big end bearing for rotation about the big end axis;

at least one piston mounted for reciprocal motion in a cylinder along a piston axis, the piston having a cross-sectional area perpendicular to the piston axis, the piston having first guide means which engage engagement means on the connecting means;

at least one second piston guide means for constraining the piston to move along the piston axis;

wherein the first piston guide means bisect the piston and each second piston guide means is located within a volume defined by the piston cross-sectional area but not along the centre line of the bisection formed by the first piston guide means.

In preferred embodiments, the first guide means include surfaces which extend substantially perpendicularly to the respective piston axis, as already discussed.

The second piston guide means is intended to alleviate "jamming" of the piston in the cylinder, which can provide a problem at high temperature. It is desirable to maintain the piston so that it is aligned with the piston axis. Several preferred embodiments of the second piston guide means are described in connection with the drawings. It will be appreciated that because the second piston guide means is located within the "footprint" of the piston, metallic mass of the fluid device is minimised.

As will be seen from the drawings, in some embodiments, the second piston guide means is formed in pairs and a line drawn from one member to the other of the pair would be perpendicular to the centre line of the bisection formed by the first piston guide means. In other embodiments, the second piston guide means includes members which are located on either side of the bisection formed by the first piston guide means but not along the centre line.

The second piston guide means may be mounted to the block within the footprint of the piston, thus minimising the size of the device of the invention.

In another broad form, the invention also provides a fluid device, which includes:
a crank mechanism including a big end bearing which orbits about a main axis, the big end bearing having a big end axis;
connecting means rotatably mounted on the big end bearing for rotation about the big end axis;
at least one piston mounted for reciprocal motion in a cylinder along a piston axis;
intermediate connecting means interconnecting the at least one piston with the connecting means; and
means for adjusting the position of the intermediate connecting means relative to the at least one piston or the connecting means or both.

The means for adjusting may include a slot, groove or surface which engages the intermediate connecting means.

The intermediate connecting means preferably engage in or with guide means to stabilise the at least one piston in the cylinder. Preferably the means for adjusting includes the guide means, but the guide means may be separate.

The means for adjusting may be movable transversely or longitudinally relative to the cylinder axis or both. The guide means may be rotatable about an axis.

The means for adjusting may include a linear, single radius curved or multi-radius curved slot/s, groove/s, surface/s or the like. The intermediate means may include sliding or rolling contact members to engage the means for adjusting.

The means for adjusting may be movable to change the effective stroke of the pistons, the effective compression ratio of the device or the position/time path followed by the pistons or a combination of any of the foregoing.

In another broad form, the invention also provides a fluid device, which includes:
a crank mechanism including a big end bearing which orbits about a main axis, the big end bearing having a big end axis;
connecting means rotatably mounted on the big end bearing for rotation about the big end axis;
at least one piston mounted for reciprocal motion in a cylinder along a piston axis;
intermediate connecting means interconnecting the at least one piston with the connecting means; and
means for adjusting the distance along the piston axis over which the piston may travel.

The means for adjusting in this aspect of the invention may include a compressible connecting rod or compressible elements separate from the connecting rod.

In other embodiments, we have proposed scotch yoke type fluid devices in which each piston may be decoupled from any other piston mounted on the same big end of a crank, so allowing each piston to move along a cylinder axis which may be at an angle to any other cylinder axis. In producing such devices it has been discovered that the pistons may be rotated in the cylinders about an axis generally peφendicular to the cylinder axis, causing damage to the device. To prevent this occurring it has been proposed to use guide means mounted on, connected to or integral with the piston to maintain the pistons in a correct orientation and to prevent unwanted rotation or deflection of the piston. We also proposed guide means located outward of the piston and cylinder bores. This requires extra space within the crank case and so increases the size of the fluid device.

In an attempt to ameliorate at least some of the above disadvantages, in one broad form, the invention provides a fluid device including:
a crank mechanism including a big end bearing which orbits about a main axis, the big end bearing having a big end axis;
connecting means rotatably mounted on the big end bearing for rotation about the big end axis;
at least one piston located for reciprocal motion in a cylinder along a cylinder axis, the or each piston having first guide means which engages engagement means on the connecting means, said connecting means reciprocating along a path relative to the piston and the first guide means between two end points;
at least one second guide means associated with the or at least one of the at least one piston for constraining the respective piston to move along the respective cylinder axis;
wherein the first guide means extends partially or totally across the cross sectional area of the respective piston perpendicular to the cylinder axis; and
wherein the second guide means is located transversely relative to the said path.

Preferably the second guide means is located between the two end points.

Preferably the first second guide means are contained within a volume defined by a projection of the cylinder's cross sectional area along the cylinder axis. However, the first or second guide means, or both, may extend out of this volume. Further, the second guide means may lie within the volume but may be positioned not between the two end points.

The first and second guide means may be formed integral with the piston body or may be one or more separate items attached to the piston body. Where the guide means are separate units, a single unit may be provided which is rigidly or pivotably mounted to the piston body. The second guide means may include one or more guide members, including tubes or rods, which extend substantially parallel to the piston axis. Where the guide means includes two or more guide members, these guide members may be located symmetrically or asymmetrically relative to the piston's cross sectional centre.

Preferably the first guide means extends through the centre of the piston's cross sectional area.

Where two or more pistons are mounted on one big end, the pistons may lie in a single plane or may lie in two or more planes.

We also describe how a fluid device may be fully or substantially statically or dynamically balanced or both about the crank axis. It will be appreciated that the additional mass of the second guide means may be balanced as described in the earlier application. It will also be appreciated that whilst balancing of pistons mounted on a single crank is the norm, balancing of a device with pistons mounted on separate big ends is possible if the big ends are coaxial.

The invention, in another broad form, also provides a fluid device, which includes:
a crank mechanism including a big end bearing which orbits about a main axis, the big end bearing having a big end axis;
connecting means rotatably mounted on the big end bearing for rotation about the big end axis;
at least one piston mounted for reciprocal motion in a cylinder along a piston axis; intermediate connecting means interconnecting the at least one piston with the connecting means; and
means for adjusting the position of the intermediate connecting means relative to the at least one piston or the connecting means or both.

The means for adjusting may include a slot, groove or surface which engages the intermediate connecting means.

The intermediate connecting means preferably engage in or with guide means to stabilise the at least one piston in the cylinder. Preferably the means for adjusting includes the guide means, but the guide means may be separate.

The means for adjusting may be movable transversely or longitudinally relative to the cylinder axis or both. The guide means may be rotatable about an axis. The means for adjusting may include a linear, single radius curved or multi-radius curved slot/s, groove/s, surface/s or the like. The intermediate means may include sliding or rolling contact members to engage the means for adjusting.

The means for adjusting may be movable to change the effective stroke of the pistons, the effective compression ratio of the device or the position/time path followed by the pistons or a combination of any of the foregoing.

We have disclosed devices in which piston motion is achieved by sliders mounted on big ends and in which two or more pistons may be mounted on a single slider but each of which moves along a separate path to each other.

We have found that because each piston is not directly connected to any other piston, there is a tendency for the pistons to rotate in the cylinders about an axis generally parallel the crank axis. This can lead to destructive failure of the device. We have found that providing guide means, extending parallel to the cylinder axis, prevents such rotation, and this has been disclosed in our earlier applications. In these earlier applications the guide means disclosed lie above the swept volume of the crank shaft and big end. We have discovered that we can place the guide means so that at various parts of the cycle they extend into the volume swept by the crank and slider. This results in a more compact device.

In one broad form the invention provides a fluid device which includes:
a crank mechanism including a big end bearing which orbits about a main axis, the big end having a big end axis;
connecting means rotatably mounted on the big end for rotation about the big end axis;
at least one piston mounted for reciprocal motion in a cylinder along a piston axis;
the piston having first guide means which engages engagement means on the connecting means;
at least one second guide means for constraining the piston to move along the piston axis;
wherein, as the crank mechanism rotates, the at least one second guide means extends into the swept volume of the crank mechanism.

Preferably the second guide means is located within the axial cross-sectional area of the piston.

Preferably each piston has two second guide means and more preferably they are located symmetrically relative to the piston axis.

In conventional scotch yoke type piston fluid machines a slider is rotatably mounted on the big end of a crank, which orbits about a main axis. The slider is constrained to move along a linear slot in the piston assembly which is generally perpendicular to the cylinder axis. Thus, as the crank rotates, the piston is caused to reciprocate along the cylinder.

In single piston devices, the linear slot is positioned on the cylinder axis and so that at top dead centre the big end lies between the piston and the main axis.

We have created various novel and inventive configurations which depart from this standard.

In a further broad form, the invention provides a reciprocating piston fluid device including a crank mechanism including a big end which orbits about a main axis, the big end having a big end axis;
connecting means rotatable mounted on the big end for rotation about the big end axis;
a single piston mounted for reciprocal motion in a cylinder and including engagement means for engaging the connecting means, whereby the piston reciprocates in the cylinder as the big end orbits the main axis;
wherein, at top dead centre, the main axis lies between the piston and the big end axis.

This, in effect, is the reverse of the norm.

In another form, the invention provides a reciprocating piston fluid device including:
a crank mechanism including a big end which orbits about a main axis, the big end having a big end axis;
at least one connecting means rotatable mounted on the big end for rotation about the big end axis;
at least one piston mounted in a respective cylinder for reciprocal motion along a cylinder axis;
engagement means interconnecting the at least one piston and the at least one connecting means,
wherein the main axis is not located on the or any of the at least one cylinder axes.

Preferably, when the or one of the pistons is at top or bottom dead centre a line joining the main and big end axes is parallel to and spaced from the respective cylinder axis of the one piston.

Preferably, the or each engagement means includes guide means to constrain the respective piston or pistons to move along the respective cylinder axis.

Usually in scotch yoke engines or pumps two opposed pistons are rigidly connected together about a yoke. A slider, which is rotatably mounted on a big end of a crank, slides within the yoke and causes the pistons to reciprocate.

The present invention aims to provide improved yoke constructions, which allows, in preferred forms, for two identical parts to be utilised to build up the yoke assembly. The assembly may be a split generally axially or transversely relative to the cylinder axis. In preferred forms the number of fixing components required is reduced whilst allowing for simple manufacture of the components.

In one broad form the invention provides a yoke assembly for a scotch yoke type fluid device having opposed pistons reciprocating in opposed cylinders having parallel cylinder axes, the yoke assembly attached to the two pistons and including an engagement portion for receiving an engagement member rotatably mounted on a big end of a crank shaft and in which the engagement means reciprocates as the crank rotates, said engagement portion being split into two parts releasably engaged together.

The engagement portion may be split along a plane generally parallel to the cylinder axes or a plane generally perpendicular to the cylinder axes.

The two parts may be identical or may be dissimilar.

Preferably only two fixings are required to securely hold the two parts together.

The engagement portion preferably includes two opposed channels in which the engagement means reciprocates. Each of the channels may be defined by only one of the parts or both parts may define part of each channel.

Preferably, where identical parts only define all or part of one channel each, each part includes legs which extend and engage the other part. These legs may be located at opposite ends of the channel but on the same lateral side; the same end but opposite lateral sides of the channel or opposite ends and opposite lateral sides of the channel. Preferably, a single fixing may hold two legs, one for each part, simultaneously.

Where non-identical parts are utilised, one part may have two or more spaced apart legs located adjacent the channel and the other part may have no legs or one leg adjacent the channel.

Preferably, the legs are located at the ends of the channel but a single leg may be positioned adjacent the channel at a mid-point. In this construction the crank cannot pass through the engagement portion.

We have found that the decoupled, paired piston s, scotch yoke devices of our invention may be balanced perfectly in that the centre of mass of the moving parts of the engine (the crank, the pistons and their members, and any interconnecting members between the cranks big end and the pistons) remains exactly stationary and centred on the main axis as the device members rotate, orbit and reciprocate through its cycle. We have found that a pair of pistons arranged at 90 degrees to each other and sharing the same big end axis may be perfectly balanced. We have found that a pair of pistons arranged at 90 degrees to each other and having coaxial big ends, similarly may be perfectly balanced (although in this embodiment a rocking couple may be set up).

An engine that is of a V configuration that is other than 90 degrees may be balanced perfectly as well.

This may be achieved by splitting the big end so that there are two big end axis per pair of reciprocating masses, ie, pistons. The two big ends axis are angularly displaced from one another about the main axis.

BRIEF DESCRIPTION OF THE DRAWINGS

The invention shall be better understood from the following, non-limiting description of preferred forms of the invention, in which:

FIGS. 14 to 47 show various configurations of the guide surfaces of the invention.

FIG. 58 shows an end view of a further embodiment of the invention.

FIGS. 59 and 60 show perspective views of the FIG. 58 embodiment.

FIGS. 63 to 68C show end views of further embodiments of the invention.

FIGS. 69 to 80 show end views of a slider arrangements used in embodiments of the invention.

FIGS. 85 to 126 show underside plan views of various pistons made according to the invention.

FIGS. 139 to 141 show isometric views of a further piston made according to the invention.

FIGS. 154 to 156 show isometric views of a further piston made according to the invention.

FIGS. 157 to 159 show isometric views of a further piston made according to the invention.

FIGS. 160 to 162 show isometric views of a further piston made according to the invention.

FIGS. 163 to 165 show isometric views of a further piston made according to the invention.

FIGS. 166 to 168 show isometric views of a further piston made according to the invention.

FIGS. 169 to 171 show isometric views of a further piston made according to the invention.

FIGS. 187 to 189 show isometric views of a further piston made according to the invention.

FIG. 201 is a cross-sectional view of a sixth embodiment of the invention.

FIG. 202 is a cross-sectional view of a seventh embodiment of the invention.

FIG. 206 is a cross-sectional view of a twelfth embodiment of the invention.

FIG. 207 is a cross-sectional view of a thirteenth embodiment of the invention.

FIG. 224 shows an exploded perspective view of the first embodiment.

FIGS. 229 to 232 show perspective conceptual views of various yoke constructions.

DETAILED DESCRIPTION OF THE PREFERRED EMBODIMENTS

Figure 1:
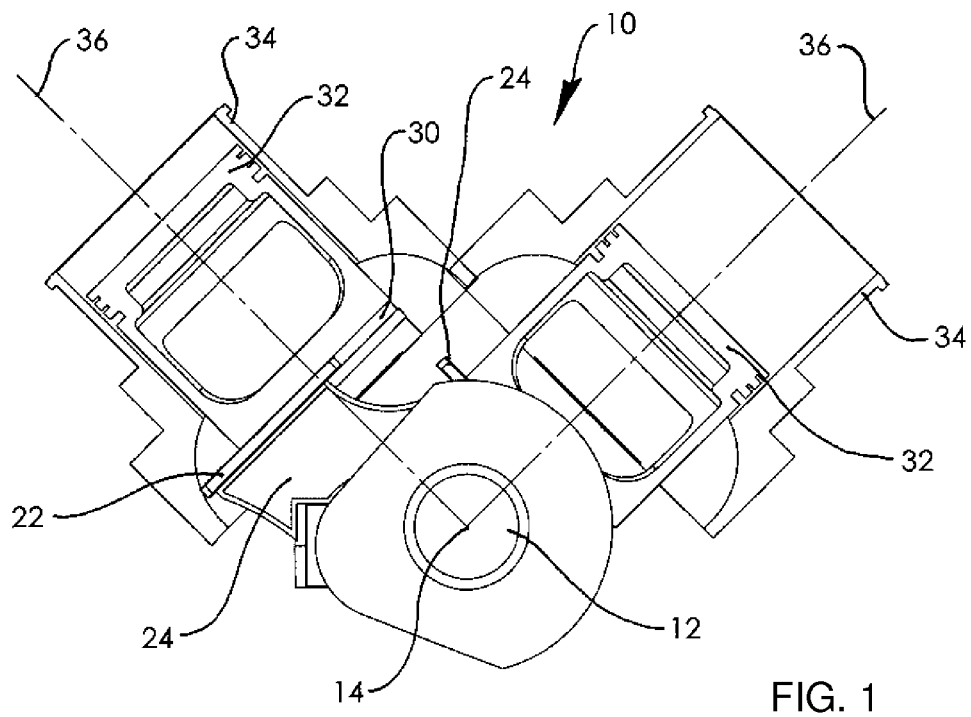
FIG. 1 is a cross-sectional view of a fluid machine according to the invention.
Figure 2:
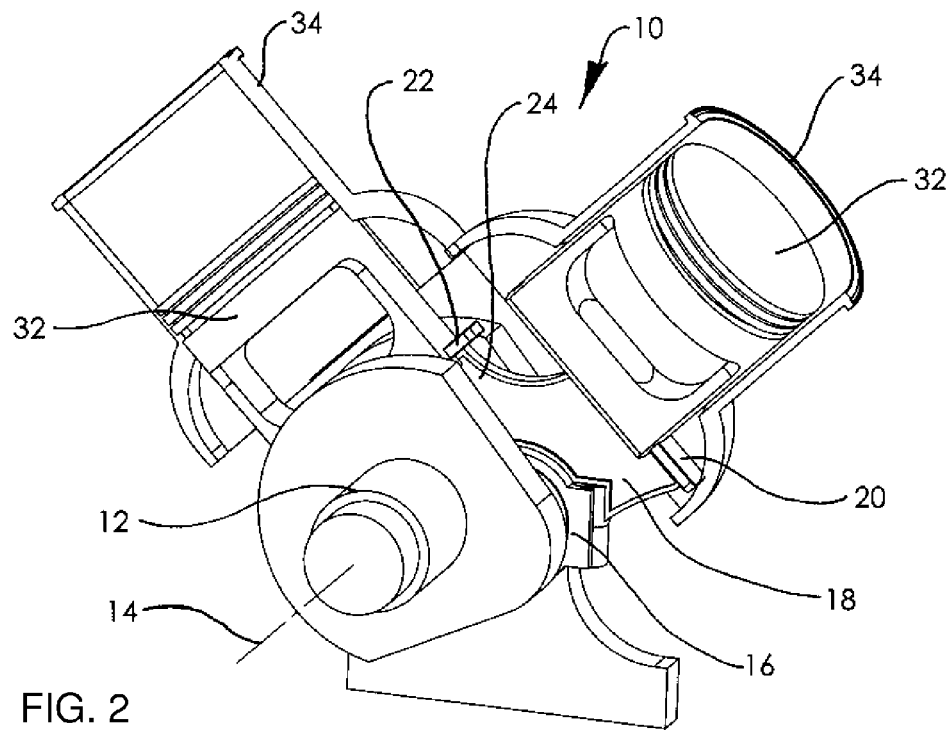
FIG. 2 is a partial cutaway perspective view of the FIG. 1 device.

Referring to FIGS. 1 and 2 there is shown a fluid device 10 which includes a crank 12 mounted for rotation about a crank axis 14. The crank 12 has an offset bearing pin 16, radially distant from the axis 14. Thus as the crank 12 rotates about axis 14, pin 16 will describe a circular orbit around axis 14.

Rotatably mounted on bearing pin 16 is a slider 18. The slider has two tongues 20, 22.

The slider 18 extends generally perpendicular to the axis 14 whilst the tongues extend generally parallel to the axis 14. As best seen in FIG. 2 the sliding surfaces extend axially on either side of the main portion 24 of the slider and so form a T-shaped construction.

Each of the tongues 20, 22 engages in a T-shaped slot 30 of a respective piston 32. Each piston is mounted in a cylinder 34 and constrained for linear movement along respective cylinder axis 36. The slot 30 preferably extends substantially perpendicular to the cylinder axis 36 and extends diametrically across the centre of the piston. Both ends of the slot 30 are open. The slider can thus move sideways relative to the piston but must move axially with the piston. Where the slot 30 does not extend at 90° to the piston axis, sideways movement of the tongue relative to the piston will cause axial motion of the piston. This enables one to control the motion of the piston beyond a pure sinusoidal motion.

The piston is constrained to move along its piston axis and as the crank 12 rotates the slider 18 member rotates about the crank axis 14. The motion of each tongue has a component parallel to the respective piston axis and a component perpendicular to the respective piston axis. Thus, the pistons reciprocate in their respective cylinders with the tongues sliding sideways in their respective slots 30. The combination of the linear movement of the piston and the tongue in the slot maintains the slider member 18 in a constant orientation as the crank rotates, irrespective of other pistons. In the embodiment of FIG. 1, there are provided two pistons at 90° to each other, but since the slider 18 maintains its orientation as it orbits the crank axis, the angle between the pistons may be other than 90°. Similarly more pistons may be added.

Figure 3:
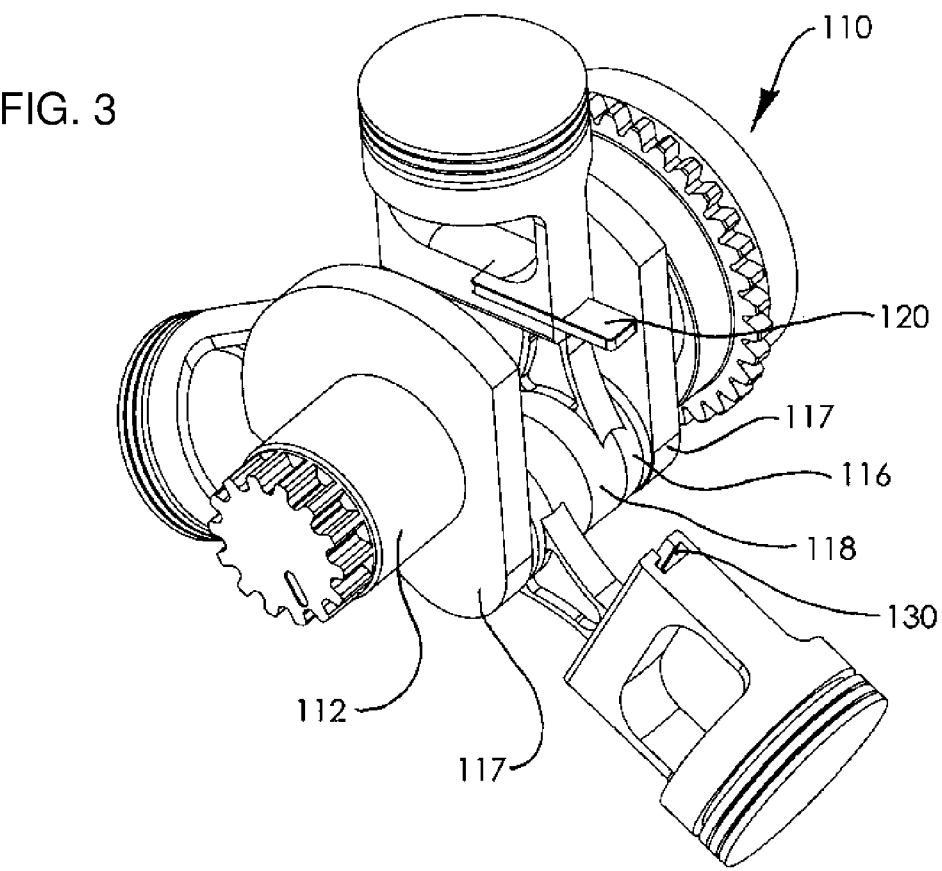
FIG. 3 is a perspective view of a three piston fluid machine according to the invention.

FIG. 3 shows a perspective view of a three piston device. For clarity the cylinder and crank cast assemblies are omitted. As can be seen, the device 110 includes a crank 112 with a bearing pin 116 extending between webs 117. Three pistons are arranged equally about the crank at 120° to each other. Mounted on the bearing pin is a triple tongue device 118. This device may be a unitary structure or it may include three separate components mounted on the pin 116. As seen, each piston is provided with a T-shaped slot 130 into which the respective tongue 120 engages. The pistons are axially offset but, if desired, they may be in a common plane.

Because each of the pistons is decoupled from any other piston, the orientation and 5 position of the pistons may be chosen as desired. There is no need for the piston axes to extend radially from the crank axis. The piston axes may extend radially from an axis, but this axis may be remote from the crank axis. The piston axes may be parallel and spaced from each other on either side of the crank axis.

Figure 4:
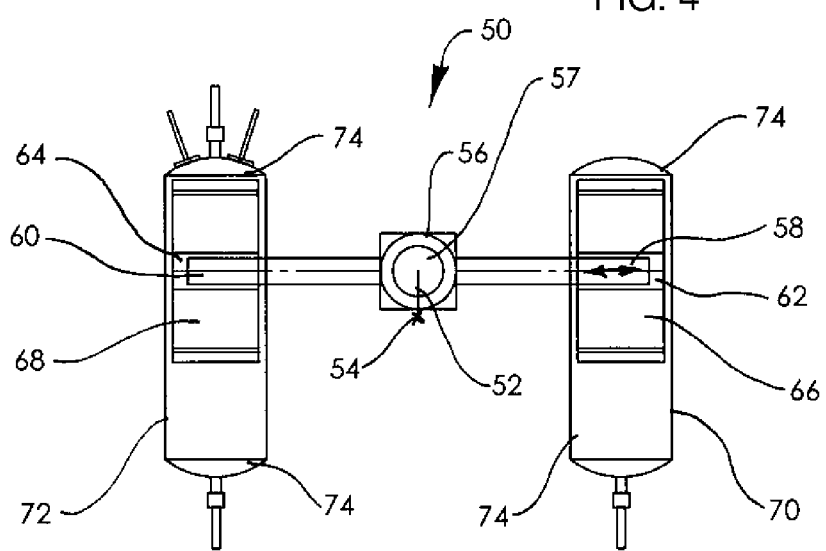
FIG. 4 shows an end view of a third embodiment of the invention.

FIG. 4 shows a fluid device 50 having a crank 52 rotating about crank axis 54. A to slider mechanism 56 is maintained on a bearing pin 56 and has two arms 58, 60 which extend horizontally and engage in slots 62, 64 respectively of pistons 66, 68. Each of the pistons 66, 68 reciprocates in a dual chambered cylinder 70, 72. The cylinders 70, 72 are closed at both ends and thus combustion chambers 74 are defined between the pistons and the ends of the cylinders.

Rotation of the crank 52 causes the pistons to reciprocate vertically within the cylinders with the arms moving sideways relative to the pistons.

Figure 5:
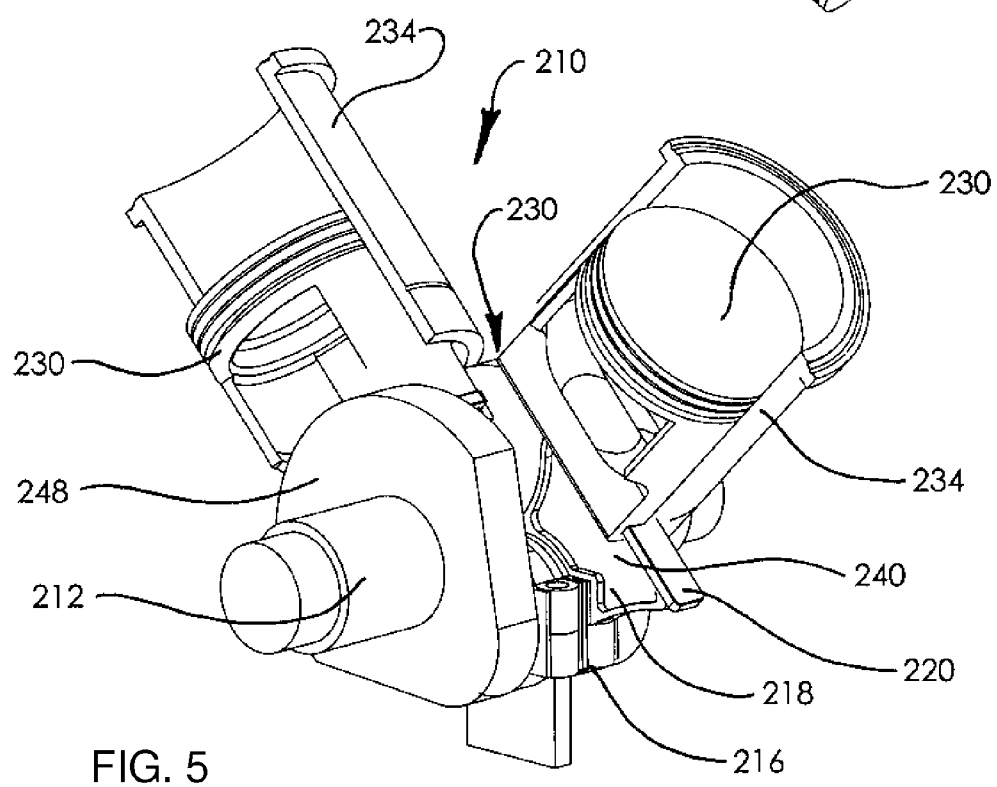
FIG. 5 shows a partial cutaway perspective view of a fourth embodiment of the invention.
Figure 6:
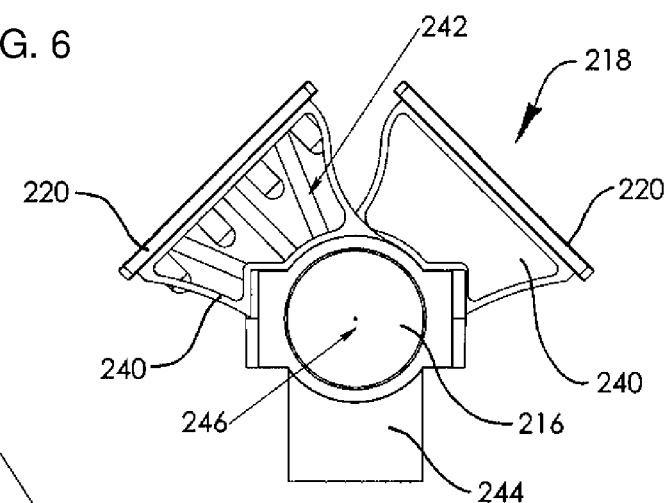
FIG. 6 shows an end view of a connecting device of the FIG. 5 device.
Figure 7:
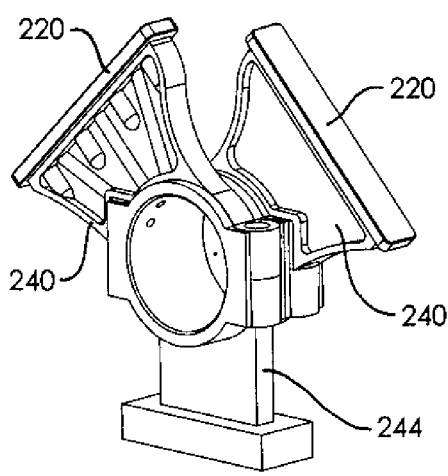
FIG. 7 shows a perspective view of the FIG. 6 device.

Referring to FIGS. 5 to 7 there is show a reciprocating piston device 210 having two pistons 230 reciprocating in respective cylinders 234 at 90° to each other. A connecting device 218 connects the two pistons to big end pin 216 of crankshaft 20 212 via tongues 220 and slots 230 in the pistons 232. The connecting device 218 has two webs 240, one for each piston, which are offset axially relative to each other. This allows the pistons 232 to overlap each other and so be brought closer to the crank axis 214. Lubrication ducts 242 are provided to supply pressurised oil from the big end pin 216 to the sliding surfaces of the tongues 220 and slots 230.

The connecting device 218 includes a counter weight 244 extends downwardly on the opposite side of the big end pin 216, bisecting the angle between the two webs 240. This counter weight 244 is sized so that the centre of inertia and preferably also the centre of mass of the connecting device 218 lies on the big end axis 246. It will be appreciated that when the pistons are spaced equally about the crank axis 214 that the webs 240 will balance each other and a separate counter weight may not be needed.

As the connecting device orbits the crank axis 214 no rotational forces are generated relative to the big end axis 246, which would cause the connecting device to attempt to rotate about the big end and which would need counter turning forces to be generated at the slot 230/tongue 220 interface. In addition, since the centre of inertia of the connecting device remains on the big end axis 246, it is a relatively simple matter of adding an appropriate amount of mass to the counter weight 248 on the crank 212 diametrically opposite the big end axis 246 to provide a dynamically balanced crankshaft/connecting device combination. It will be appreciated that for other piston arrangements that so long as the connecting device's centre of inertia lies on the big end axis 246, then it may be dynamically balanced.

This leaves the reciprocating mass of the pistons. The velocity of the pistons follows a pure sinusoidal path and in combination the two pistons are the equivalent of a single rotating mass. This may be balanced by adding an appropriate mass to the crankshaft, thereby resulting in a dynamically balanced device. For a V twin configuration, a single piston mass is added to the back of the crankshaft. For a four piston star configuration, two piston masses are added to the crank counter weight.

Figure 8:
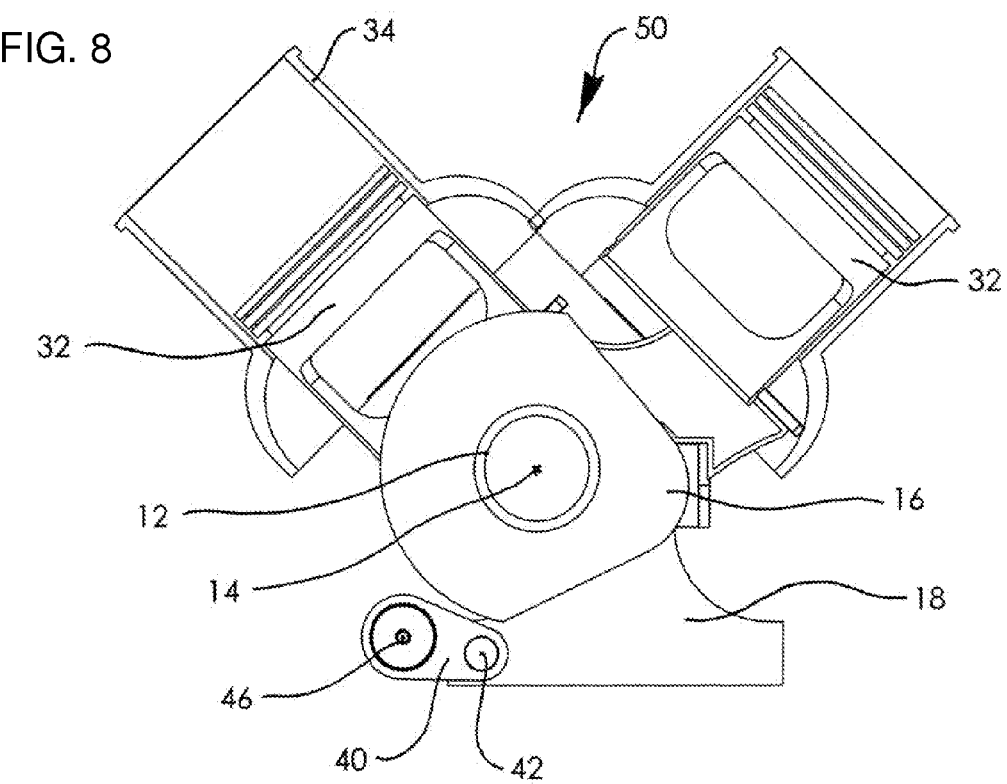
FIG. 8 shows an end view of a variation of the FIG. 1 embodiment.

Referring to FIG. 8, there is show a fluid device 50 which is a variation on the FIG. 1 embodiment. For clarity the same numbers are used for the same components. The combination of the piston 32 being limited to linear motion along the piston axis 36 and the respective tongue 20 being limited to linear motion relative to the piston 32 theoretically prevents any rotation of the connecting means 18 relative to the piston 32. However, due to the need for manufacturing tolerances, there will inevitably be some free-play and hence turning of the connecting means 18 relative to the pistons 32. This in turn will generate turning forces at the interfaces of the tongues 20 with the slots 30. To alleviate this, the device in FIG. 8 is provided with a linkage 40. One end of this linkage 40 is pivotably connected to the connecting means 18 at 42 and its other end is pivotably connected to the crankcase (not shown) at 44. The linkage 40, connecting means 18, crankshaft 12 and crankcase thus for a four bar linkage. The distance between the two pivot points 42, 44 is the same as the separation of the crank axis 14 from the big end axis 46. Thus, irrespective of the restriction imposed by the engagement of the connecting means 18 with the pistons 32, the connecting means is constrained to orbit about crank axis 14 without changing its orientation.

Figure 9:
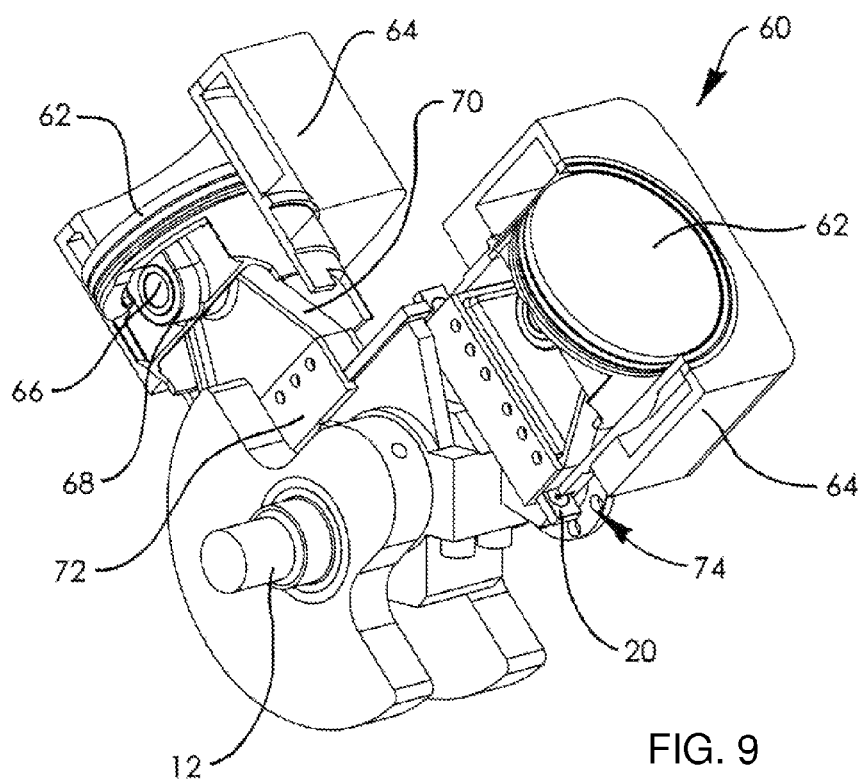
FIG. 9 shows a perspective view of a fifth embodiment of the invention.
Figure 10:
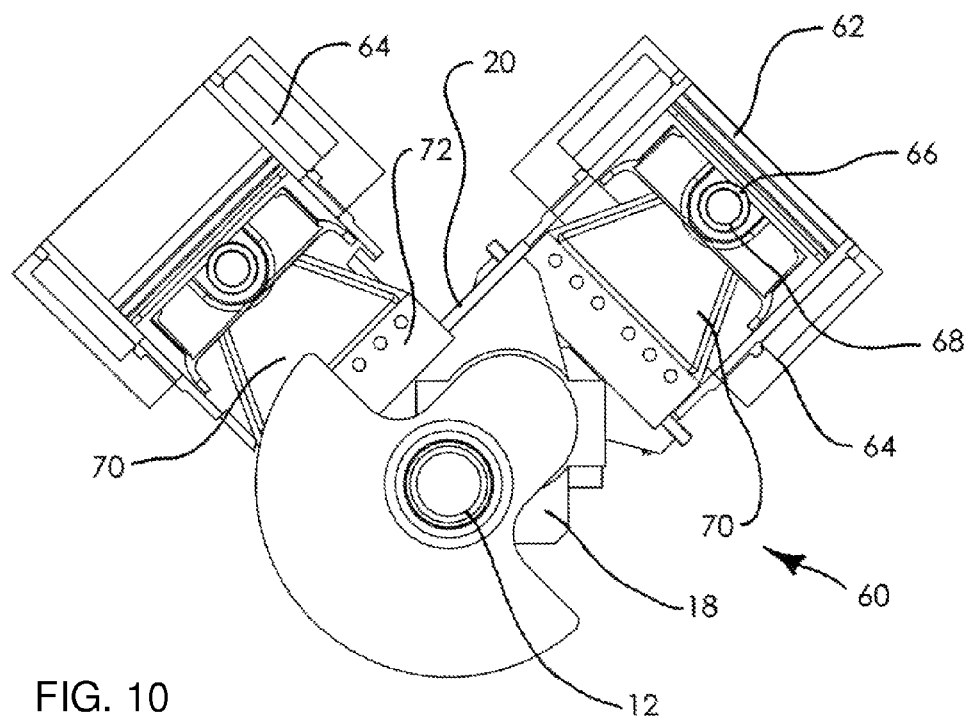
FIG. 10 shows an end view of the FIG. 9 embodiment.

Referring to FIGS. 9 & 10 there is shown a twin cylinder fluid device 60 having pistons 62 reciprocating in cylinders 64. The pistons 62 are each provided with a gudgeon pin 66 mounted in a bearing 68 on the respective piston. Mounted on the gudgeon pin 66 is a connecting rod 70. However, the connecting rod 70 does not mount on the big end of the crankshaft 12, but on the connecting means 18. The lower end 72 of the respective connecting rod 70 is provided with a T-shaped slot 74 which receives the T-shaped tongues 20 of the connecting means 18. Whilst the connecting rod 70 is free to rotate about the gudgeon pin 66 relative to the piston, the combination of the planar mating surfaces of the slots 74 and tongues 20 prevents any pivoting and so the connecting rod 70 and connecting means 18 move as a single unit. Whilst this may appear to introduce unnecessary complication to the structure, it does allow one to use conventional pistons.

Figure 11:
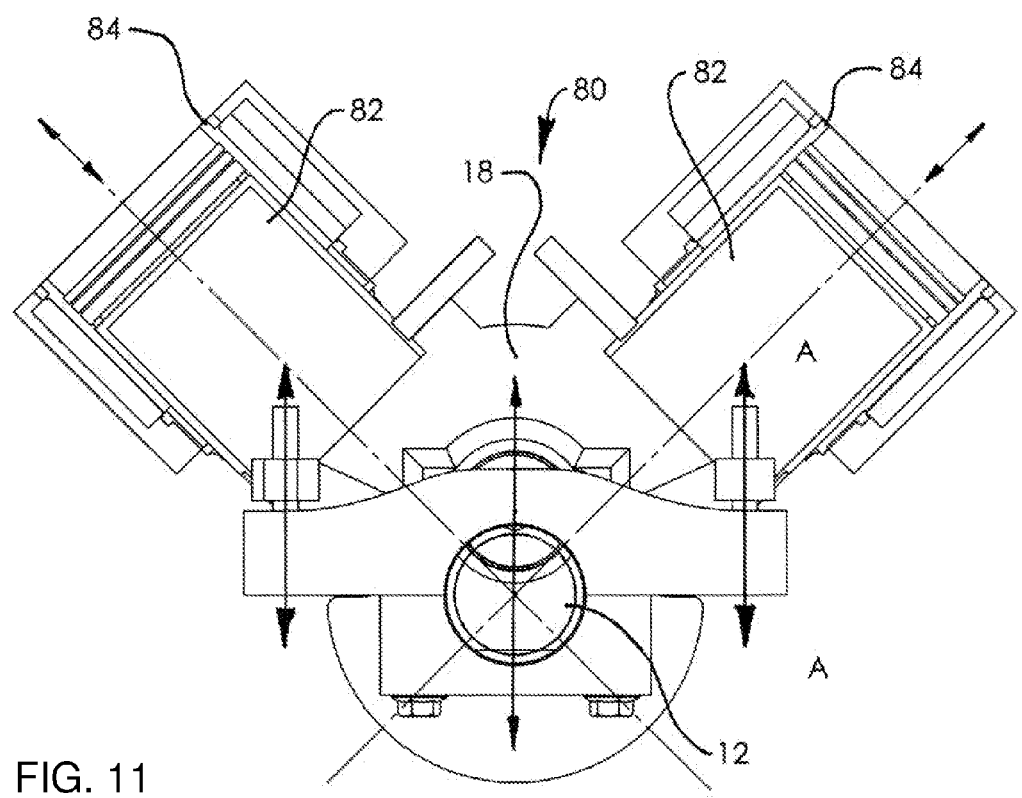
FIG. 11 shows an end view of a sixth embodiment of the invention.

Referring to FIG. 11, there is shown a twin cylinder fluid device 80 with twin pistons 82 mounted on connecting means 18 in cylinders 84. The connecting means 18 is mounted on a crankshaft 12, but the axis 14 of the crankshaft is not fixed relative to the cylinders 84. Instead, the crankshaft 12, and with it connecting means 18 and pistons 82 may be moved upwards or downwards, as indicated by arrows 86. The vertical movement of the crankshaft 12 raises the pistons in the cylinders 84 and thus provides the ability to vary the compression ratio on the fly. Movement of the crankshaft 12 does not effect the timing of the pistons in the cylinders 84 relative to the crankshaft 12 or to each other. This is in contrast to conventional V engines which if provided with movable cranks, causes the timing of the pistons to vary, with one piston being advanced and the other retarded.

Vertical movement of the crankshaft 12 may be achieved utilising conventional means, such as hydraulic rams or the like.

It will be appreciated that a movable crank may be utilised with a single piston and that the movable crank may be moved along paths other than the bisector in a V-twin engine, for example. The crank may be moved at a, say, 15° to the vertical. 15 This has no effect other than to need more crank movement to achieve the same change in compression ratio.

Figure 12:
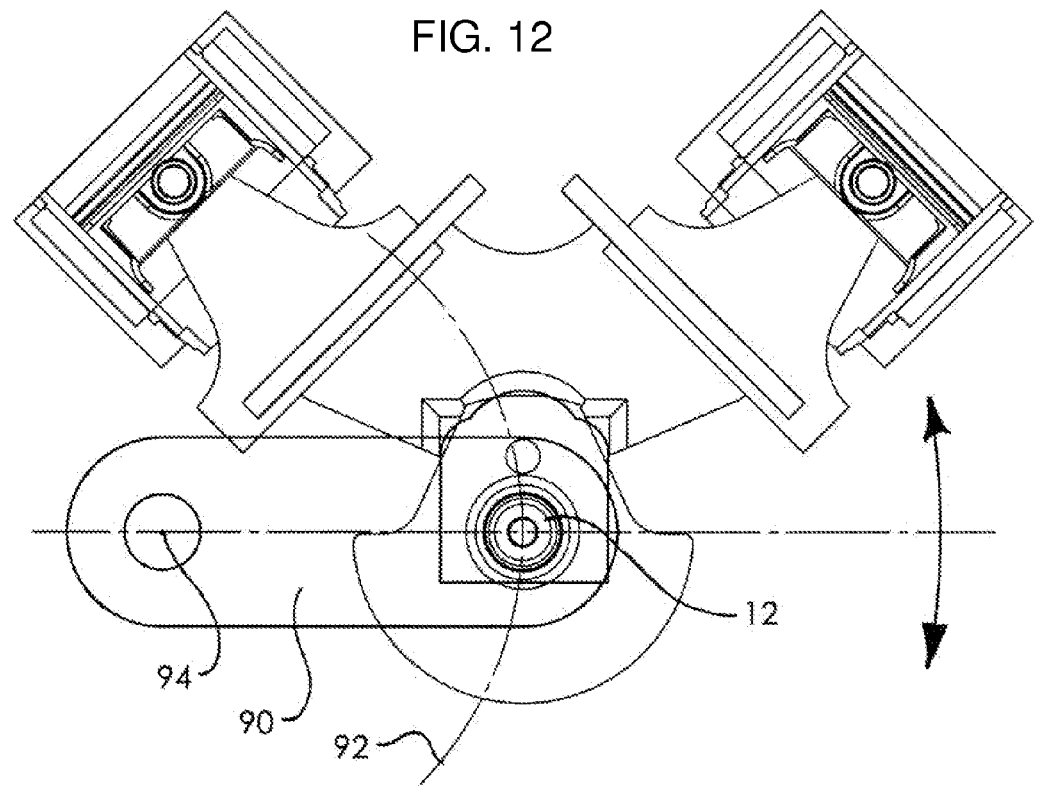
FIG. 12 shows an end view of a seventh embodiment of the invention.

FIG. 12 shows a variation of the FIG. 11 embodiment, in which the crankshaft 12 is mounted on bearing arms 90. The crank engages a gear 92, which may be connected to a gearbox in the case of an engine. The gear 92 has an axis of rotation 20 94. The bearing arms 90 are pivotably mounted on the crankcase about axes which are coaxial with the axis 94.

The bearing arms may be rotated about the axis 94 by suitable means to raise or lower the crankshaft relative to the cylinders. Whilst this does cause a sideways movement of the crankshaft, and so advancement and retardation of the pistons, this is very slight.

Figure 13:
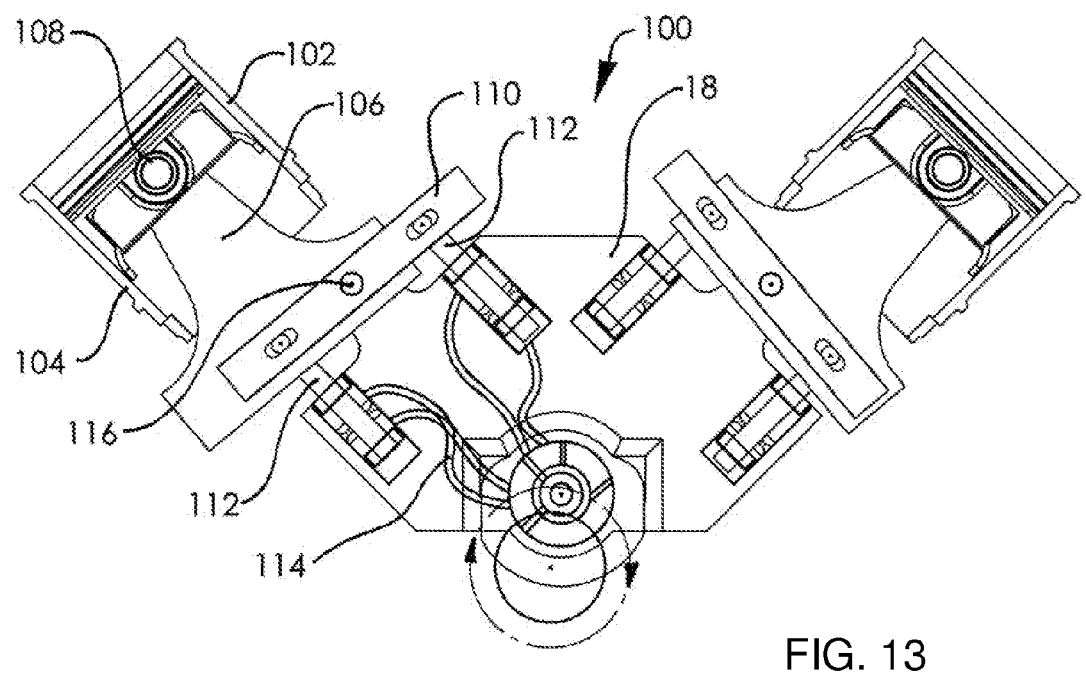
FIG. 13 shows an end view of a eighth embodiment of the invention.

FIG. 13 shows a further embodiment of the invention, in which there is a twin cylinder device 100 with pistons 102 reciprocating in cylinders 104. The pistons have connecting rods 106 pivotably mounted on gudgeon pins 108. The lower end of the connecting rod is provided with two opposed parallel surfaces in which a slider 110 is mounted. The opposite ends of the slider 110 are connected to hydraulically operated rams 112. These rams 112 are incorporated within the connecting means 18 and are selectively supplied with high pressure oil via ducts 114. The rams 112 are thus capable of causing the slider 110 to pivot about its centre 116, to raise or lower relative to the connecting means 118, and hence relative to the cylinder, or a combination of both. This causes the piston to rise or fall relative to the respective cylinder and/or for the connecting rod 106 to pivot about gudgeon pin 108, so altering the phase of the piston.

FIGS. 14 to 29 show a number of variations of the guide surfaces of the piston and the corresponding surfaces on the engagement means.

Figure 14:
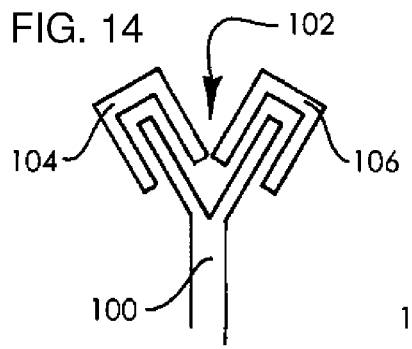

FIG. 14 shows a slider 100 having a Y-shaped engagement surface 102 for engagement with two pairs of surfaces 104, 106 of a single piston.

Figure 15:
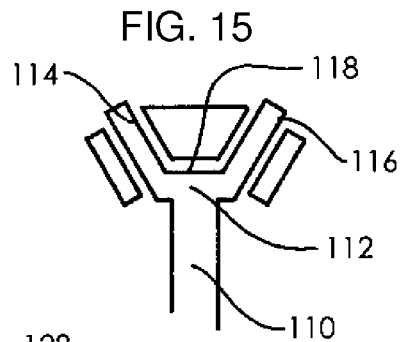

FIG. 15 shows a slider 110 having engagement means 112. This surface 112 is Y-shaped but has surfaces 114, 116 extending from base 118.

Figure 16:
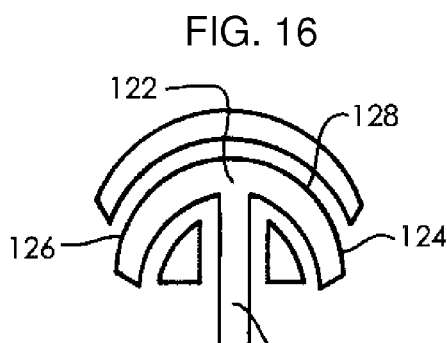

FIG. 16 shows a slider 120 having engagement means 122. The engagement means in cross section is T-shaped with two arms 124, 126. These arms 124, 126, in cross section, form a curved upper surface 128.

Figure 17:
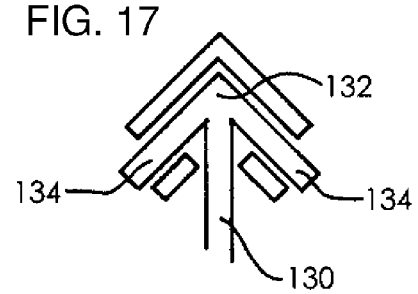

FIG. 17 shows a slider 130 having an arrow-headed engagement means 132. The engagement means 132 has two downwardly extending and diverging arms 134 o which are engaged by the piston.

Figure 18:
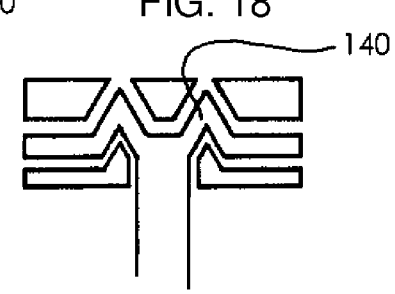

FIG. 18 shows a W-shaped engagement means 140.

Figure 19:
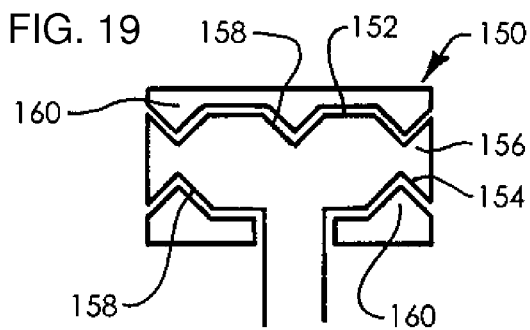

FIG. 19 shows a T-shaped engagement means 150 but the upper and lower surfaces 152, 154 of the arms 156 are provided with V-shaped grooves 158, in which V-shaped protrusions 160 extend. The V-shaped grooves 158 and protrusions 160 may be located on the other of the piston and engagement means.

Figure 20:
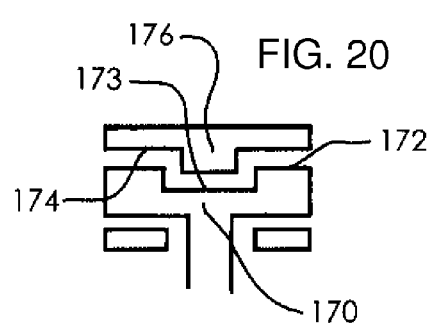

FIG. 20 shows a T-shaped engagement means 170 having an upper surface 172 with a slot 172 located centrally therein. The corresponding surface 174 of the piston includes a rectangular shaped protrusion 176 which extends into the slot.

Figure 21:
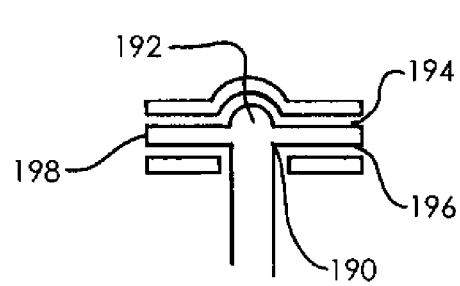

FIG. 21 shows a T-shaped engagement means 190 having a semi-circular 0 protrusion 192 located centrally on the upper surface 194. The protrusion 192 need not be located centrally and there may be additional protrusions located on one or both sides of the centre of engagement means, either on the upper surface 194, the lower surfaces 196, 198, or both.

Figure 22:
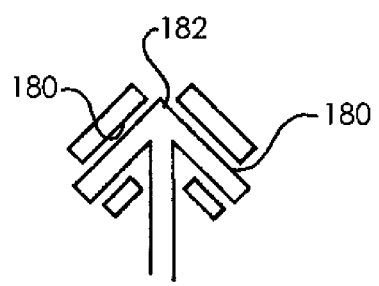

The device of FIG. 22 is similar to that of FIG. 17 except that the upper 5 engagement surface 180 of the piston is not continuous but is provided with an opening 182.

Figure 23:
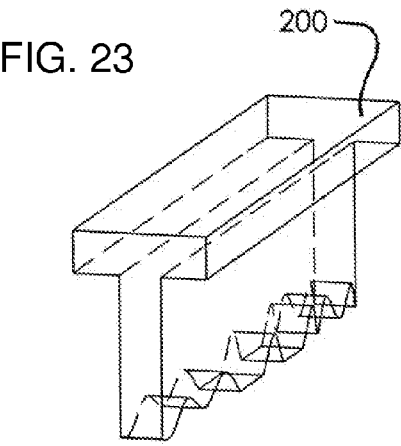

FIG. 23 shows a T-shaped engagement means 200 having (what?)

Figure 24:
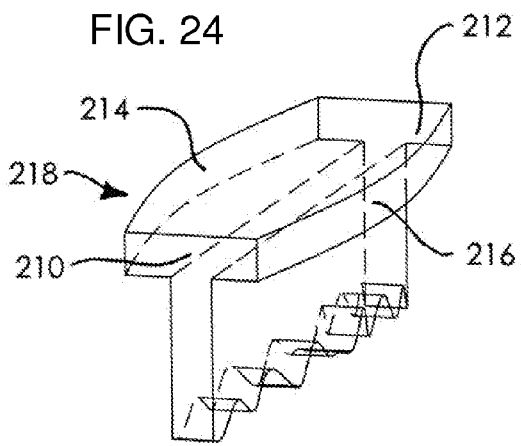

FIG. 24 shows a T-shaped engagement means 210 having arms 212 and 214. The side surfaces 216, 218 of the arms are curved, so the width between the surfaces 30 216 and 218 is greater at the centre of the engagement means than at either end. It will be appreciated that the width of the corresponding slot in the piston will need to be at least as wide as the widest part of the two arms.

Figure 25:
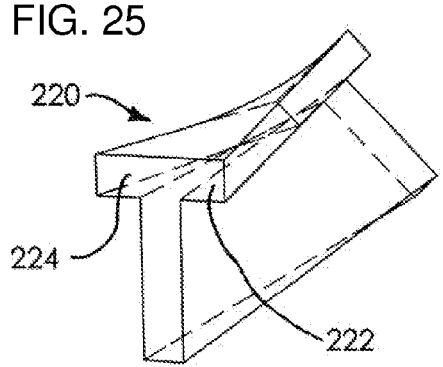

FIG. 25 shows an engagement means 220 which is T-shaped but in which the arms 222, 224 converge in the longitudinal direction, so as to form a triangular 35 shaped upper surface.

Figure 26:
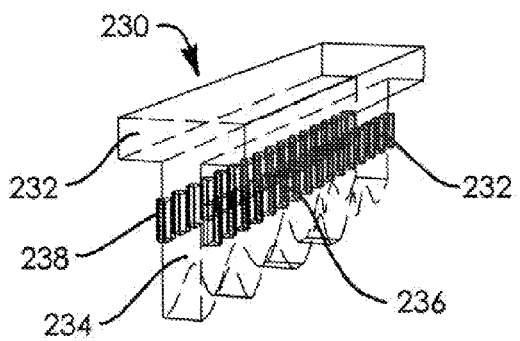

FIG. 26 shows a T-shaped engagement means 230 having arms 232 and central leg 234. The leg 234 is provided with linear gears 236, 238 on its two surfaces. These gears 236, 238 may be used to drive, via rotatable gears mounted on the piston, other devices.

Figure 27:
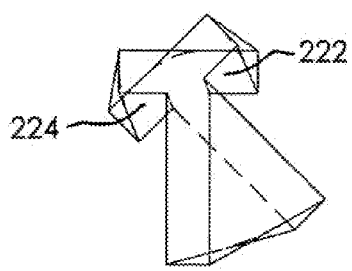

FIG. 27 shows an end view of the FIG. 25 embodiment.

Figure 28:
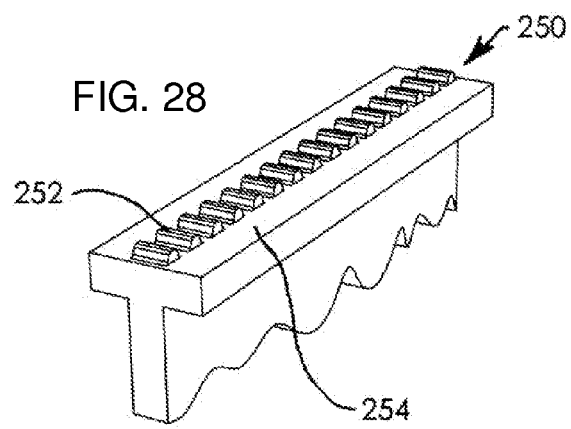

FIG. 28 shows a T-shaped engagement means 250 having a centrally located linear gear 252 on the upper surface 254. As with the FIG. 26 device, this gear may be used to drive devices mounted on or in the piston.

Figure 29:
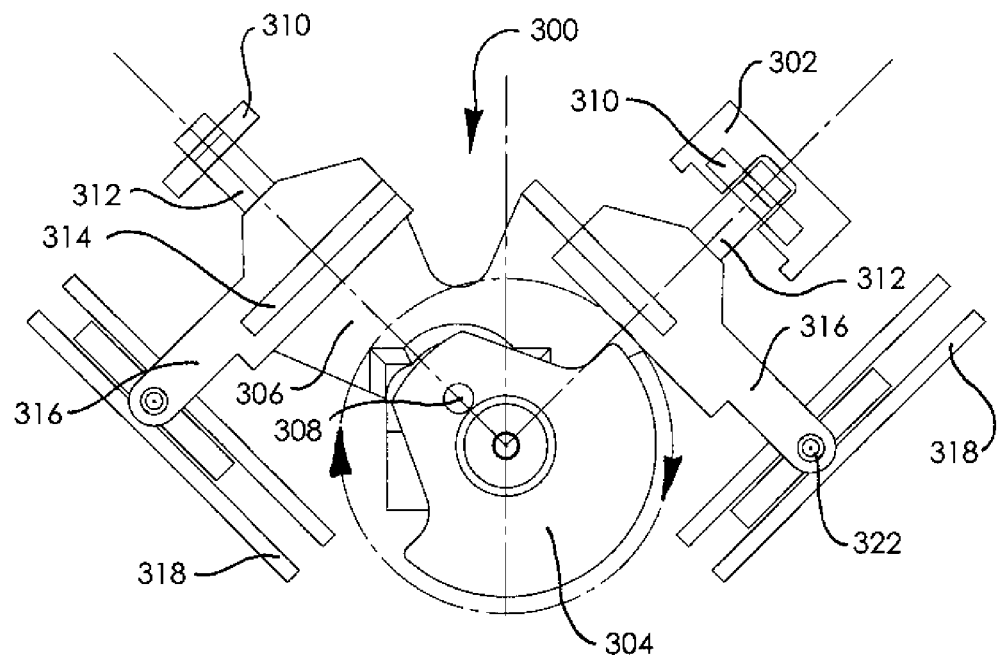

FIG. 29 shows a V-twin engine 300 having pistons 302, crank 304 and connecting means 306 mounted on the big end 308 of the crank 304. The pistons are conventional pistons in having a gudgeon pin 310 on which is rotatably mounted a connecting rod 312. However the connecting rods 312 have a slot 314 at their lower end in which the connecting means 306 engages.

The connecting rods each have a sideways extending arm 316 which engages a slider 318 which slides in guides 320 parallel to the respective cylinder axis. The connecting rod may be integral with the slider 318 or it may be connected by way of a pivotable joint 322, as shown. The joint 322 may be a single axis joint or a ball type joint. In the embodiment shown the arms 316 extend parallel to the slots 314. However they may extend at any angle.

The guides 318 aid in stabilising the respective piston because the tolerances required can result in the piston rotating very slightly in the bore and cause seizing or the like. If very tight tolerances are used, the guides may not be needed. The sliders 318 may be integral with the crank case or may be separate items attached to the crank by way of bolts and the like The gudgeon pins of the pistons may be at 90° to the crank axis as no rotational movement of the connecting rod relative to the piston will occur. Use of the pistons with gudgeon pins allows one to use off the shelf pistons.

Figure 30:
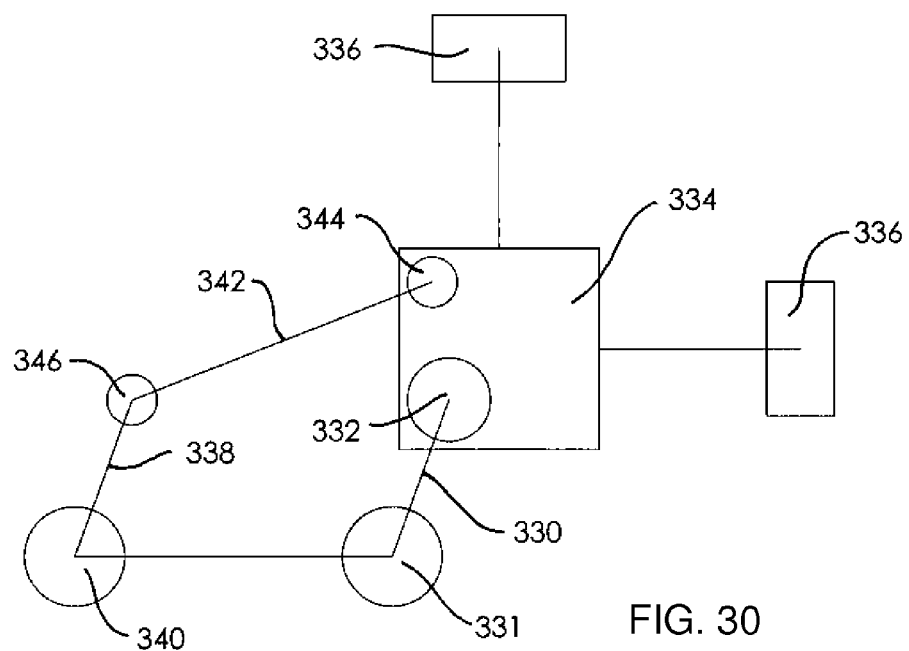
Figure 39:
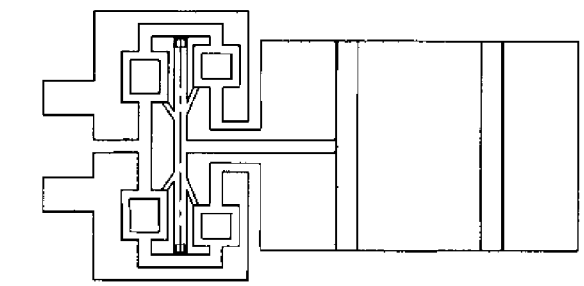

FIG. 30 shows a schematic layout of a V-twin engine having a primary crank 330, a big end 332 and a connecting means 334 mounted on the big end. Pistons 336 are mounted on the connecting means 334 as in the previous embodiments.

A slave crank, 338 is provided which rotates about an axis 340 parallel to the axis 331 of the primary crank. A link 342 is pivotably mounted on both the connecting means 334 at 344 and the slave crank 338 at 346. The distance of pivot point 346 from the slave axis 340 is the same as that of the big end 332 from the primary axis 331. The slave crank and link 342 thus aid in maintaining the connecting means in a fixed orientation as the primary crank 330 rotates. It will be appreciated that this stabilisation technique may be used with any of the embodiments described herein.

FIG. 31 shows an axial cross-section through a big end 350 and a connecting means 352. The connecting means 352 has engagement means 354 which is engaged by engagement means 356 and 358 of two separate pistons (not shown).

FIG. 32 shows a similar structure to that of FIG. 31 but with a different configuration of the engagement means 360 on the connecting means 362 and the corresponding engagement means 364, 366 of the two pistons.

FIG. 33 shows a connecting means 370 having two slots 372, 374 in each of which is engaged a T-shaped engagement means 376, 378. The engagement means 376, 378 may be attached to a single piston or to separate pistons.

FIG. 34 shows a connecting means 380 having two slots 382, 384. Each slot has a Z-shape which traps the corresponding engagement means 386, 388.

FIG. 35 shows a connecting means 390 having two slots 392, 394 in which are engagement means 396, 398. Located in the slots are roller bearings 400 to aid movement of the engagement means 396, 398 along the slots 392, 394. It will be appreciated that the bearings 400 will be provided at intervals along the slots.

FIG. 36 shows a connecting means 410 in which the piston engagement means 412, 414 surround the connecting means 410 and engage in downwardly opening slots 416, 418.

Figure 38:
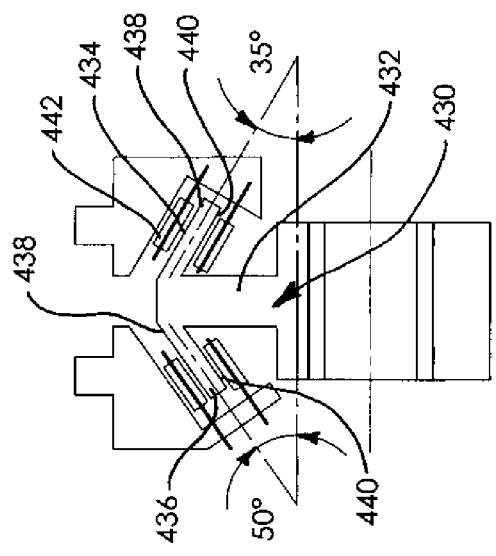
Figure 41:
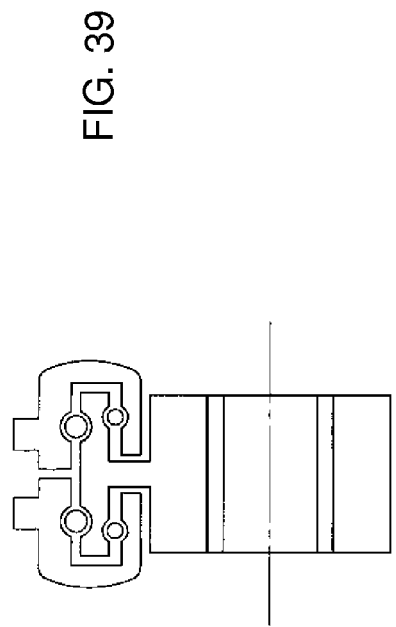
Figure 37:
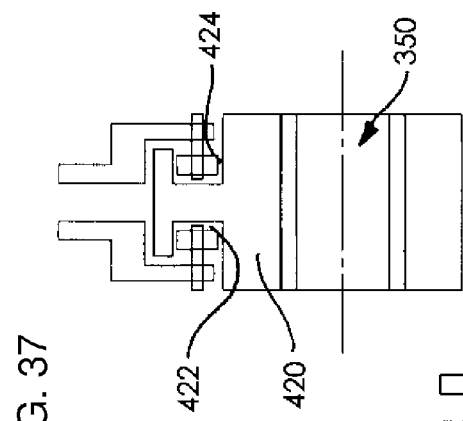
Figure 40:
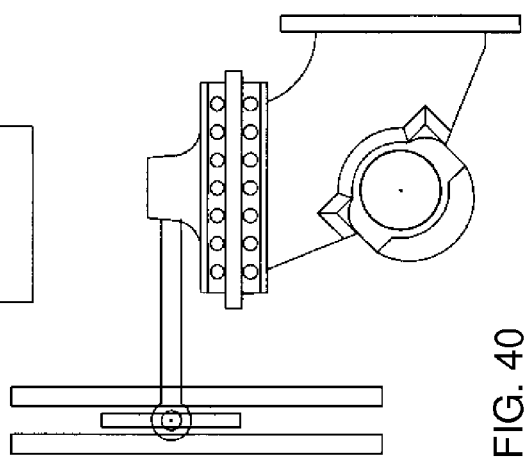

FIG. 37 shows a connecting means 420 having two sideways opening slots 422, 424. Two engagement FIG. 38 shows a connecting means 430 having a T-shaped engagement means 432 having arms 434 and 436 which descend divergently. The upper and lower surfaces 438 and 440 maybe parallel, as in arm 434 or divergent as in arm 436. The piston has a series of opposed roller bearings 442 which engage the upper and lower surfaces. As examples the centre line of the arms maybe at between 35° and 50° to the big end axis.

FIGS. 39 to 47 show further variations possible of the connection between the connection means and the engagement means of the piston or pistons mounted thereon.

Figure 48:
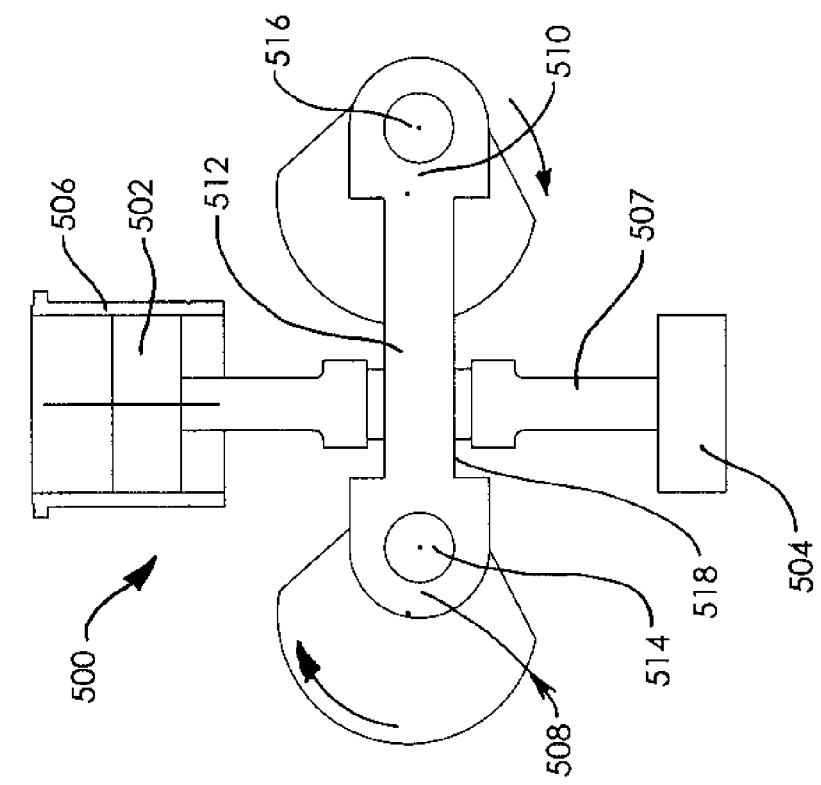

FIG. 48 shows a twin piston fluid device 500 having two opposed pistons 502 and 504 reciprocating in cylinders 506 having a common axis. The pistons are rigidly joined by a linkage 507. Two crank shafts are provided 508 and 510 having connecting means 512 mounted on respective big ends 514 and 516. The connecting means passes through a bore 518 in the linkage 507 which constrains the connecting means 512 to slide sideways relative to the linkage. Preferably this motion is perpendicular to the cylinder axis but need not be so.

The two cranks 508 and 510 are preferably linked, such as by gears, so that they rotate together. As they rotate the connecting means describes a sinusoidal vertical motion and so causes the pistons to describe similar motion.

Figure 49:
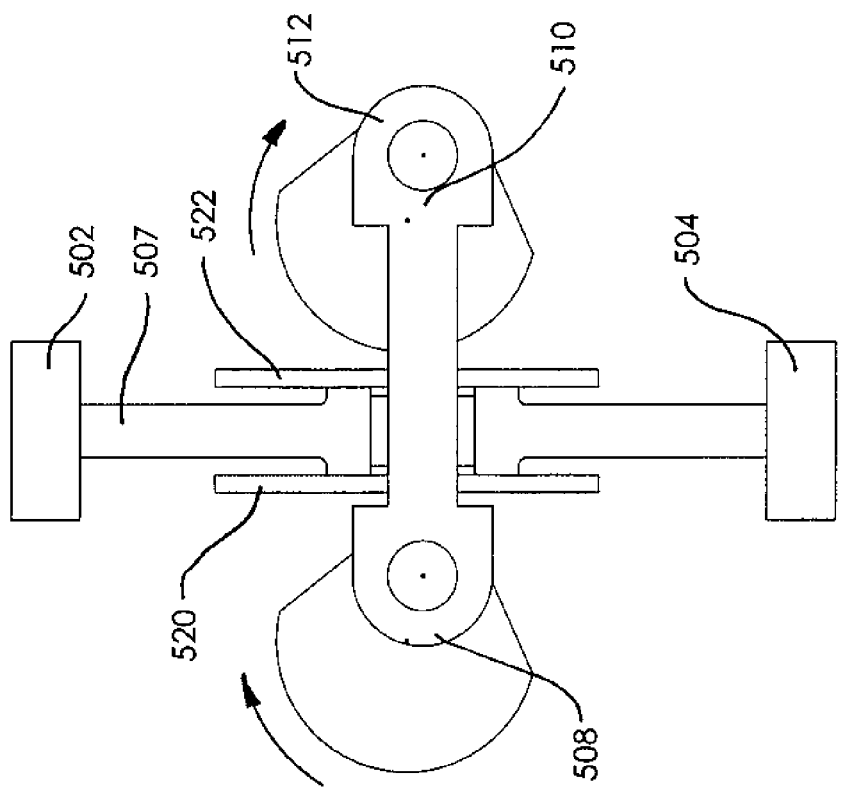
FIGS. 48 to 51 show various end views of embodiments of the invention.

FIG. 49 shows a variation of the FIG. 48 device and accordingly like parts are numbered the same.

Whilst the connecting means 512 is free to slide sideways relative to the linkage 507, there will be some sideways loading on the linkage. Accordingly guide surfaces 520 and 522 are provided either side of the linkage 505 to prevent sideways motion.

Figure 50:
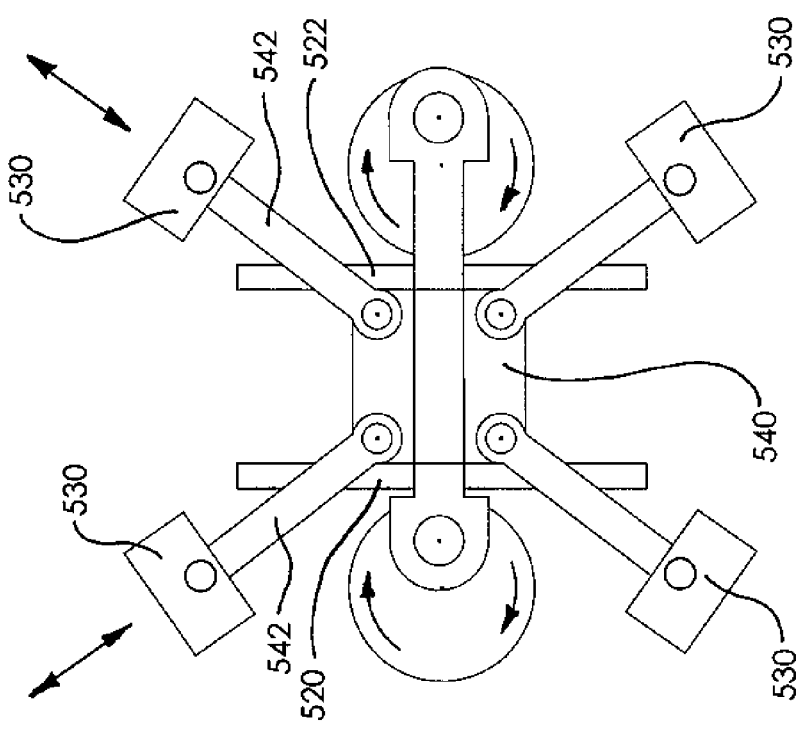

FIG. 50 shows a variation of the FIGS. 48 and 49 devices. In this embodiment four pistons 530 are pivotally connected to a slider 540 by linkages 542. The pistons are arranged in an X configuration. This may be one with equal angles of 90° between each piston path or, as shown, one where the pistons are not equally spaced. Each linkage pivotally connects to the respective piston and slider. The slider 540 is constrained to move vertically by guides 520 and 522 and does so sinusoidally.

Figure 51:
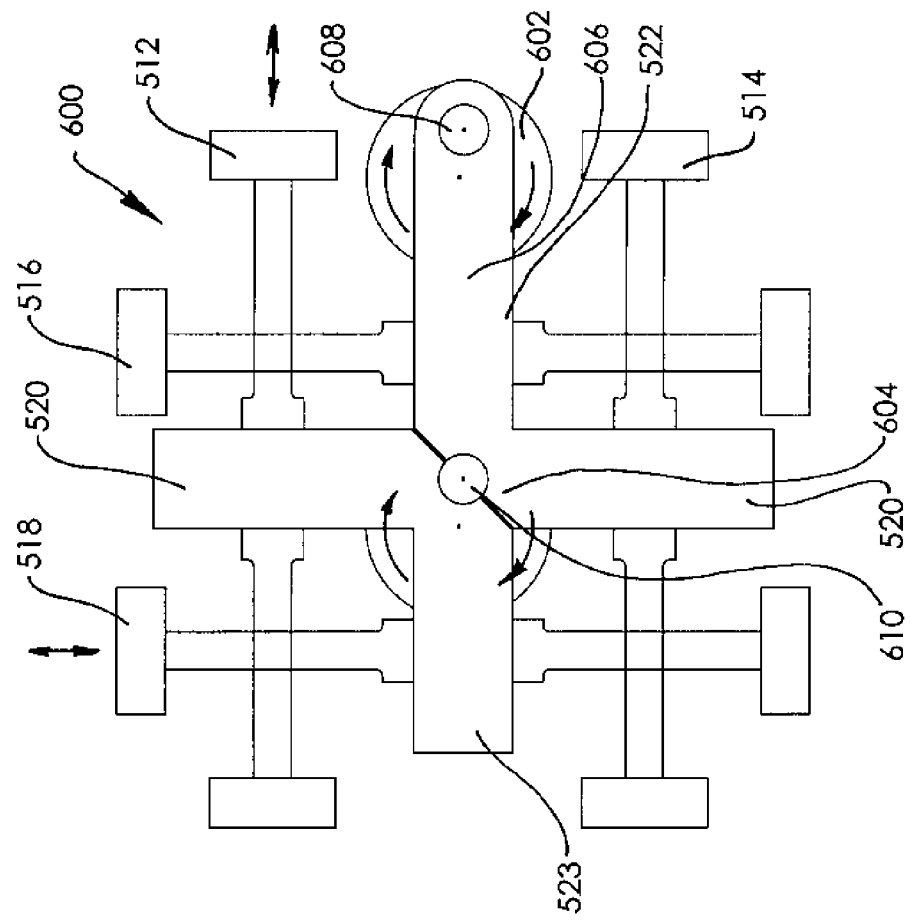

FIG. 51 shows a device 600 similar to the FIGS. 48 to 50 devices in having two cranks 602 and 604 rotating together. An X-shaped connecting means 606 is mounted on the big ends 608 and 610 of the two cranks. Four pairs of linked pistons 512, 514, 516 and 518 are each mounted on one of the arms 520 to 524 of the connecting means. Each arm and its associated pair of pistons is the equivalent of the FIG. 48 device. The arms 520 to 524 preferably extend at 90° to each other, but this is not essential. Further it is not essential that one of the big ends be mounted to the centre of the connecting means. Preferably the two cranks are located either side of the centre of the connecting means.

Figure 52:
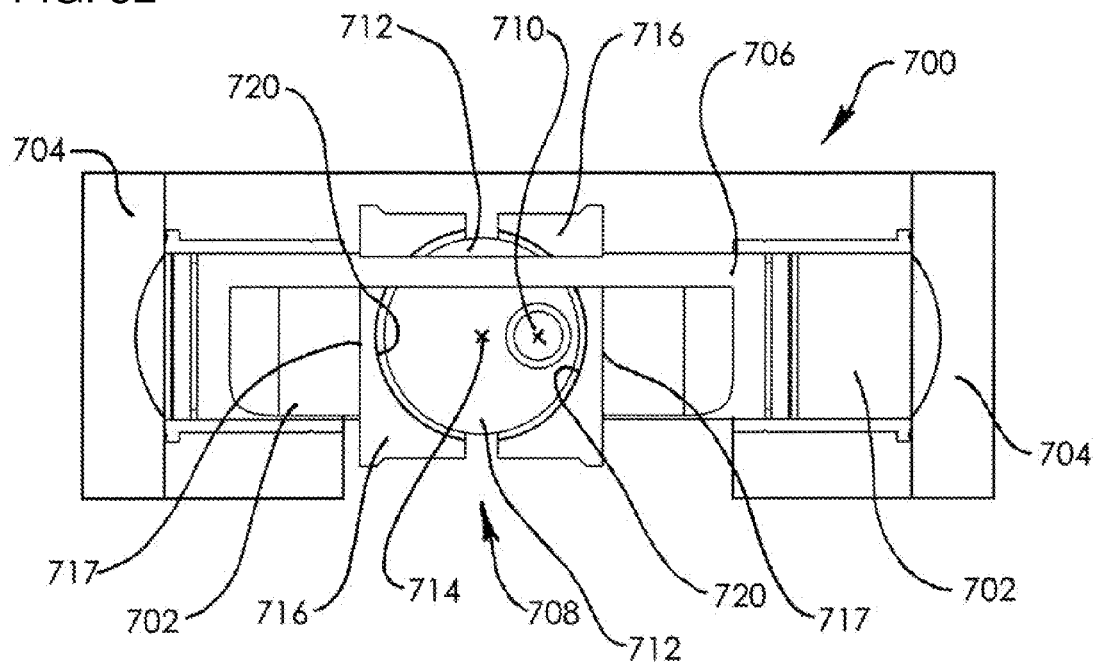
FIG. 52 shows an end view of a further embodiment of the invention.

FIG. 52 shows a further embodiment of the invention which includes an opposed piston device 700 having pistons 702 reciprocating in cylinders 704. The pistons 702 are rigidly joined by linkage 706 and so move together. Mounted between the pistons is a crank 708 which rotates about axis 710. The crank 708 has a circular disk 712 which is offset from the axis 710, having its centre at 714. Thus as the crank rotates the disk oscillates vertically and horizontally. Mounted on the linkage 706 are two followers 716. These followers 716 bear against vertical surfaces 717 of the linkage and may move vertically relative to the linkage 706 but not horizontally. The followers have circular surfaces 720 which engage the circular surface of the disk 712.

Figure 53:
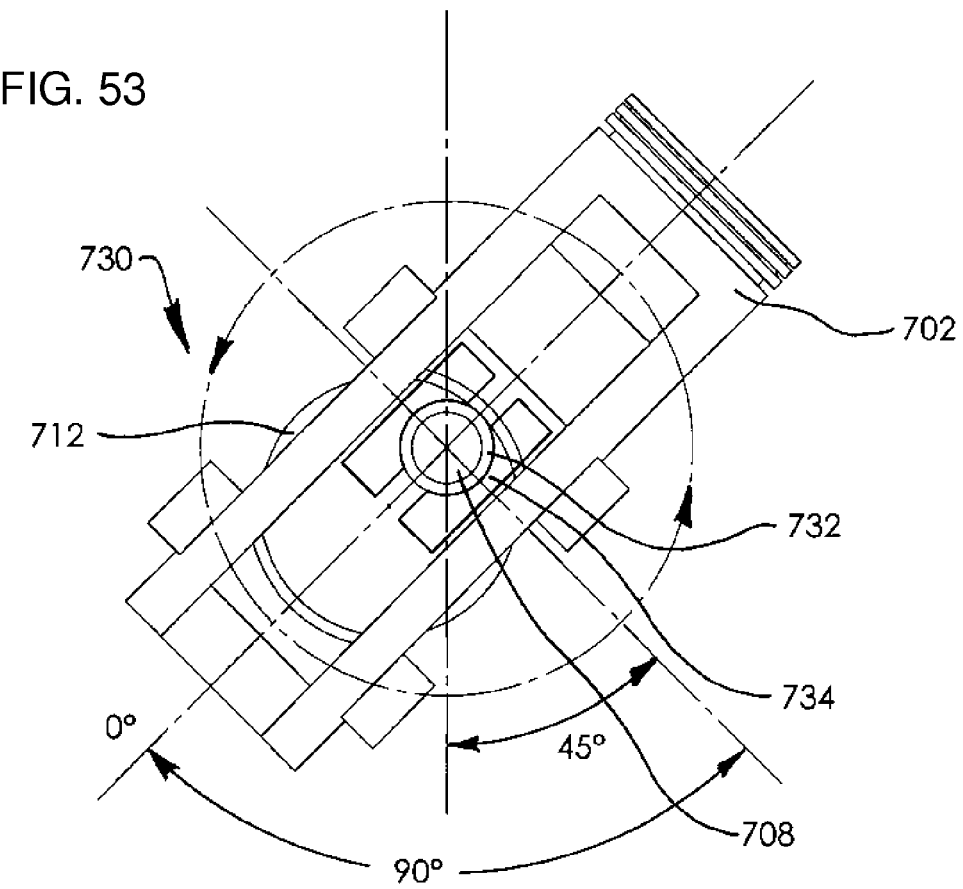
FIG. 53 shows an end view of a further embodiment of the invention.
Figure 55:
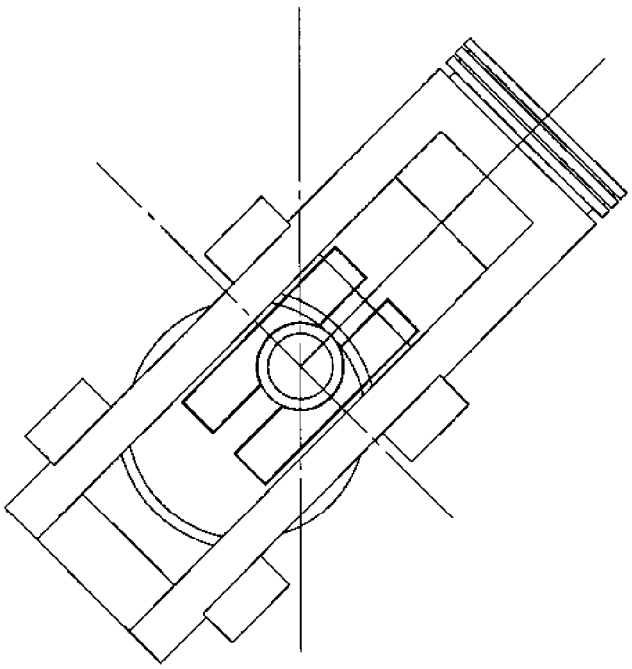
FIG. 55 shows an end view of a further embodiment of the invention.

FIG. 53 shows a single piston device 730. This is substantially the same as the FIG. 52 device, except one of the pistons has been omitted. The main bearing 732 of the crank 708 has a split member 734. This member 734 is located in a slot 735 of the piston assembly and so aids to stabilise the piston assembly.

Figure 54:
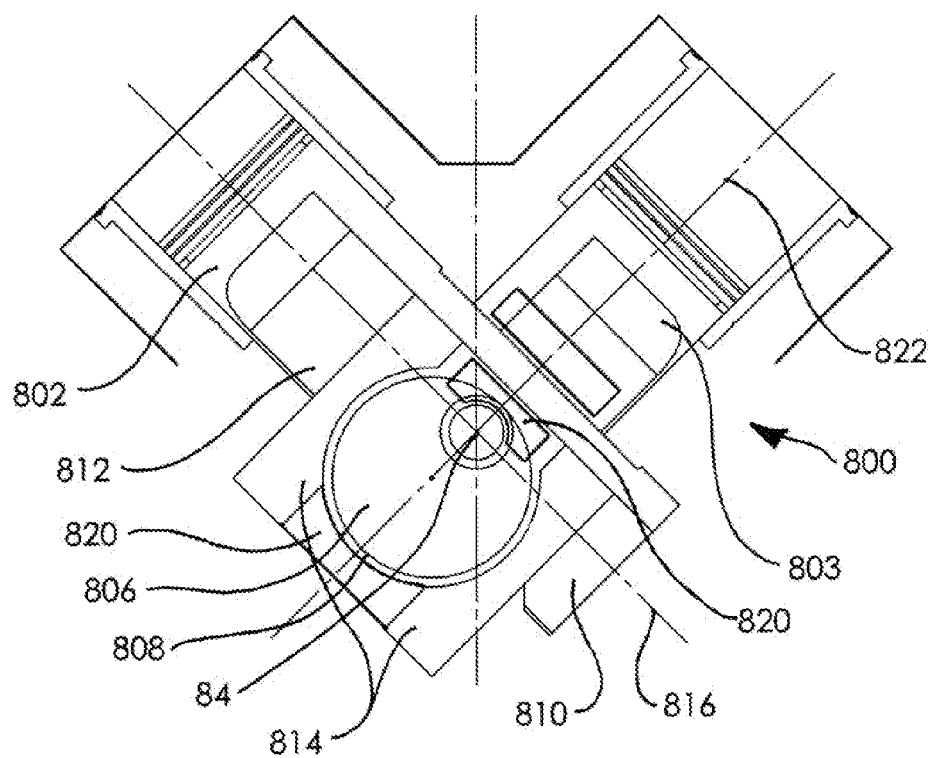
FIG. 54 shows an end view of a further embodiment of the invention.

FIG. 54 shows a twin piston device 800 having two pistons a 90 degrees to each other. However other angles may be used. The pistons 802 and 803 are not in a plane but are staggered axially along the axis 804 of the main crank 806. The main crank 806 has an offset cylinder 808. The first piston 802 has two arms, 810 & 812 extending on either side of the cylinder 808. Mounted on the arms are followers 814 which engage the cylinder 808 and which translate the oscillating motion of the disk 808 into a reciprocating motion parallel to cylinder axis 816. Similarly, the second piston has a similar pair of arms (obscured in the drawing) which hold followers 820. These followers also translate the oscillating motion of the cylinder 808 into reciprocating motion along cylinder axis 822. The device also has guide members 821 which engage the piston to limit sideways motion of the pistons.

Figure 56:
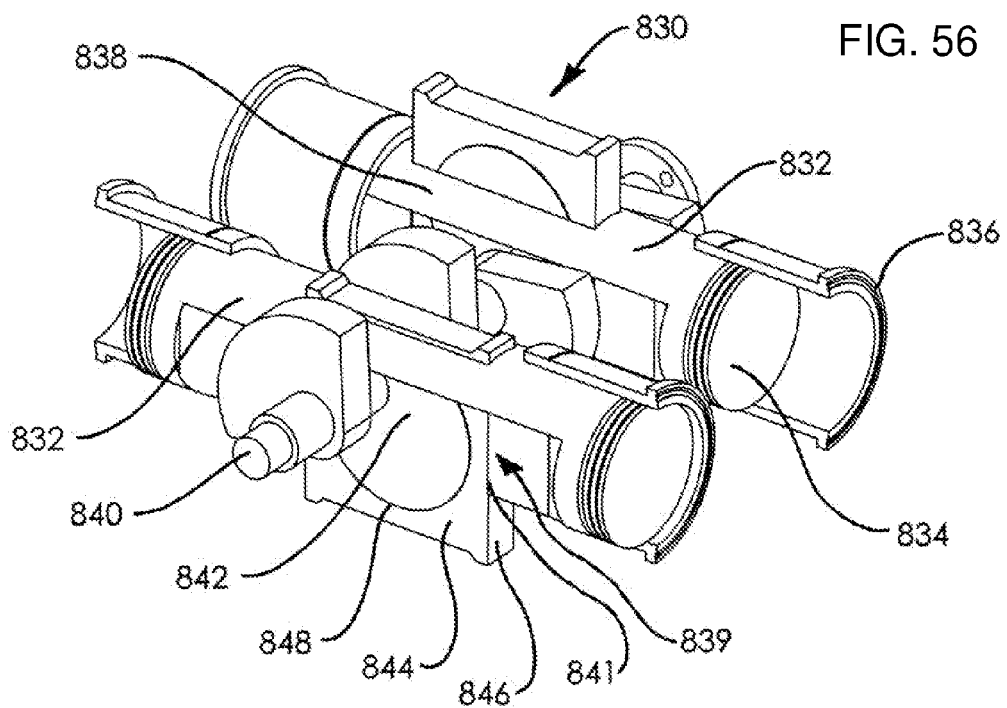
FIG. 56 shows a perspective view of a further embodiment of the invention.

FIG. 56 shows a four cylinder engine 830 having two pairs of linked piston assemblies 832. Each assembly 832 has a piston 834 at each end rigidly joined to the other by a linkage 838. The pistons 834 of each assembly reciprocate in cylinders 836.

Each linkage 838 has a slot 839 extending in a vertical plane through the linkage. Each slot has parallel vertical end walls 841 and located in each slot is a slider 844, having parallel vertical end walls 846. Each slider is free to move vertically in the respective slot.

A crank 840 extends horizontally through the linkages 838 and the sliders 844. The sliders 844 each have a circular opening 848 through which the crank passes. The crank has a circular cam 842 which has a size corresponding to the opening 848. The cam centre is offset from the crank axis and so as the crank rotates, the cam centre orbits the crank axis. This causes the slider 844 to move vertically and horizontally relative to the crank axis.

Vertical motion of the sliders 844 is "lost" due to the vertical freedom of the sliders relative to the piston assemblies, whilst horizontal motion causes the piston assemblies to oscillate horizontally in a true sinusoidal motion.

This construction has a number of advantages over existing similar systems. The main advantage is that interposing of a slider between the cam 842 and the slot walls 841 removes application of point loads, which would otherwise occur. Instead the load is transferred over large surfaces from the cam to the slider and from the slider to the slot.

Figure 57:
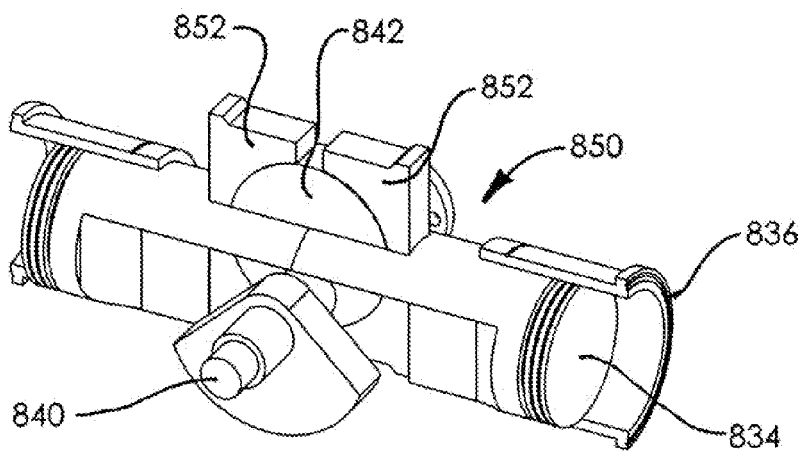
FIG. 57 shows a perspective view of a further embodiment of the invention.
Figure 57A:
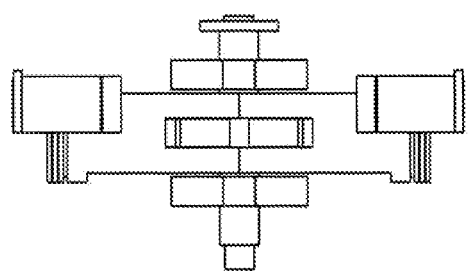
FIG. 57A shows another view of a further embodiment of the invention.

FIG. 57 shows a twin piston engine 850 similar to that of FIG. 56 and accordingly like parts have the same numbers. In this embodiment two sliders 852 are provided, one on each side of the cam 842. Each slider does not contact the other and so each is "floating" relative to the other. In the FIG. 56 embodiment, if the slider 844 rotates relative to the slot 839, there is a tendency for it to jam in the slot. The use of a "split" slider by using two sliders prevents this occurring. If one of the sliders rotates relative to the slot, then all it does is rotate around the centre of the cam 842.

Figure 60:
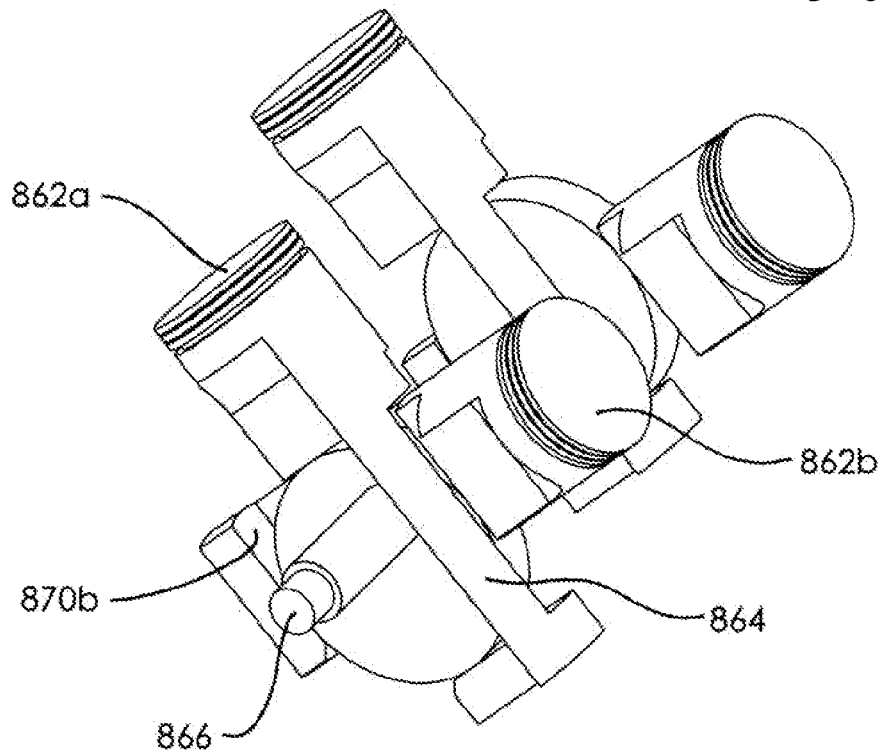

FIGS. 58 to 60 show a four piston device 860 having pairs of pistons 862a,b arranged at 90° to each other. Each piston has an extension 864 having surfaces 868 and 870 extending perpendicular to the respective piston axis. The extensions 864 extend to one side of the piston axis, as best seen in FIG. 59, so that the pistons of each pair may be positioned in a common plane perpendicular to the crank 866.

The crank includes an offset circular cam 872 which engages the four walls 868a,b, 870a,b. As the crank rotates, the cam 872 causes both pistons 862a, b to reciprocate in their respective cylinders, not shown.

Whilst the FIGS. 58 to 60 embodiment uses a cam bearing directly on the end walls, it will be appreciated that the slider construction of the FIG. 56 or 57 embodiments may be utilised.

Figure 61:
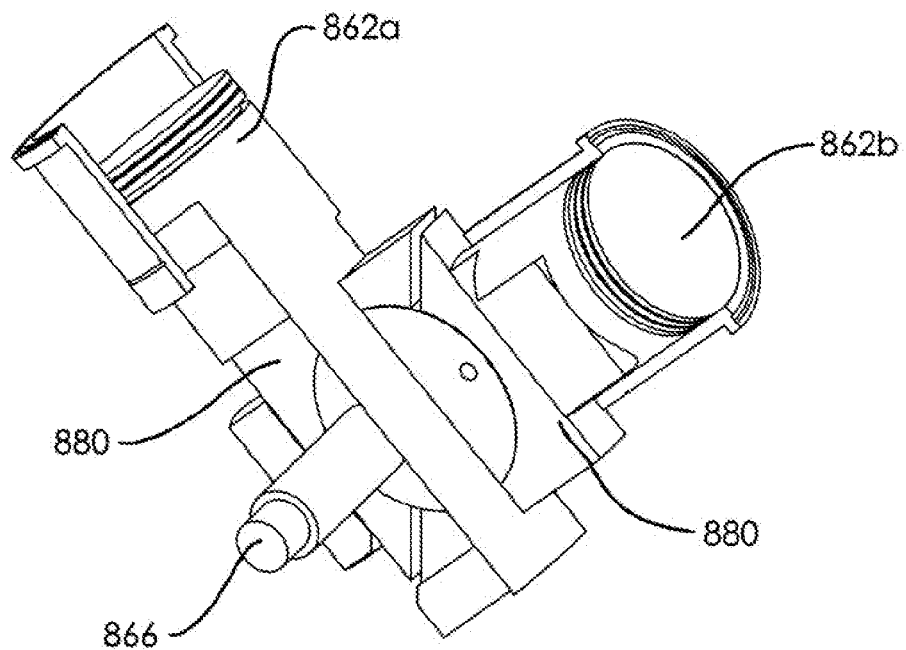
FIG. 61 shows a perspective view of a further embodiment of the invention.
Figure 62:
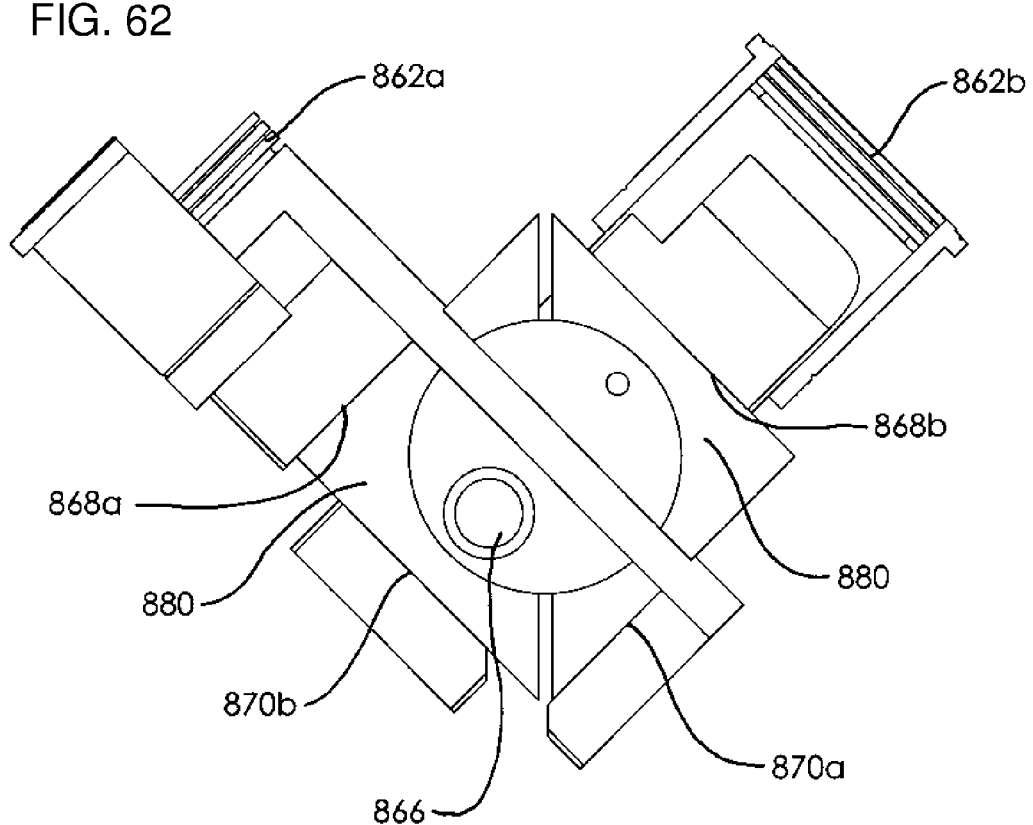
FIG. 62 shows an end view of the FIG. 61 embodiment.

FIGS. 61 and 62 show a variation of the FIGS. 58 to 60 embodiment and so like parts are numbered the same.

Two sliders 880 are interposed between the cam 872 and the end walls 868 and 870. Each slider bears on the inner face 868 of one piston and the outer face 870 of the other piston. As the crank 866 rotates this causes the sliders to move both pistons. It will be appreciated that as a piston moves toward the crank, the slider bearing on the respective end wall 870 will push the piston toward the crank whilst as the piston moves away from the crank, the other slider bearing on the inner wall 868 will push the piston away from the crank. As with the FIG. 57 embodiment, since each slider only bears on one end wall of each piston, the likelihood of jamming is reduced.

Figure 63:
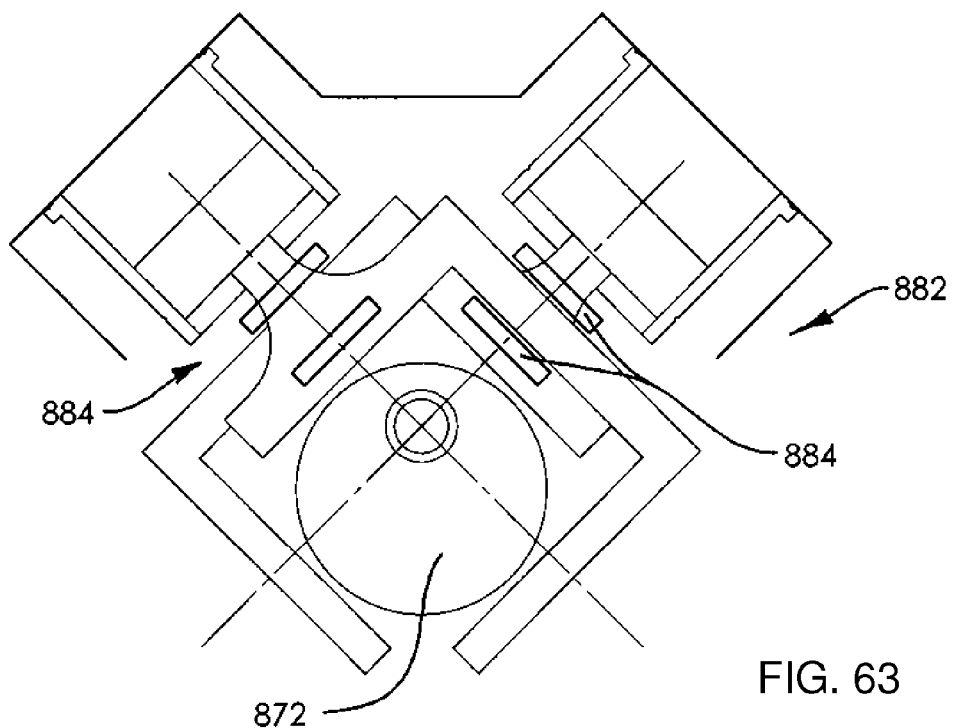

FIG. 63 shows a V-twin device 882 similar to that of FIGS. 58 to 60 in which a cam bears directly on end walls of the pistons. As such, like parts have the same numbers. To aid stability of the pistons 862, guides 884 are provided which engage either side of the extensions 864 to prevent sideways motion of the piston relative to the respective piston axis.

Figure 64:
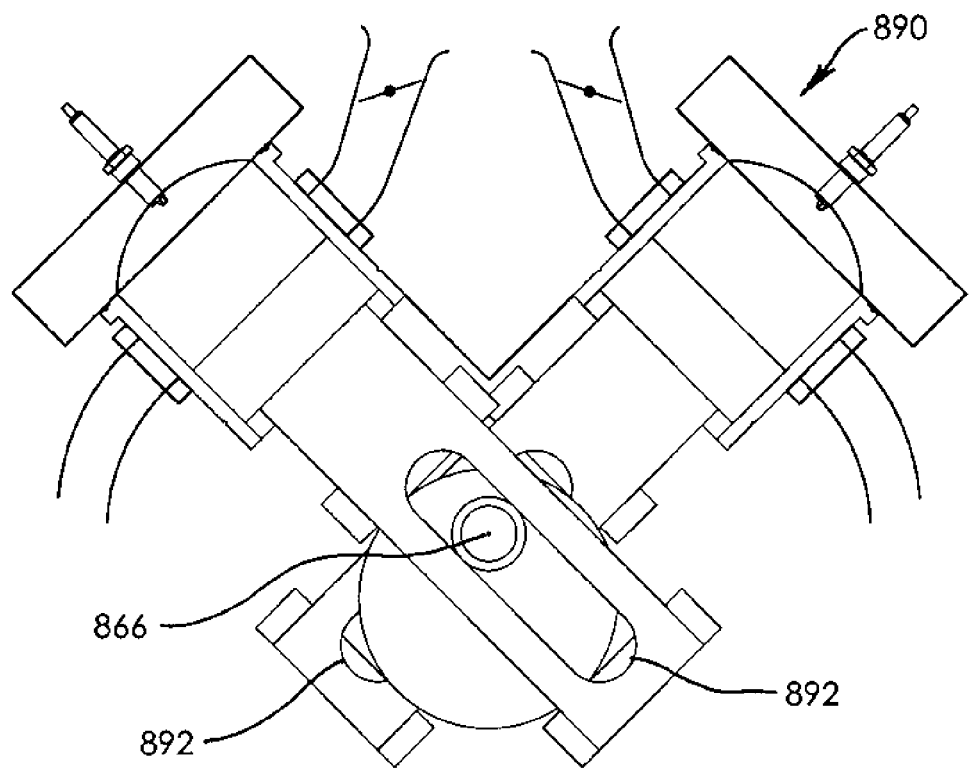

FIG. 64 shows a V-twin device 890 in which each extension 864 is provided with a longitudinally extending slot 892 through which the crank 866 extends. The slot 892 allows longitudinal motion but not transverse motion. If desired a slider block may be positioned on the crank to engage the slot walls.

Figure 65:
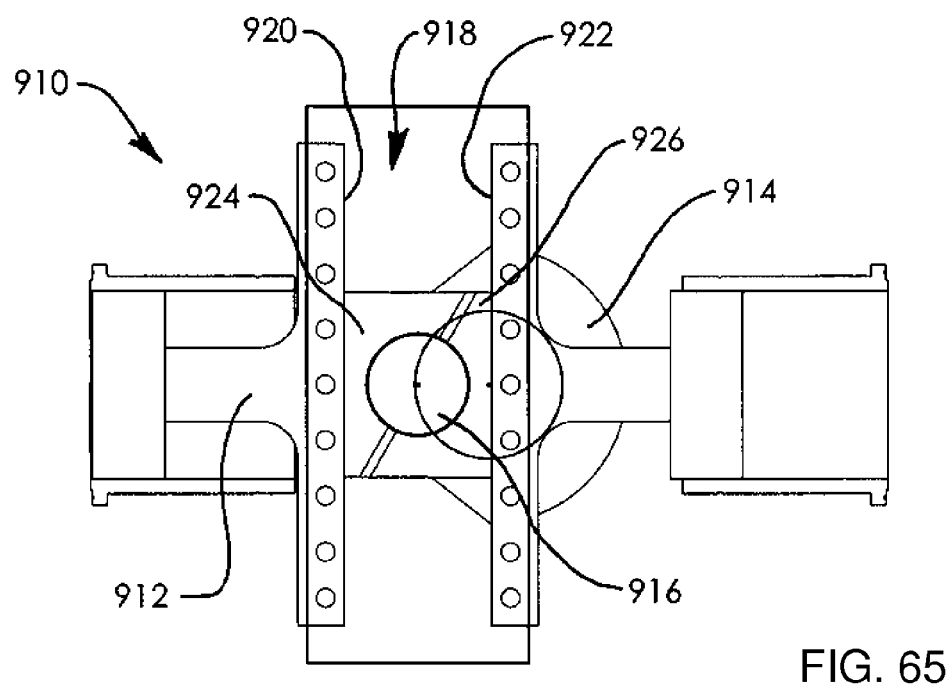

FIG. 65 shows a hybrid slider arrangement which may be utilised for any of the embodiments described herein. In this embodiment there is provided a crank 900 having an offset circular cam 902. The cam 902 is located in a slot 904 of a single or twin piston unit having end walls 906 and 908. The slot is longer than the diameter of the cam 902 and a slider is located between the cam and the end wall 908. The cam bears directly on the end wall 906.

FIG. 65 shows a scotch yoke engine 910 having twin opposed pistons 912. A crank 914 has a big end 916 upon which is mounted a slider structure 918 which slides along guide surfaces 920, 922 as the crank 914 rotates, thereby causing vertical motion of the pistons. This structure includes two independent pieces 924, 926. These two pieces 924, 926 engage surfaces 920, 922 respectively. The split line between the two pieces 924, 926 runs at about 30°, but may be at any angle.

Figure 66:
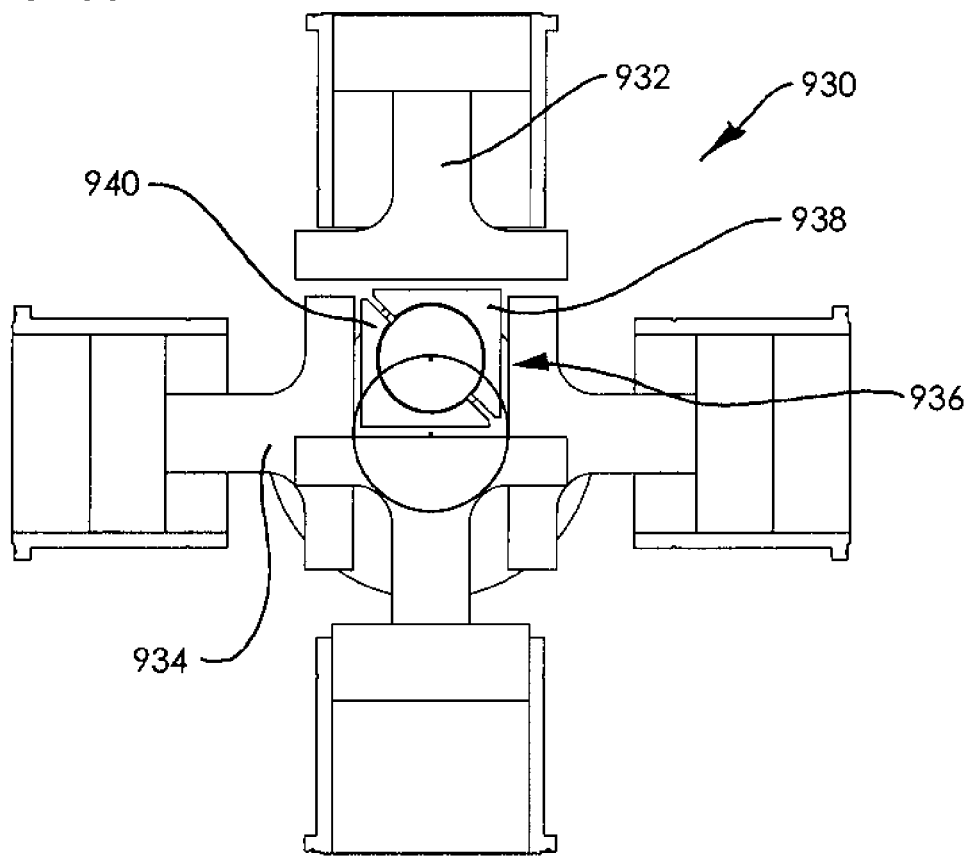

FIG. 66 shows an X configuration scotch yoke engine 930 having two piston assemblies 932, 934. A "split" slider assembly 936 engages the sliding surfaces of the two piston assemblies. The slider assembly includes two slider pieces 938, 940 both of which engage both piston assemblies. However, each piece only contacts one sliding surface of each piston assembly.

Figure 67:
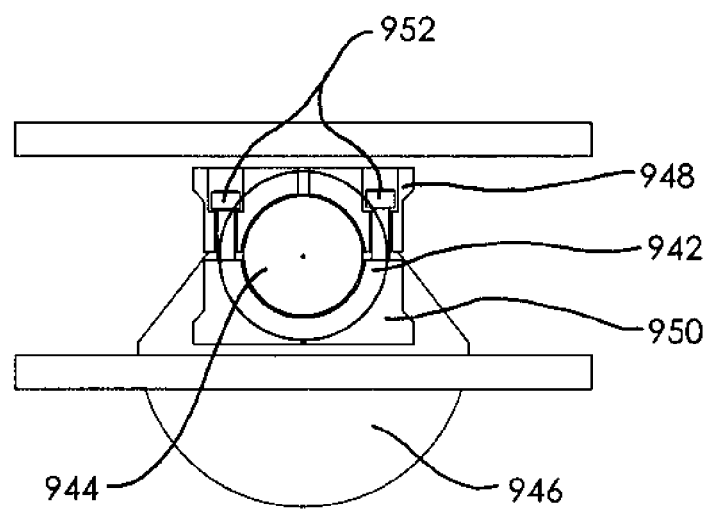

FIG. 67 shows a two piece slider assembly 942 mounted on the big end 944 of a crank 946 whilst the assembly is included of parts 948, 950, they are rigidly joined together by bolts 952, so the structure acts as a unitary structure.

FIG. 68 shows a slider assembly 954 mounted on a big end 956. The assembly has two components 958, 960, each of which bears against one of the sides of a slot of a scotch yoke type engine. Each of the two components has a loop 962 which surrounds the big end and allows the respective component to rotate about the big end independent of the other. It will be appreciated that the loop may be separate from the body 964 of the component and attached by bolts or the like.

Figure 69:
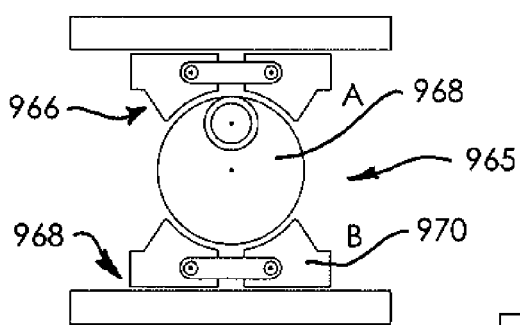

FIG. 69 shows a slider assembly 965 comprised of two components 966 mounted on cam 968. Each component 966 engages one side of the guide slot of a piston assembly. Each component 966 in turn is comprised of two parts 968, 970 linked by linkages 972. The linkage 972 may be rigidly attached to each component or pivotably mounted.

Figure 70:
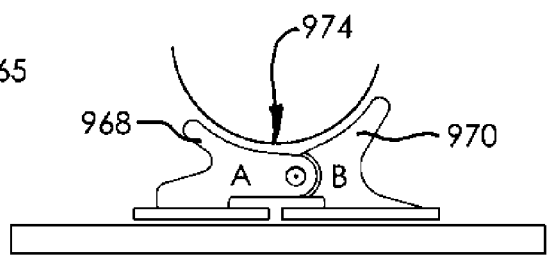

FIG. 70 shows a detail of one side of a slider assembly in which two parts are pivotably joined at axis 974.

Figure 71:
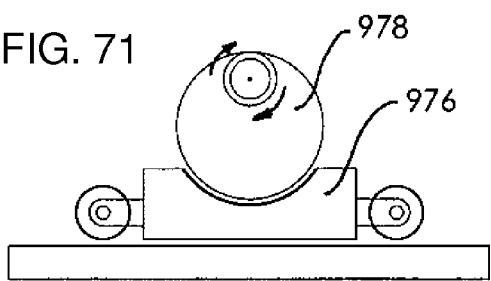
Figure 69A:
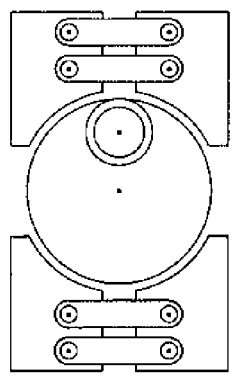

FIG. 71 shows one part of a slider assembly having a component 976 which engages an off centre cam 978. The component has a main body 980 and rollers 982 which normally engage surface 984 of the slot and hold the main body just above the surface 984. As the cam rotates, the velocity of the component along the surface changes. The separation of the body from the surface is sufficiently small that at high velocity the body floats on a film of oil and at low velocity it is supported by the rollers.

Figure 72:
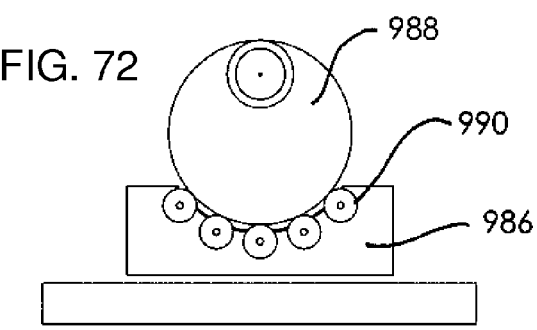

FIG. 72 shows a slider assembly where the slider component 986 engages the cam 988 by way of rollers 990.

Figure 73:
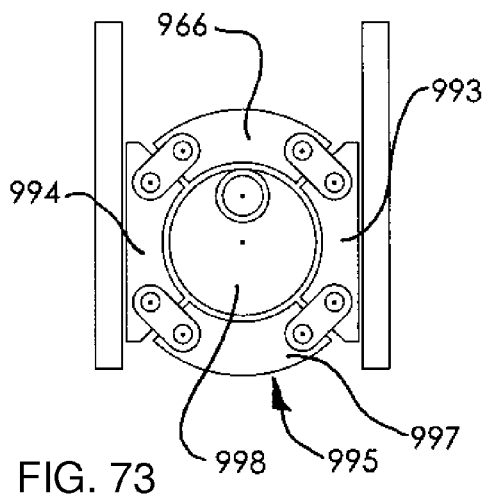

FIG. 73 shows a multi part slider assembly 992 having parts 993, 994 engaging on the sides of slot 995. The two parts are joined by parts 996, 997 which closely follow the surface of the cam 998 to aid in maintaining hydrodynamic lubrication of the slider parts on the cam.

Figure 74:
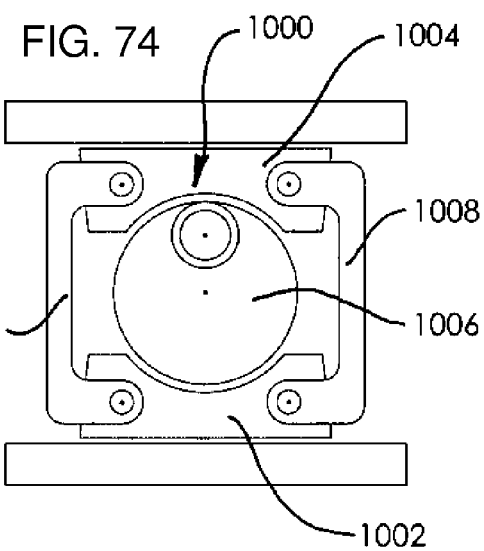

FIG. 74 shows a slider assembly 1000 having two parts 1002, 1004 on either side of a cam 1006. Linkages 1008 join adjacent ends of the two parts 1002, 1004. The linkages may be rigidly or pivotably attached to the parts.

FIG. 75 shows a slider assembly having a link 1010 joining diagonally opposite ends of a two part slider assembly 1012.

FIG. 76 shows a crank 1014 having a first, circular cam 1016 which is engaged by slider parts 1018, 1020. A second cam 1022 is located adjacent the first cam or is superimposed on the first cam 1016 and engages a cam follower 1024 mounted on the respective part once per crank revolution.

FIG. 77 shows a two part slider assembly with each part 1031 having a sliding surface 1030 engaging on surface 1032. Each part 1031 also carries a roller 1034 which intermittently engages a cam surface 1036 on the piston assembly so as to move the piston assembly further away from the crank.

Figure 78:
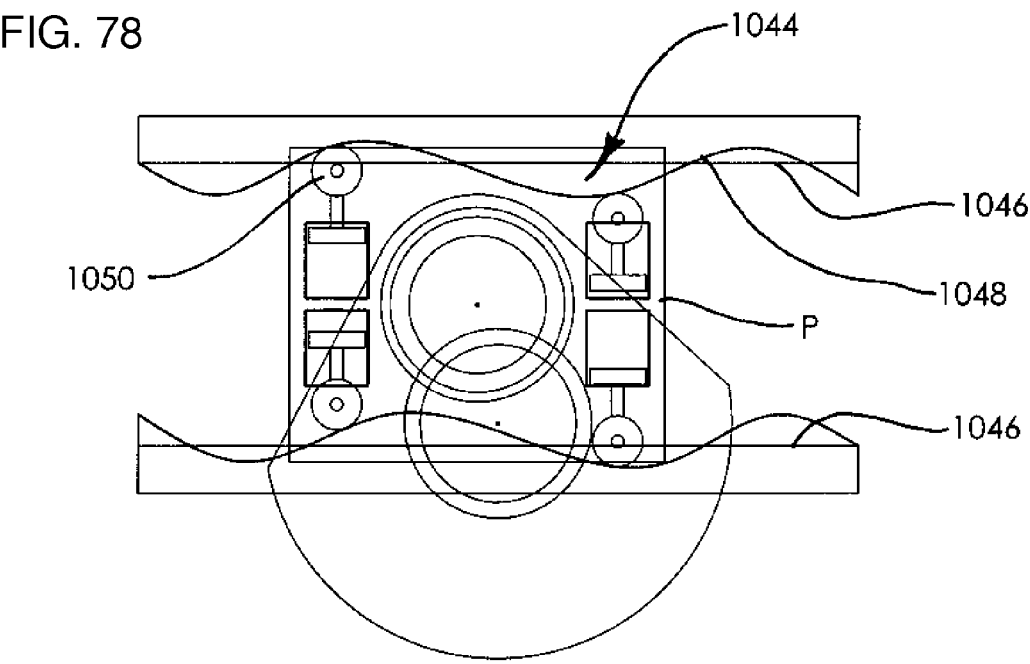
Figure 78A:
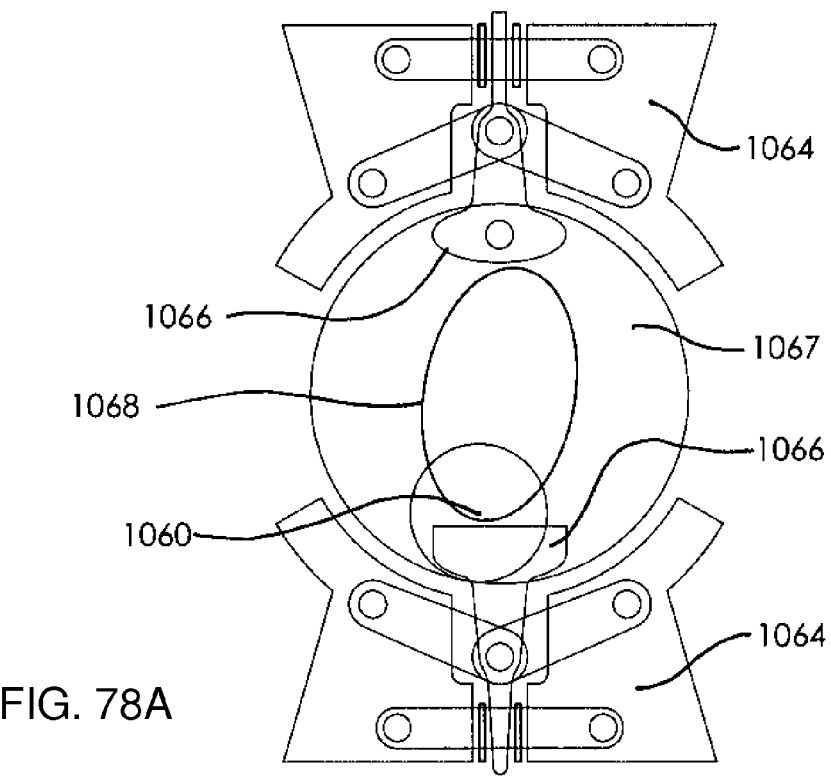

FIG. 78 shows a slide 1040 and piston assembly 1042 with linear sliding surfaces 1044 and 1046 respectively. The piston assembly has cam surfaces 1048 which are engaged by followers 1050. These followers are connected to pistons 1052 on the slider so as to pump out lubricant as needed. It will be appreciated that the cam/follower/pistons may be reversed so the cam surface is on the slider.

FIG. 78 shows a crank 1060 having a main, circular cam 1062 which is engaged by slider components 1064. Each slider component has a cam follower 1066. This cam follower is intermittently engaged by a second cam 1068 as the crank rotates.

Figure 79:
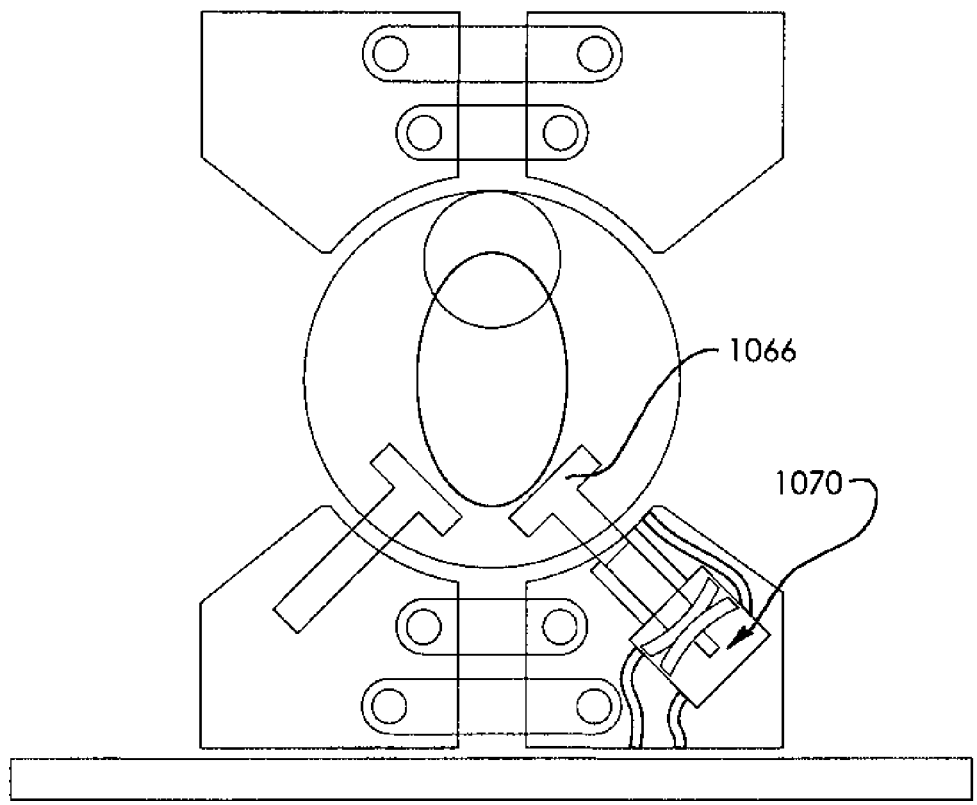

FIG. 79 shows a variation of the FIG. 78 device in which the cam follower drives a pump 1070 to intermittently drive oil to various bearing regions.

Figure 80:
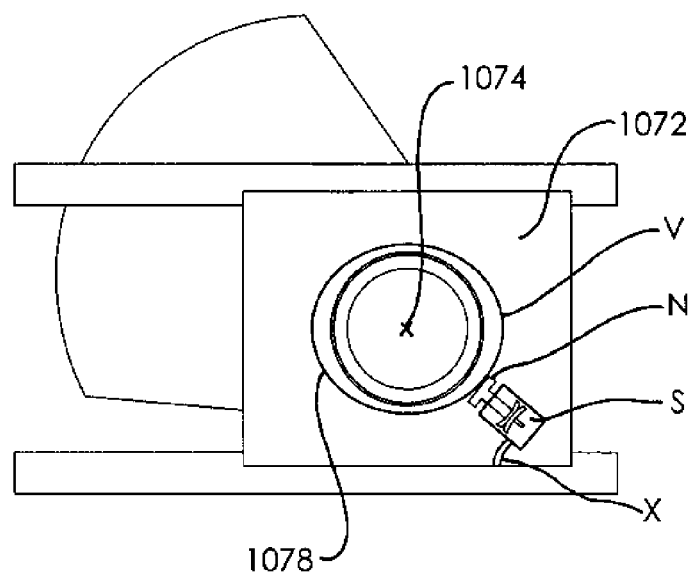

FIG. 80 shows a scotch yoke assembly having a unitary slider 1072 mounted on a big end 1074. The slider 1072 has an oil pump 1076 which is intermittently engaged by a cam 1078 located on the crank.

It is to be understood that the various forms of the slider and the engagement means on the sliders may be used with any of the other forms of the invention in any practical combination possible and the various forms are not limited to use with the components shown in the specific FIGS.

Referring to FIGS. 81 to 84 there is shown a V-twin fluid device 2010 having two pistons 2012 reciprocating in cylinders 2014 at 90° to each other, although other angles are possible. A connecting means 2016 is rotatably mounted on a big end of a crank (not shown) and slidably engages the two pistons 2012.

Each of the pistons 2012 has a T-shaped slot 2018 which extends diametrically across each piston. The connecting means has corresponding T-shaped tongues 2020 which engage in the slots 18. Each of the tongues 2020 has a two part construction—the cross arms are formed of a planar web 24 which is attached to the vertical web 2026 by bolts 2028.

Located on either side of the slot 2018 are two axially extending planar webs 2030. These webs 2030 are diametrically opposite each other and extend perpendicularly to the slot 2018 but do not extend out of the bore of the piston. The webs 2030 are integral with the piston body.

Figure 83:
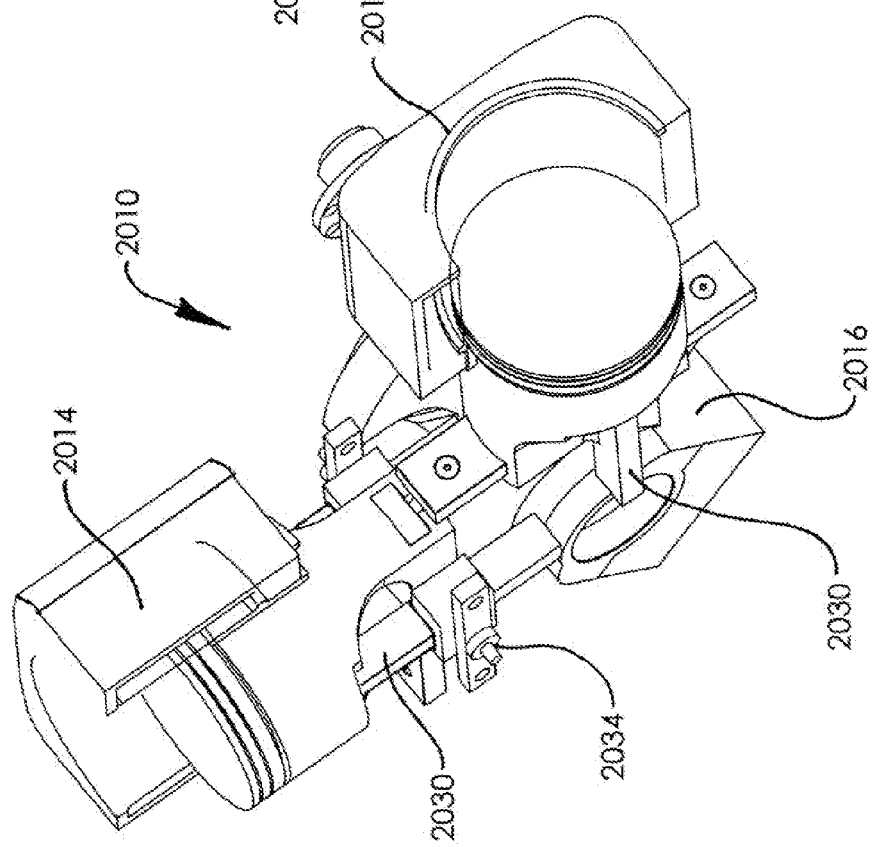
FIG. 83 is a perspective view of a fluid device incorprating the piston of FIGS. 81 and 82.

The fluid device has a series of U-shaped guides 2032 which engage the webs 2030, as seen in FIGS. 83 and 4. The guides 2032 are rigidly mounted on the crank case (not shown) and so aid in limiting any wobbling of the pistons as they move within the respective cylinders.

The guides are preferably located on the crank case by way of a locating pin 2034 and then bolted via bolt holes 2036.

The guides 2032 serve to limit movement of the pistons both parallel and transverse to the slot 2018 and so enable the skirt length of the piston to be reduced, if desired.

Because the webs 2030 are located to the side of the slot, rather than at one of its ends, the size of the crank case need not be any greater than a conventional crank case. Further, because the webs 2030 do not extend out of the bore of the piston, an existing crank case can be relatively easily modified to take the crank and piston assembly.

The webs and the slot 2018 may be formed integral with the piston and so be formed of the piston material. Alternatively separate components may be provided and the piston assembly built up from those components. Preferably the bearing surfaces of the slot 2018 and the webs 2030 are suitably treated to provide a hard wearing surface or are provided with separate inserts to provide a suitable surface. It is to be understood that oil lubrication will be provided to the bearing surfaces via oil galleries or by oil splashing FIGS. 85 to 126 show bottom plan views of different configurations of piston webs or vertical guide means which may be used with the connecting means shown in FIGS. 83 and 84. The guides corresponding to the vertical webs of each piston are not shown but it will be apparent that the guides need to have a shape corresponding to the surface of the webs.

Figure 85:
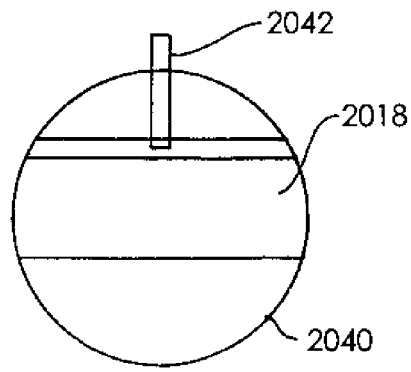

FIG. 85 shows a piston 2040 having a single axial web 42. The web 42 extends perpendicular to the slot 2018 along a radial line. The web 42 also extends beyond the piston's circumference. The web 42 may be integral with the piston or a separate component.

Figure 86:
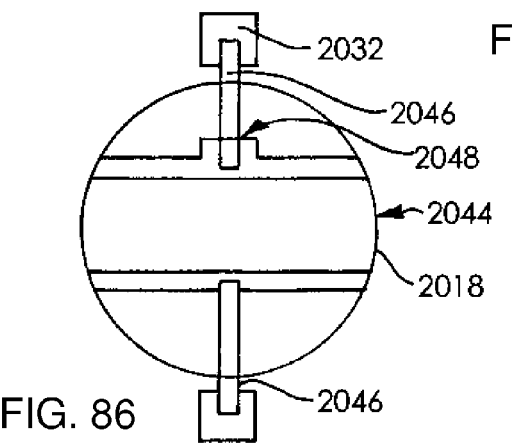

FIG. 86 shows a piston 2044 having two parallel webs 46 extending perpendicular to the slot 2018 along a diametrical line. The webs 2046 extend beyond the piston bore to engage guides, 2032. Each web is a separate component and engages in an axially extending slot 2048 on the piston.

Figure 87:
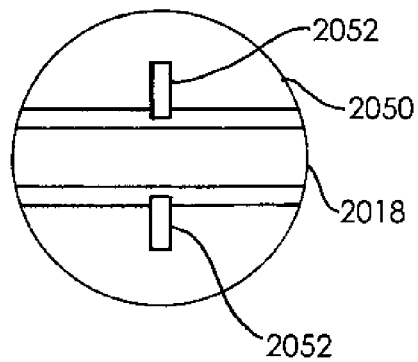

FIG. 87 shows a piston 2050 having two separate as opposed to integral webs 2052 which engage in slots 2054 in the piston. Otherwise, this structure is similar to that of the FIGS. 81 and 82 pistons.

Figure 81:
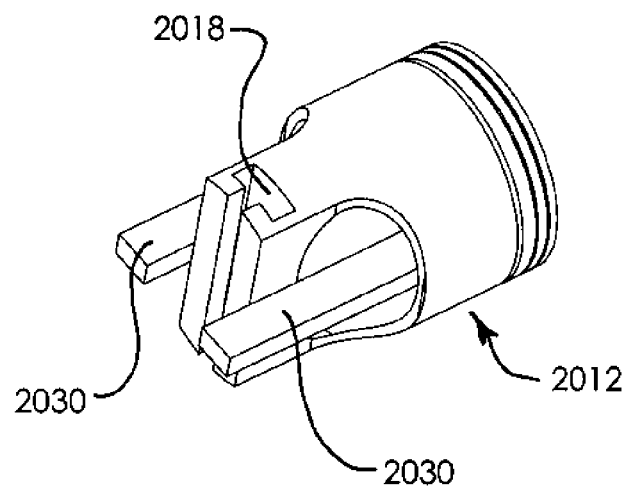
FIG. 81 is a perspective view of a piston made according to the invention.
Figure 82:
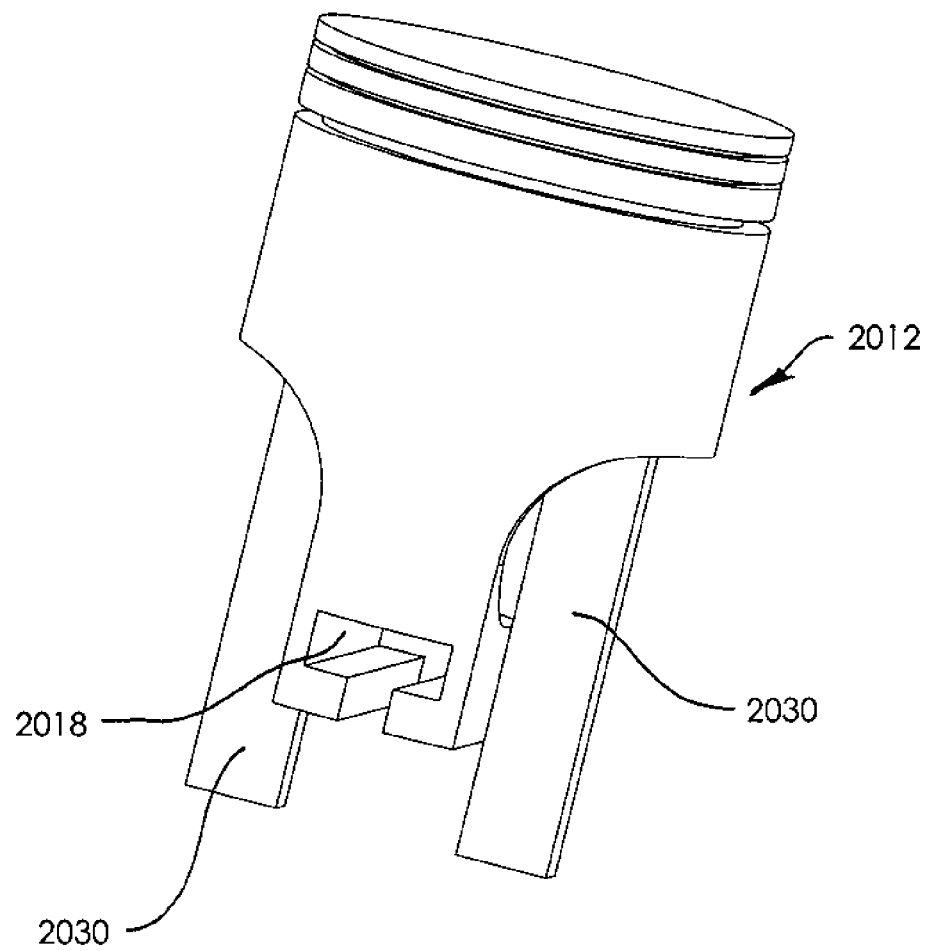
FIG. 82 is a perspective view of the FIGS. 81 piston taken from a different angle.
Figure 84:
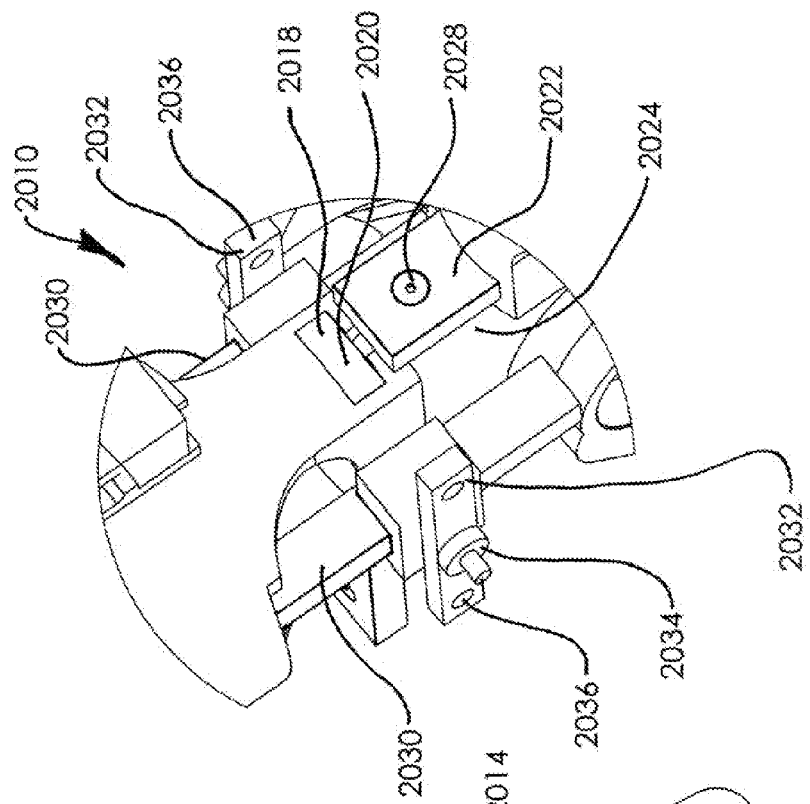
FIG. 84 is a detailed view of a portion of the device of FIGS. 83.
Figure 88:
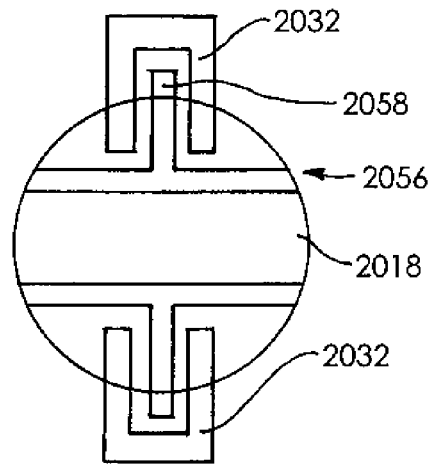

FIG. 88 shows a piston 2056 with a similar construction to that of the FIGS. 81 and 82 piston except that webs 2058 extend beyond the bore of the piston.

Figure 89:
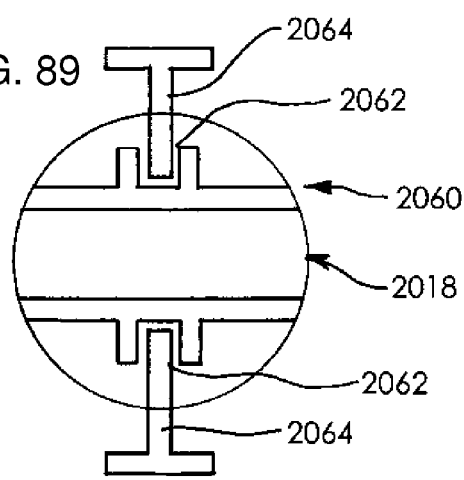

FIG. 89 shows a piston 2060 having two axially extending slots 2062 which engage axially extending webs 2064 mounted on the crank case.

Figure 90:
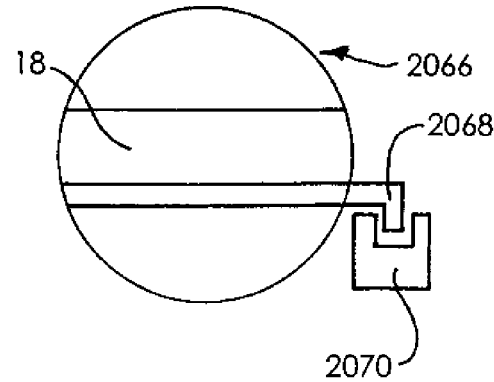

FIG. 90 shows a piston 2066 having an axially extending web 2068 which is located at one end of the slot 2018 and is engaged by a U-shaped guide 2070.

FIG. 15 shows a piston 2072 having a single integral web 2074.

FIG. 92 shows a piston 2076 having three webs 2077, 2078 and 2079. One web 2077 extends perpendicular to the slot 2018 from the centre of the piston 2076 whilst the other two webs 2078 and 2079 extend perpendicular to the slot from its other side. The webs 2078 and 2079 are spaced apart and located towards the ends of the slot 2018. All three webs extend beyond the piston's circumference.

FIG. 93 shows a piston 2080 similar to that of FIG. 92 except that the two webs 2078 and 2079 are much closer together and located toward the centre of the slot 2018. In addition the single web 2077 remains within the piston's circumference.

FIG. 94 shows a piston 2082 having two T-shaped members 2084 extending diametrically opposite to each other perpendicular to the slot 2018.

FIG. 95 shows a piston 2086 similar to that of FIG. 94 but having a single T-shaped member 88 extending from the centre of the piston.

FIG. 96 shows a piston 2090 having two T-shaped members 2092 which are offset from the centre of the piston. The offset is symmetrical about the piston's centre, but need not be.

Figure 97:
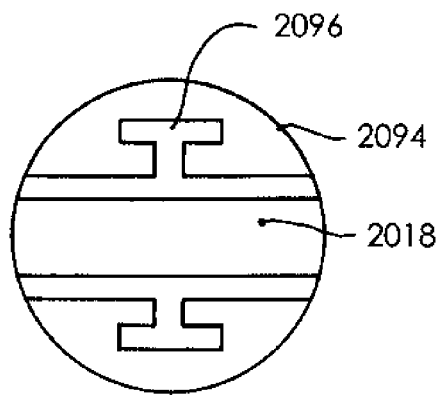
Figure 100:
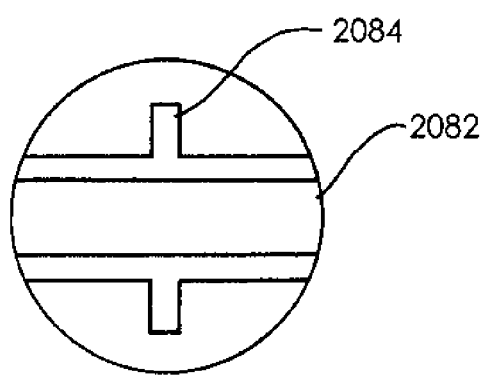

FIG. 97 shows a piston 2094 similar to that of FIG. 94 except that the T-shaped members 2096 remain within the bore of the piston.

Figure 98:
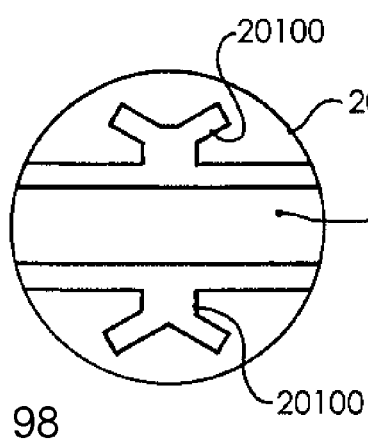

FIG. 98 shows a piston 2098 having Y-shaped axially extending webs 20100 which extend from the centre of the slot 2018.

Figure 99:
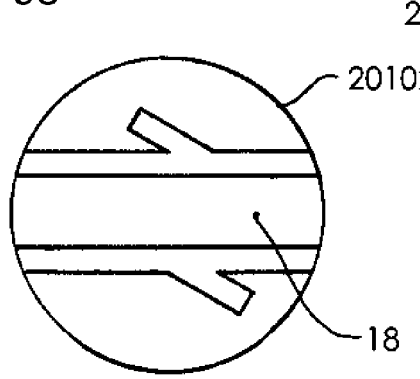

FIG. 99 shows a piston 20102 having two planar webs 20104 extending from the centre of the slot 2018 but about 45° rather than 90°.

Figure 101:
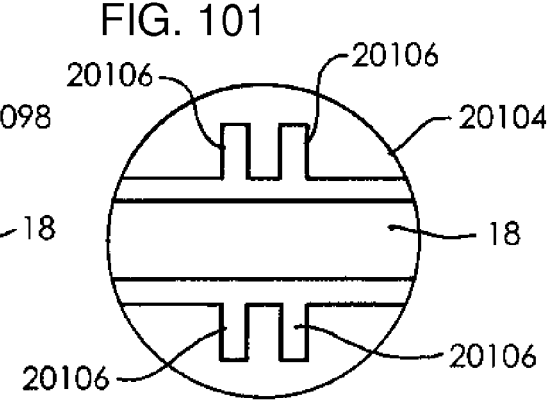

FIG. 101 shows a piston 20104 having four webs 20106 extending perpendicular to the slot 2018. Each web is engaged by a respective guide member.

Figure 102:
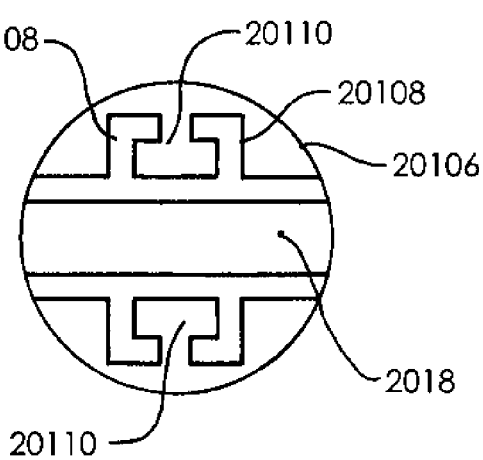

FIG. 102 shows a piston 106 in which two pairs of L-shaped members 20108 define two axially extending T-shaped slots 20110 into which a T-shaped guide member (not shown) engages.

FIG. 103 shows a piston 20112 having two webs 20114, each of which has a concave surface 20116 for engaging a complementary guide means. The surfaces 20116 may be elliptical, circular or any other shape.

FIG. 104 shows a piston 20118 having two webs 20120 with convex surfaces 20122. These surfaces 20122 may be elliptical, circular or any other shape.

FIG. 105 shows a piston 20124 with two webs 20126 similar to those of the FIG. 104 device but in which the webs 20126 are offset in opposite directions from the centre of the slot 2018. The offset may be symmetrical or asymmetrically.

FIG. 106 shows a piston 20128 with two webs 20130 having convex surface 20132. A slot 20134 extends inwardly from the convex surface 20132 towards the centre of the slot 2018.

FIG. 107 shows a piston 20136 having two webs 20138 extending perpendicular to the slot 2018 but both are offset from the centre of the piston and are opposite each other.

FIG. 108 shows a piston 20140 with two axially extending webs 20142. Each web has an undulating surface 20144 which engages a corresponding guide surface. These undulating surfaces 20144 may be arcuate, ellipsoidal or any other suitable shape. The shape may be regular or irregular.

FIG. 109 shows a piston 20146 similar to that of FIGS. 92 and 93 in having rectangular cross section webs, 20148. However the webs 20148 do not engage and are not integral with the housing for the slot 2018. Instead the webs extend from the underside of the piston.

FIG. 110 shows a piston 20150 having two webs 20152 extending downwards from the main body of the piston separately from the housing for the slot 2018.

Each web is formed of two arms 20153, 20154 which extend at 90° to each other. The arms may extend at other angles.

FIG. 112 shows a piston 20156 with two axially extending members 20158. The members 20158 have, in cross section, a mushroom shape.

FIG. 113 shows a piston 20160 with two axially extending members 20162 which do not engage the housing for the slot 2018.

FIG. 114 shows a piston 20166 similar to that of FIG. 113 but with four axially extending members 20168. Two of the members 20168 are located on either side of the slot 2018. The arrangement of the four members is preferably symmetrical about the centre of the piston.

FIG. 115 shows a piston 20170 with two pairs of guide members. A first pair 20172 extends from the underside of the main body of the piston and has a circular or elliptical outer surface 20174. The other pair 20176 extend from the circular peripheral surface of the piston.

FIG. 116 shows a piston 20178 having four axial guide members 20180 extending from the circular peripheral surface of the piston.

FIG. 117 shows a piston 20182 having a substantially rod shaped guide member 20184 extending axially. The guide member 20184 is integral with or mounted to the peripheral surface of the piston.

FIG. 118 shows a piston 20186 similar to that of FIG. 90 except that two guide members 20188 are provided at one end of the slot 2018.

FIG. 119 shows a piston 20190 with two guide members 20192 extending axially and generally radially from the housing to the slot 2018. Each member 20192 has undulating side surfaces 20194. These may have any shape desired.

FIG. 120 shows a piston 20196 with three guide members 20197, 20198 and 20199. The guide member 20197 extends perpendicularly to the slot 2018 whilst members 20198 and 20199 extend divergently to each other from the slot 2018. Preferably all three members extend radially from the slot 2018.

Figure 121:
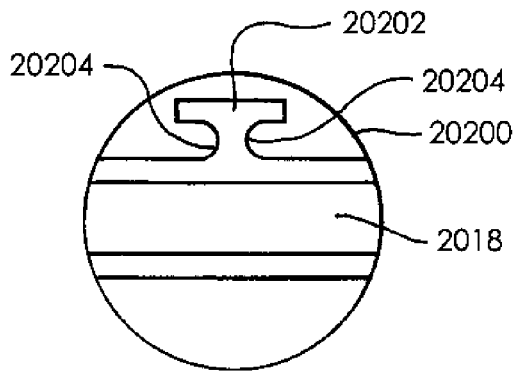

FIG. 121 shows a piston 20200 having a single guide member 20202 extending axially. The guide member 20202 has concave sides 20204 and planar outer surface 20206. Preferably surface 20206 is parallel to the slot 202018.

Figure 122:
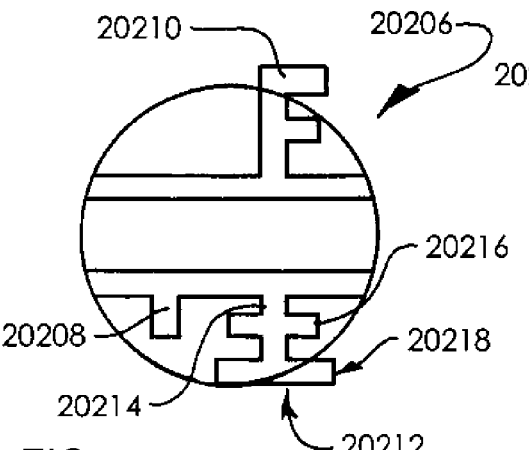

FIG. 122 shows a piston 20206 having three axially extending guide means 20208, 20210 and 20212. Guide member 20208 is a simple rectangle in cross section, guide member 20210 is F-shaped in cross section whilst guide member 212 has a central spine with arms 20216 and 20218 extending from its side. The arms 216 and 20218 may have the same or different lengths.

Figure 123:
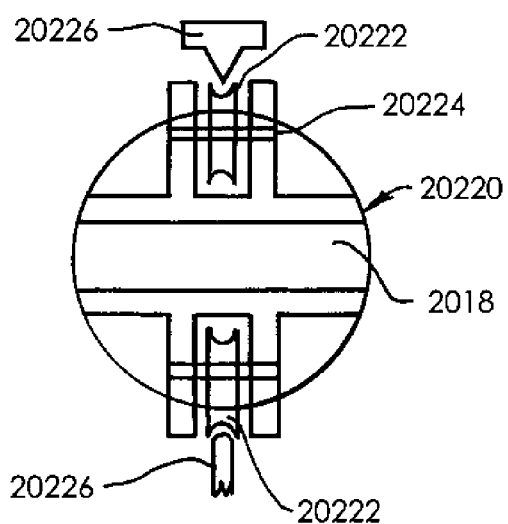

FIG. 123 shows a piston 20220 having at least one roller 20222 mounted on each side of the slot 2018 by axle pins 20224. The rollers 20224 engage an axially 5 extending guide 20226 mounted on the crank case. The piston may be provided with two or more rollers on either side of the slot 20118.

Figure 124:
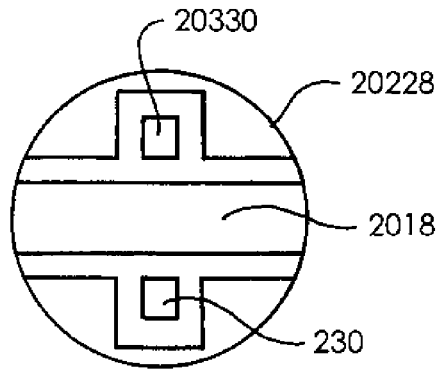

FIG. 124 shows a piston 20228 having two rectangular section tubes 20230 extending axially on either side of the slot 2018. These tubes 20230 are open at least one end and receive axially extending guide rods mounted on the crank case.

Figure 125:
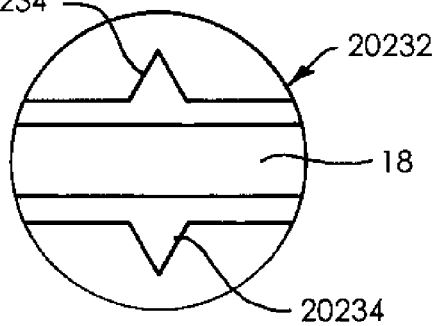

FIG. 125 shows a piston 20232 having triangular shaped guide members 20234 extending axially on either side of the slot 2018.

Figure 126:
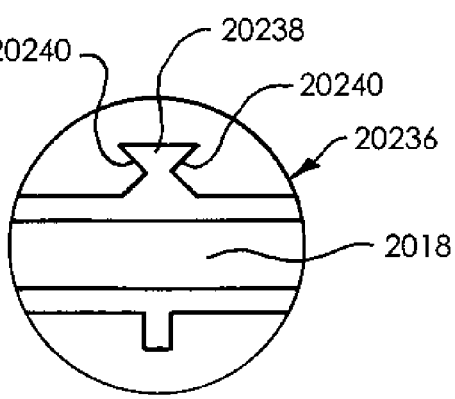

FIG. 126 shows a piston 20236 having a guide member 20238 with triangular indents 20240 in its two sidewalls.

Figure 127:
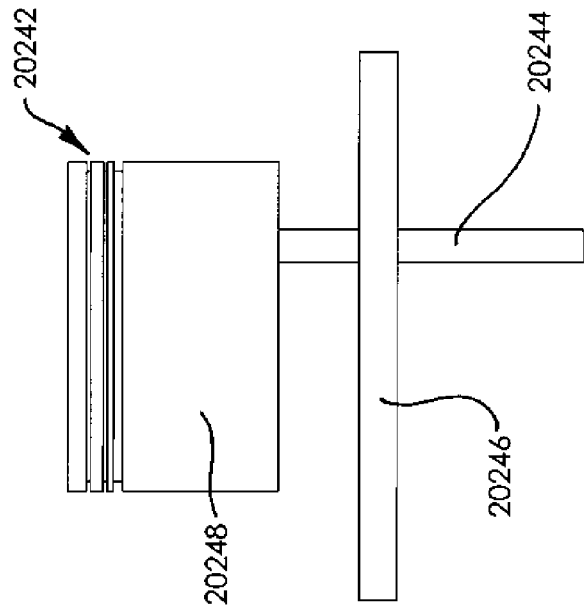
FIGS. 127 to 129 show isometric views of a further piston made according to the invention.
Figure 128:
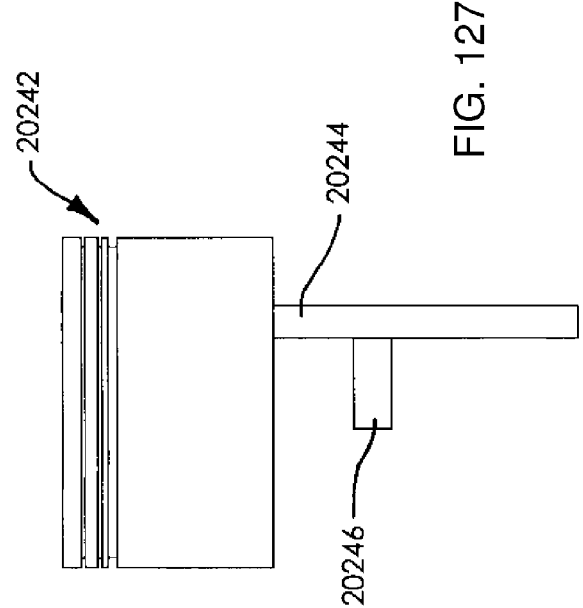
Figure 129:
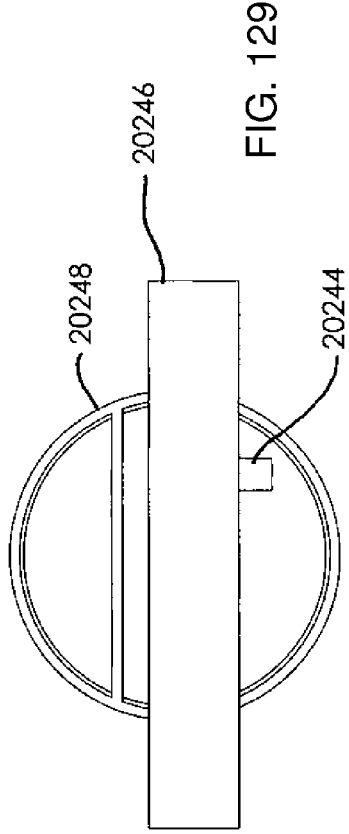

FIGS. 127 to 129 show a piston 20242 with a vertically extending guide bar 15 20244 and a horizontal slide bar 20246. The bar 20244 extends from the lower surface of the main body 20248 of the piston. The horizontal bar 20246 is mounted on an inner side of the vertical bar 20244. The bar 20246 is engaged by a suitable engagement means on the connecting means whilst the vertical bar 20244 is engaged by a suitable guide surface mounted on the crank case.

Figure 131:
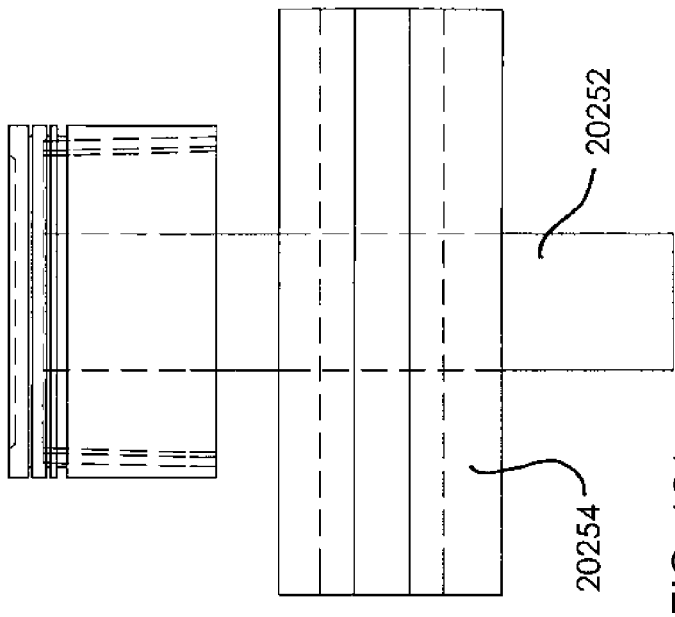
FIGS. 130 to 132 show isometric views of a further piston made according to the invention.
Figure 130:
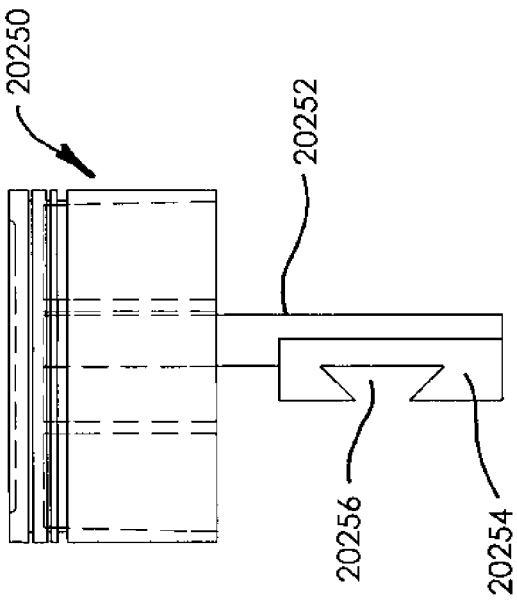
Figure 132:
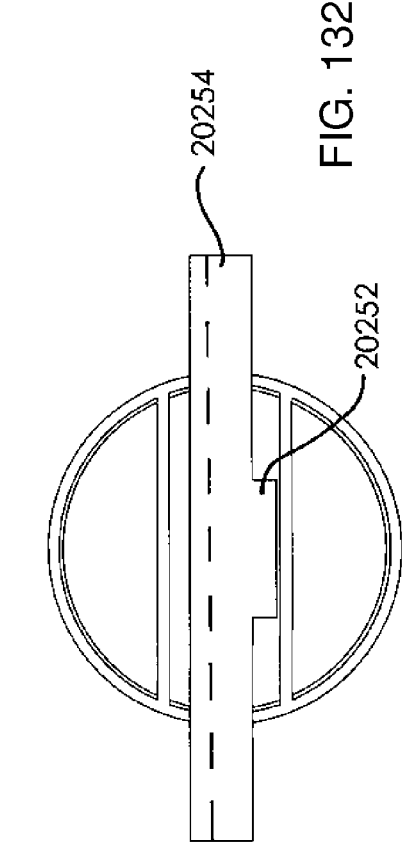

FIGS. 130 to 132 show a piston 20250 with a vertical guide bar 20252 and a horizontal bar 20254. The horizontal bar 20254 has a re-entrant slot 20256 for slideably engaging a corresponding tongue on a connecting means.

Figure 134:
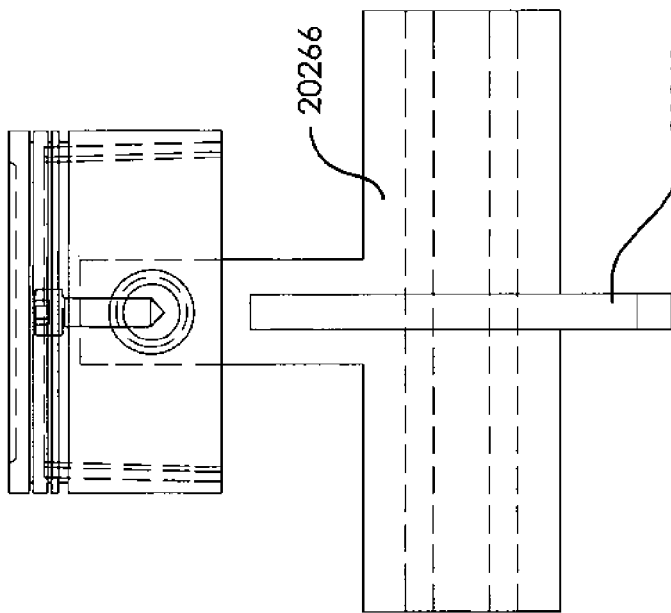
FIGS. 133 to 135 show isometric views of a further piston made according to the invention.
Figure 133:
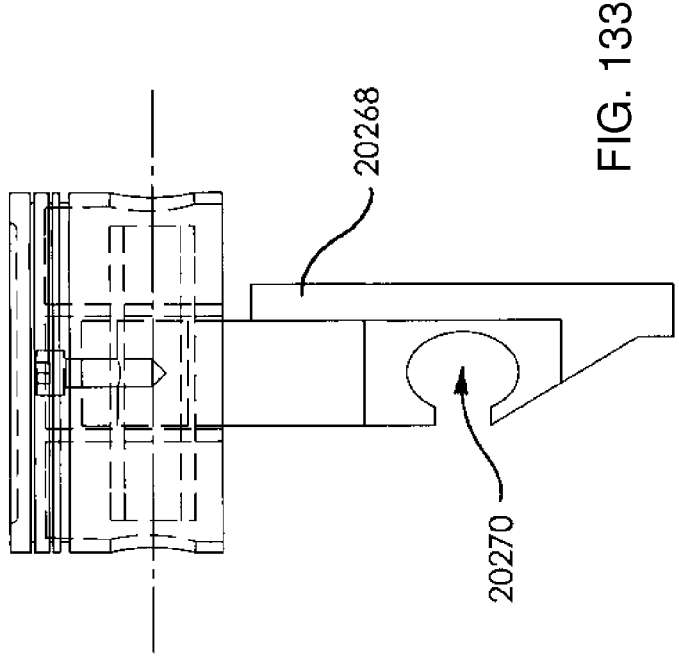
Figure 135:
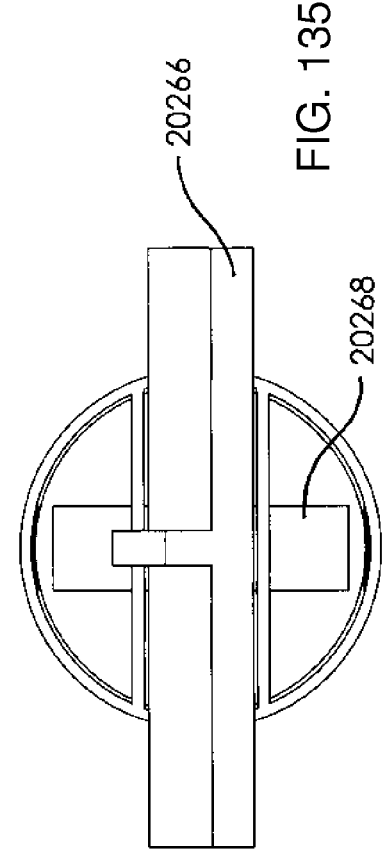

FIGS. 133 to 135 show a piston 20258 having a main body 20260. Rotatably mounted to the main body by a gudgeon pin 20262 is a engagement/guide means 20264. This engagement means includes a horizontally extending portion 20266 and a vertical extending portion 20268. The horizontal portion includes a slot 20270 which slideably receives a complimentary tongue on the connecting means whilst the vertical portion is engaged by a guide mounted on the crank case. It will be noted that the vertically extending portion extends above and below the horizontally extending portion.

Figure 137:
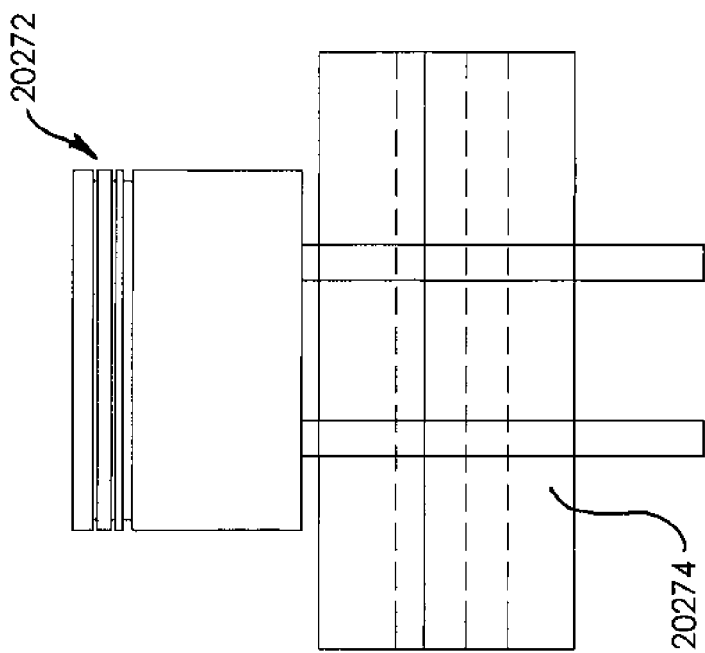
FIGS. 136 to 138 show isometric views of a further piston made according to the invention.
Figure 136:
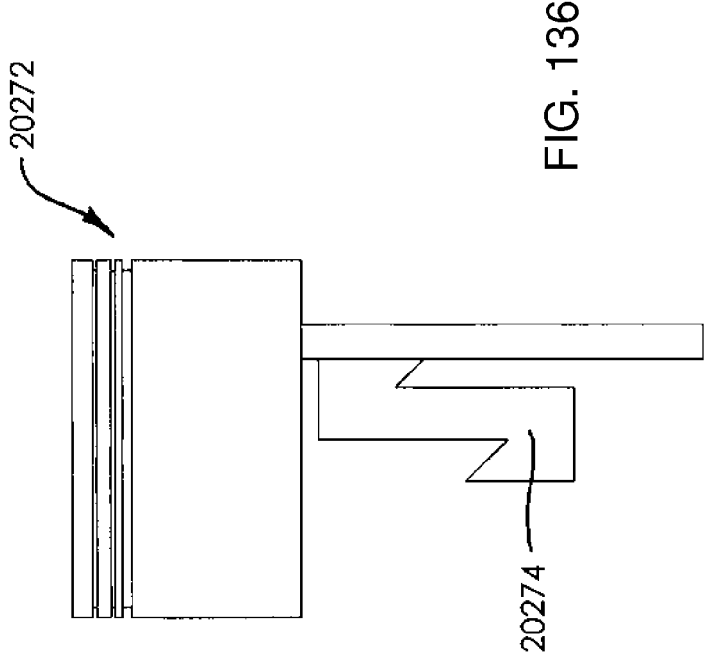
Figure 138:
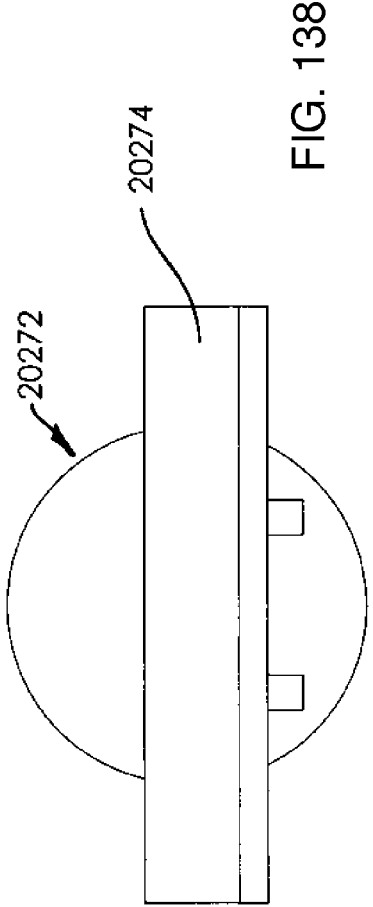

FIGS. 136 to 138 show a piston assembly 20272 with a Z-shaped horizontally extending member which slideably engages a complimentary surface on the connecting means.

FIGS. 139 to 141 show a piston assembly 20276 in which a vertical guide bar 35 20278 extends from the base of the main body of the piston 20280. A horizontal bar 20282 is mounted on the main body 20280 independently of the vertical guide bar 20278.

Figure 143:
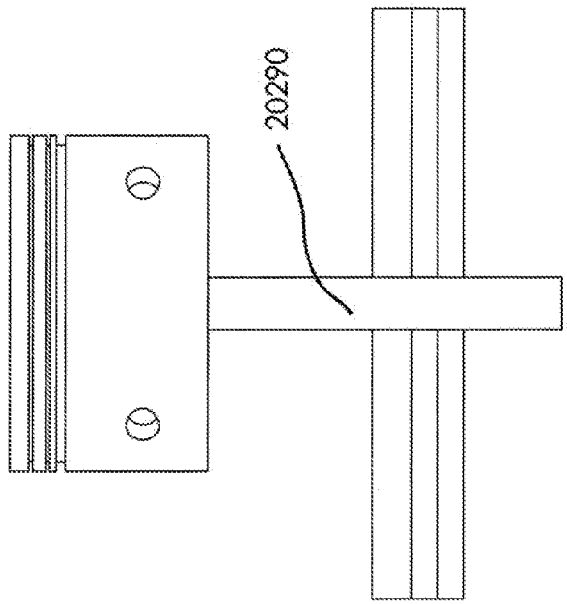
FIGS. 142 to 144 show isometric views of a further piston made according to the invention.
Figure 142:
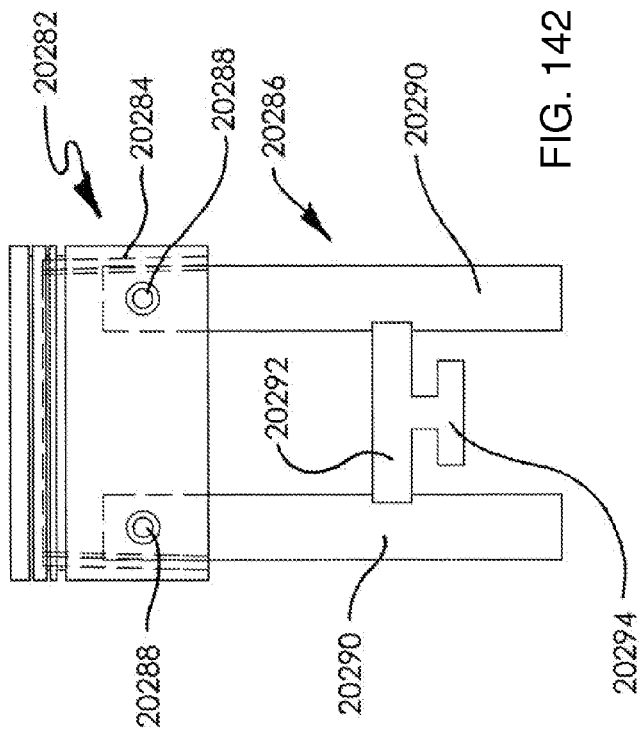
Figure 144:
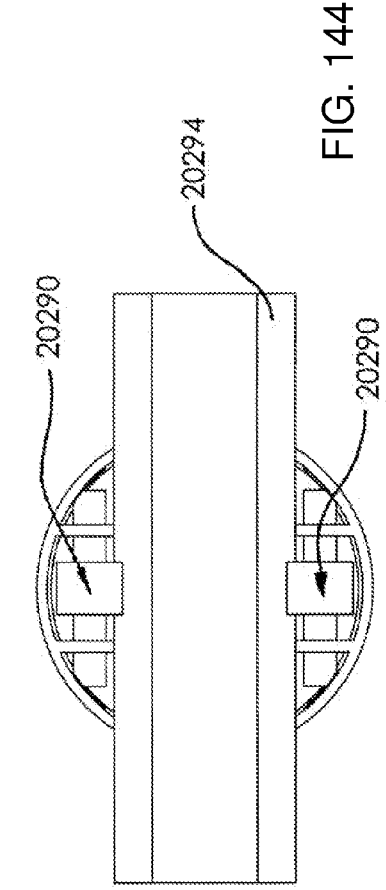

FIGS. 142 to 144 show a piston assembly 20282 having a main body 20284 and an engagement/guide assembly 20286 mounted to the main body by pins or bolts 20288. The engagement/guide assembly has two vertical legs 20290 and a cross bar 20292. Mounted on the cross bar is a horizontally extending T-shaped engagement member 20294 which extends perpendicular to the plane of the two vertical guide bars 20290. This member 20294 is engaged by the connecting means.

Figure 146:
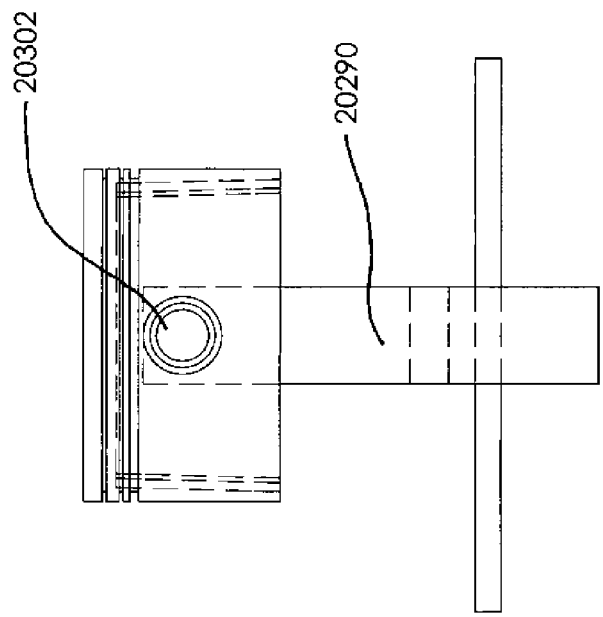
FIGS. 145 to 147 show isometric views of a further piston made according to the invention.
Figure 145:
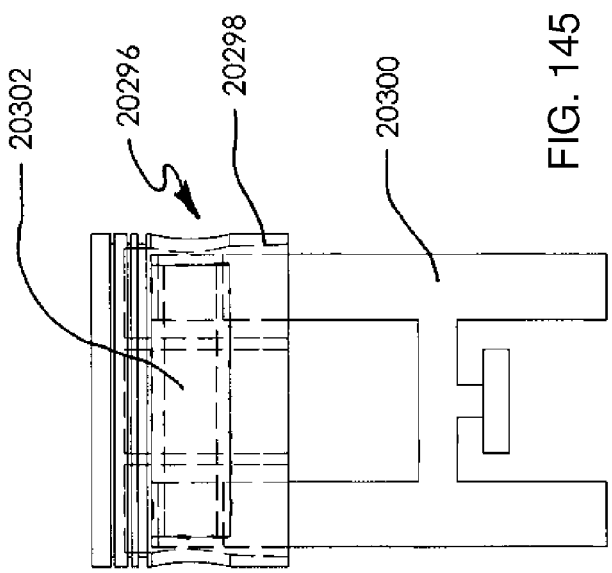
Figure 147:
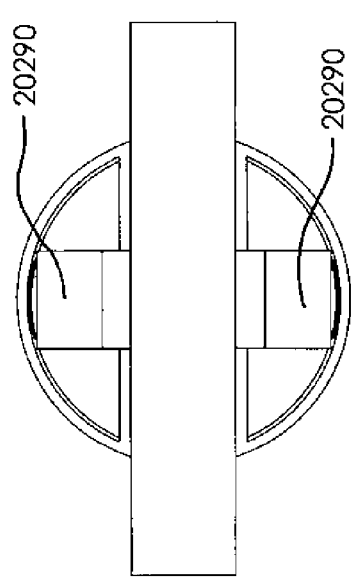

FIGS. 145 to 147 show an assembly 20296 similar to that of FIGS. 142 to 144 and a similar engagement/guide assembly 300 is mounted to the main body 20298 of the piston. The assembly 300 is mounted to the main body 298 by a gudgeon pin 20302 which extends in the plane of the two legs 290. The assembly 20300 may pivot about the pins 20302.

Figure 149:
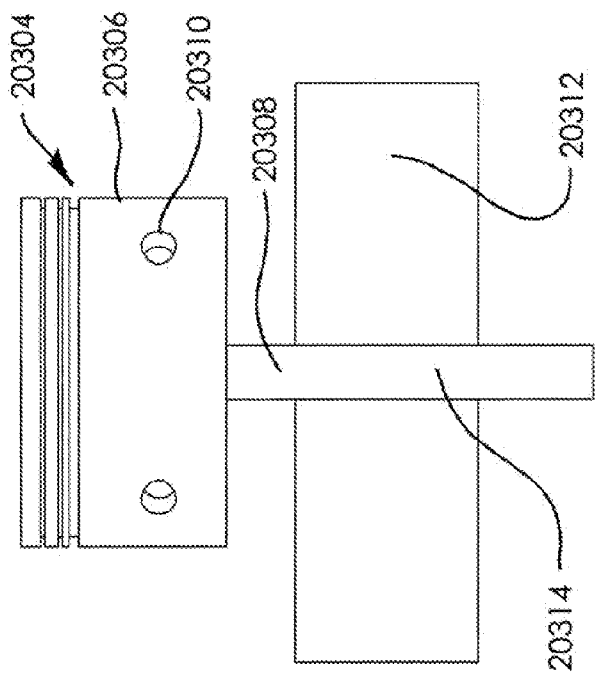
FIGS. 148 to 150 show isometric views of a further piston made according to the invention.
Figure 148:
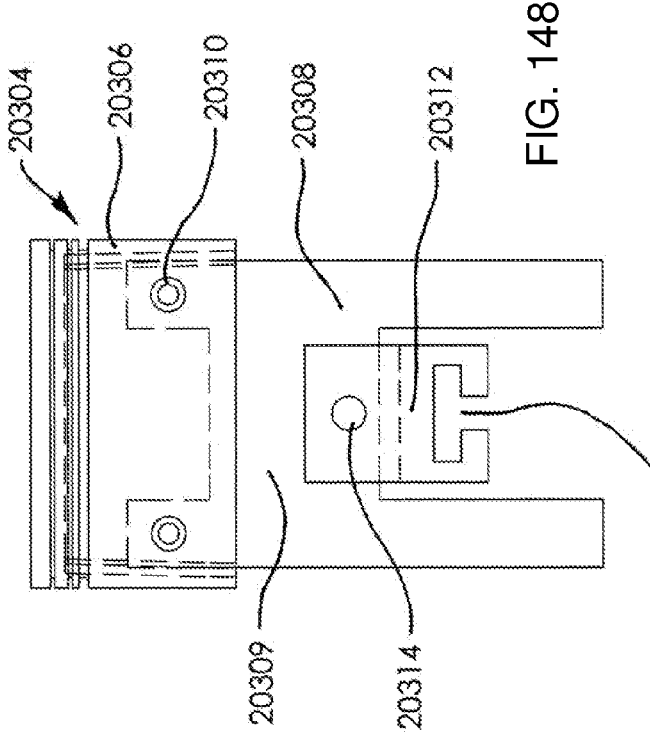
Figure 150:
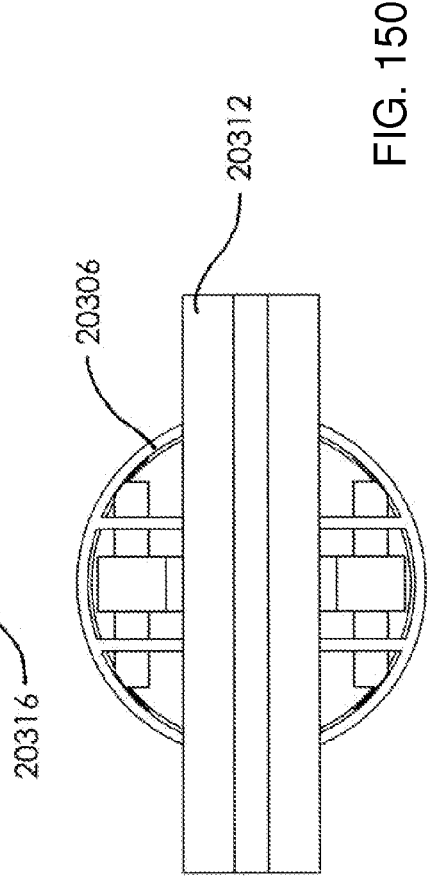

FIGS. 148 to 150 show a piston assembly 20304 having a main body 20306 on which is mounted an H-shaped guide assembly 20308. The assembly is mounted to the main body 20306 via pins 20310. Mounted on the cross bar 20309 of the assembly 20308 is a horizontally extending engagement bar 20312. The bar 20312 is pivotably mounted to bar 20309 via pin 20314. The bar 20312 has a T-shaped slot 20316 for engaging a T-shaped tongue on the engagement means.

Figure 152:
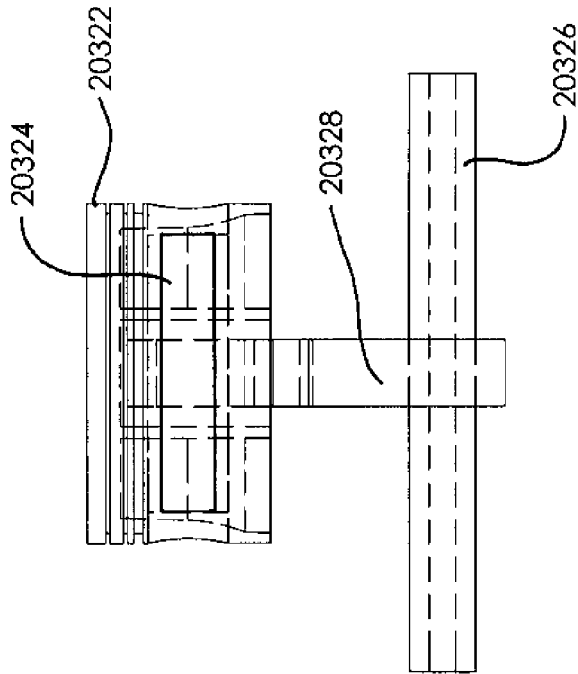
FIGS. 151 to 153 show isometric views of a further piston made according to the invention.
Figure 151:
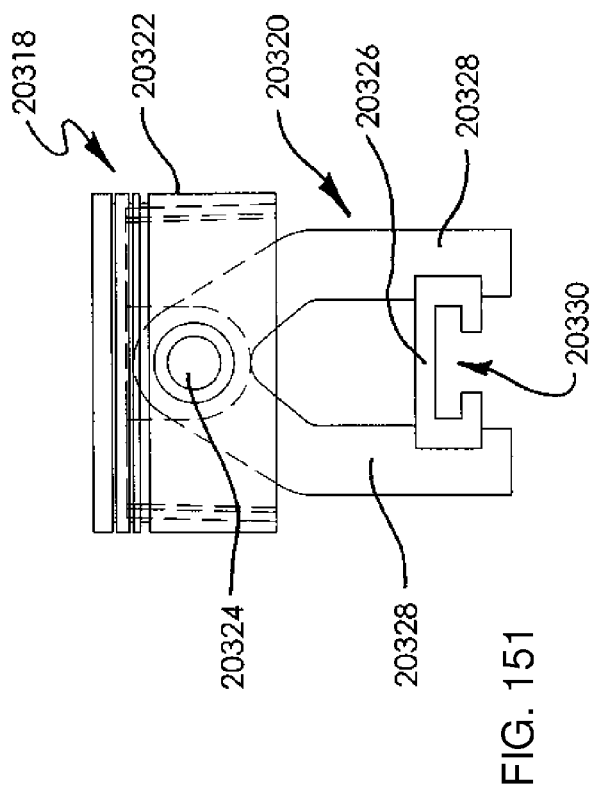
Figure 153:
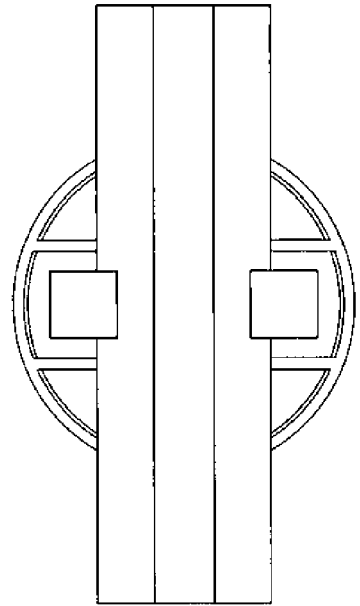

FIGS. 151 to 153 show a piston assembly 20318 having a guide/engagement means 20320 mounted to the main body 20322 via pin 20324. A cross bar 20326 extends between vertical members 20328 and includes a T-shaped slot 20330.

FIGS. 154 to 156 show a guide engagement assembly 20332 having a cross bar 20334, four vertical guide bars 20336 and a central connecting bar 20338. There are two vertical guide bars 20336 on either side of the cross bar 20334. The cross bar has a T-shaped slot.

FIGS. 157 to 159 show an assembly similar to that of FIGS. 154 to 156 except that the cross bar 20340 is T-shaped, rather than having a T-shaped slot.

FIGS. 160 to 162 show an assembly 20342 similar to that of FIGS. 157 to 159 attached to a piston body 20344 by two pins 20346 so that pivoting is not possible.

FIGS. 163 to 165 show a piston assembly 20350 having a guide/engagement means 20352 mounted on a pin or cross bar 20354 of the piston body 20356. The pin or cross bar 20354 may be separate from or integral with the body 20356. The assembly is retained on the cross bar 20354 by bolt 20358.

FIGS. 166 to 168 show a guide/engagement assembly 20360 similar to that of FIGS. 20874 to 2076 but retained on the piston body 20362 by two pins 20364.

FIGS. 169 to 171 show a piston assembly 20366 functionally identical to that of FIGS. 166 to 168 but in which there is a single unitary structure and only one vertical guide bar 20368 on each side of the horizontal engagement bar as opposed to two.

Figure 173:
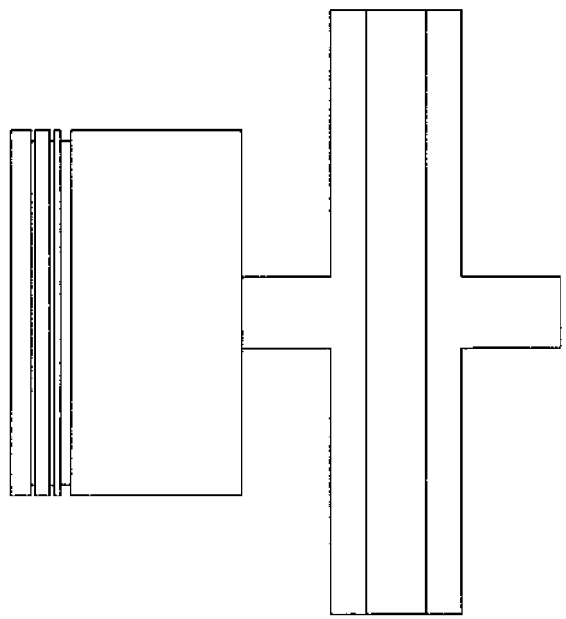
FIGS. 172 to 174 show isometric views of a further piston made according to the invention.
Figure 172:
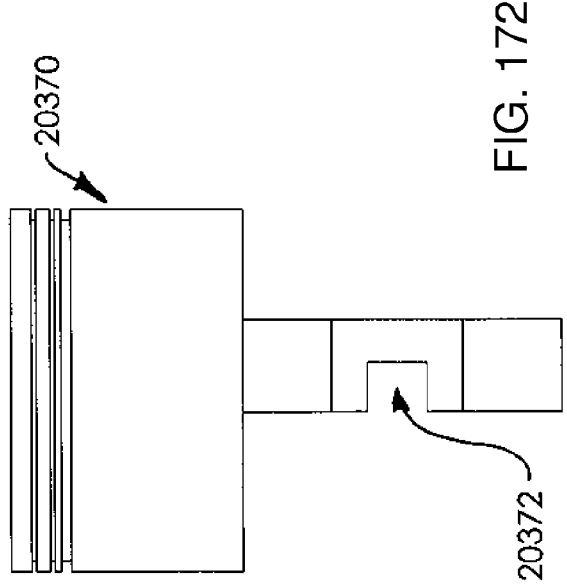
Figure 174:
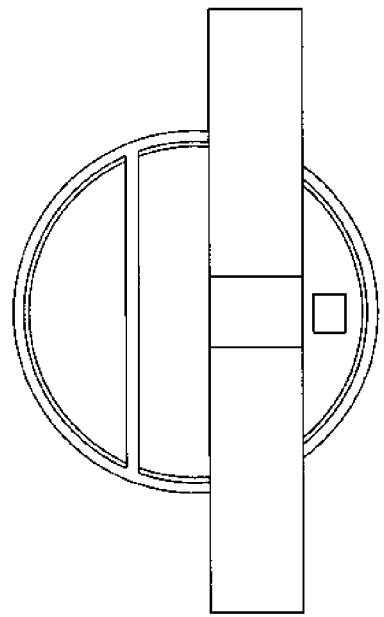

FIGS. 172 to 174 show a piston assembly 20370 similar to that of FIGS. 127 to 129 but in which a horizontal slot 20372 is provided for engagement with the connecting means.

Figure 176:
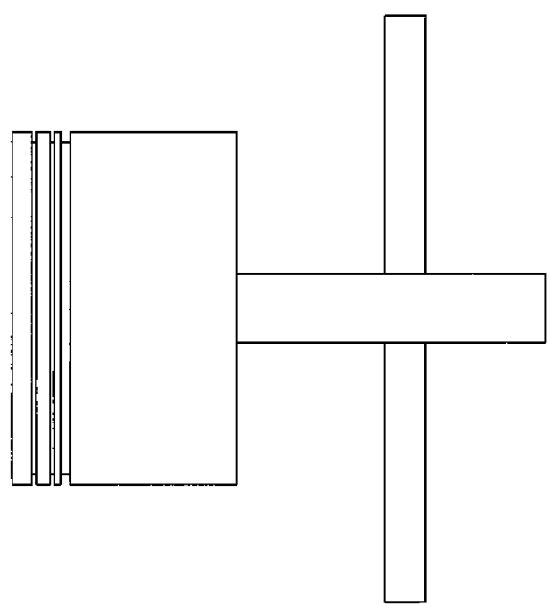
FIGS. 175 to 177 show isometric views of a further piston made according to the invention.
Figure 175:
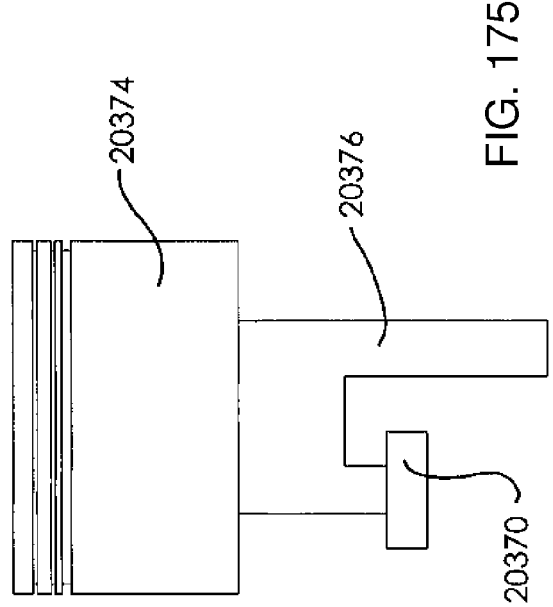
Figure 177:
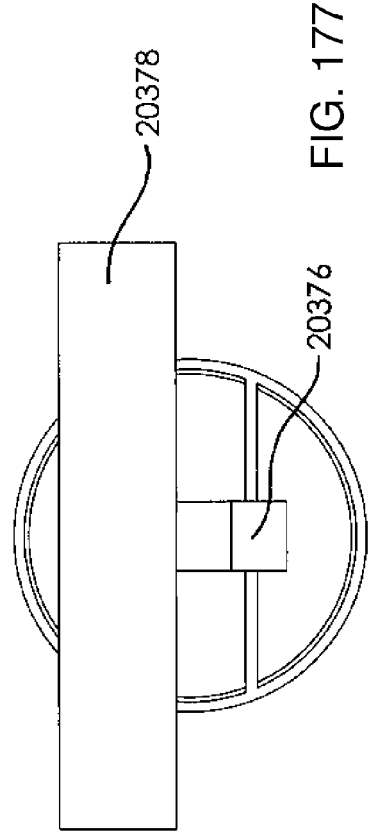

FIGS. 175 to 177 show a piston assembly 20374 having a single vertical guide bar 20376 and a T-shaped engagement bar 20378 depending from the guide bar 20376.

Figure 179:
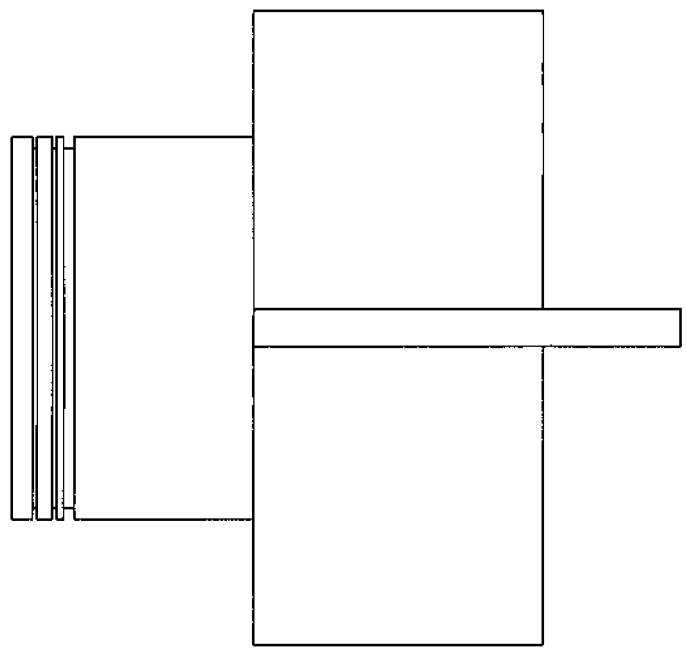
FIGS. 178 to 180 show isometric views of a further piston made according to the invention.
Figure 178:
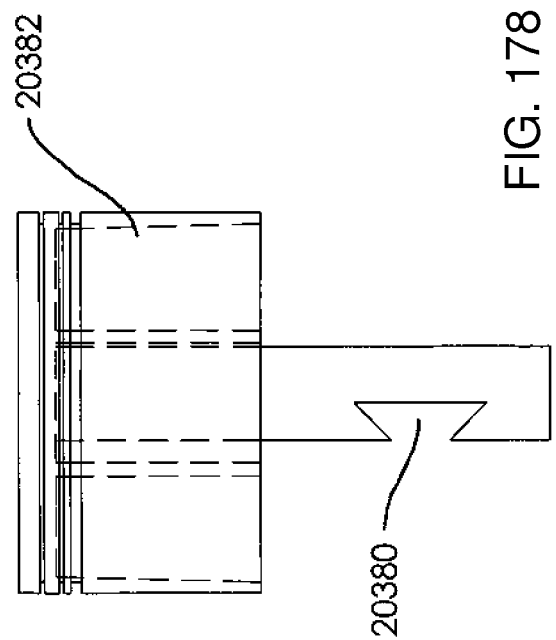
Figure 180:
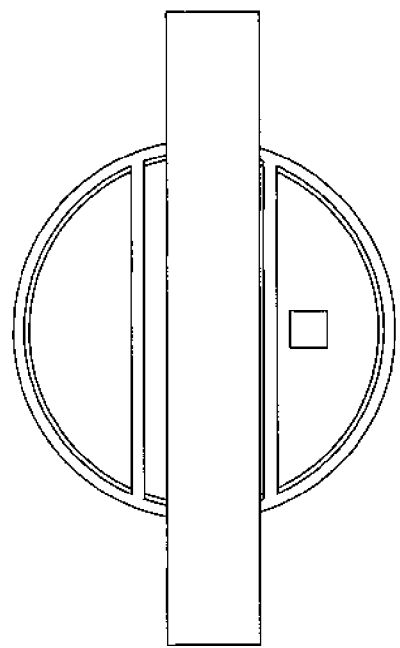

FIGS. 178 to 180 show a piston assembly functionally identical to the FIGS. 130 to 132 embodiment except that the re-entrant slot 380 is much nearer to the piston body 20382.

Figure 182:
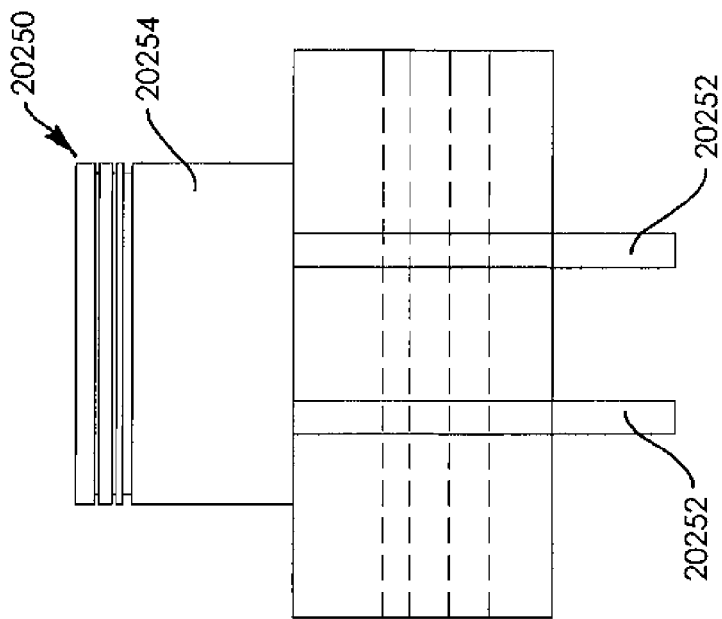
FIGS. 181 to 183 show isometric views of a further piston made according to the invention.
Figure 181:
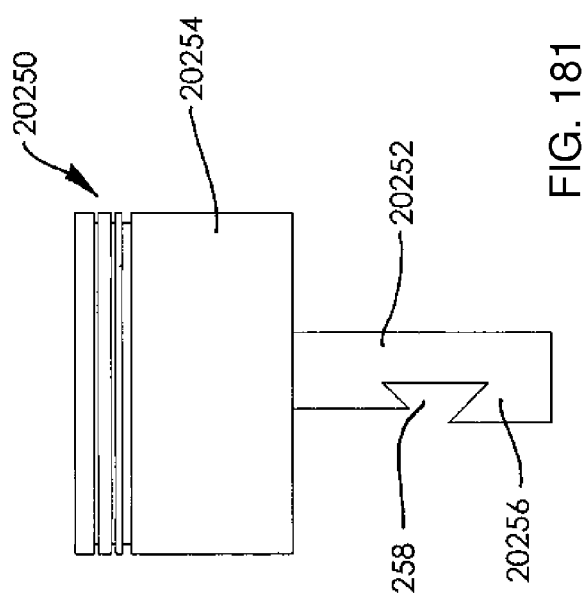
Figure 183:
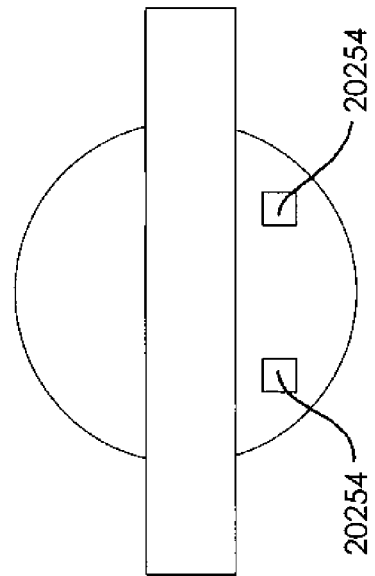

FIGS. 181 to 183 show a piston assembly 20250 having two vertical guide bars 20252 extending from the piston body 20254. Across the bar 20256 is mounted inwardly of the bars 20252 and extends horizontally. The cross bar has a diamond shaped slot 20258 which receives a corresponding tongue mounted on the connecting means.

Figure 185:
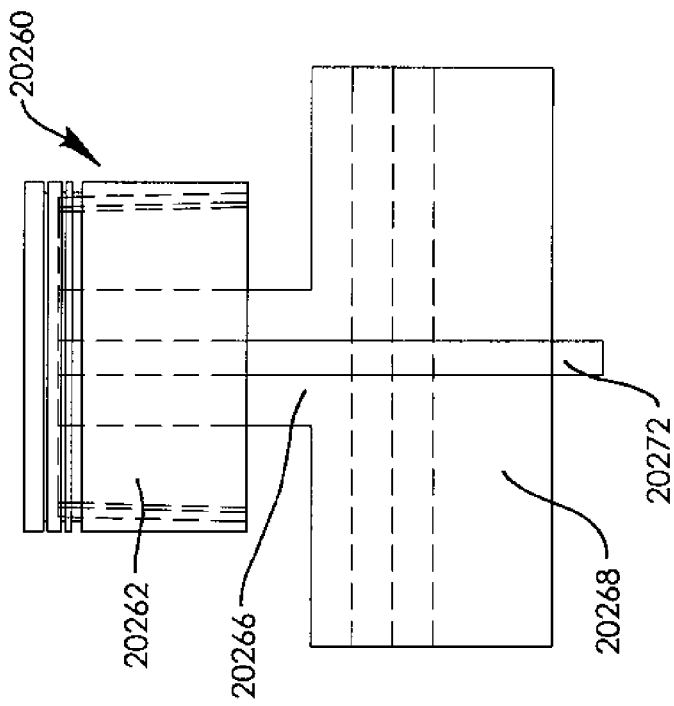
FIGS. 184 to 186 show isometric views of a further piston made according to the invention.
Figure 184:
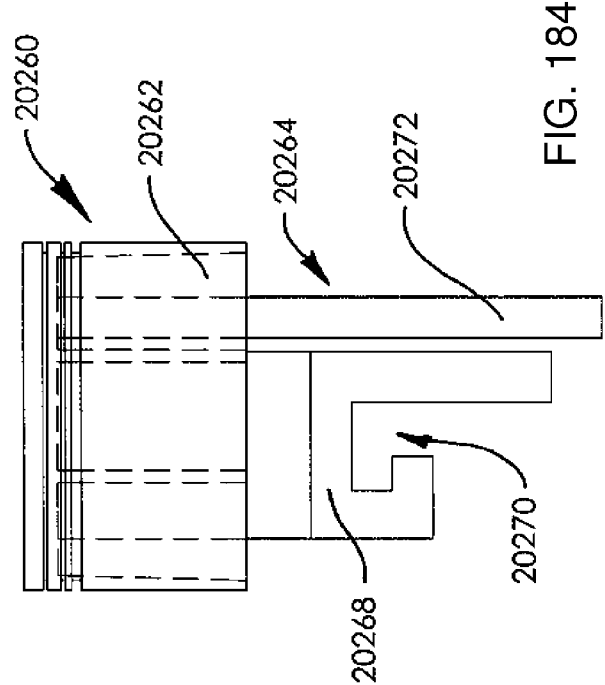
Figure 186:
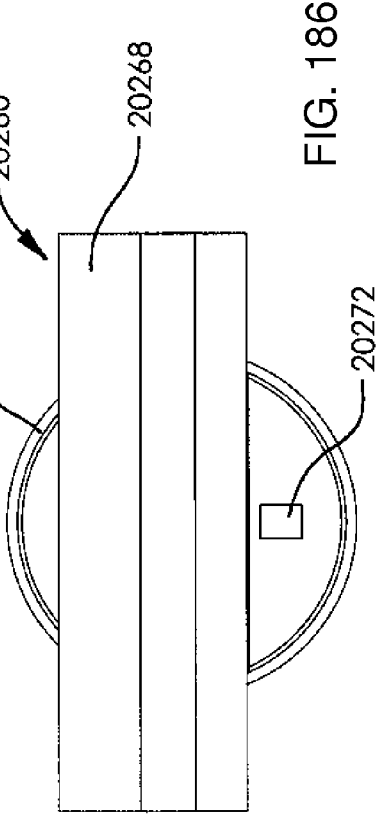

FIGS. 184 to 185 show a piston assembly 20260 having a piston body 20262 from which descends a guide bar/engagement assembly 20264. This assembly 20264 includes a T-shaped engagement portion 20266 having a cross bar 20268 which in turn defines an L-shaped slot 20270 to receive an L-shaped tongue mounted on a connecting means. A vertical guide bar 20272 descends from the piston body 20262. Preferably the guide bar 20272 is integral with the engagement portion 20266 but it may be separate. The guide bar 20272 preferably extends below the horizontal cross bar 20268.

FIGS. 187 to 189 show a piston assembly 20274 having a piston body 20276 and a guide/engagement assembly 20278 pivotably mounted to the body 20276 by gudgeon pin 20280. The assembly 20278 has a T-shaped portion comprising vertical leg 20282 and horizontal cross bar 20284. The cross bar has a T-shaped slot 20286 in a side wall 20288 for receiving a corresponding tongue on the connecting means.

Figure 191:
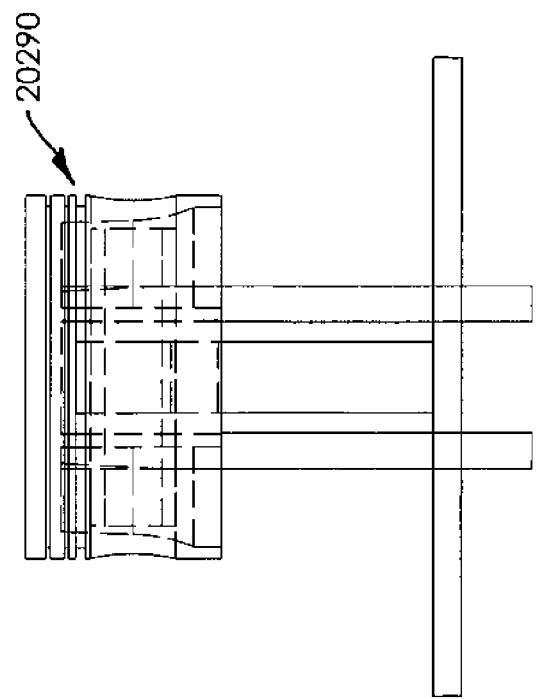
FIGS. 190 to 192 show isometric views of a further piston made according to the invention.
Figure 190:
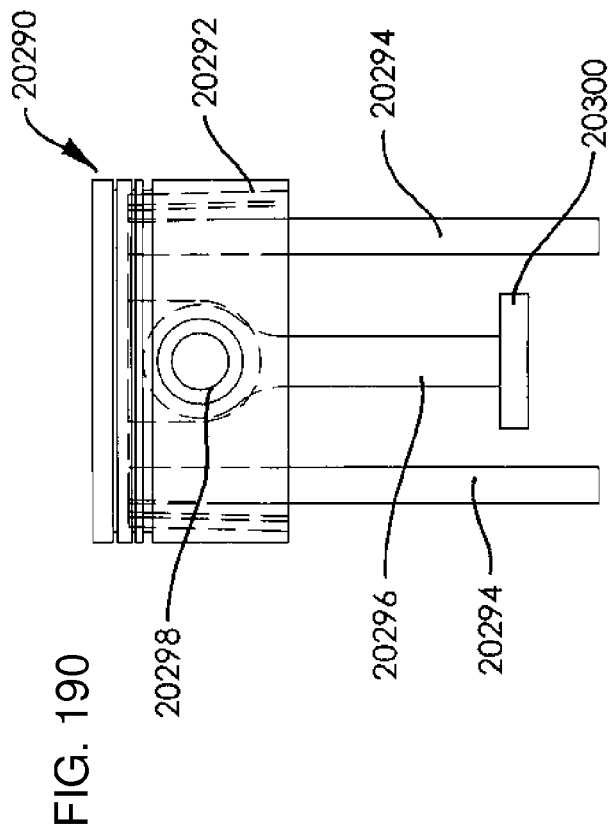
Figure 192:
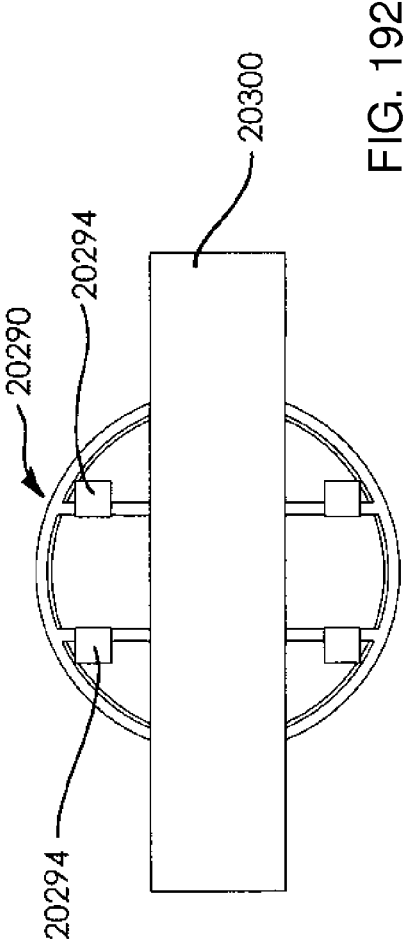

FIGS. 190 to 192 show a piston assembly 20290 having a piston body 20292 with four vertical and parallel guide bars 20294 extending downwards. The four bars 20294 are located at the corners of a square centred on the centre of the piston's circumference.

An engagement means 20296 is pivotably mounted on the piston via gudgeon pin 20298 and is located between the vertical guide bars 20294. The engagement means includes a flat cross bar 20300 which may engage in a T-shaped slot on the connecting means.

Figure 194:
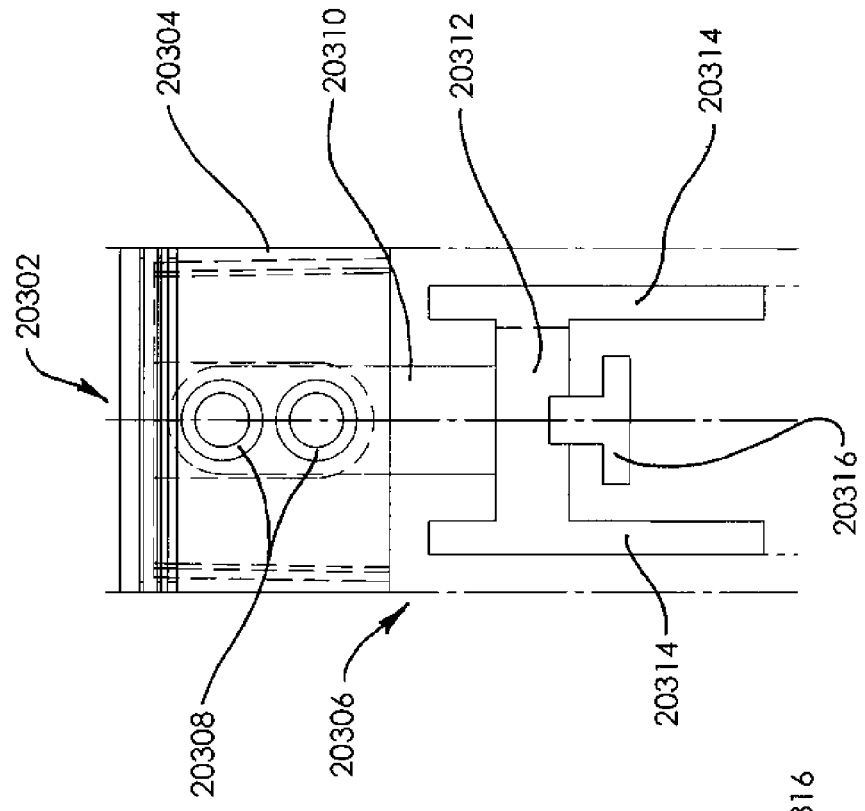
FIGS. 193 to 195 show isometric views of a further piston made according to the invention.
Figure 193:
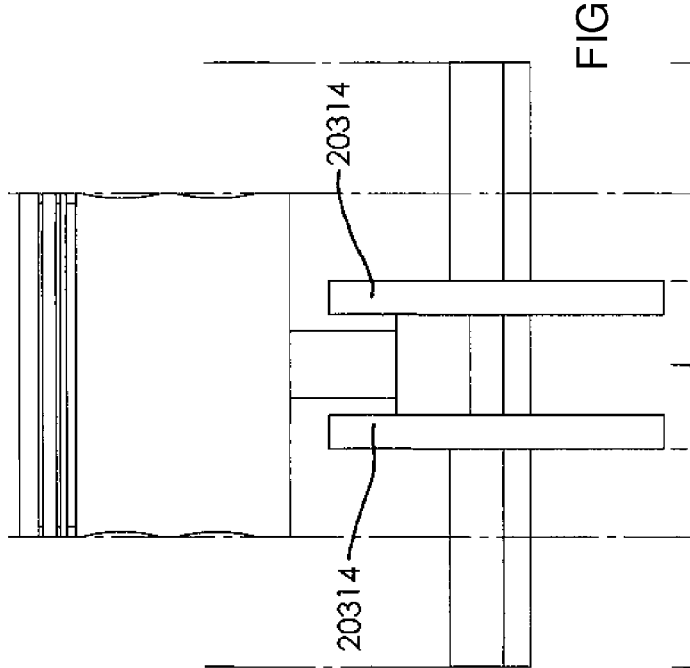
Figure 195:
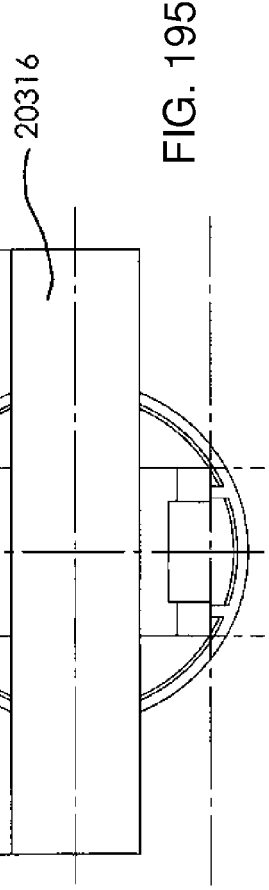

FIGS. 193 to 195 show a piston assembly 20302 having a piston body 20304 with a guide/engagement assembly 20306 attached to the body 20304 by two pins 20308. The assembly 20306 has a vertical post 20310 and a first cross bar 20312 having four vertical guide posts 20314, each arranged at one of its corners. Mounted to the underside of the first cross bar 20312 is a second T-shaped cross bar 20316 which is engaged by a corresponding T-shaped slot on the connecting means.

Figure 196:
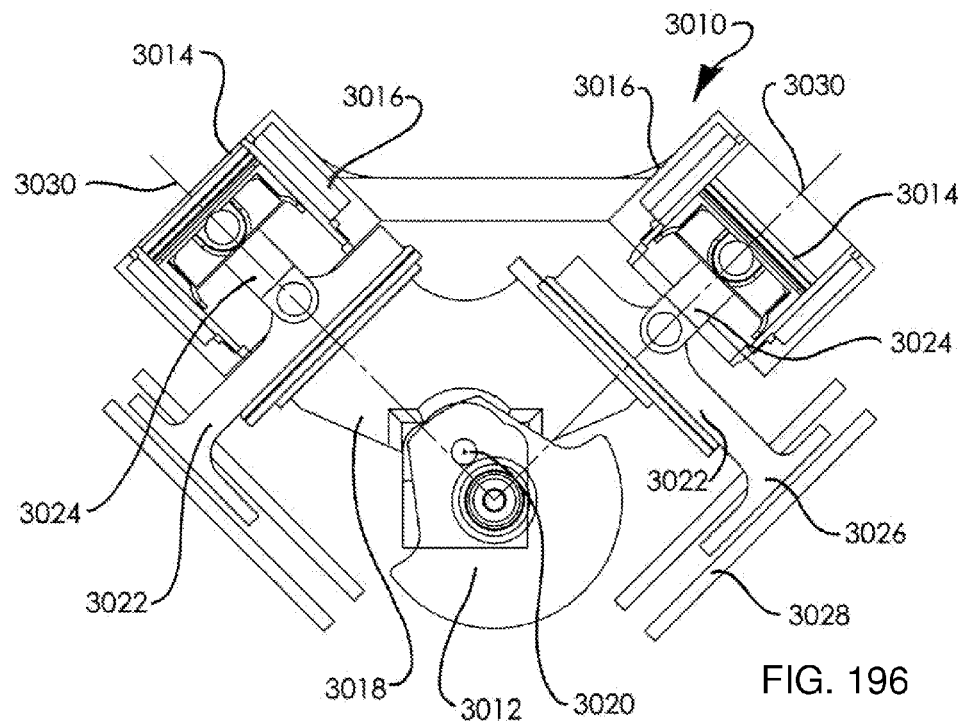
FIG. 196 is a cross-sectional view of a first embodiment of the invention.

Referring to FIG. 196 there is shown a reciprocating piston device 3010 having a crank 3012, pistons 3014 reciprocating in cylinders 3016 and a connecting mechanism 3018 rotatably mounted on the big end 3020 of the crank 3012. The connecting mechanism 3018 engages intermediate members 3022. Connecting rods 3024 connects the members 3022 with the respective piston 3014 and the connecting rods 3024 are pivotably attached to the piston 3014 and members 3022.

The intermediate members 3022 have a sliding arm 3026 mounted in a slider 3028. The slider 3028 defines a linear slot parallel to the respective cylinder axis 3030. The intermediate member is thus constrained to move parallel to the cylinder axis. The connector 3018 is limited to motion relative to the members 3022 which is perpendicular to the cylinder axis and so as the crank rotates the pistons are caused to follow a true sinusoidal path.

Figure 197:
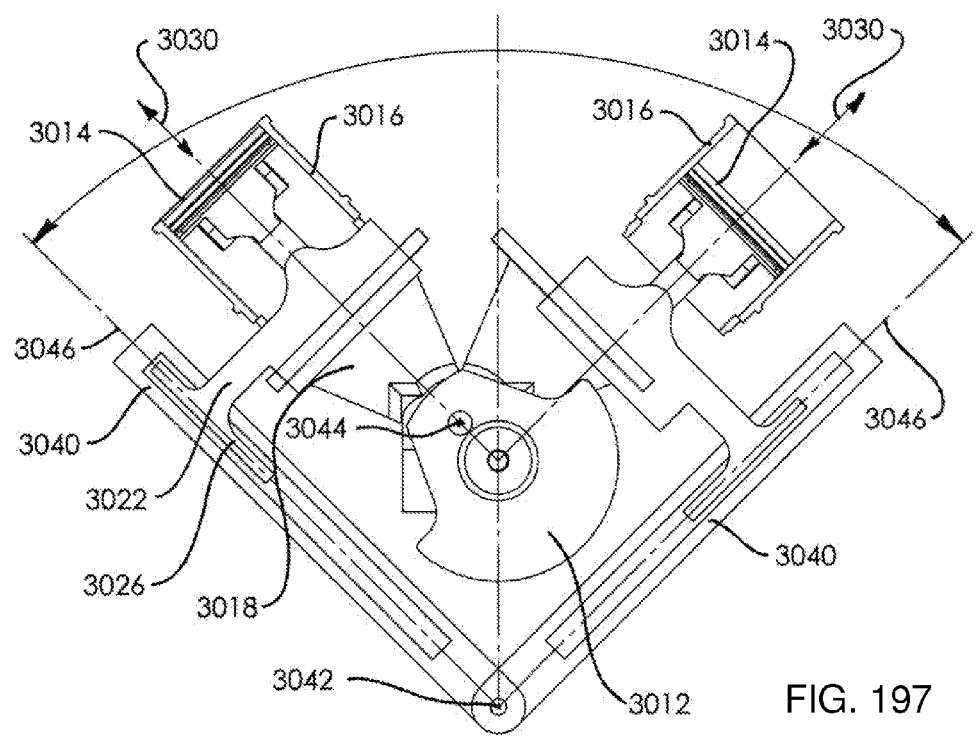
FIG. 197 is a cross-sectional view of a second embodiment of the invention.

FIG. 197 shows an embodiment similar to that of FIG. 196 and accordingly the same numbers are used for like parts. In the FIG. 197 embodiment the intermediate members 3022 engage in sliders 3040 which are pivoted about a common axis 3042. This axis is on a line passing through the crank axis 3044 which bisects the angle between the two cylinder axes 3030. The sliders 3040 may be rotated about the axis 3042 so that the slider axes 3046 are not parallel to the cylinder axes 3030. This causes the intermediate members to travel at an angle to the cylinder axes, so reducing the effective stroke of the device. Sideways motion of the intermediate members 3022 relative to the pistons is accommodated by the pivotable connection of the respective connecting rod 3024 to both the piston and member 3022. The effect is to superimpose a secondary sinusoidal motion due to this sideways motion on the sinusoidal motion caused by the rotation of the crank.

Figure 198:
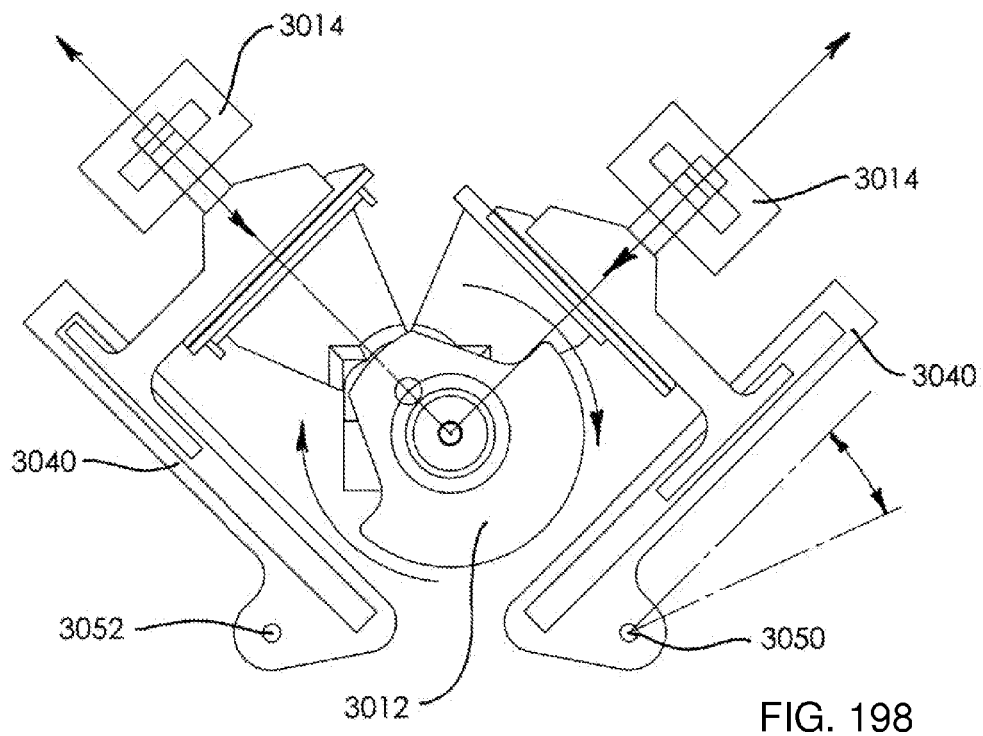
FIG. 198 is a cross-sectional view of a third embodiment of the invention.

FIG. 198 shows an embodiment similar to that of the FIG. 197 except that the sliders 3040 are mounted upon separate axes 3050, 3052. As with the FIG. 197 embodiment movement of the sliders 3040 about their axes of rotation causes a change in stroke length and motion of the pistons.

Figure 199:
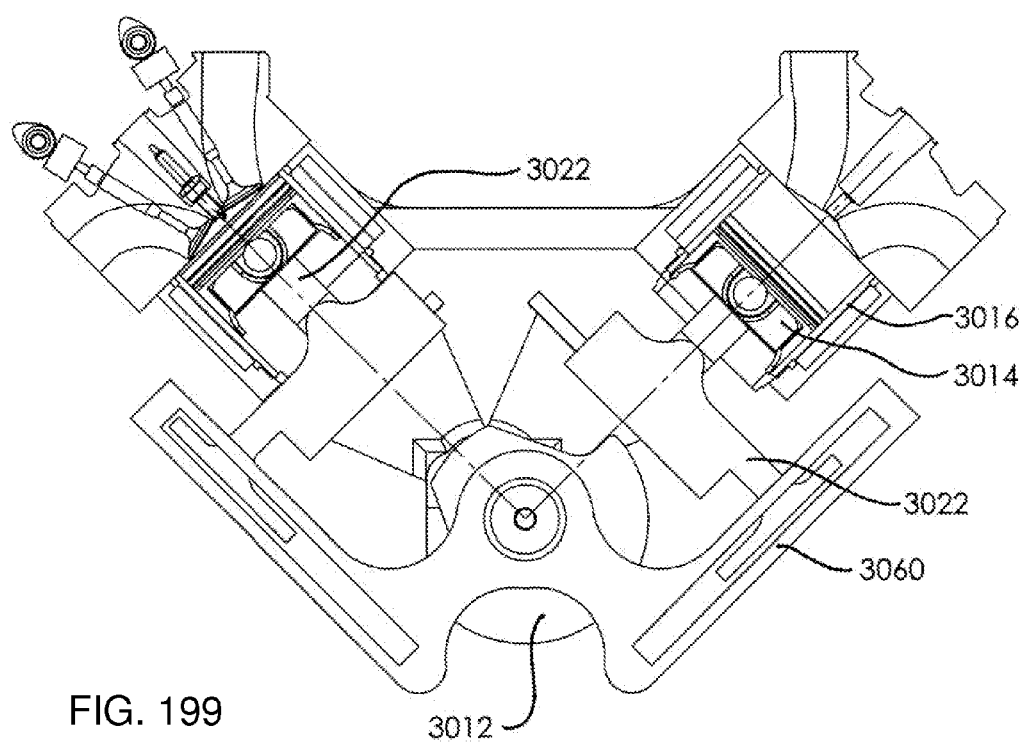
FIG. 199 is a cross-sectional view of a fourth embodiment of the invention.

FIG. 199 shows a variation in which the intermediate members 3022 engage in a unitary slider 3060, which in turn is rotatably mounted on the crank itself, so as to be rotatable about the crank axis. Other than positioning of the axis of rotation, this embodiment functions identically to the FIG. 197 embodiment.

Figure 200:
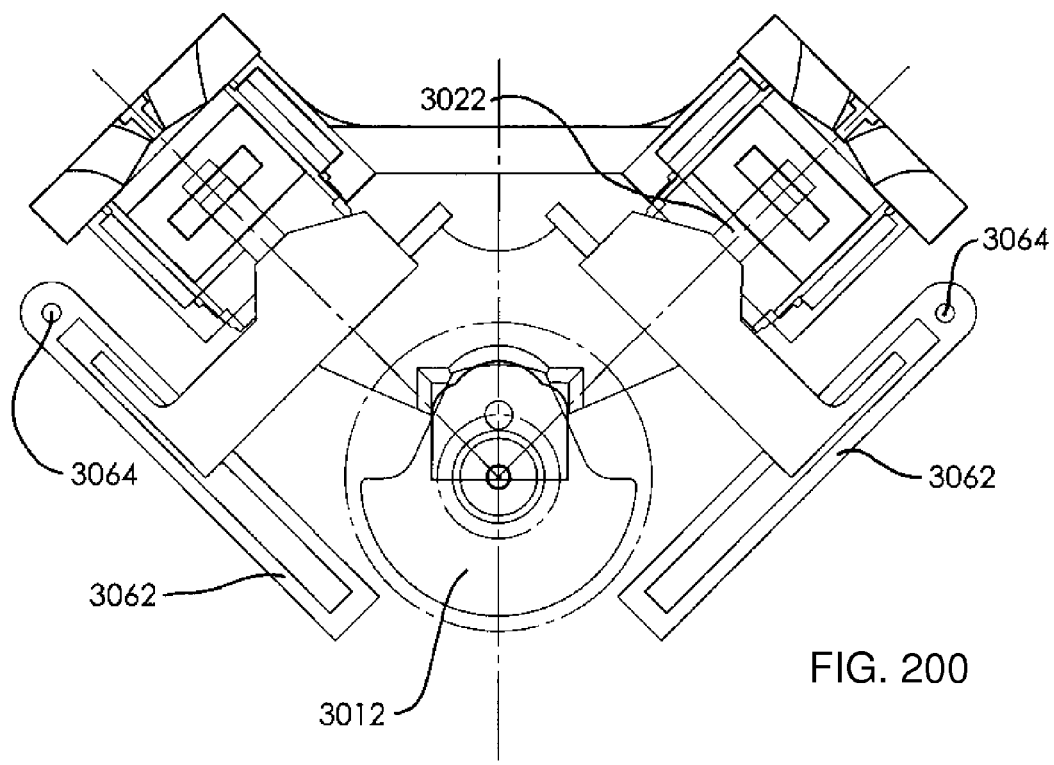
FIG. 200 is a cross-sectional view of a fifth embodiment of the invention.

FIG. 200 shows a further variation in which the intermediate members 3022 are mounted in sliders 3062 pivoted about axes 3064. As with the FIGS. 197 and 198 devices, rotation of the sliders results in changes to the motion and stroke length of the device.

FIG. 201 shows an embodiment having a two part piston 3070, having an outer piston 3072 and an inner piston 3074. The outer piston 3072 is equivalent to the piston 3014 of the earlier embodiments. The inner piston 3074 is slidably mounted in the outer piston for motion parallel to the cylinder axis. A linkage system 3076 connects inner piston 3074 to a secondary slide member 3076 mounted in a secondary slide 3078. Both the primary slide and secondary slide are independently pivoted about separate axes 3080 and 3082.

When the axes of the primary and secondary slide are parallel the inner piston 3074 does not move relative to the outer piston. When the axes are not parallel the inner piston moves relative to the outer piston as the crank rotates and the sliding members travel along the respective slides.

It will also be noted that the intermediate member is pivotably mounted on the piston, dispensing with the connecting rod. To provide the necessary degree of freedom, there is provided a separate sliding member 3084 which is pivotably attached to the intermediate member 3022.

The two sliders can also be move sideways along axis 3086 so as to change the displacement or the compression ratio of the device. The sideways movement of the two sliders may be independent of each other.

FIG. 202 shows a minor variation on the FIG. 201 device in which the two sliders cannot pivot but can only move sideways.

Figure 203:
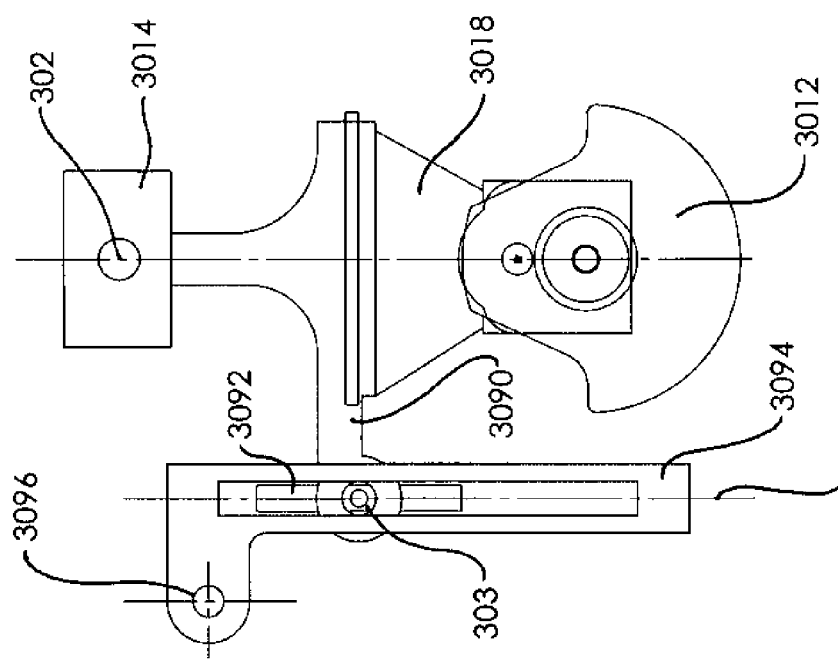
FIG. 203 is a cross-sectional view of an eighth embodiment of the invention.

FIG. 203 shows a further minor variation of the invention having an L-shaped intermediate member 3090 rotatably mounted on a slide member 3092. The slide member 3092 slides in slide 3094 which is pivoted about axis 3096. The axis 3096 is not located on the sliding axis 3098.

Figure 205:
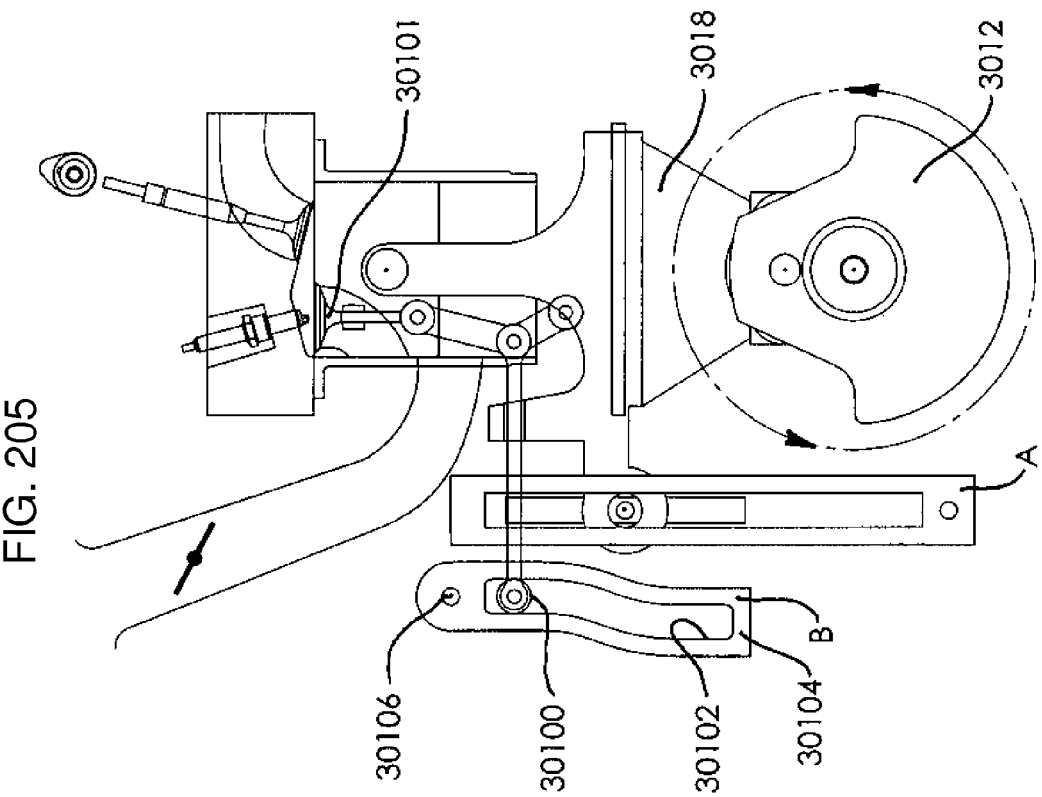
FIG. 205 is a cross-sectional view of a tenth embodiment of the invention.

FIG. 205 shows an embodiment similar to the FIG. 201 device in which a linkage mechanism for a valve 3101 has a rotatable follower 3100 which rolls along a non-linear slot 3102. Thus as the follower moves along the slot 3102, the position of the to valve 3101 may be varied. The carrier 3104 is pivoted about axis 3106 to provide further control of the valve's position.

FIG. 206 shows a variation of the invention and is similar to the FIG. 203 device. In the FIG. 206 embodiment slot 3110 is arcuate and an arcuate shaped follower 3112 is provided to slide in the slot 3110. The carrier 3114 is pivotably mounted by way of an eccentric 3116 about axis 3118. This enables the sideways position of the slot 3110 to be varied. The radius of the slot 3110 may be any value.

FIG. 207 is a further variation of the FIG. 206 device and is similar to the FIG. 207 device except that the slot 3120 on the carrier 3122 is not arcuate but follows a multi radius path. To accommodate this the slider 3124 includes two rotatable followers 3126. Thus as the slider moves along the slot 3120 it moves 5 sideways relative to the cylinder axis. Movement of the slider 3124 relative to the intermediate member 3022 is accommodated by pivotably mounting the two together at axis 3128.

Figure 208:
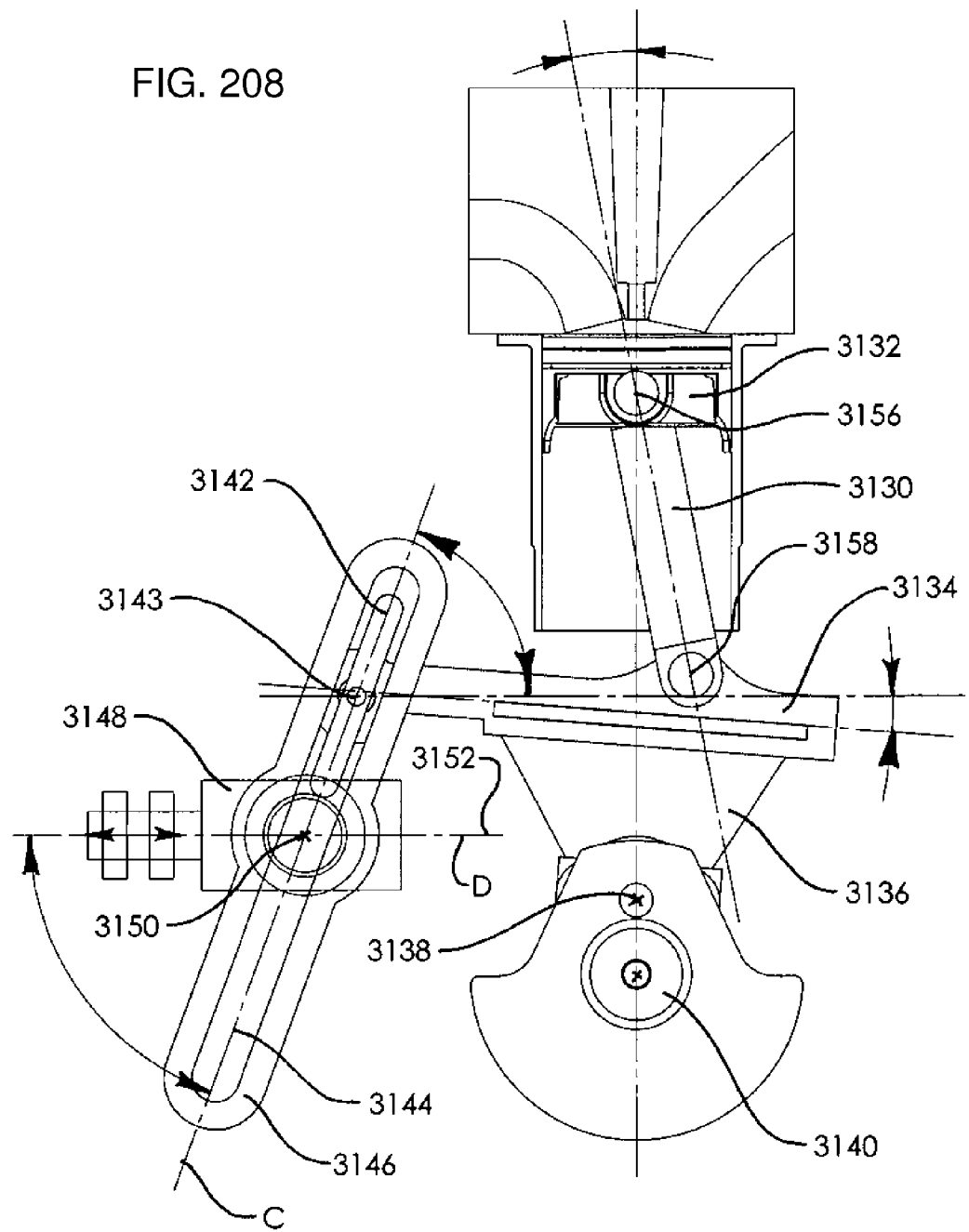
FIG. 208 is a cross-sectional view of the FIG. 207 embodiment in a different position.
Figure 209:
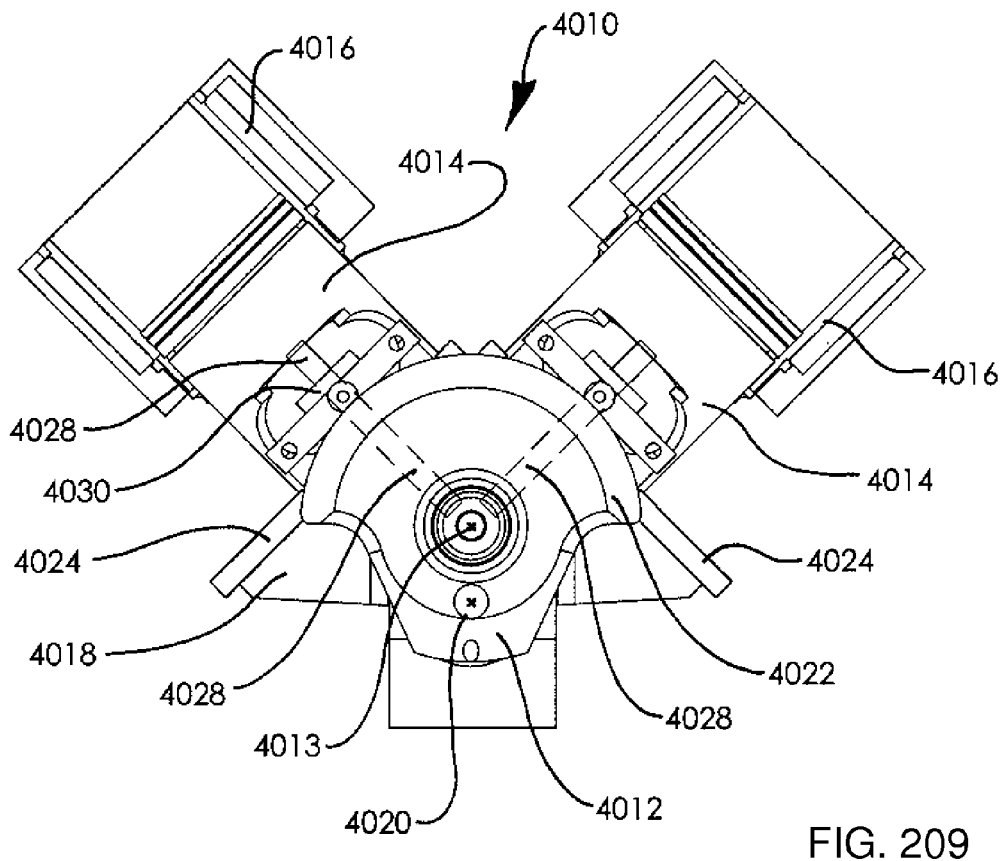
FIG. 209 is an end view of an embodiment of the invention at a first position during its cycle.
Figure 210:
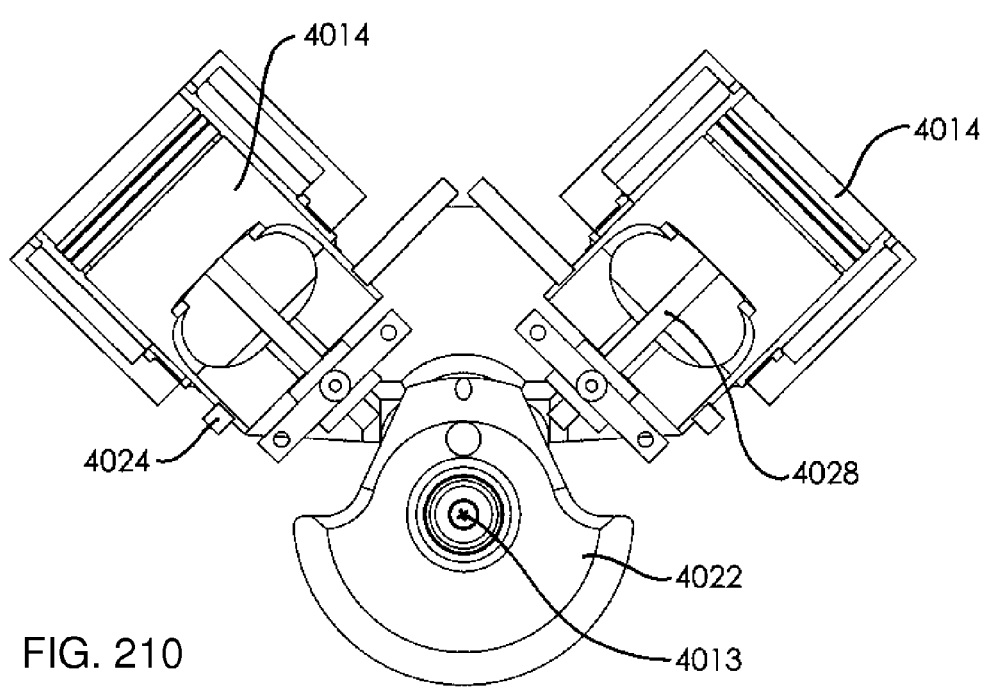
FIGS. 210 to 212 are end views of the embodiment of FIG. 220 209 at different stages of its cycle.
Figure 211:
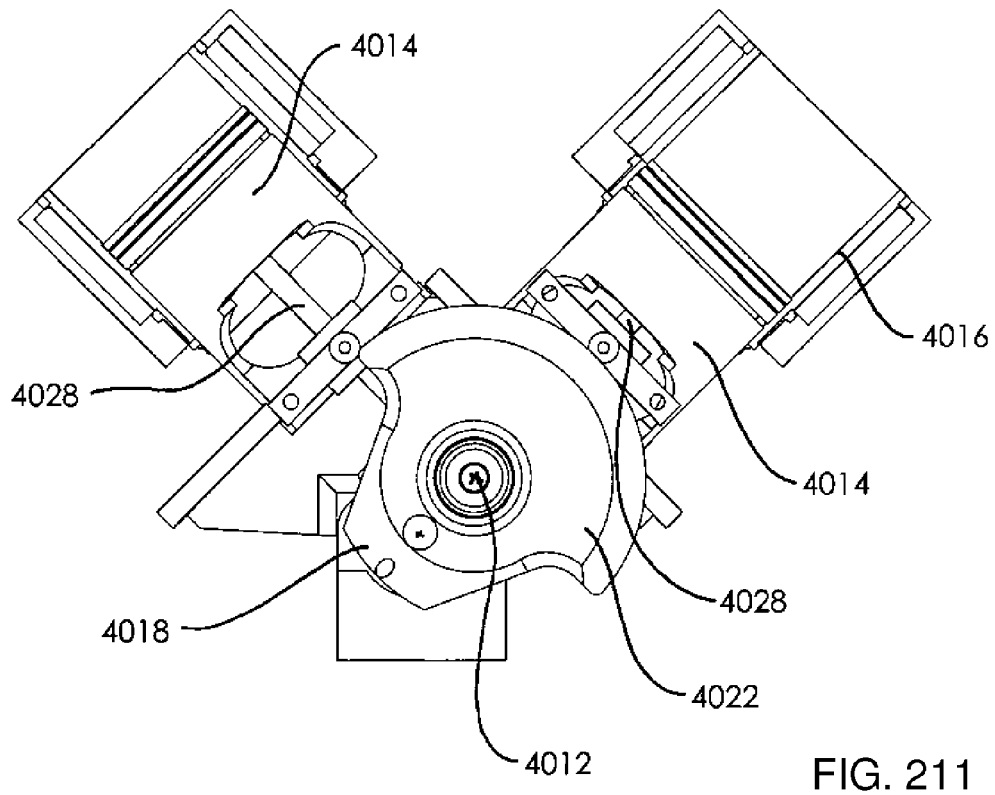
Figure 212:
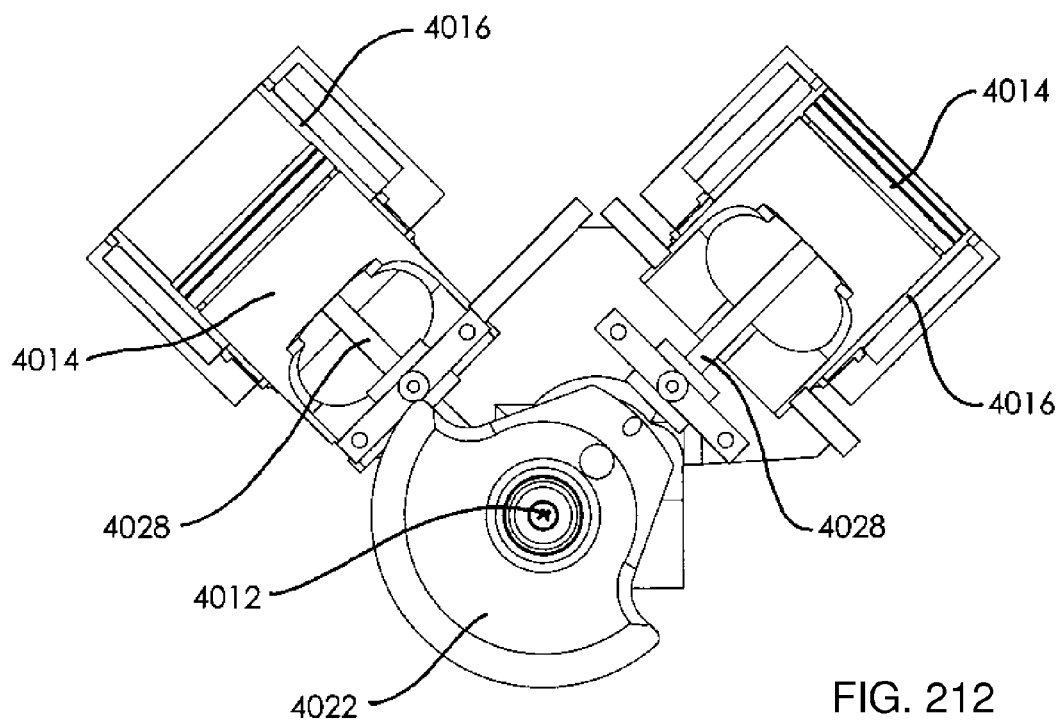
Figure 213:
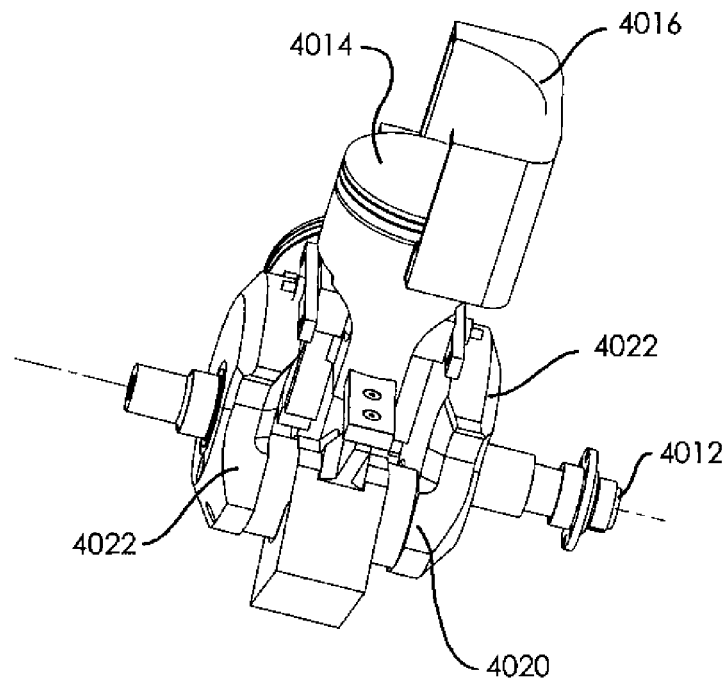
FIG. 213 shows a view of the embodiment taken perpendicular to one of the cylinder axes at a position corresponding to bottom dead centre for one of the pistons.
Figure 214:
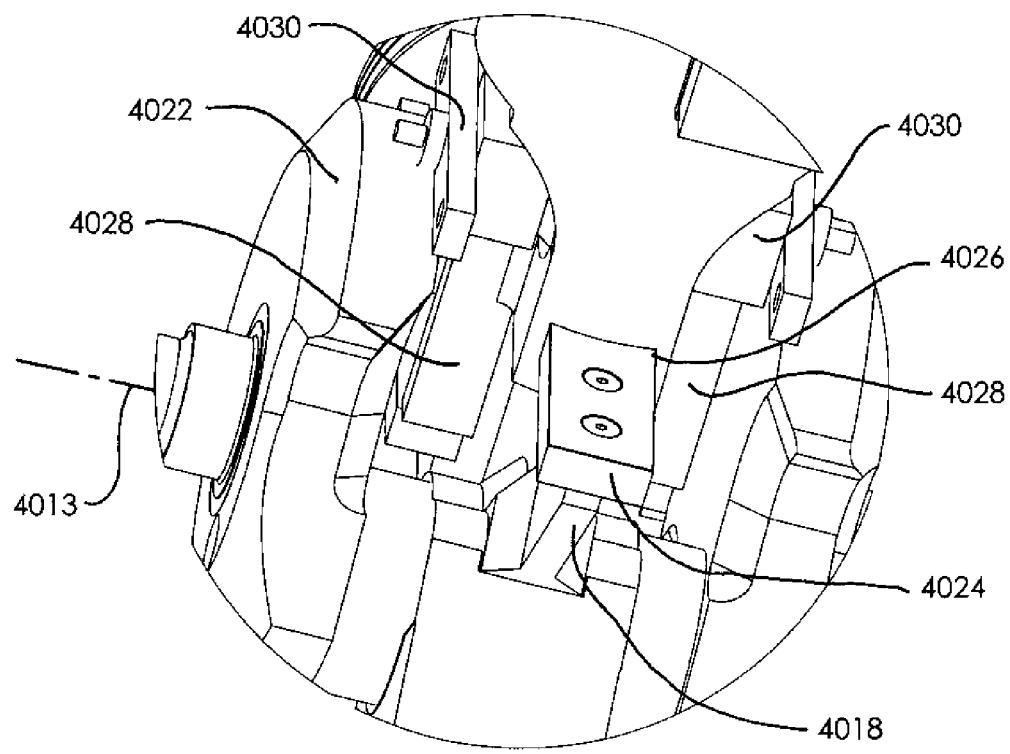
FIG. 214 shows a view of the embodiment similar to that of FIG. 213 but at top dead centre.

FIG. 208 shows a variation of the invention in which a connecting rod 3130 is pivotably connected to a piston 3132 and an intermediate member 3134. As with to all of the embodiments the intermediate member is movable sideways relative to a connector 3136 mounted on the big end 3138 of crank 3140. The intermediate member 3134 is pivotably connected to a slide member 3142 at 3143 which slides in slot 3144 of primary carrier 3146. The carrier 3146 is pivotably mounted on a secondary carrier 3148 at 3150. The secondary carrier 3148 is movable along axis 3152. This axis 3152 may be perpendicular to the cylinder axis or angle other than 90°. As can be seen, the intermediate member may be moved sideways so that the line 3154 joining the pivot points 3156 and 3158 of the connecting rod lies at an angle other than 90° to the cylinder axis.

Figure 204:
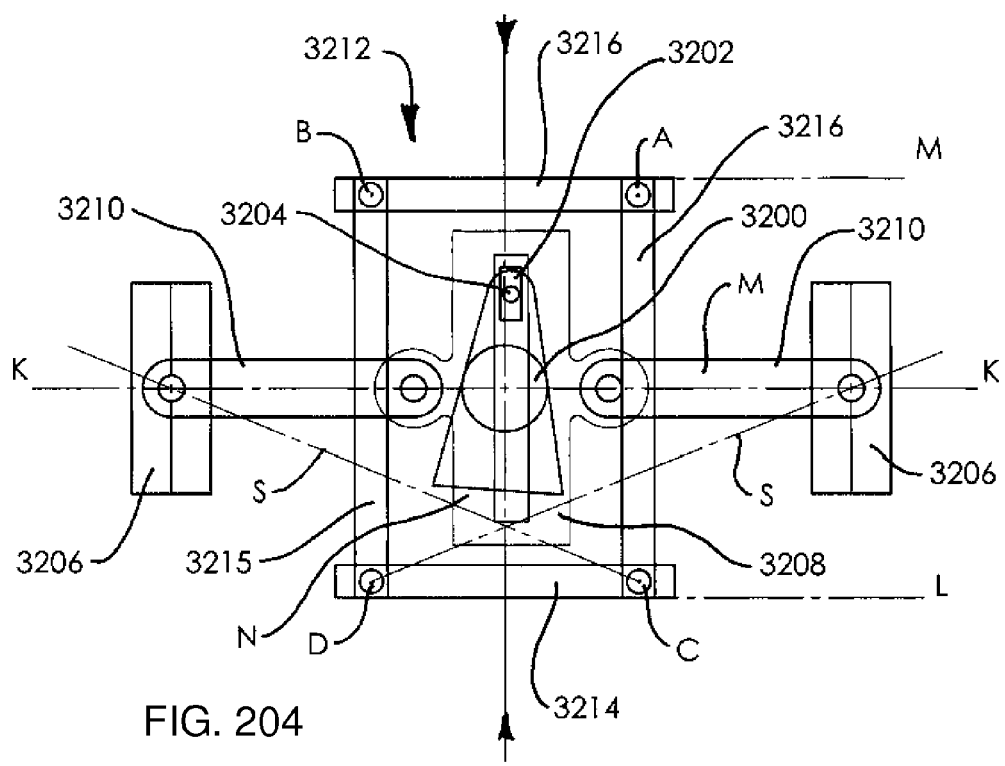
FIG. 204 is a cross-sectional view of a ninth embodiment of the invention.

FIG. 204 shows a variation of a scotch yoke device having a crank 3200, 20 connecting assembly 3202 mounted on big end 3204 and pistons 3206 pivotably connected to intermediate member 3208 by connecting rods 3210. The intermediate member is constrained by frame 3212 which consists of four frame members 3214, 3215, 3216 and 3217 which are pivotably mounted together. The height of the frame is the same as that of the intermediate member 3208 but the 25 frame width is greater so that sideways motion of the intermediate member 3208 and hence pistons 3206 is possible. The frame is movable vertically and the frame members may be pivoted to change the frame shape from a rectangle to a parallelogram. Movement of the frame vertically moves the intermediate member upwards, so causing the connecting rods 3210 to pivot upwards and draw the 30 pistons toward the centre of the device. Thus the compression ratio of the device is changed whilst the stroke remains the same.

Distortion of the frame to be non-rectangular causes the intermediate member to pivot and to follow a path at an angle to the cylinder axes. As the member moves along this path the angle between the piston and its respective connecting rod will 35 change, resulting in a non-sinusoidal motion of the piston.

Referring to FIGS. 209 to 216 there is shown a fluid device 4010 having a crank 4012 rotating about a crank axis 4013 and two pistons 4014 reciprocating in cylinders 4016. The two pistons 4014 are connected to the crank 4012 via a single slider mechanism 4018, which is rotatably mounted on the big end 4020 of the 40 crank. The big end 4020 extends between webs 4022. The slider 4018 has two T-shaped tongues 4024 which slidably engage in corresponding slots 4026 in the pistons. As the crank rotates the slider 4018 slides relative to the pistons 4014, which are caused to reciprocate in the cylinders.

Extending downwards from the base area of each piston are two guide bars 4028. These bars 4028 extend on either side of the slider 4018 and slot 4026. In addition, 5 each bar extends below the slot 4026 toward the crank axis 4013. Whilst two bars 4028 per piston are shown, it will be appreciated that only one or more than two bars per piston may be used. Where two or more bars are used it is not essential that they be located symmetrically relative to the cylinder/piston axis; the bars may be positioned to one side of the slot 4026 or asymmetrically on both sides.

A corresponding number of guides 4030 are provided for the guide bars 4028 and are attached or integral with the crank case. In the embodiment shown each guide 4030 includes a U-shaped channel in which the respective guide bar 4028 reciprocates.

Figure 216:
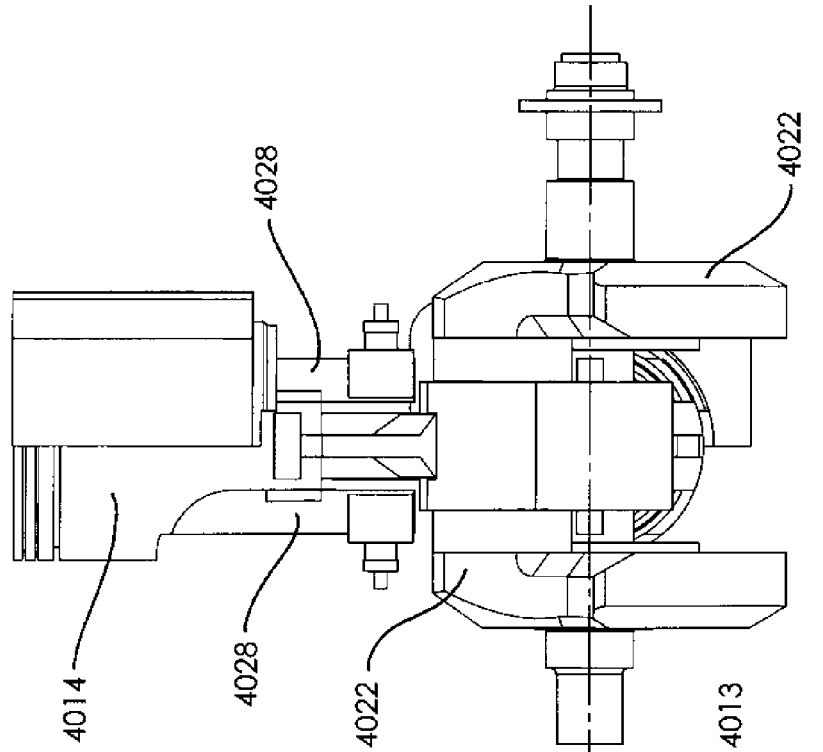
FIG. 216 shows an expanded view of part of FIG. 215.
Figure 215:
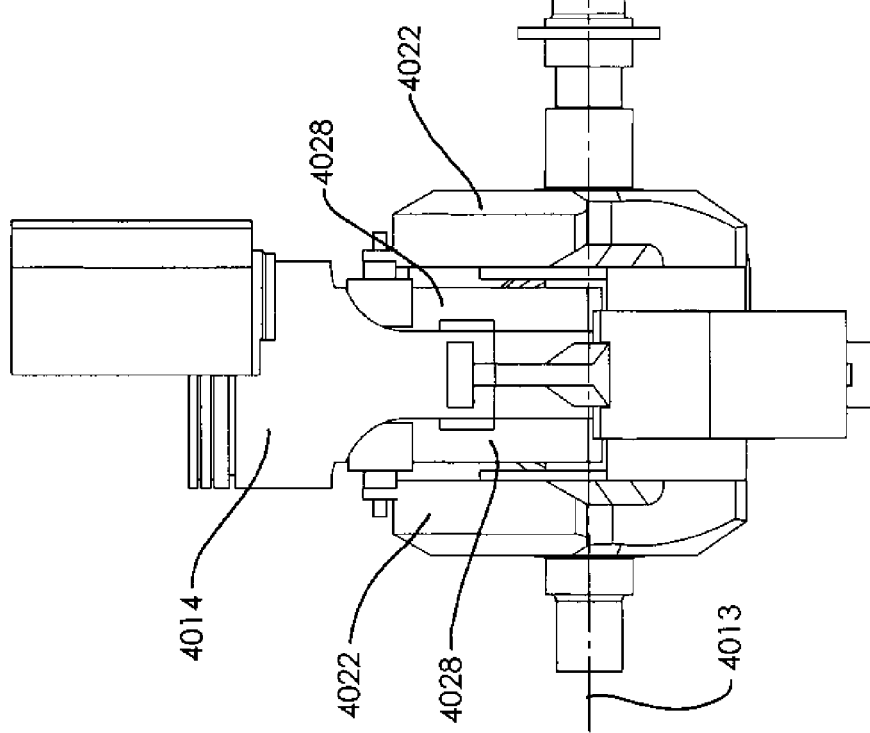
FIG. 215 shows a perspective view of the embodiment.

As best seen in FIGS. 215 and 216 the big end 4020 is supported by two webs 15 4022. The guide bars 4028 are positioned on the piston 4014 to lie between the two webs 4022 when viewed from the side. In addition, as best seen in FIGS. 220 to 223, when viewed on end, the guide bars 4028 extend along the cylinder axis toward the crank axis 4013. Thus the provision of the guide bars does not require additional space in the crank case.

As the crank 4012 rotates, the pistons 4014 reciprocate in their pistons and, as seen in FIGS. 209 to 212, the guide bars move up and down with the pistons into and out of the volume swept by the big end.

At bottom dead centre the guide bars 4028 may extend to be just clear of the sleeve 4034 of the slider and so allow the guides 4030 to lie as close to the swept volume 25 of the crank shaft as possible. This allows for a compact configuration, with the distance between the piston crown 4036 and crank axis 4013 to be minimised.

Figure 217:
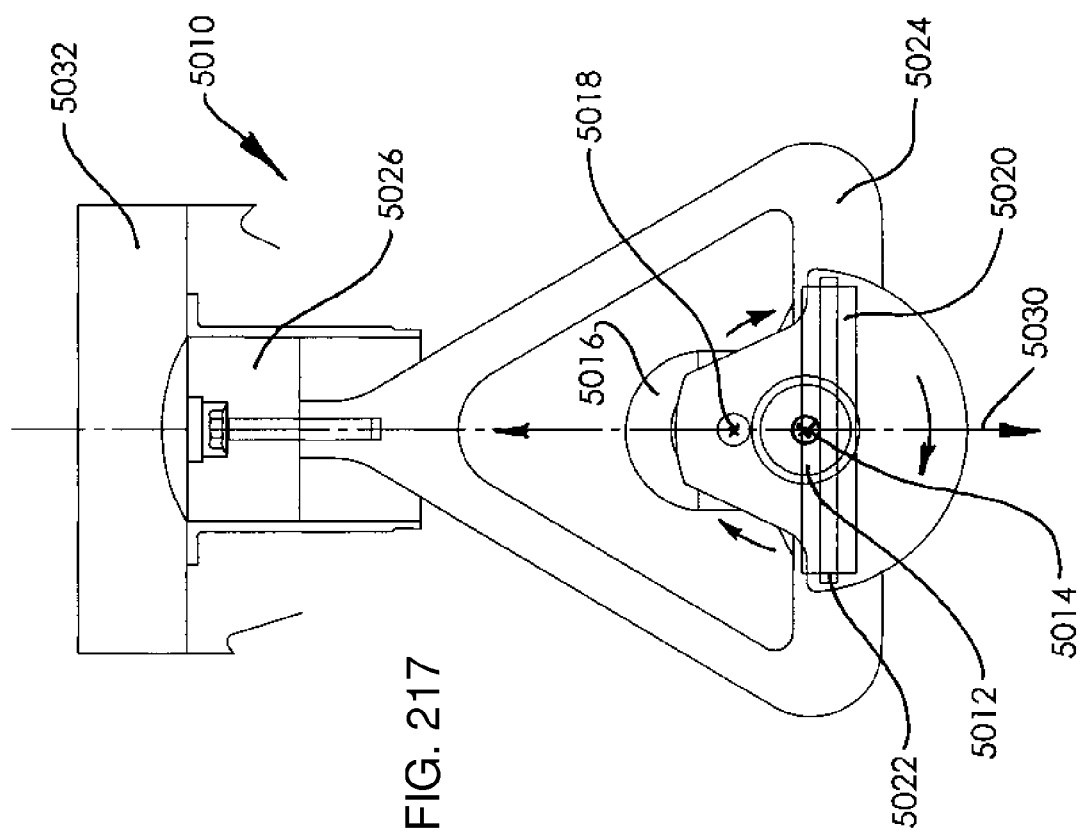
FIG. 217 is an axial end view of a first embodiment of the invention.

Referring to FIG. 217, there is shown a fluid device 5010 having a crank 5012 which rotates about a crank axis 5014 and has a big end 5016 with a big end axis 5018. Mounted on the big end 5016 is a connecting means 5020, which may rotate 30 on the big end about big end axis 5018. The connecting means includes a linear slot 5022 in which an engagement means 5024 is received. The engagement means may move along the slot 5022, by sliding, via roller type bearings or via other means.

Mounted on the engagement means 5024, or integral therewith, is a piston 5026, 35 which is mounted in a cylinder 5028 for reciprocal motion along cylinder axis 5030.

The engagement means 5024 is in the form of a triangular loop and the connecting means is positioned so that the linear slot 5022 always lies with the big end axis between the slot 5022 and the piston 5026. The piston 5026 is constrained to move along the cylinder axis 5030 and so as the crank rotates, the slot 5022 remains horizontal with the connecting means 5020 moving both vertically (and moving the piston) and side ways, relative to the engagement means.

The effect of this arrangement is that the crank axis may be moved nearer the cylinder head 5032 than otherwise.

Figure 218:
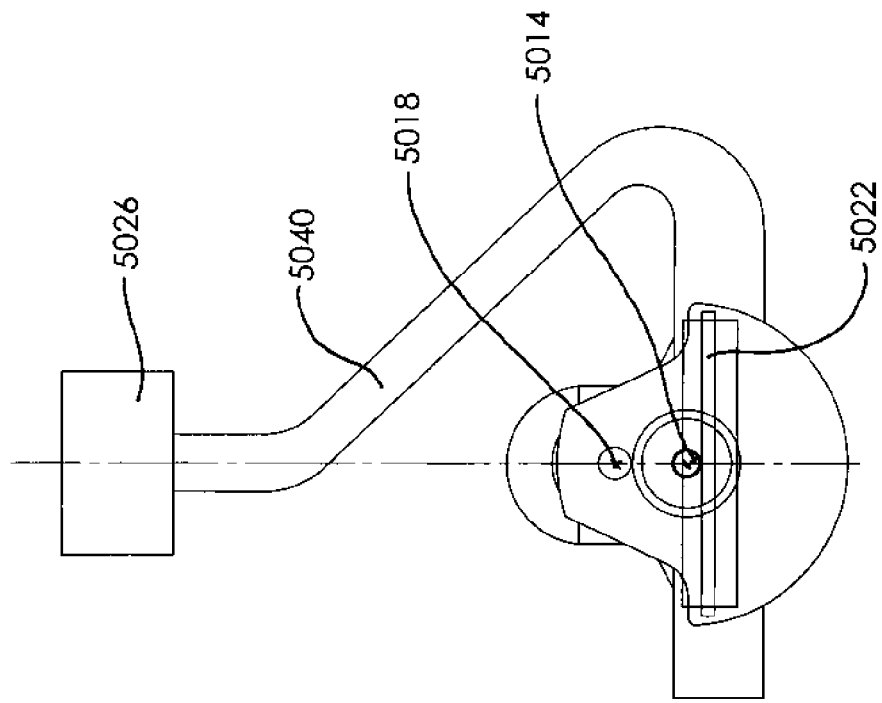
FIG. 218 is an axial end view of a second embodiment of the invention.

FIG. 218 shows a variation of the FIG. 217 embodiment in which all parts and arrangements are the same except for the engagement means. Accordingly, the same numbers are used for the same components.

Figure 228:
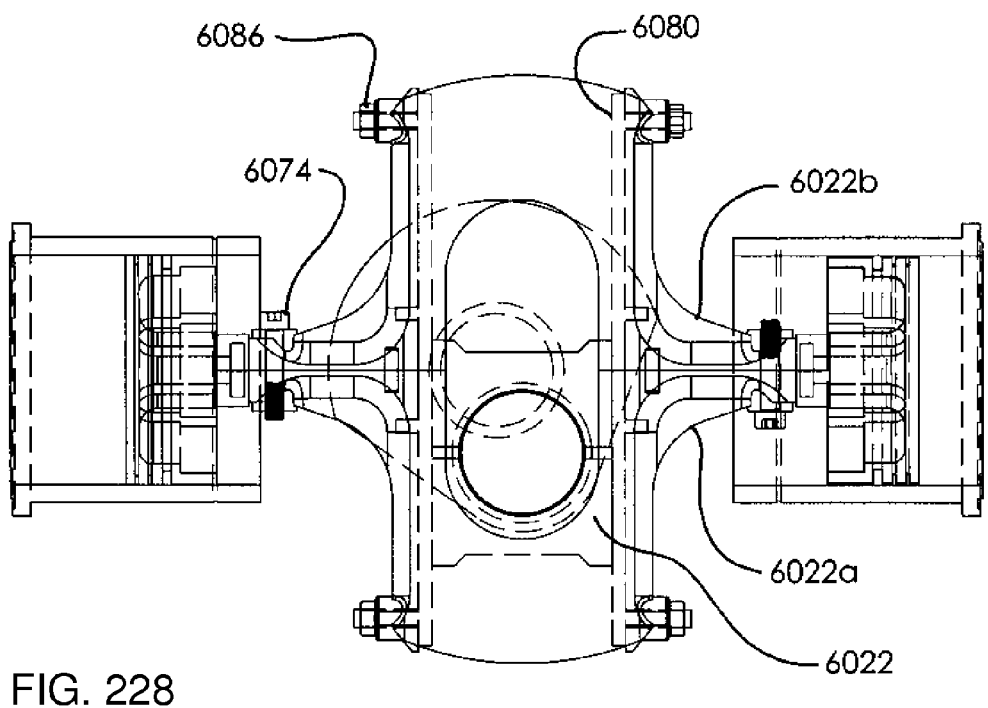
FIG. 228 shows an end view of the third embodiment.

In the FIG. 218 device, the engagement means 5040 is not a closed loop but is open on one side. This may aid in assembly but functionally the arrangement is identical to that of FIG. 228.

Figure 219:
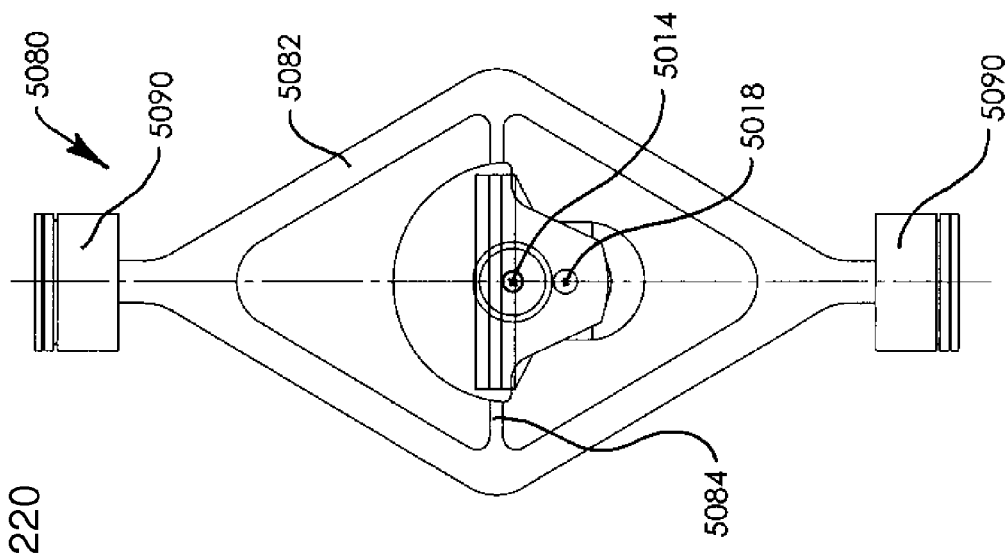
FIG. 219 is an axial end view of a third embodiment of the invention.

FIG. 219 shows a third embodiment which, in some ways, is derived from the FIG. 218 device.

The FIG. 219 device 5050 includes a crank 5052, crank axis 5054, big end 5056 and big end 5058. Connecting means 5060 is rotatable mounted on big end 5058.

Two co-axial cylinders 5062 are provided with respective pistons 5064 mounted for motion along the common axis 5066. The crank axis 5054 is remote from axis 5066.

The two pistons are mounted on or integral with a common engagement means 5068, which is generally T-shaped with an arm 5070 extending away from axis 5066. Preferably, the arm 5070 extends at 90° to the axis 5066 but this is not essential. Also, preferably, the arm extends from approximately midway between the pistons 5064, but again this is not essential.

The arm engages the connecting means 5060, preferably via a sliding tongue and groove or slot arrangement to allow motion of the connecting means along the arm 5070. The arm is preferably linear but need not be.

The arm 5070 extends past the connecting means 5060 and at its free end has a guide member 5072 which is mounted on or in guide means 5074. The guide means 5074 defines a slot 5076 which extends parallel to axis 5066 and so aids in ensuring that motion of the pistons 5064 and engagement means 5068 is parallel to axis 5066. Guide member or members 5078 mounted along the axis 5066 also aid in stabilising the motion of the pistons 5064.

Figure 220:
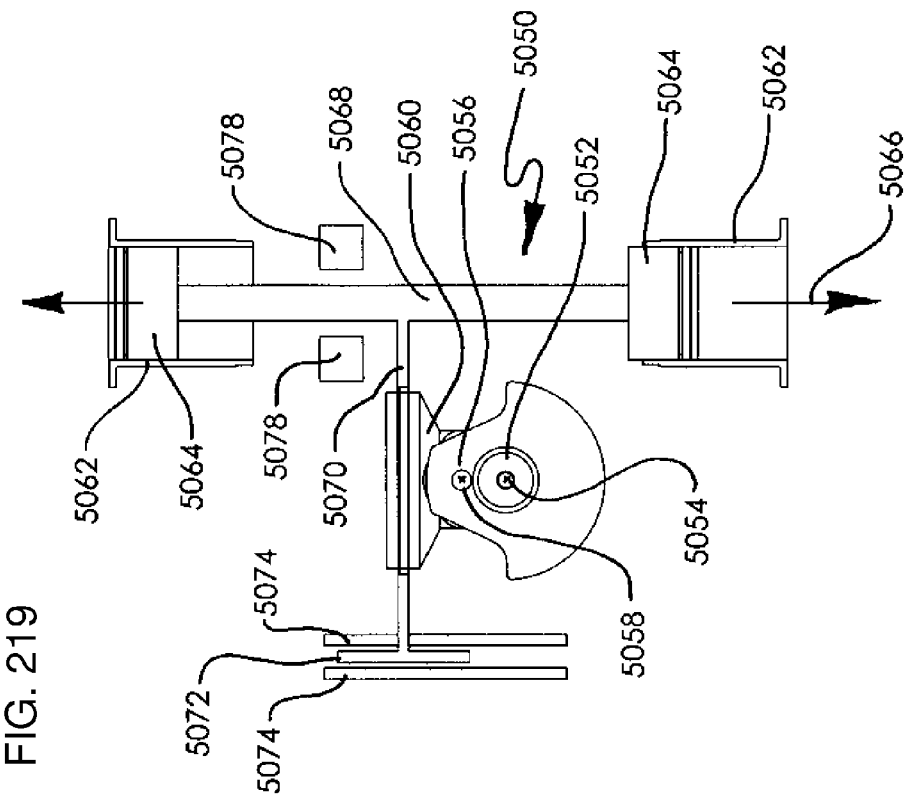
FIG. 220 is an axial end view of a fourth embodiment of the invention.

FIG. 220 shows a first embodiment of the invention 5080 which is based on the FIG. 217 embodiment but includes two co-axially opposed pistons 5090.

In this embodiment, there is provided a common engagement means 5082 which engages the connecting means. The engagement means is effectively the same as two of the engagement means of the FIG. 217 device joined about a common cross-piece 5084.

Figure 221:
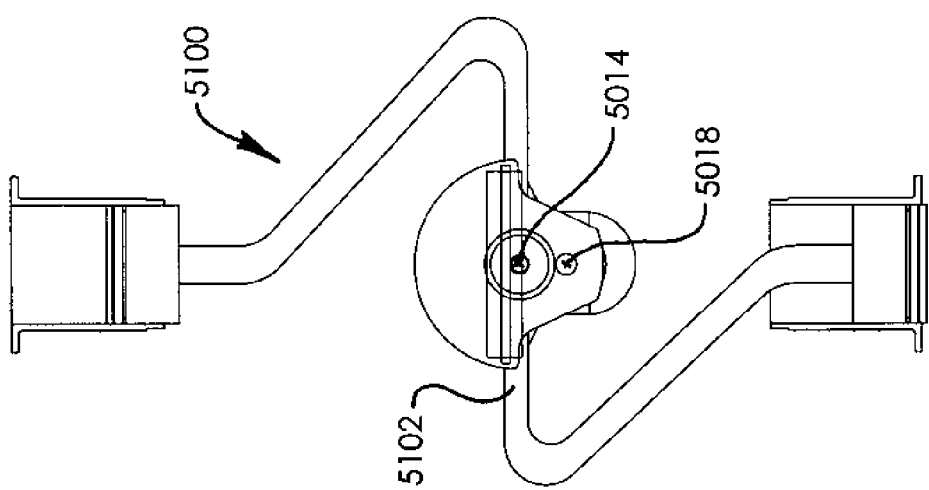
FIG. 221 is an axial end view of a fifth embodiment of the invention.

FIG. 221 shows a further embodiment 5100 having a similar piston, crank and cylinder lay-out to the FIG. 220 device.

In this embodiment, the engagement means 5102 is Z-shaped but otherwise the device is functionally equivalent to that of FIG. 220.

Figure 222:
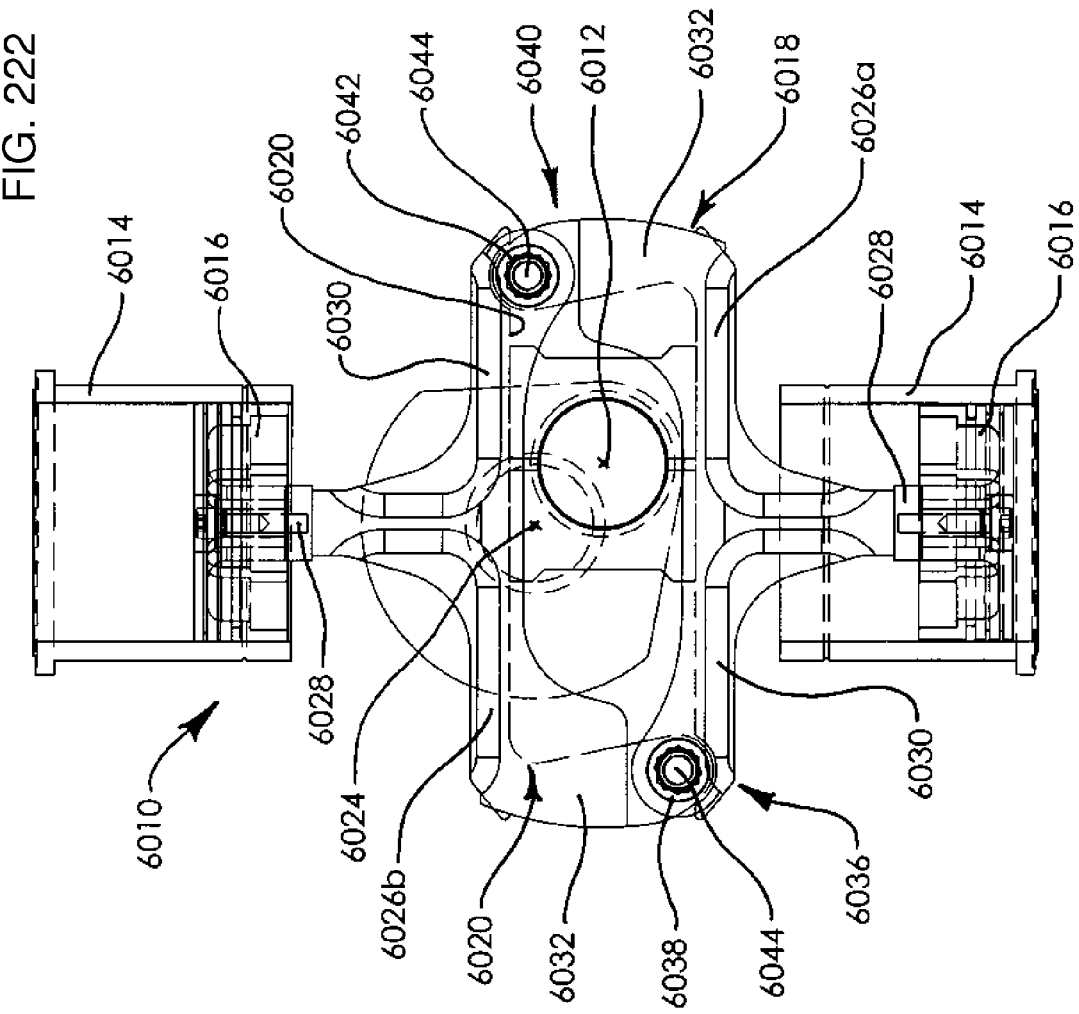
FIG. 222 shows an end view of a first embodiment of the invention. For clarity some components are omitted.
Figure 223:
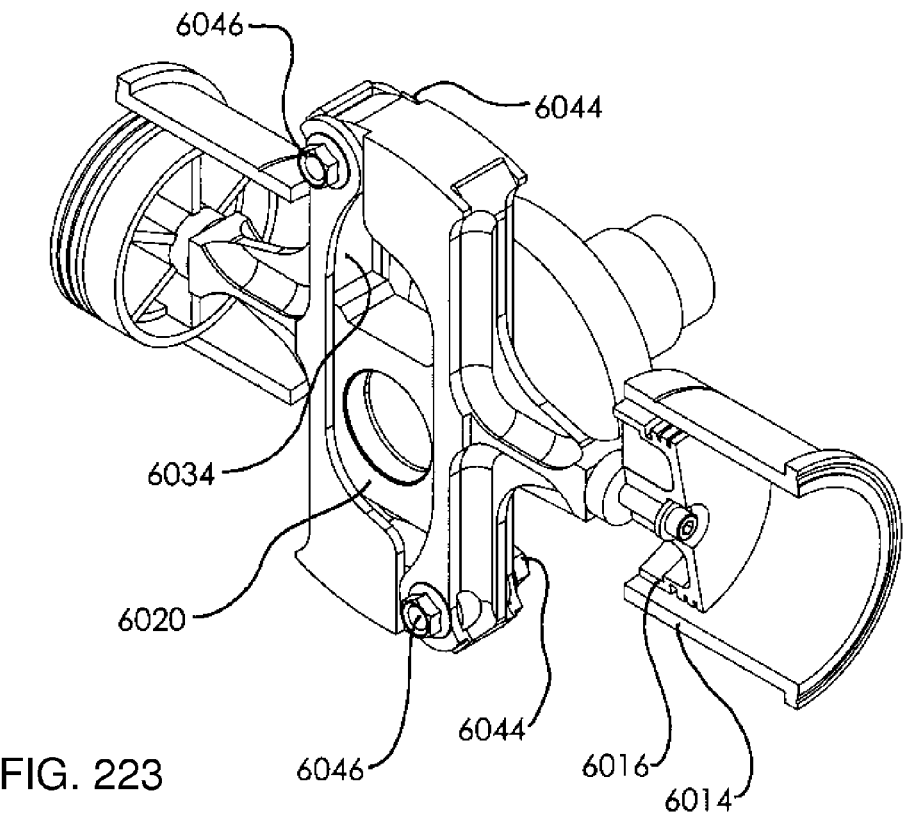
FIG. 223 is a perspective view of the FIG. 1 embodiment.

Referring to FIGS. 222 and 223 there is shown an opposed piston scotch yoke device 6010 having a crank 6012, cylinders 6014 on either side of the crank and two pistons 6016 mounted on a scotch yoke assembly 6018. The scotch yoke assembly 6018 defines a slot 6020 in which a slider 6022, slides. The slider 6022 is rotatably mounted on the big end 6024 of the crank. For clarity only half of the crank is shown and in practice the big end would extend through the slider 6022.

The yoke assembly includes two identical pieces 6026a and 6026b. Each piece has a centrally located mounting 6028 on which a piston 6016 mounts, a transverse section 6030 and a longitudinal section 6032.

The transverse section extends generally perpendicular to the cylinder axes whilst the longitudinal section extends generally parallel to the cylinder axes.

A channel 6034 extends in the transverse and longitudinal sections in which the slider is located. At the free end 6036 of the transverse section are bolt holes 6038 whilst at the free end 6040 the longitudinal section there are bolt holes 6042. The two identical parts are joined with the free ends 6036 of the transverse sections engaging the free ends 6040 of the longitudinal sections of the other part. The bolt holes 6038 and 6042 align and the two parts are secured together with the bolts 6044 and nuts 6046.

A tubular spacer 6048 is positioned within the channel through which the bolts pass to prevent over tightening and crushing of the slot.

As best seen in FIG. 223, the longitudinal sections have closed ends 6050.

Figure 225:
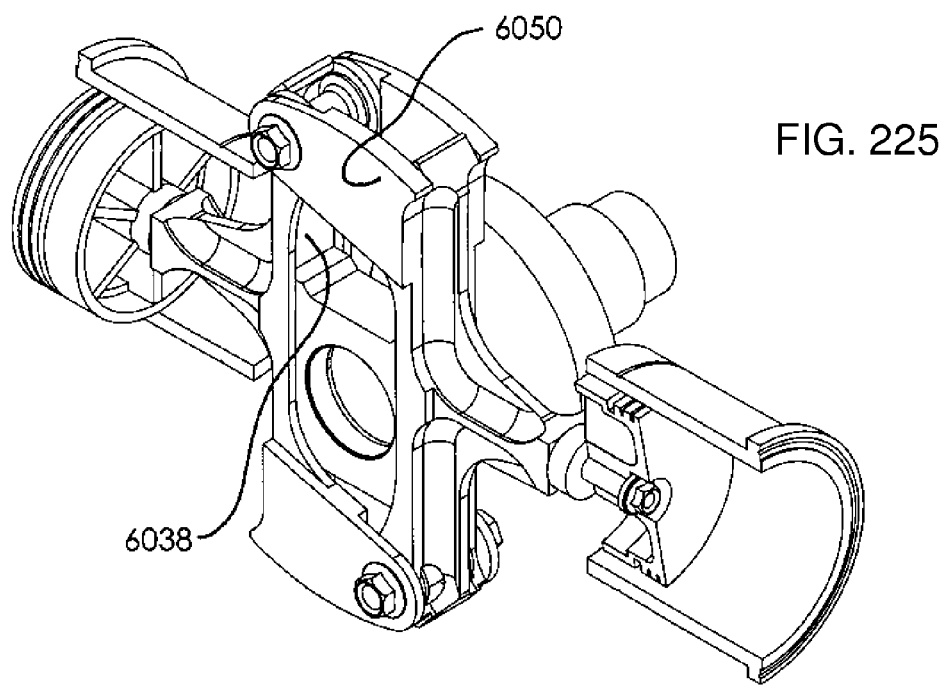
FIG. 225 shows a perspective view of a second embodiment of the invention.

FIGS. 224 and 225 show a variation of the FIGS. 222 and 223 device which is functionally identical except that the end 6050 of each yoke part is not closed. Instead the channel 6038 extends through the end. This aids in manufacturing as the channel may be easily ground with a grinding wheel, without the ends of the longitudinal section limiting movement of the grinding wheel. The end 6050 of the longitudinal section is not required to maintain the slider in the channel.

Figure 226:
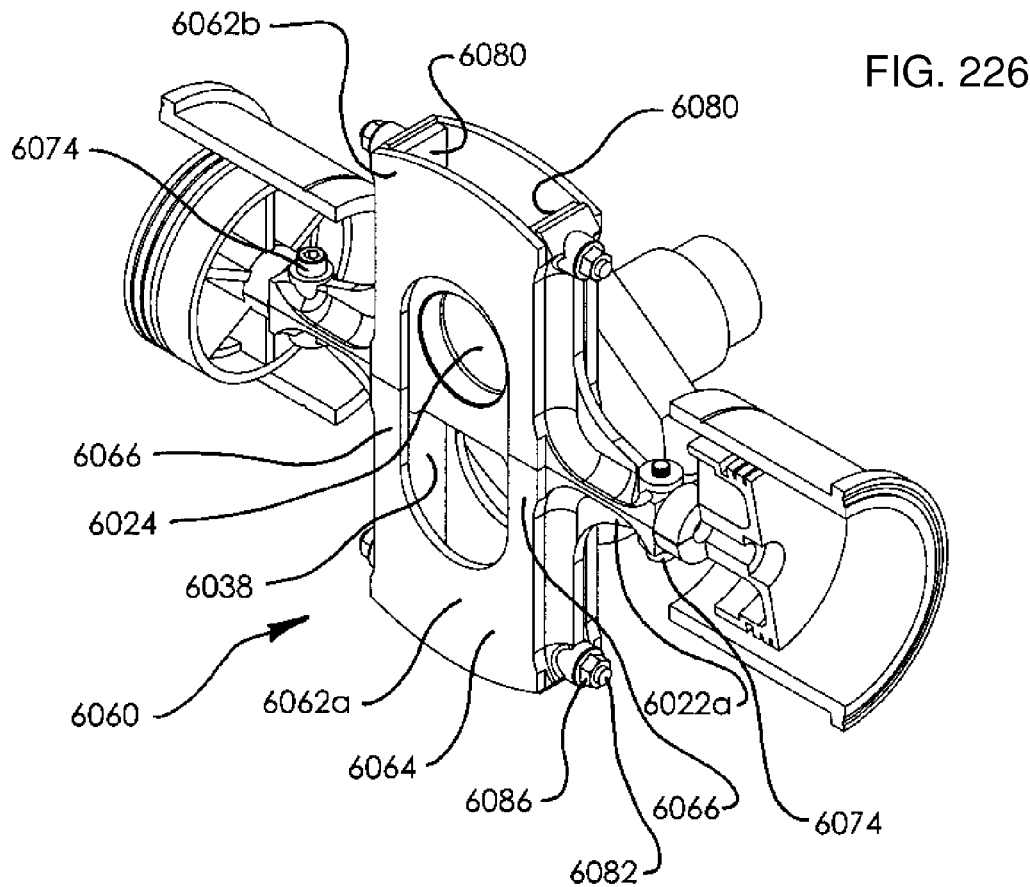
FIG. 226 shows a perspective view of a third embodiment of the invention.
Figure 227:
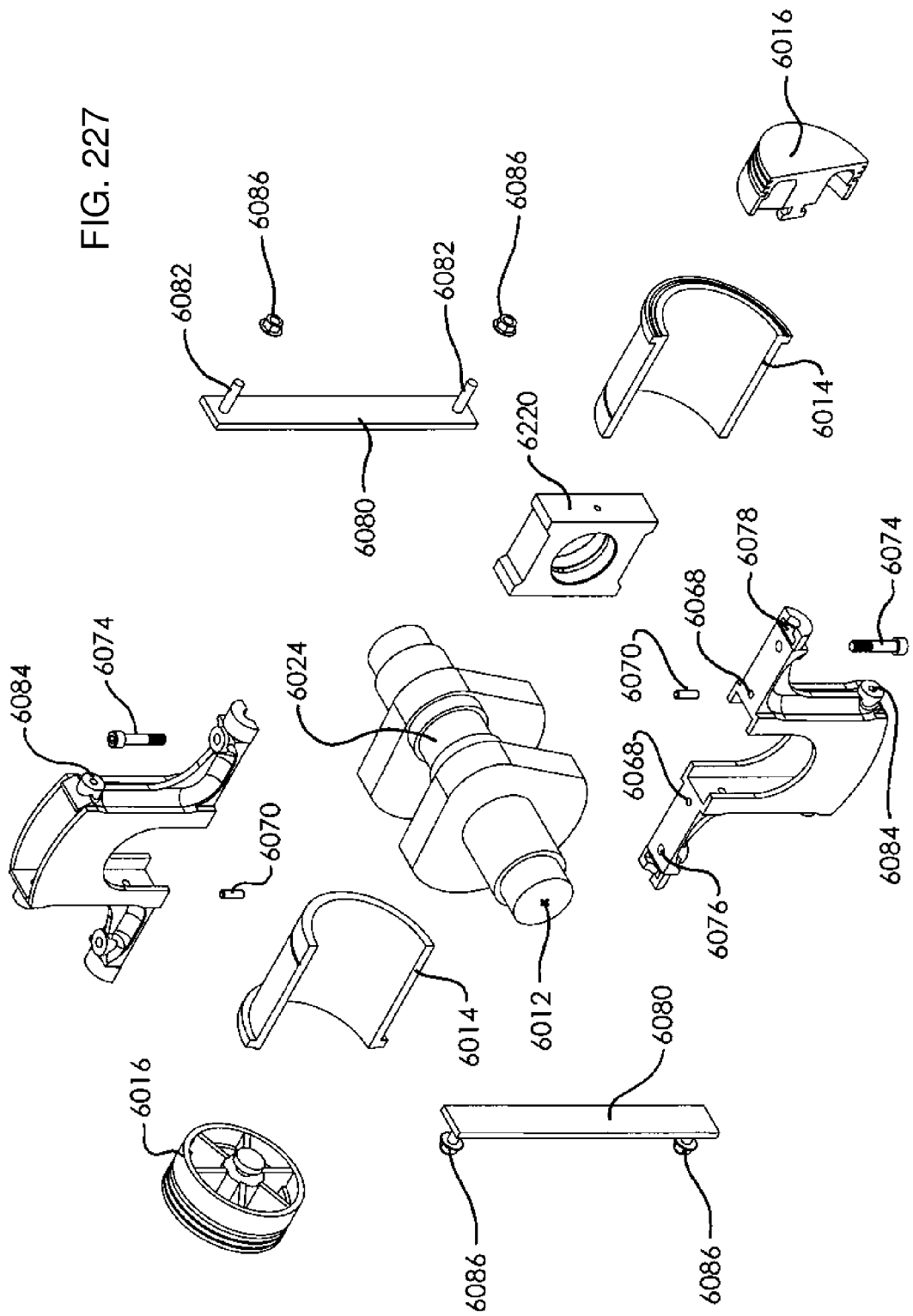
FIG. 227 shows an exploded perspective view of the third embodiment.

FIGS. 226 and 227 show a further variation of the yoke assembly. In this embodiment the yoke assembly 6060 is split along the cylinder axis to form two identical portions 6062a, 6062b. The portions are U-shaped, having a central body 6064 with axially extending arms 6066. Each portion is symmetrical about a centre line perpendicular to the cylinder axis.

The opposing faces of the two pairs of arms 6066 are each provided with two stud holes 6068 and studs 6070 are provided to locate the two halves together. The two halves are secured together by bolts 6074 which pass through bolt holes 6076 at each end of the arms 6066 and screw into the opposing arm 6066. The ends of the arms 6066, when joined, form a receptacle 6078 into which the piston is mounted. This receptacle allows the piston to rotate about the cylinder axis.

The assembly also includes joining members 6080. These joining members are located within the channel and have threaded studs 6082 which extend through holes 6084. The members 6080 are secured to the two halves by nuts 6086 and serve to resist bending of the two halves of the assembly out of a plane.

FIGS. 239 to 232 show conceptually components for building up yoke assemblies.

Figures 229, 230, 231:
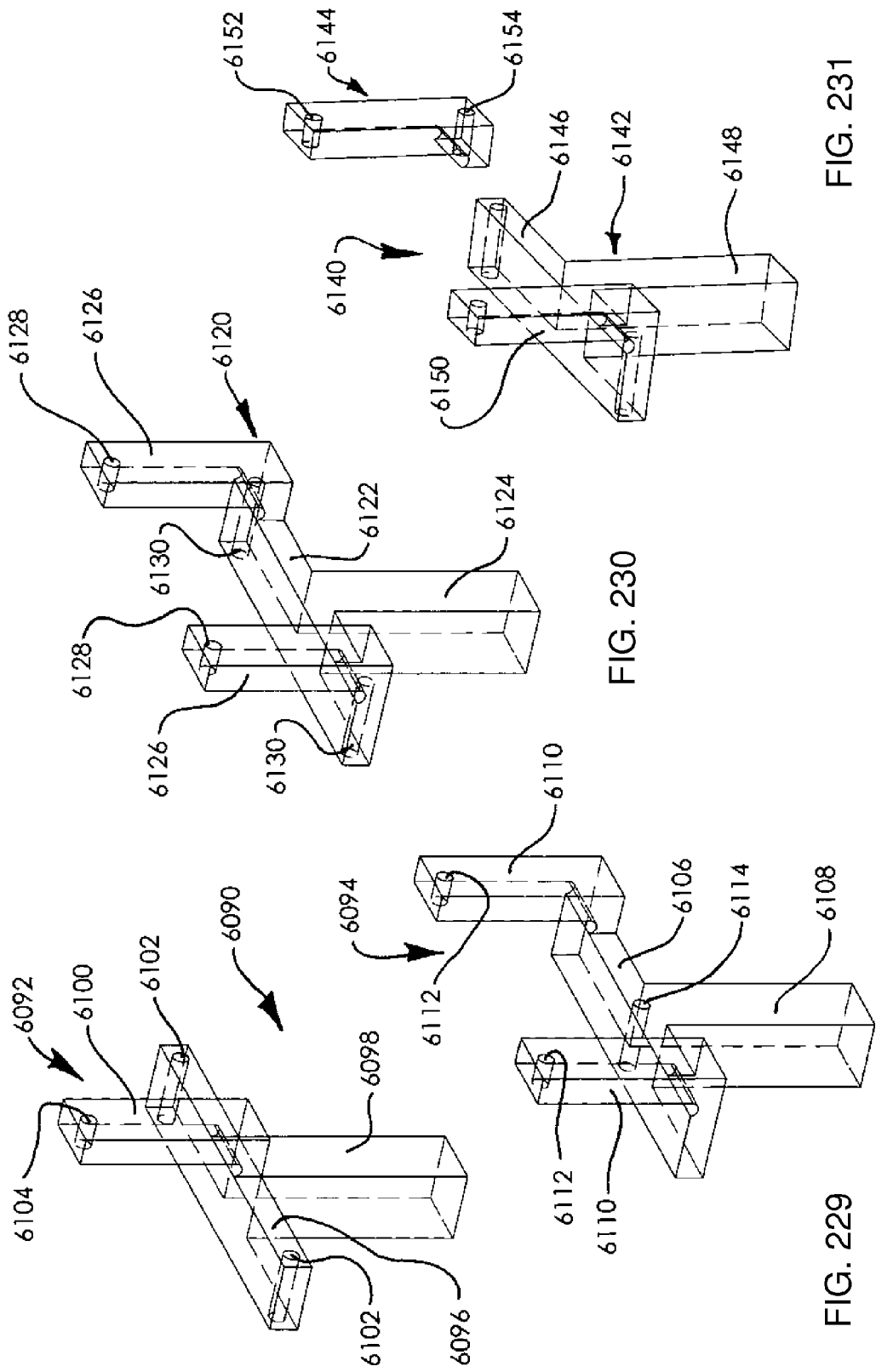
Figure 234:
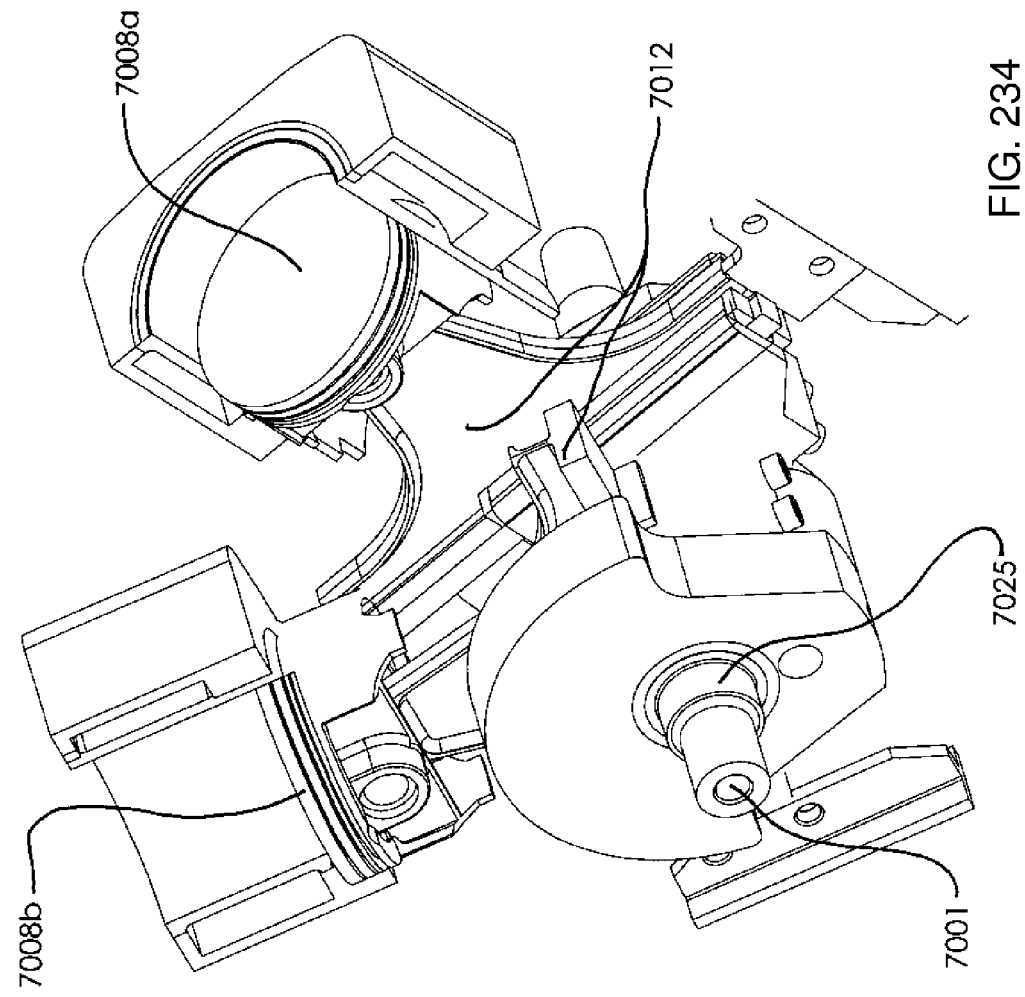
FIG. 234 is an end view of a V scotch yoke device according to our invention wherein the big ends are coaxial and the pistons are disposed for reciprocation at 75 degrees to each other about the main axis.

FIG. 229 shows a yoke assembly 6090 comprising two non-identical portions 6092 and 6094. The first portion 6092 has a transverse arm 6096, a piston mounting portion 6098 and a central arm 6100. The ends of the transverse arm have bolt holes 6102 which extend through the arm whilst the free end of the central arm 6100 has a single hole 6104.

The other portion 6094 has a transverse arm 6106, piston mounting portion 6108 and two arms 6110 extending from adjacent the ends of the transverse arm 6106. The arms 6110 extend from the same side of the central arm and at their free ends have holes 6112. The transverse arm 6106 has a central bolt hole 6114.

When assembled the central arm 6100 is attached to transverse arm 6106 by a bolt passing through hole 6104 into hole 6114. Similarly arms 6110 are attached to transverse arm 6096 by bolts passing through holes 6112 into holes 6102. The bolt holes 6102 and 6114 may be threaded or unthreaded. Three bolts are required for assembly.

It will be appreciated that this configuration may only be used where the big end does not pass through the yoke.

FIG. 230 shows a variation of the twin arm part of FIG. 229. This variation allows two identical components to be joined together. The component 6120 has a transverse arm 6122, piston mounting 6124 and two arms 6126 extending from the same side of the transverse arm 6122. Bolt holes 6128 are provided in the free ends of arms 6126 and holes 6130 in ends of the arm 6122. Two components 6120 may be assembled with holes 6128 and 6130 aligned and secured together by a bolt being screwed into or passing through holes 6130. Four bolts are required for assembly.

FIG. 231 shows a variation of the FIG. 230 embodiment. FIG. 231 shows a yoke component 6140 having two parts 6142 and 6144. The first part 6142 includes transverse arm 6146, piston mounting 6148 and a single longitudinal arm 6150. The other part 6144 corresponds to the arm 6150 and is provided with bolt holes 6152 and 6154 for mounting to the two transverse arms. Whilst this construction has four parts compared to two in the FIG. 230 embodiment, the same number of bolts is required—only four.

FIG. 243 232 shows a yoke assembly 6160 comprising two identical parts 6162. Each part includes a transverse arm 6164, a piston mounting 6166 and two longitudinal arms 6168, 6170. In contrast to the FIG. 230 or 231 embodiments, in this embodiment the arms 6168 and 6170 extend from opposite sides of the transverse arm 6164. Bolt holes 6172 and 6174 are provided at the free ends and base of the arms 6168, 6170 to allow the two components to be joined together.

Figure 233:
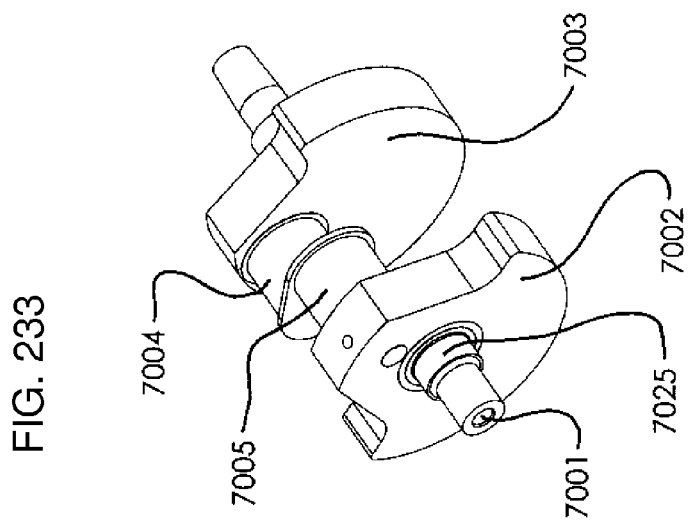
FIG. 233 is an isometric view of a crank with a pair of split big ends.

Turning now to FIG. 233, there is shown a crank mechanism with a main axis 7001, having two webs 7002, 7003 extending outwards of the main journal 7025, the webs support big ends 7005 and 7004 which have their own respective axis. The axes are offset to each other by 30° to each other. The crank is used in the fluid device of FIG. 245 wherein the cylinder axes are at an angle to each other of 75°.

Figure 235:
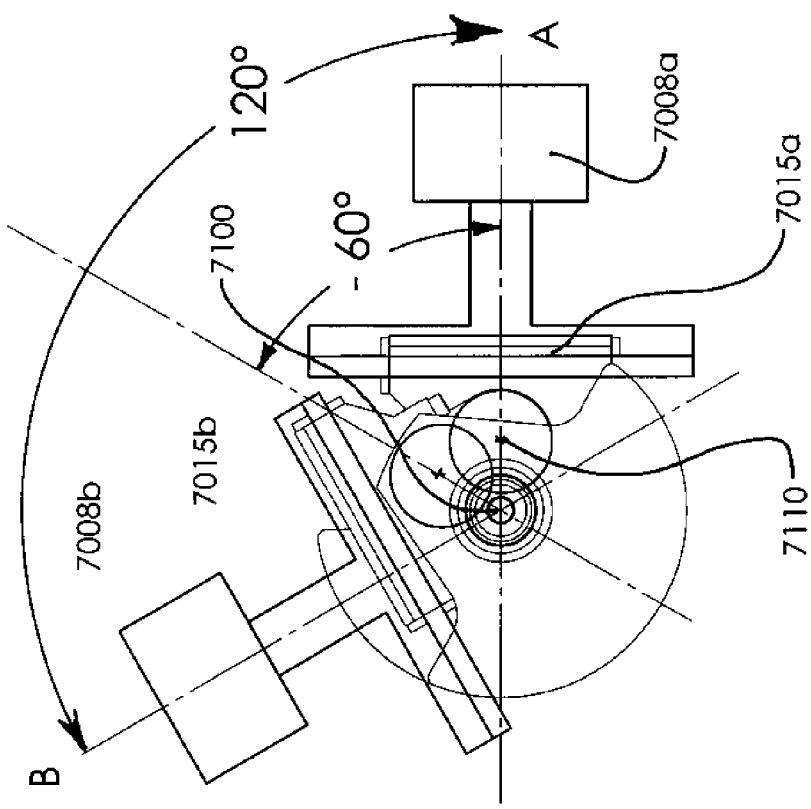
FIG. 235 is an end view of a V scotch yoke device according to our invention wherein the pistons are disposed for reciprocation at 90 degrees to each other about the main axis.

FIG. 235 shows a scotch yoke type device according to our invention wherein the pistons 7008a and 7008b are disposed for reciprocation at 90 degrees about the main axis 7001, the crank has at least one big end and it has only one axis 7010. Note the pistons are constrained to reciprocate along their respective paths A and B, and A and B are at 90 degrees to one another. The pistons 7008a and 7008b are connected to the crank big end s 7010, by way of sliding engagement means 7012.

Figure 236:
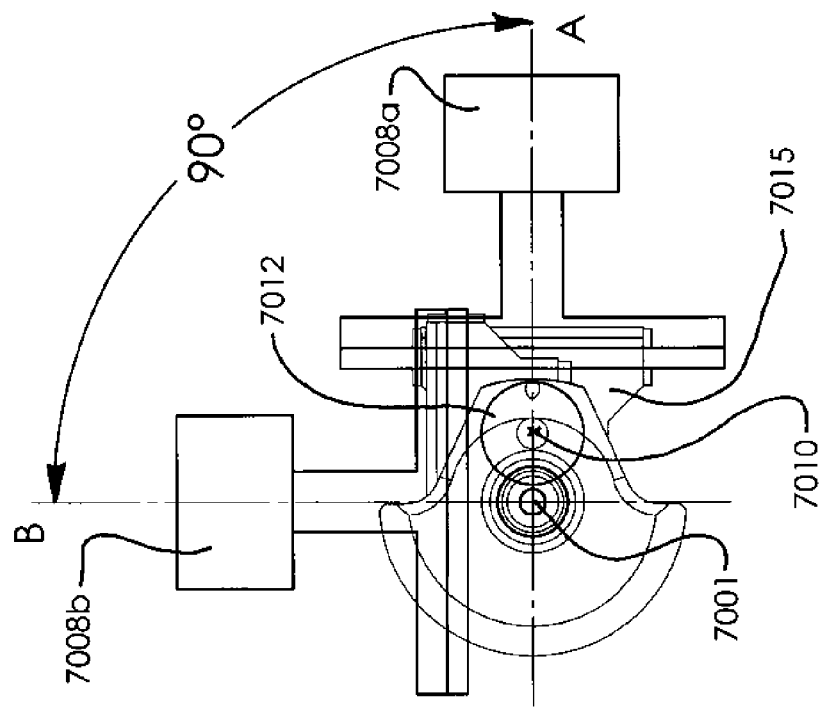
FIG. 236 is an end view of a V scotch yoke device according to our invention wherein the pistons are disposed for reciprocation at 120 degrees to each other about the main axis.
Figures 237, 238:
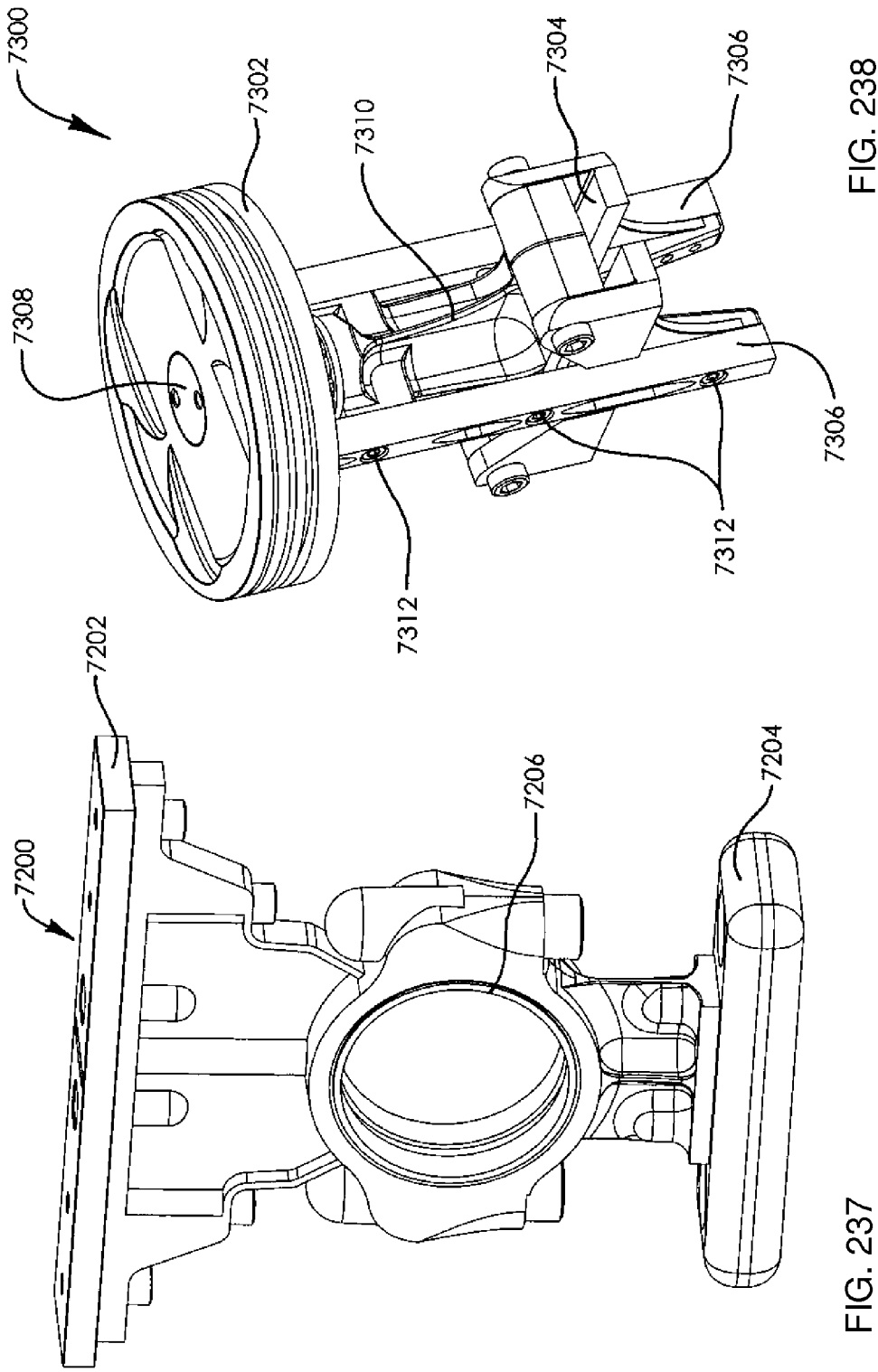
FIG. 237 is a perspective view of a connecting rod designed to be attached to a single piston assembly.
FIG. 238 is a perspective view of a single piston assembly designed to be attached to the connecting rod of FIG. 237.

FIG. 236 depicts a V scotch yoke type device according to our invention wherein the pistons 7008a, 7008b are disposed about the main axis 7001 at 120 degrees from each other. Path B is 30 degrees rotated anti clockwise from being at 90 degrees to path A. Further, big end axis 7004 is rotated 60 degrees anti clockwise from big end axis 7005. As above, big end 7100 is for the motion of the piston that travels on the path 7100 and big end 7110 is for the motion of the piston that travels on the path A.

It will be appreciated that it is best if the pistons reciprocate in a manner that they are one half of a sinewave out of phase from each other. Provided that the pistons are of the same mass, the engine will be perfectly balanced. It is also obvious that the crank disk and scotch yoke embodiments of our invention that are of V configuration may be balanced in the same way and that X, horizontally opposed or 180 degree configuration devices of our invention may also be balanced similarly.

It is also clear that an engine designer may wish to construct a fluid scotch yoke type device of a type depicted and described herein wherein a degree of imbalance is in some way preferred, accordingly we would broaden this application to include devices with their pistons displaced at not quite one quarter of a sine wave out from each other, say up to 10%-20% or even up to 50% of the sine wave out of true balance, this would still fit broadly within the scope of the invention.

For the purpose of this discussion, the engine is a 90 degree vee twin, with the cylinders 45 degrees to the left and right of a vertical centre line. The engine is assumed to be rotating clockwise so that when the crankshaft is vertical, the left piston is going up and the right piston is at the same relative position in its cylinder but doing down.

The engine is assumed to be made up of the following components:

Crankshaft whose mass is concentrated in two positions namely the counterweight and the big-end.

Conrod whose mass is concentrated in 3 positions, the left slider, the right slider and the counterweight directly below the big-end.

The left and right pistons whose mass is assumed to be concentrated at the centre of their respective bores and some distance above the respective sliders.

The stationary parts of the engine (crank case, block, etc.) are assumed to rigidly mounted so they can be disregarded in considering engine balance issue.

Imagine we start assembling the engine as follows:

Install a crankshaft which is balanced on its own. That is, its centre of mass is at its centre of rotation, the main bearing. Clearly this is perfectly balanced.

Now add the component referred to as the "con-rod". Because the left and right slider mechanisms will be above the big-end, the conrod will require its own counterweight located directly below the big-end if we want its centre of gravity to be at the big-end. If we add to the crankshaft counterweight an amount calculated from the total mass of the conrod, we can keep the centre of gravity at the main bearing and the assembly so far will still be perfectly balanced.

Note that the conrod maintains the same orientation all the time so that it is in fact "orbiting". Because its centre of mass is at the big end, it will have no tendency to rotate as the crankshaft rotates. If we reduced the mass of the conrod counterweight so that the conrod centre of mass was above the big-end, then the conrod would tend to rock as the crankshaft rotated. Provided it is prevented from actually rocking, its centre of mass will still describe a circle of the same radius and can still be perfectly balanced by the crankshaft counterweight.

There is thus a design choice here whether to reduce the load on the slider mechanisms by balancing the conrod or whether to reduce the mass of the conrod and the mass of the crankshaft counterweight thereby reducing inertial forces generally. An alternative would be to prevent the conrod from rotating by other means such as a second crank mechanism.

If we now add the pistons, we put the engine out of balance. However, because the piston motion is perfectly simple harmonic and the pistons are 90 degrees out of phase, the two together are exactly equivalent to one piston mass travelling in a circle. We therefore only have to add to the crankshaft counterweight a mass calculated from the mass of one piston (and adjusted to allow for the ratio of crankshaft throw to crankshaft counterweight distance) and the whole engine remains perfectly balanced.

This is easiest to visualise if you tilt your head to the left so that the left piston appears to be moving vertically and the right piston moving horizontally. When the left piston is at its highest point, the crankshaft counterweight is at its lowest point. At the same instant, the "right-hand" piston is at midstroke and travelling to the right. As far as the horizontal motion of the crankshaft counterweight is concerned, it is at midstroke and travelling to the left. The crankshaft counterweight can therefore be adjusted to exactly balance both pistons.

The centre of mass of all moving parts of the engine remains exactly stationary. There are no higher order effects as in a conventional engine. These arise because the piston motion is not simple harmonic and the motion of a conventionally driven piston is not simple harmonic and the motion of a conventionally driven piston is not symmetrical near top and bottom dead centre.

It is also interesting to note that the internal kinetic energy of the Raffaele slider engine is also constant throughout its cycle. Provided the angle of the cylinders is 90 degrees, then the combine kinetic energy of the pistons is constant. This means that there is no tendency for the mechanism to resist rotating at constant angular velocity.

The following is the theory behind the balancing of the engine with offset big ends.

A is the angle between the bores of 2 cylinders in a vee engine.

D is the angle between lines extending from the main axis to the big ends.

If D is set equal to 2*(A−90), the centre of gravity of the two pistons will be found to move in a circle so that it can easily be balanced by a counterweight on the crankshaft.

If the connecting rods are allowed to pivot relative to the pistons, we assume that the connecting rods are sufficiently long that the motion of the pistons is simple harmonic. Where pivoting is not allowed or limited to very small amounts the motion will inherently be simple harmonic motion to practical effect.

The mass of the connecting rods is ignored.

Angles are measured positive anticlockwise from the positive X axis.

Assume the first bore is a 0 degrees.

The second bore is at an angle A degrees.

When the big end for the first piston is at 0 degrees (so that the first piston is at TDC) the big end of the second piston is at D degrees.

Consider the general case when the big end for the first piston is at R degrees and the big end of the second piston is at D+R degrees.

The X co-ordinate of the first piston is Cos(R) measured with respect to its mean position.

The Y co-ordination of the first piston is always zero.

The radius of the crankshaft for the second piston is also unit length, but in the general case we are considering, the value of the radius projected onto the axis of the second bore is Cos(A−D−R).

Since we are only interested in variations in the position of the centre of gravity of the pistons, we can take the second piston to be at:

$X = \text{Cos}(A-D-R) \cdot \text{Cos}(A)$ $Y = \text{Cos}(A-D-R) \cdot \text{Sin}(A)$ The centre of gravity of the two pistons together can be taken as:

$X = \text{Cos}(A-D-R) \cdot \text{Cos}(A) + \text{Cos}(R)$ $Y = \text{Cos}(A-D-R) \cdot \text{Sin}(A) + 0$ Note that these should both be divided by 2, but this is omitted to simplify the appearance of the algebraic expressions.

It turns out that for any value of A, if we set D=2*(A−90), then the centre of gravity of both pistons together moves in a circle and can be easily balanced by a counterweight attached to the crankshaft.

We can prove this is the case by substituting 2*A−180 for D in the above expressions which become $X = \text{Cos}(A-2 \cdot A+180-R) \cdot \text{Cos}(A) + \text{Cos}(R)$ $Y = \text{Cos}(A-2 \cdot A+180-R) \cdot \text{Sin}(A) + 0$ which become $X = \text{Cos}(-A+180-R) \cdot \text{Cos}(A) + \text{Cos}(R)$ $Y = \text{Cos}(-A+180-R) \cdot \text{Sin}(A) + 0$ which equals $X = -\text{Cos}(A+R) \cdot \text{Cos}(A) + \text{Cos}(R)$ $Y = -\text{Cos}(A+R) \cdot \text{Sin}(A)$ simplifying we get $X = \text{Sin}(A) \cdot (\text{Cos}(R) \cdot \text{Sin}(A) + \text{Sin}(R) \cdot \text{Cos}(A))$ $Y = \text{Sin}(A) \cdot (-\text{cos}(A) \cdot \text{Cos}(R) + \text{Sin}(A) \cdot (\text{Sin}(R))$ or $X = \text{Sin}(A) \cdot \text{Sin}(A+R)$ $Y = \text{Sin}(A) \cdot \text{Cos}(A+R)$ This is the equation of a point moving in a circle of radius Sin(A).

Thus the motion of the two pistons together can be counterbalanced by a single mass, equal in mass to one piston mass rotating on a radius of Sin(A) times the crankshaft radius. (The fact that there are actually two pistons compensates for the factor of 2 which was omitted in the expressions for X and Y above).

It will be appreciated that when A=90°, ie a 90° V configuration, that D=0°, ie, the axes of the two big ends are not offset but are coaxial. Thus a 90° V configuration with a single big end is merely a special case where D=0°.

FIGS. 248 and 249 show a connecting rod 7200 assembly and a piston assembly 7300 for use together in a fluid device (not shown) having only one piston assembly 7300 mounted on the or each connecting rod 7200. The connecting rod 7200 has a T shaped engagement means 7202 for sliding engagement with a T shaped slot 7304 on the piston assembly. A counter weight 7204 is provided opposite the big end journal 7206 to partially or fully counterbalance the mass of the connecting rod and the piston assembly located on the other side of the big end journal 7206. The piston assembly 7300 also includes a piston crown 7302 and longitudinally extending guides 7306 for engagement with guide means to constrain the piston assembly to reciprocate along a linear path. It will be noted that the piston assembly is a made up unit with the various components bolted together. Piston crown 7302 is attached to the central assembly 7310 via a bolt 7308; guides 7306 are attached to the central assembly 7310 via bolts 7312.

It will be apparent to those skilled in the art that many modifications and variations may be made to the embodiments described herein without departing from the spirit or scope of the invention.

The invention has industrial applicability in relation to fluid machines in general and more specifically to internal combustion engines and pumps.

What is claimed is:

1. A scotch yoke fluid device selected from an engine and a pump including:
   a crankshaft having a main axis and having a big end bearing pin which has a big end bearing pin axis, the crankshaft adapted for rotation about the main axis and the big end bearing pin being adapted to orbit the main axis during crankshaft rotation, the big end bearing pin adapted to sweep a first volume as it orbits the main axis;
   connecting means rotatably mounted on the big end bearing pin and adapted to orbit the main axis during crankshaft rotation;
   a cylinder having a cylinder axis, the cylinder axis being perpendicular to the main axis;
   a piston having a piston axis and including:
   (a) a piston crown having a cross sectional area perpendicular to the piston axis;
   (b) first guide means elongate along an axis extending perpendicular to the piston axis;
   (c) second guide means elongate along an axis extending parallel to the piston axis and having a first end and a second end;
   the piston mounted for reciprocation along the piston axis;
   a second volume defined by a projection of the piston crown cross sectional area along the piston axis in the direction of the crankshaft
   the first guide means being located only to that side of the big end bearing pin axis lying between the big end bearing pin axis and the piston crown;
   the first guide means engaging the connecting means whereby the connecting means is constrained to reciprocate along the first guide means during crankshaft rotation;
   a component selected from a crank case and a block including third guide means adapted to engage the second guide means, the second guide means and the third guide means cooperating to substantially prevent rotation of the piston around an axis parallel to the main axis;
   wherein:
   (i) the second guide means and the third guide means are located such that they are in engagement only within the second volume;
   (ii) the second guide means is positioned to a side of the first guide means, the first end of the second guide means is located closer to the piston crown than is the first guide means, and when the piston is at TDC the second end of the second guide means is located closer to the big end bearing pin axis than is the first guide means; and
   (iii) the second guide means is adapted to be moved in and out of the first volume during crankshaft rotation such that the second guide means is outside the first volume when the piston is at TDC.

2. A scotch yoke fluid device according to claim 1, wherein the piston includes at least two second guide means to the same side of the first guide means and each respective second guide means is engaged by a respective third guide means.

3. A scotch yoke fluid device according to claim 1 wherein the piston includes at least two second guide means, there being at least one second guide means located on a first side of the first guide means and at least one other second guide means located on the opposite side of the first guide means and each second guide means engaged by a respective third guide means.

4. A scotch yoke fluid device according to claim 1 wherein the second guide means is chosen from a group including: a rod, a tube, a web, or a slot, and the third guide means includes a surface shape adapted for engagement with the second guide means.

5. A scotch yoke fluid device according to claim 1 wherein the first guide means extends within 5° of perpendicular relative to the piston axis.

6. A scotch yoke fluid device according to claim 1 wherein the engagement of the second guide means by the third guide means is such that rotation of the first guide means of the piston around an axis parallel to the main axis is substantially prevented.

7. A scotch yoke fluid device according to claim 1, which includes a pair of pistons in a V-configuration, each piston of the pair mounted for reciprocation within a respective cylinder, the crankshaft adapted to be moved along the bisector of the included angle such that the compression ratio of the pair of pistons within their respective cylinders may be raised or lowered without change of phase of either piston motion relative to crankshaft rotation.

8. A scotch yoke fluid device according to claim 1, which includes a pair of pistons in a V-configuration, each piston of the pair mounted for reciprocation within a respective cylinder, the crankshaft adapted to be moved along a linear path such that the compression ratio of each piston within its respective cylinder may be altered equally.

9. A scotch yoke fluid device according to claim 1, in which the crankshaft is adapted to be moved along a path such that the compression ratio of the piston within the cylinder may be raised or lowered.

10. A scotch yoke fluid device according to claim 9, in which the path is linear.

11. A scotch yoke fluid device according to claim 9, in which the path is arcuate.

12. A scotch yoke fluid device according to claim 1 wherein the connecting means includes adjustable slider means, the connecting means incorporating hydraulic ram means within the connecting means and being adapted to raise and to lower the adjustable slider means relative to the cylinder and the connecting means.

13. A scotch yoke fluid device according to claim 1 wherein the connecting means includes adjustable slider means, the connecting means incorporating hydraulic ram means within the connecting means and being adapted to vary the angle of the adjustable slider means relative to the cylinder to alter the phase of the piston motion relative to the crankshaft angle.

14. A scotch yoke fluid device according to claim 1 including means for adjusting the distance along the piston axis over which the piston crown may travel.

15. A scotch yoke fluid device according to claim 1 in which the piston crown and the second guide means are parts of a multi-part piston assembly including intermediate connecting means interconnecting the piston crown of the multi-part piston assembly with the first guide means of the multi-part piston assembly.

16. A scotch yoke fluid device according to claim 1 in which the cylinder axis is not radial to the main axis.

17. A piston for a scotch yoke fluid device selected from a scotch yoke engine and a pump, the piston having a piston axis and including:
- (a) a piston crown having a cross sectional area perpendicular to the piston axis;
- (b) first guide means elongate along an axis extending substantially perpendicular to the piston axis;
- (c) second guide means elongate along an axis extending parallel to the piston axis and having a first end and a second end;

wherein the second guide means is positioned to a side of the first guide means and spaced therefrom, and wherein the distance between the first end of the second guide means and the piston crown is less than the distance between the first guide means and the piston crown.

18. A scotch yoke fluid device selected from a scotch yoke engine and a pump including: a cylinder having a cylinder axis;
- a first crankshaft having a first big end bearing pin which is adapted to orbit around a first main axis for the first crankshaft;
- connecting means rotatably mounted on the first big end bearing pin;
- at least one piston mounted for reciprocal motion in the cylinder along a piston axis, the at least one piston adapted to engage the connecting means;
- the at least one piston including at least one second guide means having a respective first end and a respective second end, the at least one second guide means elongate along a respective second guide means axis extending parallel to the piston axis;
- a third guide means adapted to engage the second guide means such that the piston is prevented from rotary movement around an axis extending parallel to the first main axis;
- stabilizing means engaging the connecting means to limit the connecting means to a single orientation as it orbits the first main axis.

19. The scotch yoke fluid device according to claim 18 wherein the stabilizing means includes a linkage pivotably mounted to the connecting means and to a second crankshaft big end bearing pin for a second crankshaft, the second crankshaft mounted on a crankcase to rotate around a second main axis for the second crankshaft.

20. The scotch yoke fluid device according to claim 18 wherein the stabilizing means includes a second crankshaft having a second main axis, the second crankshaft having a second big end bearing pin centred on a second big end bearing pin axis; the second crankshaft rotatable around the second main axis, the second main axis parallel to and spaced from the first main axis, the connecting means rotatably mounted on the first big end bearing pin, and the connecting means rotatably mounted on the second big end bearing pin.

* * * * *